United States Patent
Kim et al.

(10) Patent No.: US 11,387,973 B2
(45) Date of Patent: Jul. 12, 2022

(54) METHOD AND APPARATUS FOR TRANSMITTING AND RECEIVING SCHEDULING REQUESTS

(71) Applicant: Samsung Electronics Co., Ltd., Suwon-si (KR)

(72) Inventors: Soenghun Kim, Suwon-si (KR); Jaehyuk Jang, Suwon-si (KR); Donggun Kim, Seoul (KR); Sangbum Kim, Suwon-si (KR); Seungri Jin, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/815,024

(22) Filed: Nov. 16, 2017

(65) Prior Publication Data

US 2018/0139030 A1    May 17, 2018

(30) Foreign Application Priority Data

Nov. 17, 2016   (KR) .................. 10-2016-0153085
Apr. 14, 2017   (KR) .................. 10-2017-0048552

(51) Int. Cl.
*H04L 5/00*        (2006.01)
*H04W 72/12*    (2009.01)
(Continued)

(52) U.S. Cl.
CPC .......... *H04L 5/0098* (2013.01); *H04L 5/0042* (2013.01); *H04L 5/0053* (2013.01);
(Continued)

(58) Field of Classification Search
CPC ............... H04L 5/0098; H04L 5/0053; H04W 72/1278; H04W 72/044; H04W 28/0278
See application file for complete search history.

(56) References Cited

U.S. PATENT DOCUMENTS

2012/0039278 A1*  2/2012  Park .................. H04W 72/1278
                                                            370/329
2014/0161086 A1*  6/2014  Tamura ................. H04W 72/14
                                                            370/329

(Continued)

FOREIGN PATENT DOCUMENTS

KR     10-2015-0128426 A    11/2015
WO     2016/137532 A1        9/2016

OTHER PUBLICATIONS

Intel Corporation, Scheduling request design for NR, R1-1611998, 3GPP TSG-RAN WG1 #87, Nov. 6, 2016, Reno, USA.

(Continued)

*Primary Examiner* — Robert C Scheibel
(74) *Attorney, Agent, or Firm* — Jefferson IP Law, LLP

(57) ABSTRACT

A communication method and system for converging a $5^{th}$-Generation (5G) communication system for supporting higher data rates beyond a $4^{th}$-Generation (4G) system with a technology for Internet of Things (IoT) are provided. The present disclosure may be applied to intelligent services based on the 5G communication technology and the IoT-related technology, such as smart home, smart building, smart city, smart car, connected car, health care, digital education, smart retail, security and safety services. A method and apparatus of activating/deactivating cells with scalable transmission time intervals (TTIs) is disclosed.

16 Claims, 74 Drawing Sheets

(51) Int. Cl.
*H04W 28/02* (2009.01)
*H04W 72/04* (2009.01)

(52) U.S. Cl.
CPC ..... *H04W 28/0278* (2013.01); *H04W 72/044* (2013.01); *H04W 72/1278* (2013.01); *H04L 5/001* (2013.01); *H04L 5/0087* (2013.01); *H04W 72/1252* (2013.01)

(56) References Cited

U.S. PATENT DOCUMENTS

| | | |
|---|---|---|
| 2014/0293898 A1 | 10/2014 | Tseng |
| 2014/0301312 A1* | 10/2014 | Kim .................. H04W 72/1263 370/329 |
| 2015/0049697 A1 | 2/2015 | Worrall et al. |
| 2015/0078286 A1* | 3/2015 | Kim .......................... H04L 1/18 370/329 |
| 2015/0319724 A1 | 11/2015 | Chae et al. |
| 2016/0073427 A1 | 3/2016 | Worrall |
| 2016/0142981 A1 | 5/2016 | Yi et al. |
| 2017/0202009 A1* | 7/2017 | Kim .................. H04W 72/1284 |
| 2017/0367097 A1 | 12/2017 | Sohn et al. |
| 2018/0020462 A1 | 1/2018 | Xiong et al. |
| 2018/0049231 A1* | 2/2018 | Yamada ............ H04W 72/1252 |
| 2019/0150176 A1* | 5/2019 | Pelletier ............ H04W 72/1247 370/329 |
| 2019/0174513 A1* | 6/2019 | Loehr .................. H04W 72/14 |
| 2019/0230565 A1* | 7/2019 | Han ...................... H04W 48/20 |
| 2020/0037385 A1 | 1/2020 | Park et al. |
| 2020/0059959 A1* | 2/2020 | Turtinen ............... H04W 74/02 |
| 2020/0059967 A1 | 2/2020 | Kim et al. |

OTHER PUBLICATIONS

International Search Report dated Feb. 9, 2018, issued in International Application No. PCT/KR2017/013021.
Extended European Search Report dated May 18, 2020, issued in a counterpart European application No. 17870689.1-1205 / 3527021.
Korean Office Action dated Jan. 19, 2021, issued in a counterpart Korean Application No. 10-2017-0048552.
Ericsson, R2-165341, Uplink scheduling for NR, 3GPP TSG RAN WG2 #95, 3GPP; Agenda Item: 9.4.2.3; Aug. 12, 2016.
Indian Office Action dated Dec. 8, 2021, issued in a counterpart Indian Application No. 201937019495.
Korean Office Action dated Mar. 2, 2022, issued in a counterpart Korean Application No. 10-2021-0149130.
MediaTek Inc.; RLM and RLF in HF NR; 3GPP TSG-RAN WG2 Meeting #96; R2-168130 Nov. 4, 2016, Reno, USA.
Samsung; Motivation and Considerations of Beam Recovery; 3GPP TSG-RAN WG2 Meeting #96; R2-167945 Nov. 4, 2016, Reno, USA.
LG Electronics; Discussion on multi-carrier operation between LTE and NR; 3GPP TSG RAN WG1 Meeting #87 R1-1611783; Nov. 5, 2016, Reno, USA.

* cited by examiner

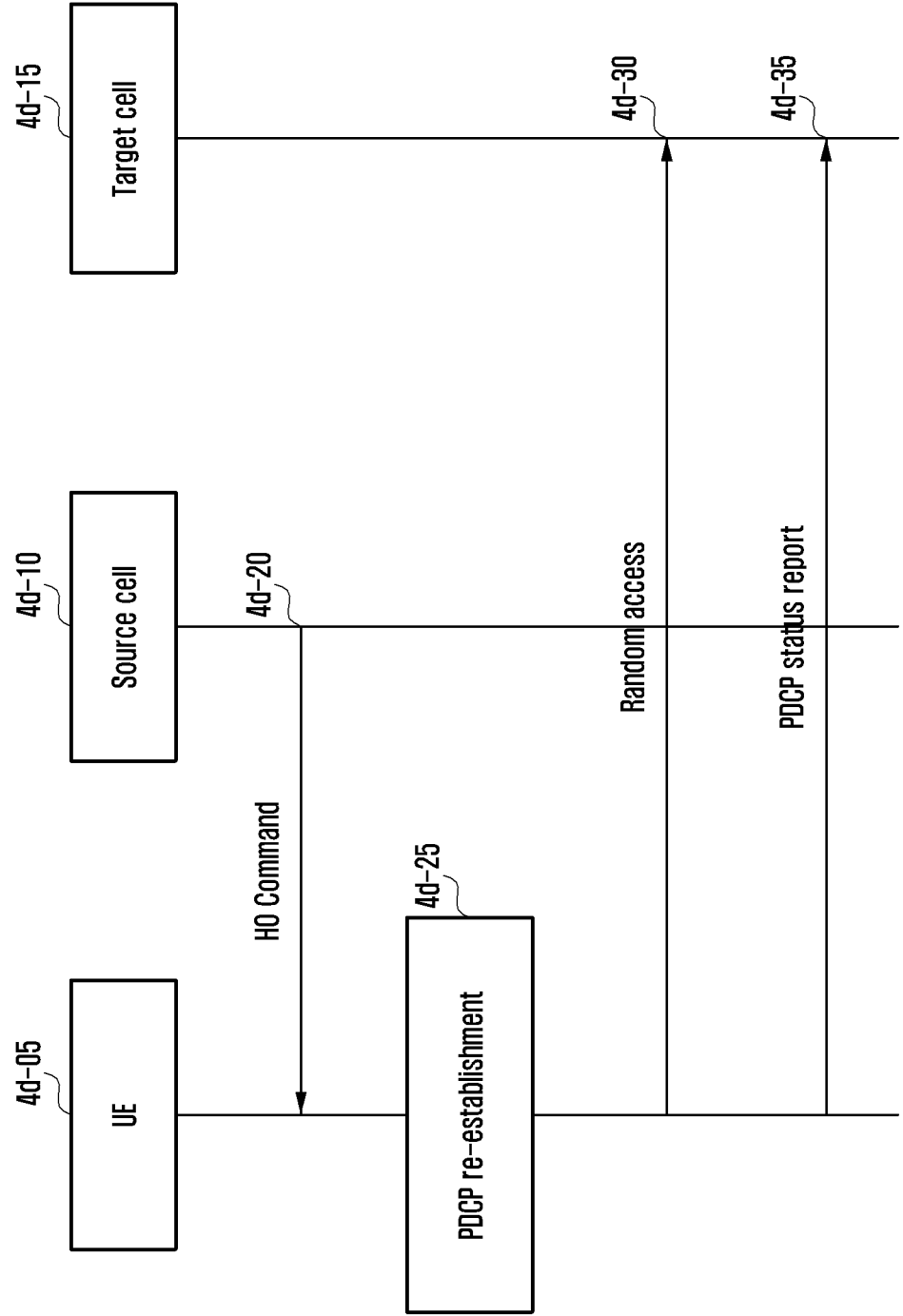

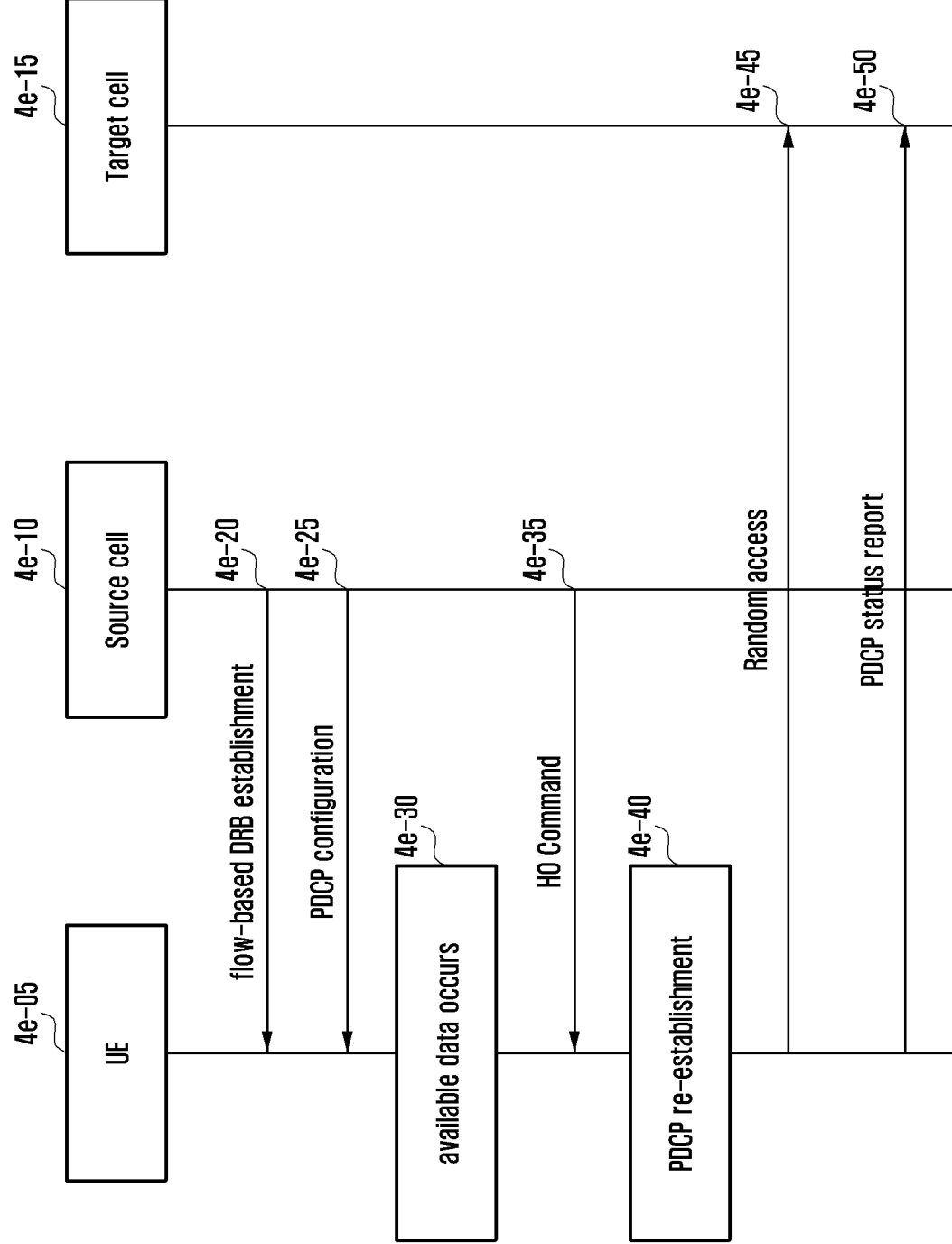

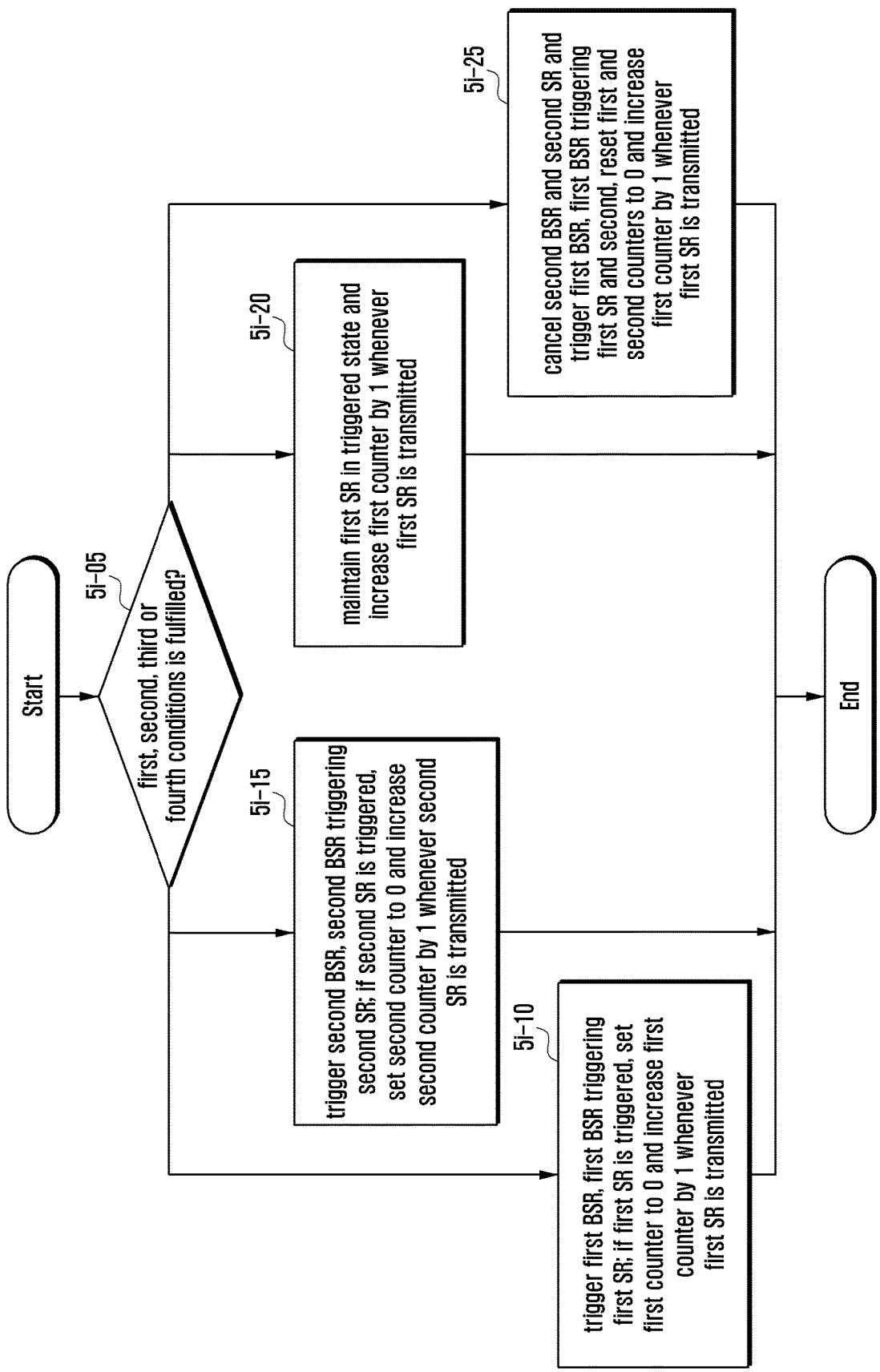

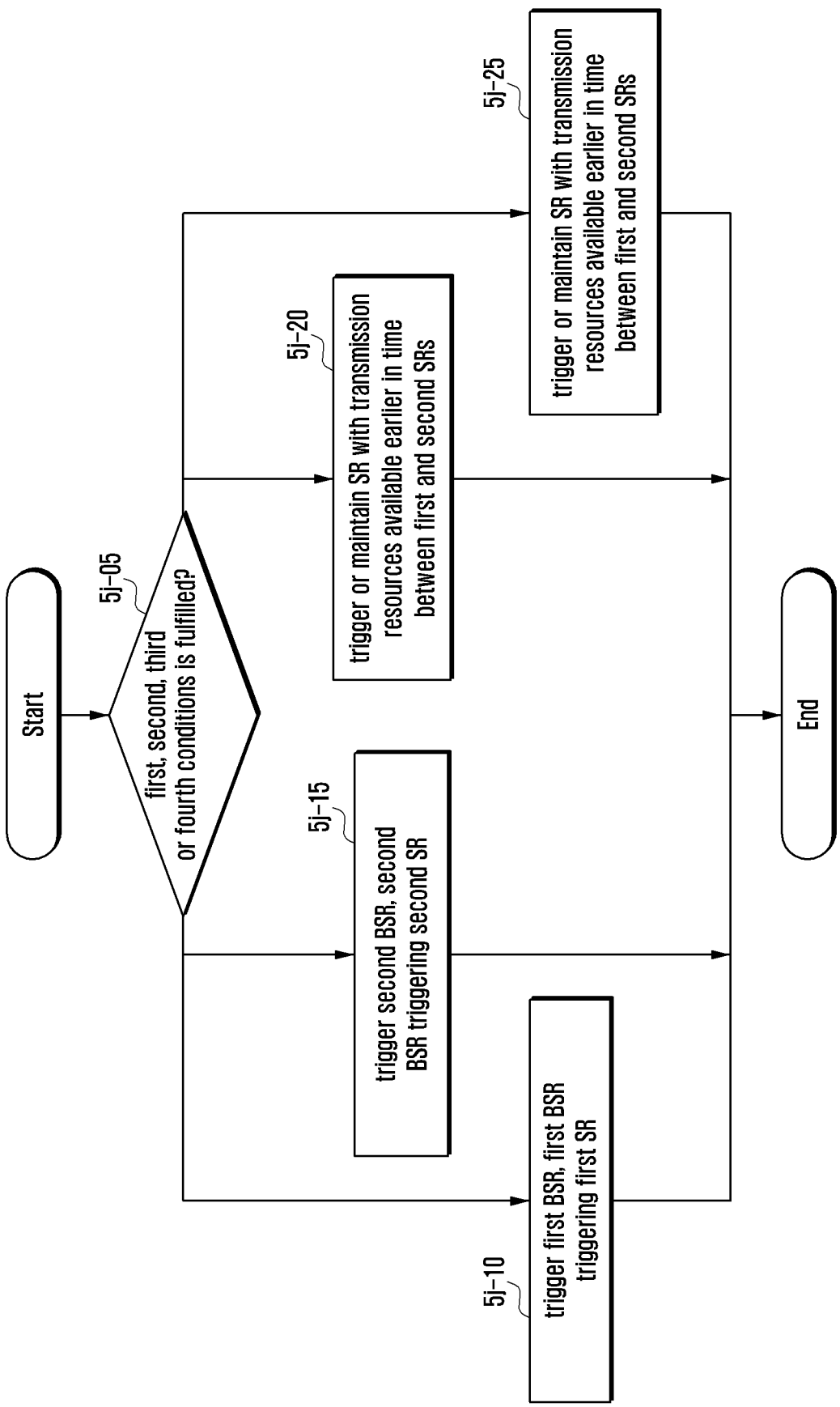

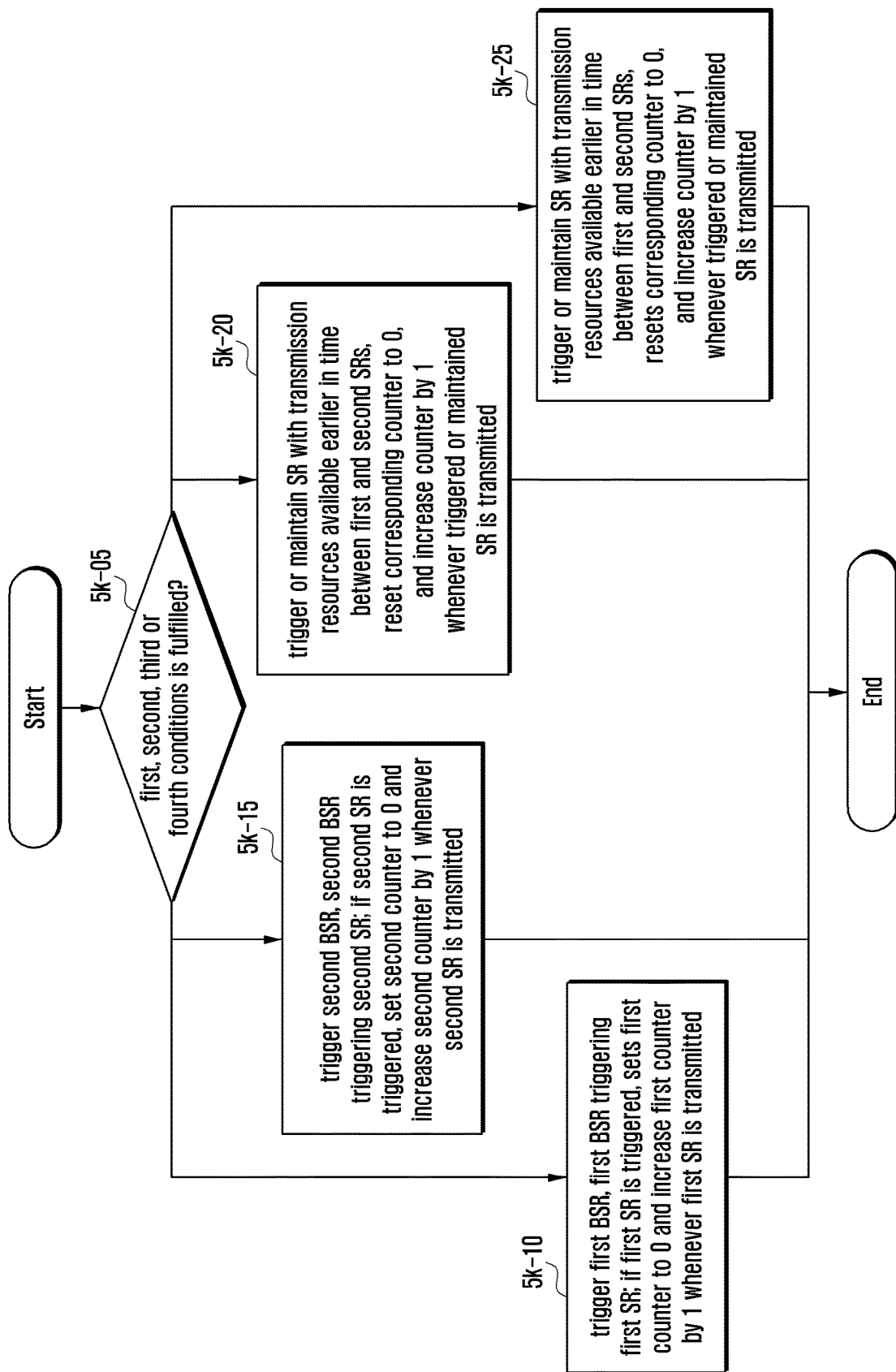

METHOD AND APPARATUS FOR TRANSMITTING AND RECEIVING SCHEDULING REQUESTS

CROSS-REFERENCE TO RELATED APPLICATION(S)

This application claims the benefit under 35 U.S.C. § 119(a) of a Korean patent application filed on Nov. 17, 2016 in the Korean Intellectual Property Office and assigned Serial number 10-2016-0153085 and under 35 U.S.C. § 119(a) of a Korean patent application filed on Apr. 14, 2017 in the Korean Intellectual Property Office and assigned Serial number 10-2017-0048552, the entire disclosure of which is hereby incorporated by reference.

TECHNICAL FIELD

The present disclosure relates to a wireless communication system. More particularly, the present disclosure relates to a method and apparatus of activating/deactivating cells with scalable transmission time intervals (TTIs) in a 3rd generation partnership 5th generation new radio (3GPP 5G NR) system using cell aggregation.

BACKGROUND

In order to meet the increasing demand for wireless data traffic since the commercialization of $4^{th}$ generation (4G) communication systems, the development focus is on the $5^{th}$ generation (5G) or pre-5G communication system. For this reason, the 5G or pre-5G communication system is called a beyond 4G network communication system or post long-term evolution (LTE) system. Consideration is being given to implementing the 5G communication system in millimeter wave (mmW) frequency bands (e.g., 60 GHz bands) to accomplish higher data rates. In order to increase the propagation distance by mitigating propagation loss in the 5G communication system, discussions are underway about various techniques such as beamforming, massive multiple-input multiple output (MIMO), full dimensional MIMO (FD-MIMO), array antenna, analog beamforming, and large-scale antenna. Also, in order to enhance network performance of the 5G communication system, developments are underway of various techniques such as evolved small cell, advanced small cell, cloud radio access network (RAN), ultra-dense network, device-to-device (D2D) communication, wireless backhaul, moving network, cooperative communication, coordinated multi-points (CoMP), and interference cancellation. Furthermore, the ongoing research includes the use of hybrid frequency shift keying (FSK) and quadrature amplitude modulation (QAM) and sliding window superposition coding (SWSC) as advanced coding modulation (ACM), filter bank multi-carrier (FBMC), non-orthogonal multiple access (NOMA), and sparse code multiple access (SCMA).

Meanwhile, the Internet is evolving from a human-centric communication network in which information is generated and consumed by humans to the internet of things (IoT) in which distributed things or components exchange and process information. The combination of the cloud server-based Big data processing technology and the IoT begets internet of everything (IoE) technology. In order to secure the sensing technology, wired/wireless communication and network infrastructure, service interface technology, and security technology used for implementing the IoT, recent research has focused on sensor network, machine-to-machine (M2M) communication, and machine-type communication (MTC) technologies. In the IoT environment, it is possible to provide an intelligent Internet Technology that is capable of collecting and analyzing data generated from connected things to create new values for human life. The IoT can be applied to various fields such as smart home, smart building, smart city, smart car or connected car, smart grid, health care, smart appliance, and smart medical service through legacy information technology (IT) and convergence of various industries.

Thus, there are various attempts to apply the IoT to the 5G communication system. For example, the sensor network, M2M communication, and MTC technologies are implemented by means of the 5G communication technologies such as beamforming, MIMO, and array antenna. The application of the aforementioned cloud RAN as a big data processing technology is an example of convergence between the 5G and IoT technologies.

Next generation mobile communication systems employ a very high data (up to 20 Gbp in downlink and 10 Gbps in uplink) and a very low transmission latency (4 ms for eMBB service and 1 ms for URLLC service).

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method for activating/deactivating cells with scalable transmission time intervals (TTIs) in a mobile communication system using cell aggregation.

Another aspect of the present disclosure is to provide a method for configuring per-frequency measurement time periods in a mobile communication system using cell aggregation for aggregating cells with scalable TTIs.

Also, another aspect of the present disclosure is to provide a method for reporting per-cell power headroom in a mobile communication system using cell aggregation for aggregating cells with scalable TTIs.

Also, another aspect of the present disclosure is to provide a method and apparatus for supporting a terminal with a single antenna effectively in a mobile communication system.

Also, another aspect of the present disclosure is to provide an enhanced scheduling request method capable of reducing transmission latency in a next generation mobile communication system.

Also, another aspect of the present disclosure is to provide a new radio link monitoring (RLM) operation for use in a next generation mobile communication system and a method for performing measurement on a synchronization signal instead of a reference signal which is used for RLM in the legacy LTE.

In accordance with an aspect of the present disclosure, a method of a terminal is provided. The method includes receiving a first message for adding a secondary cell (SCell) using a numerology different from that of a primary cell (PCell) from a base station through the PCell, receiving a second message for activating/deactivating the SCell from the base station through the PCell during a first TTI, and performing an operation in the SCell according to the second message during a second TTI, which is a TTI of the SCell and corresponds to a TTI after a predetermined time period since the first TTI of the PCell.

In accordance with another aspect of the present disclosure, a terminal is provided. The terminal includes a transceiver which transmits and receives signals and a controller which controls the transceivers to receive a first message for adding a S Cell using a numerology different from that of a PCell through the PCell and receives a second message for activating/deactivating the SCell through the PCell during a first TTI and performs an operation according to the second message in the SCell during a second TTI, which is a TTI of the SCell and corresponds to a TTI after a predetermined time period since the first TTI of the PCell.

In accordance with another aspect of the present disclosure, a method of a base station is provided. The method of a base station includes transmitting to a terminal a first message for adding a SCell using a numerology different from that of a PCell configured for the terminal, transmitting a second message for activating/deactivating the SCell to the terminal through the PCell during a first TTI, and performing an operation according to the second message in the SCell during a second TTI, which a TTI of the SCell of the terminal and corresponds to a TTI after a predetermined time period since the first TTI of the PCell of the terminal.

In accordance with another aspect of the present disclosure, a base station is provided. The base station includes a transceiver which transmits and receives signals and a controller which controls the transceiver to transmit to a terminal a first message for adding a SCell using a numerology different from that of a PCell configured for the terminal, transmit a second message for activating/deactivating the SCell to the terminal through the PCell during a first TTI, and performs an operation according to the second message in the SCell during a second TTI, which a TTI of the SCell of the terminal and corresponds to a TTI after a predetermined time period since the first TTI of the PCell of the terminal.

In accordance with another aspect of the present disclosure, a method of a terminal is provided. The method of a terminal includes receiving a message for configuring a first measurement period from a base station through a PCell and performing measurement in a SCell using a numerology different from that of the PCell during a second measurement period corresponding to the first measurement period, the second measurement period starting at a start time point of the first measurement period or a TTI of the SCell arriving first since the start time point of the first measurement period.

In accordance with another aspect of the present disclosure, a terminal is provided. The terminal includes a transceiver which transmits and receives signals and a controller which controls the transceiver to receive a message for configuring a first measurement period from a base station through a PCell and performs measurement in a SCell using a numerology different from that of the PCell during a second measurement period corresponding to the first measurement period, the second measurement period starting at a start time point of the first measurement period or in a TTI of the SCell arriving first since the start time point of the first measurement period.

In accordance with another aspect of the present disclosure, a method of a base station is provided. The method of the base station includes configuring a first measurement period for a PCell of a terminal and transmitting a message including information for configuring the first measurement period to the terminal through the PCell, the terminal performing measurement during a second measurement period corresponding to the first measurement period in a S Cell, the second measurement period starting at a start time point of the first measurement period or in a TTI of the SCell arriving first since the start time point of the first measurement period.

In accordance with another aspect of the present disclosure, a base station is provided. The base station includes a transceiver which transmits and receives signals and a controller which configures a first measurement period for a PCell of a terminal and controls the transceiver to transmit a message including information for configuring the first measurement period to the terminal through the PCell, the terminal performing measurement during a second measurement period corresponding to the first measurement period in a SCell, the second measurement period starting at a start time point of the first measurement period or in a TTI of the SCell arriving first since the start time point of the first measurement period.

In accordance with another aspect of the present disclosure, a method of a terminal is provided. The method of a terminal includes selecting a cell for transmitting a power headroom report (PHR) among cells including a PCell and at least one SCell different in numerology from the PCell, calculating PHs for the PCell and the at least one SCell based on TTI lengths of the PCell and the at least one SCell, and transmitting the PHR generated based on the PHs through the selected cell.

In accordance with another aspect of the present disclosure, a terminal is provided. The terminal includes a transceiver which transmits and receives signals and a controller which selects a cell for transmitting a PHR among cells including a PCell and at least one SCell different in numerology from the PCell, calculates PHs for the PCell and the at least one SCells based on TTI lengths of the PCell and the at least one SCell, and controls the transceiver to transmit the PHR generated based on the PHs through the selected cell.

In accordance with another aspect of the present disclosure, a method of a base station is provided. The method of a base station includes configuring, to a terminal, a PCell and at least one SCell different in numerology from the PCell and receiving a PHR through a cell selected among cells including the PCell and the at least one SCell, the terminal calculating PHs for the PCell and the at least one SCell based on TTI lengths of the PCell and the at least one SCell and generating the PHR based on the calculated PHs.

In accordance with another aspect of the present disclosure, a base station is provided. The base station includes a transceiver which transmits and receives signals and a controller which configures, to a terminal, a PCell) and at least one SCell different in numerology from the PCell and controls the transceiver to receive a PHR through a cell selected among cells including the PCell and the at least one SCell, the terminal calculating PHs for the PCell and the at least one SCell based on TTI lengths of the PCell and the at least one SCell and generating the PHR based on the calculated PHs.

In accordance with another aspect of the present disclosure, a method of a terminal is provided. The method of a terminal includes receiving a first message for configuring at least one data radio bearers (DRB) corresponding to at least one quality of service (QoS) from a base station, receiving a second message commanding handover from the base station to a target base station, generating a packet data convergence protocol (PDCP) status report based on whether there is real data transmission on the at least one DRB, and transmitting the PDCP status report to the target base station.

In accordance with another aspect of the present disclosure, a terminal is provided. The terminal includes a transceiver which transmits and receives signals and a controller which controls the transceiver to receive a first message for configuring at least one DRB corresponding to at least one QoS from a base station and receive a second message commanding handover from the base station to a target base station, generates a PDCP status report based on whether there is real data transmission on the at least one DRB, and controls the transceiver to transmit the PDCP status report to the target base station.

In accordance with another aspect of the present disclosure, a method of a base station is provided. The method of a base station includes transmitting a first message for configuring at least one DRB corresponding to at least one QoS to a terminal and transmitting to the terminal a second message for commanding a handover to a target base station, the terminal generating a PDCP status report based on whether there is real data transmission on the at least one DRB and transmitting the PDCP status report to the target base station.

In accordance with another aspect of the present disclosure, a base station is provided. The base station includes a transceiver which transmits and receives signals and a controller which controls the transceiver to transmit a first message for configuring at least one DRB corresponding to at least one QoS to a terminal and then transmits to the terminal a second message for commanding a handover to a target base station, the terminal generating a PDCP status report based on whether there is real data transmission on the at least one DRB and transmitting the PDCP status report to the target base station.

In accordance with another aspect of the present disclosure, a method of a terminal is provided. The method of a terminal includes receiving a message for configuring multiple scheduling request (SRs) simultaneously from a base station, configuring the SRs being triggered by different conditions, and transmitting, when one of the different conditions is fulfilled, the SR corresponding to the fulfilled condition among the multiple SRs.

In accordance with another aspect of the present disclosure, a terminal is provided. The terminal includes a transceiver which transmits and receives signals and a controller which controls the transceiver to receive a message for configuring multiple SRs simultaneously from a base station, configures the SRs being triggered by different conditions, and controls the transceiver to transmit, when one of the different conditions is fulfilled, the SR corresponding to the fulfilled condition among the multiple SRs.

In accordance with another aspect of the present disclosure, a method of a base station is provided. The method of a base station includes transmitting a message for configuring multiple SRs simultaneously to a terminal and receiving an SR fulfilling a condition for SR transmission among the multiple SRs being triggered different conditions.

In accordance with another aspect of the present disclosure, a base station is provided. The base station includes a transceiver which transmits and receives signals and a controller which controls the transceiver to transmit a message for configuring multiple SRs simultaneously to a terminal and receive an SR fulfilling a condition for SR transmission among the multiple SRs being triggered different conditions.

In accordance with another aspect of the present disclosure, a method of a terminal is provided. The method a terminal includes receiving configuration information indicating a modulation scheme for SR from a base station, generating, when SR is triggered by generation of uplink data, a modulation symbol containing information related to the uplink data using the modulation scheme, and transmitting the modulation symbol on resources allocated for the SR to the base station.

In accordance with another aspect of the present disclosure, a terminal is provided. The terminal includes a transceiver which transmits and receives signals and a controller which controls the transceiver to receive configuration information indicating a modulation scheme for SR from a base station, generates, when SR is triggered by generation of uplink data, a modulation symbol containing information related to the uplink data using the modulation scheme, and controls the transceiver to transmit the modulation symbol on resources allocated for the SR.

In accordance with another aspect of the present disclosure, a method of a base station is provided. The method of a base station includes transmitting configuration information indicating a modulation scheme for SR to a terminal and receiving a modulation symbol transmitted by the terminal on resources allocated for the SR, the terminal generating the modulation symbol containing information related to uplink data using the modulation scheme when SR is triggered by generation of the uplink data.

In accordance with another aspect of the present disclosure, a base station is provided. The base station includes a transceiver which transmits and receives signals and a controller which controls the transceiver to transmit configuration information indicating a modulation scheme for SR to a terminal and receive a modulation symbol transmitted by the terminal on resources allocated for the SR, the terminal generating the modulation symbol containing information related to uplink data using the modulation scheme when SR is triggered by generation of the uplink data.

In accordance with another aspect of the present disclosure, a method of a terminal is provided. The method of a terminal includes receiving configuration information for configuring a RLM on a beam formed by a base station, configuring a beam group including at least one beam based on the configuration information, receiving a synchronization signal on a serving beam included in the beam group, and measuring radio link quality based on strength of the synchronization signal.

In accordance with another aspect of the present disclosure, a terminal is provided. The terminal includes a transceiver which transmits and receives signals and a controller which controls the transceiver to receive configuration information for configuring a RLM on a beam formed by a base station, configures a beam group including at least one beam based on the configuration information, controls the transceiver to receive a synchronization signal on a serving beam included in the beam group, and measures radio link quality based on strength of the synchronization signal.

In accordance with another aspect of the present disclosure, a method of a base station is provided. The method of a base station includes transmitting configuration information for configuring RLM on beams formed to at least one terminal and transmitting synchronization signals on at least one beam periodically, the terminal configuring a beam group including at least one beam based on the configuration information, receiving the synchronization signal on a serving beam included in the beam group, and measuring radio link quality based on strength of the synchronization signal.

In accordance with still another aspect of the present disclosure, a base station is provided. The base station includes a transceiver which transmits and receives signals and a controller which controls the transceiver to transmit configuration information for configuring RLM on beams formed to at least one terminal and then transmit synchronization signals on at least one beam periodically, the terminal configuring a beam group including at least one beam based on the configuration information, receiving the synchronization signal on a serving beam included in the beam group, and measuring radio link quality based on strength of the synchronization signal.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 4D is a signal flow diagram illustrating a procedure for PDCP re-establishment and PDCP status report in the legacy LTE system according to an embodiment of the present disclosure;

FIG. 4E is a signal flow diagram illustrating a procedure for PDCP re-establishment and PDCP status report according to an embodiment of the present disclosure;

FIG. 5I is a flowchart illustrating an operation of a UE according to embodiment 5-3 of the present disclosure;

FIG. 5J is a flowchart illustrating an operation of a UE according to embodiment 5-4 of the present disclosure;

FIG. 5K is a flowchart illustrating an operation of a UE according to embodiment 5-5 of the present disclosure;

FIG. 5O is a block diagram illustrating a configuration of a UE in a wireless communication according to an embodiment of the present disclosure;

Throughout the drawings, it should be noted that like reference numbers are used to depict the same or similar elements, features, and structures.

DETAILED DESCRIPTION

Figure 1A:
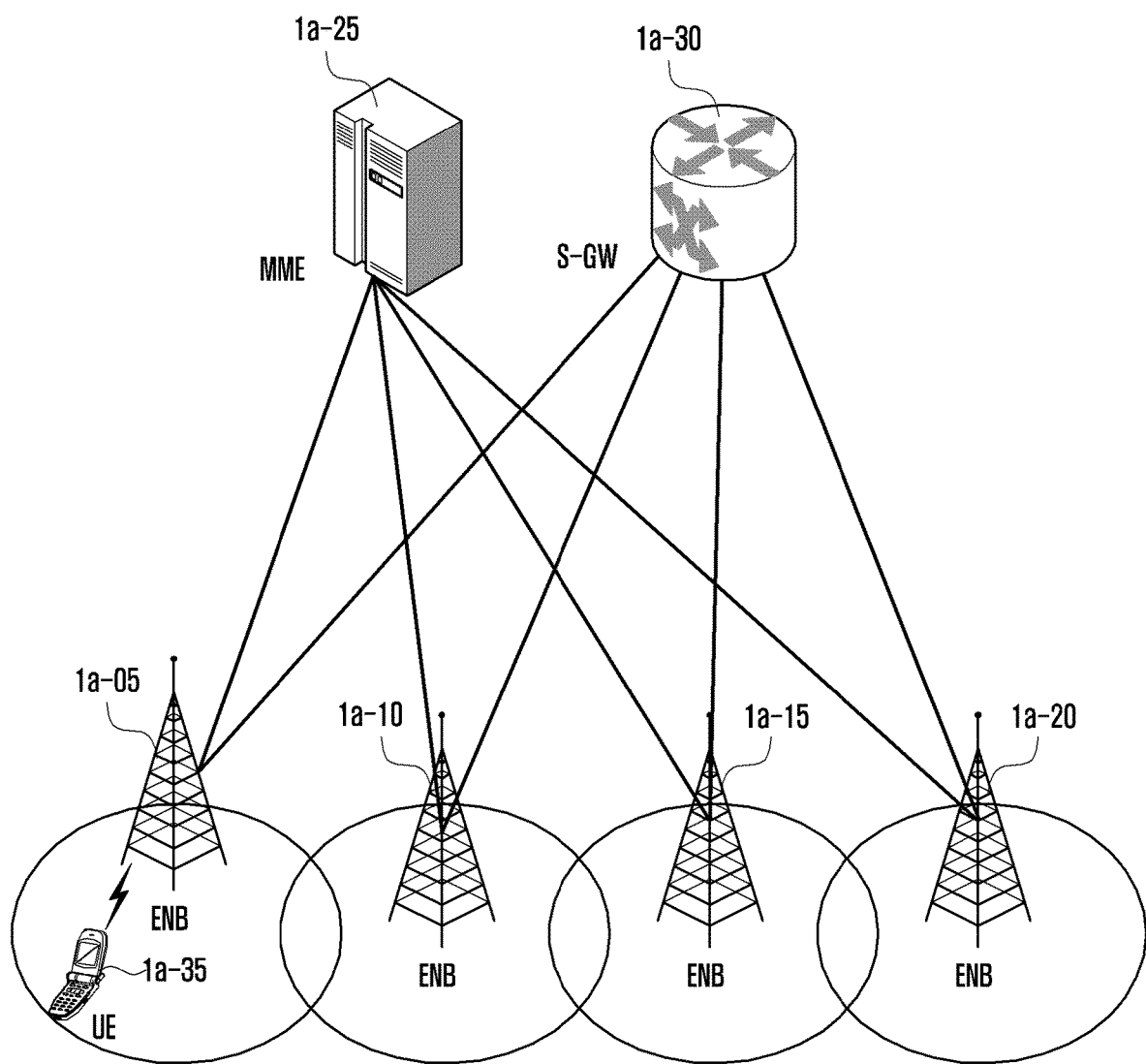
FIG. 1A is a diagram illustrating long term evolution (LTE) system architecture according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Advantages and features of the present disclosure and methods of accomplishing the same may be understood more readily by reference to the following detailed description of exemplary embodiments and the accompanying drawings. However, the present disclosure may be embodied in many different forms and should not be construed as being limited to the exemplary embodiments set forth herein; rather, these exemplary embodiments are provided so that this disclosure will be thorough and complete and will fully convey the concept of the disclosure to those skilled in the art, and the present disclosure will only be defined by the appended claims. Like reference numerals refer to like elements throughout the specification.

The terms used, in the following description, for indicating access nodes, network entities, messages, interfaces between network entities, and diverse identity information is provided for convenience of explanation. Accordingly, the terms used in the following description are not limited to specific meanings but may be replaced by other terms equivalent in technical meanings.

In the following descriptions, the terms and definitions given in the 3GPP LTE standards are used for convenience of explanation. However, the present disclosure is not limited by use of these terms and definitions and other arbitrary terms and definitions may be employed instead. Particularly, the present disclosure is applicable to the 3GPP NR (5G mobile communication standard).

Embodiment 1

FIG. 1A is a diagram illustrating LTE system architecture according to an embodiment of the present disclosure.

Referring to FIG. 1A, the radio communication system includes evolved Node Bs (eNBs) 1a-05, 1a-10, 1a-15, and 1a-20; a mobility management entity (MME) 1a-25; and a serving gateway (S-GW) 1a-30. The user equipment (UE) 1a-35 connects to an external network via the eNBs 1a-05, 1a-10, 1a-15, and 1a-20 and the S-GW 1a-30.

The eNBs 1a-05, 1a-10, 1a-15, and 1a-20 are access nodes of a cellular network for serving the UEs attempting connection to the network. That is, each of the eNBs 1a-05, 1a-10, 1a-15, and 1a-20 collects status information of UEs (such as buffer status, power headroom, channel status) for serving the user traffics and schedules the UEs to support connection between the UEs and a core network (CN). The MME 1a-25 is an entity taking charge of UE mobility management and control function and serves the eNBs 1a-05, 1a-10, 1a-15, and 1a-20; the S-GW 1a-30 is an entity taking charge of data bearer function. The MME 1a-25 and the S-GW 1a-30 may also perform UE authentication and bearer management on the UEs connected to the network and handle the packets arrived from and to be transmitted to the eNBs 1a-05, 1a-10, 1a-15, and 1a-20.

Figure 1B:
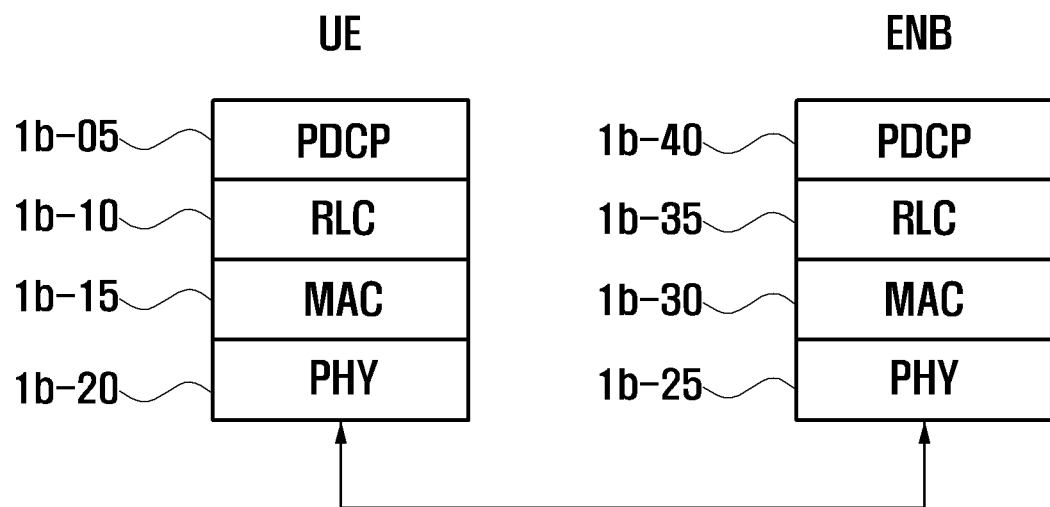
FIG. 1B is a diagram illustrating a protocol stack of an interface between a user equipment (UE) and an evolved Node B (eNB) in LTE according to an embodiment of the present disclosure.

FIG. 1B is a diagram illustrating a protocol stack of an interface between a UE and an eNB in LTE according to an embodiment of the present disclosure.

Referring to FIG. 1B, the protocol stack of the interface between the UE and the eNB in the LTE system includes a plurality of protocol layers stacked from the bottom to the top: physical layer denoted by reference numbers 1b-20 and 1b-25, medium access control (MAC) layer denoted by reference numbers 1b-15 and 1b-30, radio link control (RLC) layer denoted by reference numbers 1b-10 and 1b-35, and packet data convergence control (PDCP) layer denoted by reference numbers 1b-05 and 1b-40. The PDCP layer denoted by reference numbers 1b-05 and 1b-40 takes charge of compressing/decompressing an IP header, and the RLC layer denoted by reference numbers 1b-10 and 1b-35 takes charge of reformatting PDCP PDUs in order to fit them into the size indicated by the MAC layer. The MAC layer denoted by reference number 1b-15 and 1b-30 allows for connection of multiple RLC entities established for one UE and takes charge of multiplexing RLC PDUs from the RLC layer into a MAC PDU and demultiplexing a MAC PDU into RLC PDUs. The PHY layer denoted by reference numbers 1b-20 and 1b-25 takes charge of channel-coding and modulation on higher layer data to generate and transmit orthogonal frequency division multiplexing (OFDM) symbols over a radio channel, and demodulating and channel-decoding on OFDM symbols received over the radio channel to deliver the decoded data to the higher layers. The PHY layer denoted by reference numbers 1b-20 and 1b-25 uses hybrid automatic repeat request (HARQ) for additional error correction by transmitting 1-bit information indicating positive or negative acknowledgement about data packet, the acknowledgement being transmitted from the receiver to the transmitter. The 1-bit information is referred to as acknowledgement/negative acknowledgement (ACK/NACK). The downlink HARQ ACK/NACK corresponding to an uplink transmission may be transmitted in physical hybrid-ARQ indicator channel (PHICH), and the uplink HARQ ACK/NACK corresponding to a downlink transmission may be transmitted in physical uplink control channel (PUCCH) or physical uplink shared channel (PUSCH).

Although not shown in the drawing, there is a radio resource control (RRC) layer above the PDCP layer, and peer RRC entities exchange connection and measurement configuration control messages for controlling radio resources.

Meanwhile, the PHY layer may be configured to use one or more frequencies/carriers simultaneously, and this technique is referred to as carrier aggregation (CA). The CA makes it possible to increase the data rate for communication between a UE and an eNB dramatically by aggregating one or more secondary component carriers with a primary component carrier in comparison with the legacy signal carrier system. In LTE, an eNB operate a primary cell (PCell) corresponding to the primary component carrier and, if necessary, at least one secondary cell (SCell) corresponding to the secondary component carrier.

Figure 1C:
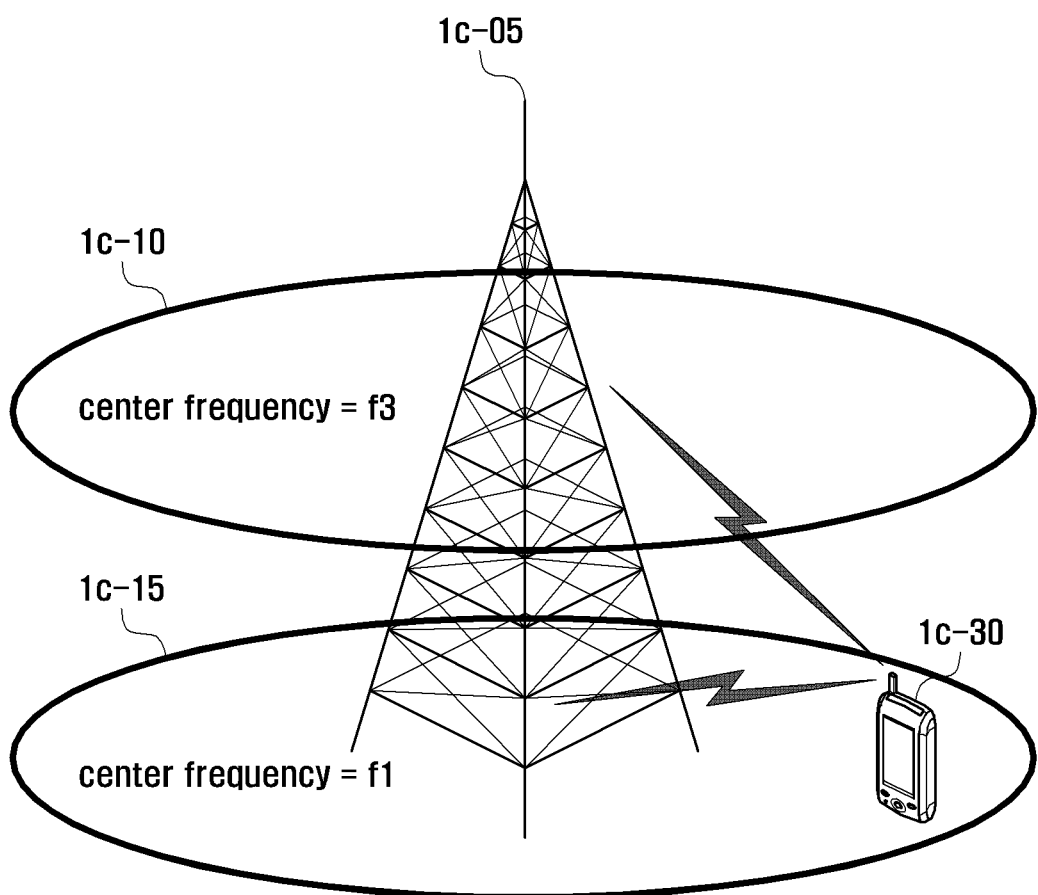
FIG. 1C is a diagram for explaining carrier aggregation (CA) for a UE according to an embodiment of the present disclosure.

FIG. 1C is a diagram for explaining CA for a UE according to an embodiment of the present disclosure.

Referring to FIG. 1C, an eNB 1c-05 may transmit signals over multiple carriers across several frequency bands. For example, if the eNB 1c-05 operates on two downlink (DL or forward) frequencies 1c-15 and 1c-10 with respective center frequencies f1 and f3, a legacy UE receives data on one of the two carriers. However, a CA-enabled UE is capable of receiving data at an increased data rate using both the two carriers simultaneously. The eNB 1c-05 allocates more carriers to the CA-enabled UE, depending on the situation, so as to increase data rate for the UE 1c-30.

Assuming that a cell is configured with one downlink carrier and one uplink carrier in the conventional concept, the CA can be understood as if the UE communicates data via multiple cells. This means that the CA makes it possible to increase the peak data rate in proportion to the number of aggregated carriers.

In the following description, if a UE receives data through a certain downlink carrier or transmits data through a certain uplink carrier, this means the UE transmits/receives data through a control channel and a data channel of the cell corresponding to the center frequency and frequency band characterizing the carrier. Although the description is directed to an LTE system for convenience of explanation, the present disclosure is applicable to other wireless communication systems supporting CA.

Figure 1D:
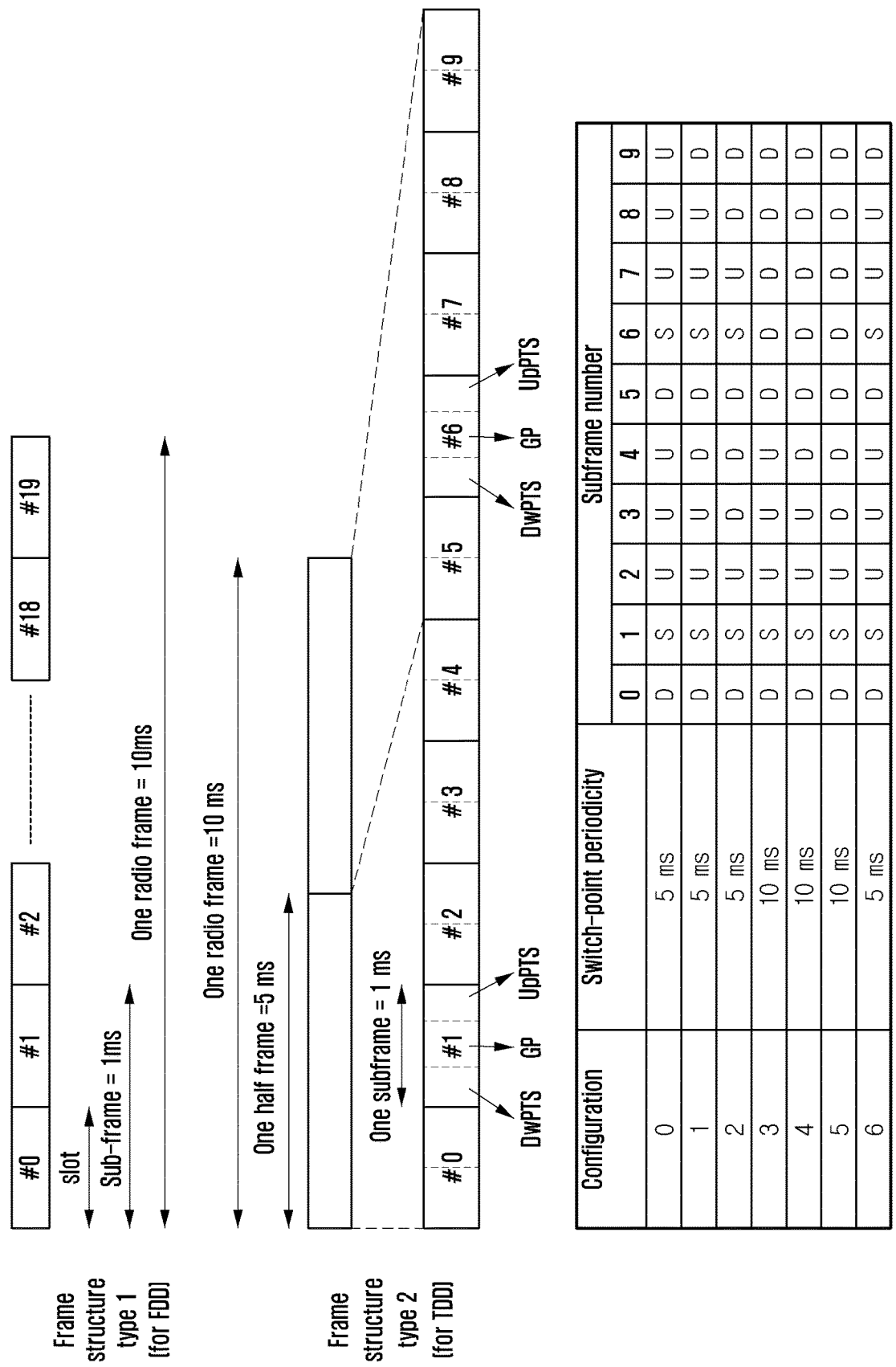
FIG. 1D is a diagram illustrating radio frame structures for LTE according to an embodiment of the present disclosure.

FIG. 1D is a diagram illustrating radio frame structures for LTE according to an embodiment of the present disclosure.

FIG. 1D, depicts Frame Structure Type 1 for a frequency division duplex (FDD) system and Frame Structure Type 2 for a time division duplex (TDD) system.

Referring to FIG. 1D, Frame Structure Types 1 and 2 has the same length of 10 ms, and one radio frame consists of 10 subframes (#0, #1, #2, . . . , #9) of 1 ms duration each. In Frame Structure Type 1 for FDD, all subframes are designated for downlink or uplink because the downlink and uplink are separated in frequency. In Frame Structure Type 2 for TDD, subframes #0, #2, #3, #4, #5, #7, #8, and #9 may be designated as downlink subframe (marked by D in the table depicted at the bottom of FIG. 1D) or uplink subframe (marked by U in the table depicted at the bottom of FIG. 1D) according to the TDD DL-UL configuration listed in the table depicted at the bottom of FIG. 1D. For example, TDD DL-UL configuration 0 includes downlink subframes of subframes #0 and #5 and uplink subframes of subframes #2, #3, #4, #7, #8, and #9; and TDD DL-UL configuration 1 includes downlink subframes of subframes #0, #4, #5, and #9 and uplink subframes of subframes #2, #3, #7, and #8.

In FIG. 1D, subframes #1 and #6 are special subframes (marked by S in the table depicted at the bottom of FIG. 1D) appearing at the transition from downlink to uplink transmission. A special subframe comprises three regions represented by downlink pilot time slot (DwPTS), guard period (GP), and uplink pilot time slot (UpPTS); the DwPTS is allowed for downlink data transmission, and the UpPTS is not allowed for uplink data transmission but sounding reference symbol (SRS) transmission. The GP helps avoid interference between the downlink and uplink transmission.

Figure 1E:
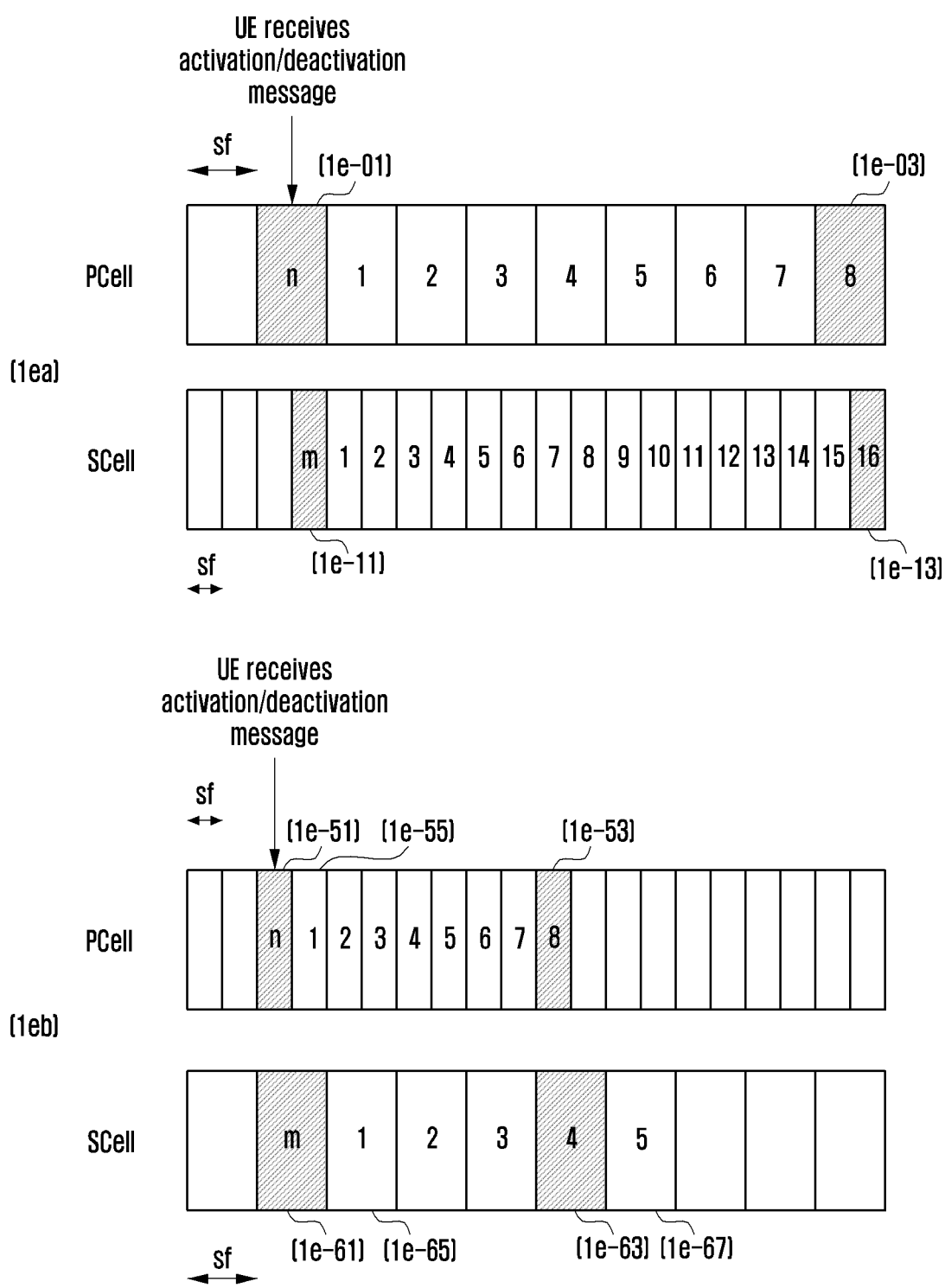
FIG. 1E is a diagram illustrating frame formats for explaining secondary cell (SCell) activation/deactivation timings in system according to an embodiment of the present disclosure.

FIG. 1E is a diagram illustrating frame formats for explaining SCell activation/deactivation timings in system according to an embodiment of the present disclosure.

FIG. 1E is depicted under the assumption of aggregating frequencies with different subframe lengths. FIG. 1E consists of two parts: upper part 1ea where the subframe length of the PCell is longer than the subframe length of the SCell and lower part 1eb where the subframe length of the PCell is shorter than the subframe length of the SCell. FIG. 1E also assumes that the UE is already connected to an eNB (i.e., in the RRC_CONNECTED state capable of transmitting/receiving data) and configured by the eNB to add an SCell with a different subframe length.

First, a description is made of the case where the subframe length of the PCell is longer than the subframe length of the SCell as shown in part 1ea of FIG. 1E. The UE receives a command for activating/deactivation the SCell configured to use additionally in subframe n+0 1e-01 of the PCell (or an SCell activated already). Although this command is received at subframe n+0, the corresponding SCell is activated/deactivated at subframe n+X 1e-03 (X is an integer, 8 in this embodiment) because it takes time to interpret and process the command. In the present disclosure, the S Cell is activated/deactivated after m+f(X*(PCell subframe length/SCell subframe length)) subframe 1e-13 from subframe m 1e-11 of the SCell of which the end point is equal to or later than that of subframe n of the PCell. The f(x) may be a round or ceiling function.

In the case that an activation command is received, the UE may operate as follows in the corresponding subframe.
  Start channel state information (CSI) reporting
    The CSI includes CQI/PMI/RI/PTI for use by an eNB in link adaptation and scheduling the corresponding UE.
    channel quality indicator (CQI): Indicator indicating recommended transmission format fulfilling 10% of bit error rate
    precoding matrix indicator (PMI: Indicator for use in closed-loop spatial multiplexing
    rank indicator (RI): Indicator indicating recommended transmission rank
    precoder type indication (PTI): Indicator indicating type of precoder
  Start monitoring scheduling channel from/for SCell
  Start transmitting sounding reference signal (SRS) (only when SRS is configured)

In the case that a deactivation command is received, the UE may operate as follows in the corresponding subframe.
  Stop CSI reporting
  Stop monitoring scheduling channel from/for SCell
  Stop transmitting SRS Next, a description is made of the case where the subframe length of the PCell is shorter than the subframe length of the SCell as shown in part 1eb of FIG. 1E. The UE receives a command for activating/deactivation the SCell configured to use additionally in subframe n+0 1e-51 of the PCell (or an SCell activated already). Although this command is received at subframe n+0, the corresponding SCell is activated/deactivated at subframe n+X 1e-53 (X is an integer, 8 in this embodiment) because it takes time to interpret and process the command. In the present disclosure, the SCell is activated/deactivated after m+f(X*(PCell subframe length/SCell subframe length)) subframe 1e-63 from subframe m 1e-61 of the SCell of which the end point is equal to or later than that of subframe n of the PCell. The f(x) may be a round or ceiling function.

In the case that an activation command is received, the UE may operate as follows in the corresponding subframe.
  Start CSI reporting
    The CSI includes CQI/PMI/RI/PTI for use by an eNB in link adaptation and scheduling the corresponding UE.
    CQI: Indicator indicating recommended transmission format fulfilling 10% of bit error rate
    PMI: Indicator for use in closed-loop spatial multiplexing
    RI: Indicator indicating recommended transmission rank
    PTI: Indicator indicating type of precoder
  Start monitoring scheduling channel from/for SCell Start transmitting SRS (only when SRS is configured)

In the case that a deactivation command is received, the UE may operate as follows in the corresponding subframe.

Stop CSI reporting

Stop monitoring scheduling channel from/for SCell

Stop transmitting SRS

It may also be possible to consider a scenario as follows. A UE may receive an activation/deactivation message at subframe n or subframe n+1. That is, it may be possible to consider the operations scenarios for a case where the activation/deactivation message is received in the first half of an SCell subframe and a case where the activation/deactivation message is received in the last half of the SCell subframe (i.e., case of considering only the scenario where the activation/deactivation message is received out of the boundary of the PCell subframe in the above described embodiment). In this case, the reference start time point of the SCell becomes subframe m 1e-61 for the case where the activation/deactivation message is received at subframe n 1e-51 or subframe m+1 1e-65 for the case where the activation/deactivation message is received at subframe n+1 1e-55. Accordingly, the SCell may be activated/deactivated at subframe 1e-63 or subframe 1e-67.

Figure 1F:
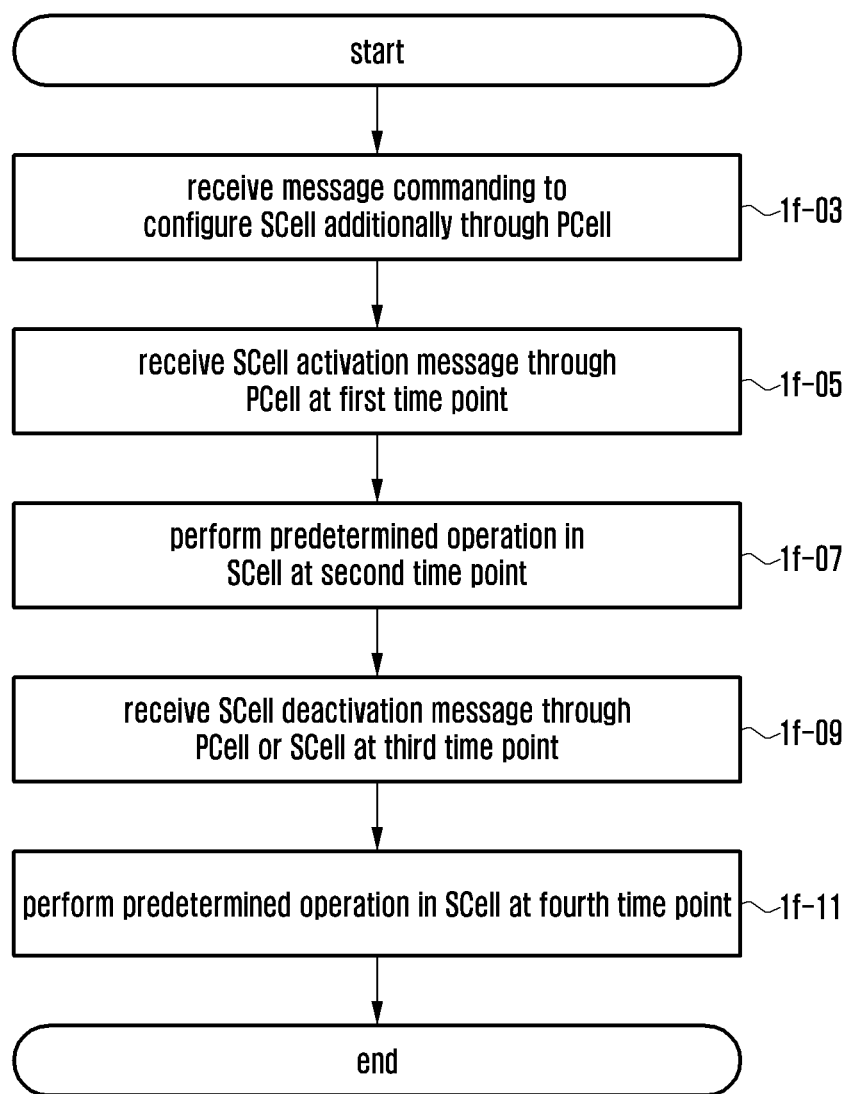
FIG. 1F is a flowchart illustrating an operation of a UE according to an embodiment of the present disclosure.

FIG. 1F is a flowchart illustrating an operation of a UE according to an embodiment of the present disclosure.

Referring to FIG. 1F, it is assumed that the UE is connected to an eNB so as to transmit/receive data.

FIG. 1F is depicted under the assumption of inter-cell CA across frequencies of the PCell and SCell using different subframe lengths. FIG. 1F is also depicted under the assumption that the UE is already connected to an eNB (i.e., in the RRC_CONNECTED state capable of transmitting/receiving data) and configured by the eNB to add an SCell with a different subframe length.

The UE receives a message instructing to configure an SCell (a second cell) additionally through the PCell (a first cell) at operation 1f-03. As described above, it is assumed that the PCell and SCell have different subframe lengths, and the additional SCell configuration message is conveyed by an RRC layer message. The SCell configuration message may include at least the information on the center frequency of the SCell and related information. Afterward, the UE receives an SCell (the second cell) activation message through the PCell (a first cell, or another activated SCell which is a third cell) at a first time point (e.g., $n^{th}$ subframe of the PCell) at operation 1f-05. As a consequence, the UE activates the SCell at a second time point by performing an operation at operation 1f-07 as follows:

Start CSI reporting

The CSI includes CQI/PMI/RI/PTI for use by an eNB in link adaptation and scheduling the corresponding UE.

CQI: Indicator indicating recommended transmission format fulfilling 10% of bit error rate PMI: Indicator for use in closed-loop spatial multiplexing RI: Indicator indicating recommended transmission rank PTI: Indicator indicating type of precoder Start monitoring scheduling channel from/for SCell Start transmitting SRS (only when SRS is configured)

The second time point is determined by a function of ratio between the subframe lengths of the PCell and SCell; in detail, if activated at subframe n+X (X is an integer) in view of the PCell, the SCell is activated after m+f(X*(PCell subframe length/SCell subframe length)) subframe from subframe m of the SCell of which the end point is equal to or later than that of subframe n of the PCell. The f(x) may be a round or ceiling function.

Afterward, the UE receives an SCell deactivation message through the PCell or SCell at s third time point (e.g., $n^{th}$ subframe of the PCell) at operation 1f-09. Accordingly, the UE deactivates the SCell at a fourth time point by performing an operation at operation 1f-11 as follows:

Stop CSI reporting

Stop monitoring scheduling channel from/for SCell

Stop transmitting SRS

The fourth time point is determined by a function of ratio between the subframe lengths of the PCell and SCell; in detail, if activated at subframe n+X (X is an integer) in view of the PCell, the SCell is activated after m+f(X*(PCell subframe length/SCell subframe length)) subframe from subframe m of the SCell of which the end point is equal to or later than that of subframe n of the PCell. The f(x) may be a round or ceiling function.

Figure 1G:
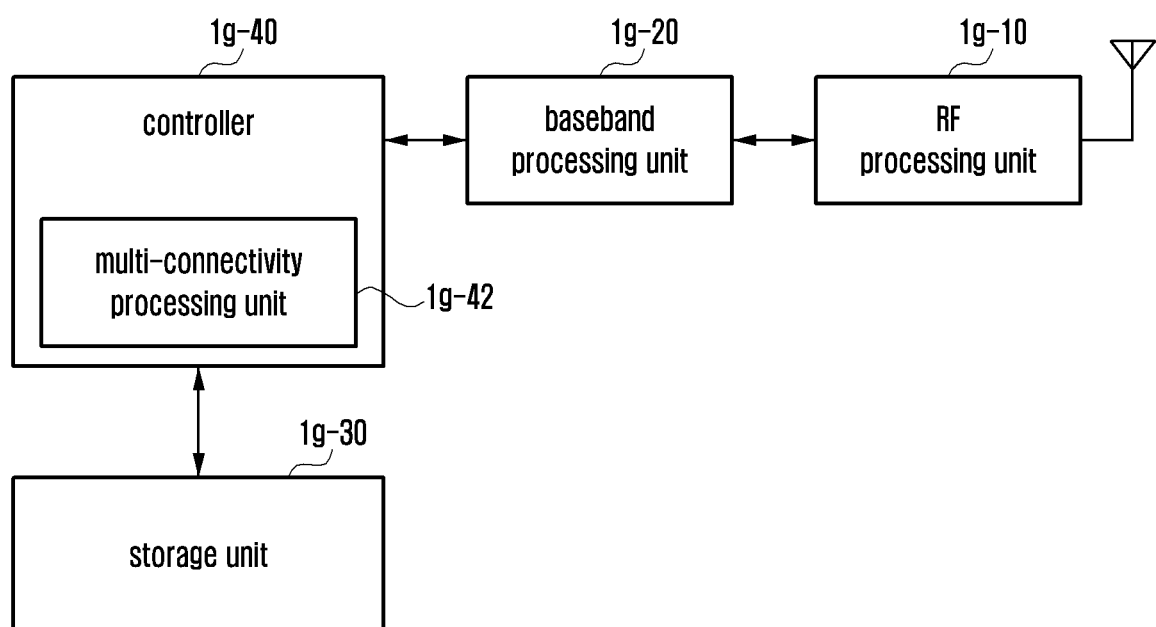
FIG. 1G is a block diagram illustrating a configuration of a UE in a wireless communication according to an embodiment of the present disclosure.

FIG. 1G is a block diagram illustrating a configuration of a UE in a wireless communication according to an embodiment of the present disclosure.

Referring to FIG. 1G, the UE includes a radio frequency (RF) processing unit 1g-10, a baseband processing unit 1g-20, a storage unit 1g-30, and a controller 1g-40.

The RF processing unit 1g-10 takes charge of signal band conversion and amplification for transmitting signals over a radio channel. That is, the RF processing unit 1g-10 up-converts a baseband signal output from the baseband processing unit 1g-20 to an RF band signal for transmission through antennas and down-converts an RF band signal received through the antenna to a baseband signal. For example, the RF processing unit 1g-10 may include a transmission filter, a reception filter, an amplifier, a mixer, an oscillator, a digital-to-analog converter (DAC), and an analog-to-digital convertor (ADC). Although one antenna is depicted in FIG. 1G, the terminal may include a plurality of antennas. The RF processing unit 1g-10 may include a plurality of RF chains. The RF processing unit 1g-10 may perform beamforming. For beamforming, the RF processing unit 1g-10 may adjust the phases and sizes of the signal transmitted/received through the antennas or antenna elements.

The baseband processing unit 1g-20 takes charge of conversion between baseband signals and bit strings according to a physical layer protocol of the system. For example, the baseband processing unit 1g-20 performs encoding and modulation on the transmit bit strings to generate complex symbols in data transmission mode. The baseband processing unit 1g-20 also performs demodulation and decoding on the baseband signal from the RF processing unit 1g-10 to recover the received bit strings in data reception mode. For the case of an OFDM system, the baseband processing unit 1g-20 performs encoding and modulation on the transmit bit string to generate complex symbols, maps the complex symbols to subcarriers, performs inverse fast Fourier transform (IFFT) on the subcarriers, and inserts a cyclic prefix (CP) to generate OFDM symbols in the data transmit mode. The baseband processing unit 1g-20 splits the baseband signal from the RF processing unit 1g-10 into OFDM symbols, recovers the signals mapped to the subcarriers through FFT, and performs demodulation and decoding to recover the bit strings in the data reception mode.

The baseband processing unit 1g-20 and the RF processing unit 1g-10 take charge of transmitting and receiving signals as described above. Accordingly, the baseband processing unit 1g-20 and the RF processing unit 1g-10 may be referred to as a transmission unit, a reception unit, a transceiver, or a communication unit. At least one of the baseband processing unit 1g-20 and the RF processing unit 1g-10 may include a plurality of communication modules for supporting different radio access technologies. At least one of the baseband processing unit 1g-20 and the RF processing unit 1g-10 may include a plurality of communication modules for processing different frequency bands signals. Examples of the radio access technologies include WLAN (e.g., IEEE 802.11) and cellular network (e.g., LTE). Examples of the different frequency bands may include super high frequency (SHF) band (e.g., 2.5 GHz and 5 GHz) and millimeter wave (mmWave) bands (e.g., 60 GHz).

The storage unit 1g-30 stores basic programs for operation of the terminal, application programs, and data such as configuration information. In particular, the storage unit 1g-30 may store the information related to the secondary access node with which the terminal performs radio communication using the secondary radio access technology. The storage unit 1g-30 provides the stored data in response to a request from the controller 1g-40.

The controller 1g-40 controls overall operations of the terminal. For example, the controller 1g-40 controls the baseband processing unit 1g-20 and the RF processing unit 1g-10 to transmit/receive signals. The controller 1g-40 also writes and reads data to and from the storage unit 1g-30. In order to accomplish this, the controller 1g-40 may include at least one processor. For example, the controller 1g-40 may include a communication processor (CP) for controlling communication and an application processor (AP) for providing higher layer processing, e.g., application layer protocol processing. According to an embodiment of the present disclosure, the controller 1g-40 includes a multi-connectivity processing unit 1g-42. For example, the controller 1g-40 may control the UE to perform the UE operations and procedures described with reference to FIG. 1E.

According to an embodiment of the present disclosure, the controller 1g-40 configures a cell with a different subframe length in response to a command instructing to add a cell using a different subframe length from the eNB and, an activation/deactivation command for the corresponding cell is received, determines the activation/deactivation time point based on the difference between the PCell and SCell subframe lengths to perform a given operation.

Embodiment 2

Figure 2A:
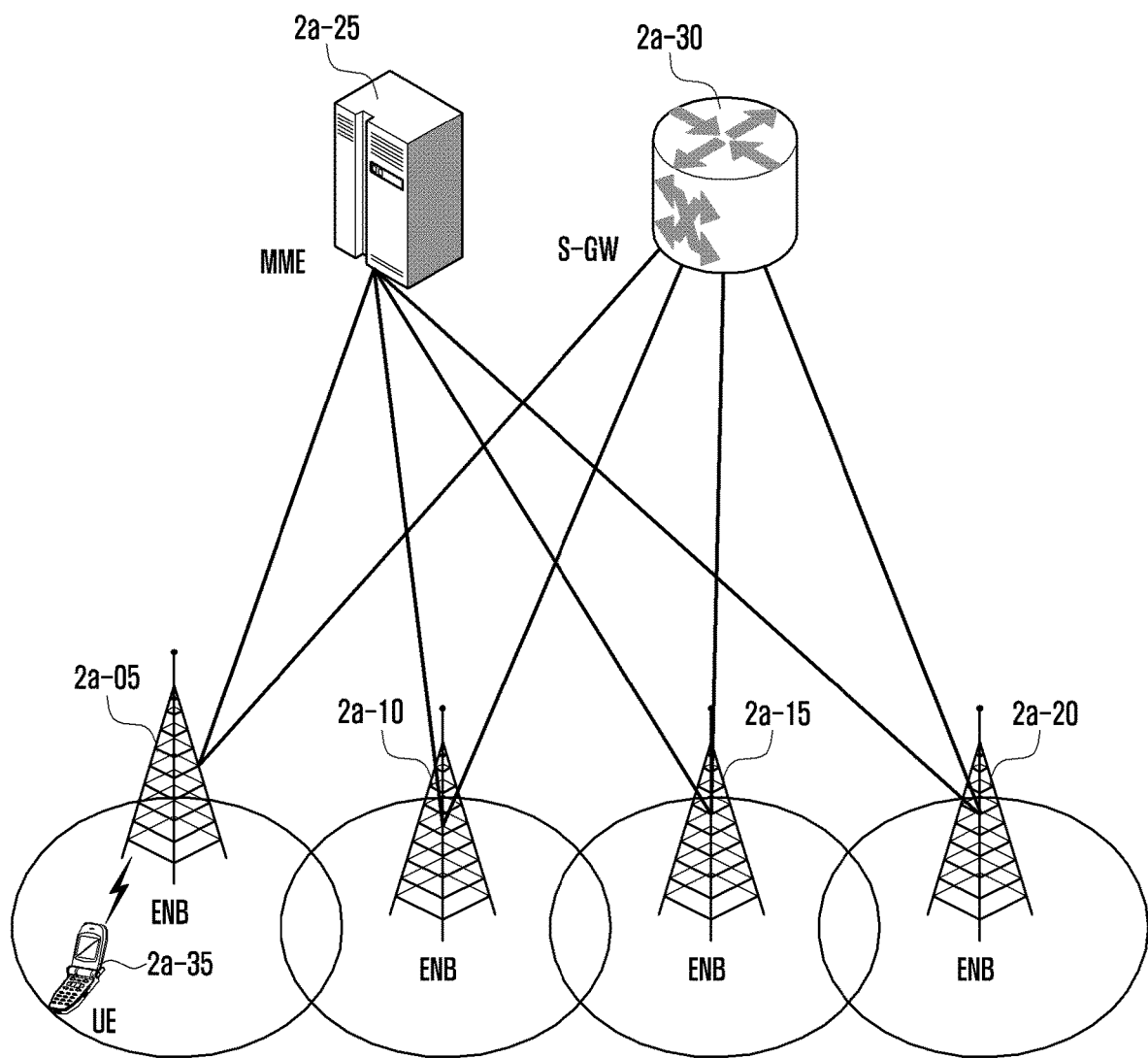
FIG. 2A is a diagram illustrating LTE system architecture according to an embodiment of the present disclosure.

FIG. 2A is a diagram illustrating LTE system architecture according to an embodiment of the present disclosure.

Referring to FIG. 2A, the radio communication system includes evolved Node Bs (eNBs) 2a-05, 2a-10, 2a-15, and 2a-20; a MME 2a-25; and an S-GW 2a-30. The User Equipment (UE) 2a-35 connects to an external network via the eNBs 2a-05, 2a-10, 2a-15, and 2a-20 and the S-GW 2a-30.

The eNBs 2a-05, 2a-10, 2a-15, and 2a-20 are access nodes of a cellular network for serving the UEs attempting connection to the network. That is, each of the eNBs 2a-05, 2a-10, 2a-15, and 2a-20 collects status information of UEs (such as buffer status, power headroom, channel status) for serving the user traffics and schedules the UEs to support connection between the UEs and a CN. The MME 2a-25 is an entity taking charge of UE mobility management and control function and serves the eNBs 2a-05, 2a-10, 2a-15, and 2a-20; the S-GW 2a-30 is an entity taking charge of data bearer function. The MME 2a-25 and the S-GW 2a-30 may also perform UE authentication and bearer management on the UEs connected to the network and handle the packets arrived from and to be transmitted to the eNBs 2a-05, 2a-10, 2a-15, and 2a-20.

Figure 2B:
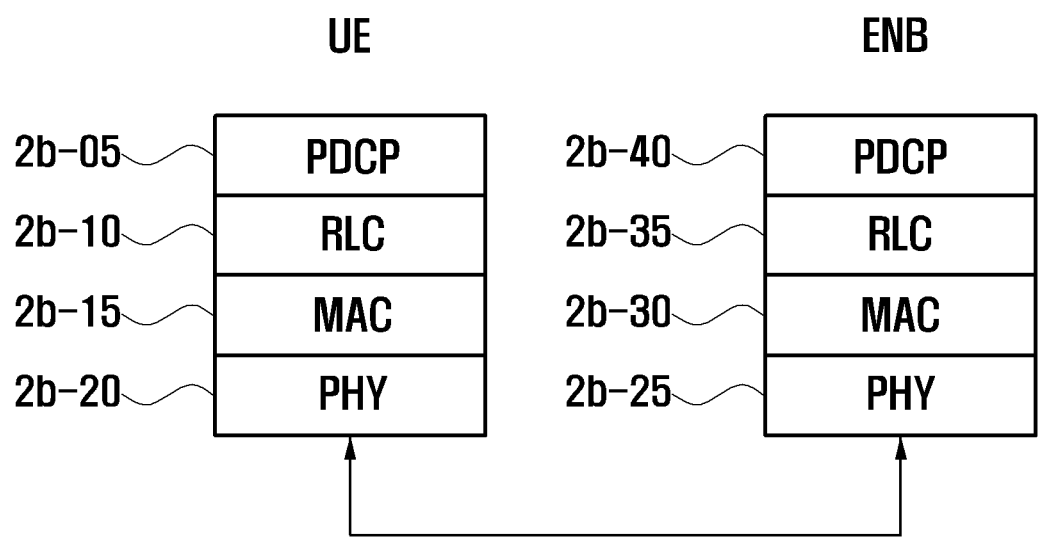
FIG. 2B is a diagram illustrating a protocol stack of an interface between a UE and an eNB in LTE according to an embodiment of the present disclosure.

FIG. 2B is a diagram illustrating a protocol stack of an interface between a UE and an eNB in LTE according to an embodiment of the present disclosure.

Referring to FIG. 2B, the protocol stack of the interface between the UE and the eNB in the LTE system includes a plurality of protocol layers stacked from the bottom to the top: physical (PHY) layer denoted by reference numbers 2b-20 and 2b-25, MAC layer denoted by reference numbers 2b-15 and 2b-30, radio link control (RLC) layer denoted by reference numbers 2b-10 and 2b-35, and PDCP layer denoted by reference numbers 2b-05 and 2b-40. The PDCP layer denoted by reference numbers 2b-05 and 2b-40 takes charge of compressing/decompressing an IP header, and the RLC layer denoted by reference numbers 2b-10 and 2b-35 takes charge of reformatting PDCP PDUs in order to fit them into the size indicated by the mac layer. The MAC layer denoted by reference number 2b-15 and 2b-30 allows for connection of multiple RLC entities established for one UE and takes charge of multiplexing RLC PDUs from the RLC layer into a MAC PDU and demultiplexing a MAC PDU into RLC PDUs. The PHY layer denoted by reference numbers 2b-20 and 2b-25 takes charge of channel-coding and modulation on higher layer data to generate and transmit OFDM symbols over a radio channel, and demodulating and channel-decoding on OFDM symbols received over the radio channel to deliver the decoded data to the higher layers. The PHY layer denoted by reference numbers 2b-20 and 2b-25 uses HARQ for additional error correction by transmitting 1-bit information indicating positive or negative acknowledgement about data packet, the acknowledgement being transmitted from the receiver to the transmitter. The 1-bit information is referred to as ACK/NACK. The downlink HARQ ACK/NACK corresponding to an uplink transmission may be transmitted in Physical Hybrid-ARQ Indicator Channel (PHICH), and the uplink HARQ ACK/NACK corresponding to a downlink transmission may be transmitted in PUCCH or PUSCH.

Although not shown in the drawing, there is a RRC layer above the PDCP layer, and peer RRC entities exchange connection and measurement configuration control messages for controlling radio resources.

Meanwhile, the PHY layer may be configured to use one or more frequencies/carriers simultaneously, and this technique is referred to as CA. The CA makes it possible to increase the data rate for communication between a UE and an eNB dramatically by aggregating one or more secondary component carriers with a primary component carrier in comparison with the legacy signal carrier system. In LTE, an eNB operate a primary cell (PCell) corresponding to the primary component carrier and, if necessary, at least one secondary cell (SCell) corresponding to the secondary component carrier.

Figure 2C:
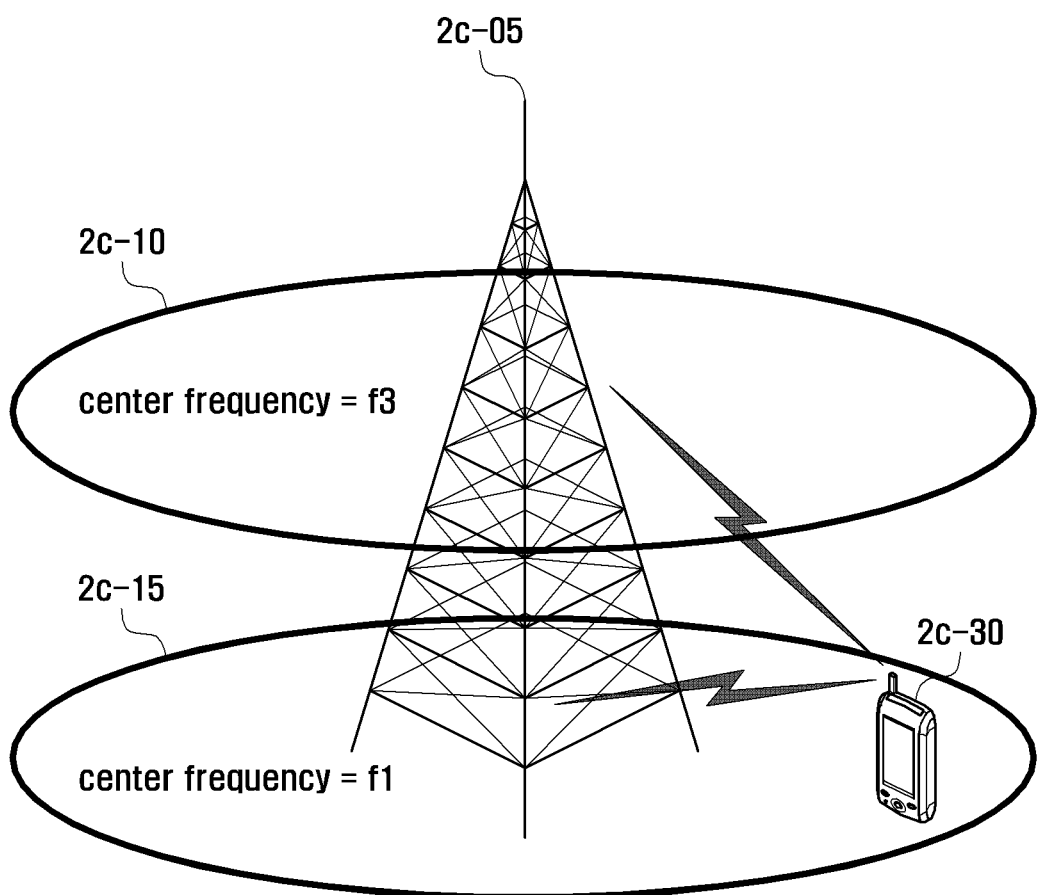
FIG. 2C is a diagram for explaining CA for a UE according to an embodiment of the present disclosure.

FIG. 2C is a diagram for explaining CA for a UE according to an embodiment of the present disclosure.

Referring to FIG. 2C, an eNB 2c-05 may transmit signals over multiple carriers across several frequency bands. For example, if the eNB 2c-05 operates on two downlink (DL or forward) frequencies 2c-15 and 2c-10 with respective center frequencies f1 and f3, a legacy UE receives data on one of the two carriers. However, a CA-enabled UE is capable of receiving data at an increased data rate using both the two carriers simultaneously. The eNB 2c-05 allocates more carriers to the CA-enabled UE, depending on the situation, so as to increase data rate for the UE 2c-30.

Assuming that a cell is configured with one downlink carrier and one uplink carrier in the conventional concept, the CA can be understood as if the UE communicates data via multiple cells. This means that the CA makes it possible to increase the peak data rate in proportion to the number of aggregated carriers.

In the following description, if a UE receives data through a certain downlink carrier or transmits data through a certain uplink carrier, this means the UE transmits/receives data through a control channel and a data channel of the cell corresponding to the center frequency and frequency band characterizing the carrier. Although the description is directed to an LTE system for convenience of explanation, the present disclosure is applicable to other wireless communication systems supporting CA.

Figure 2D:
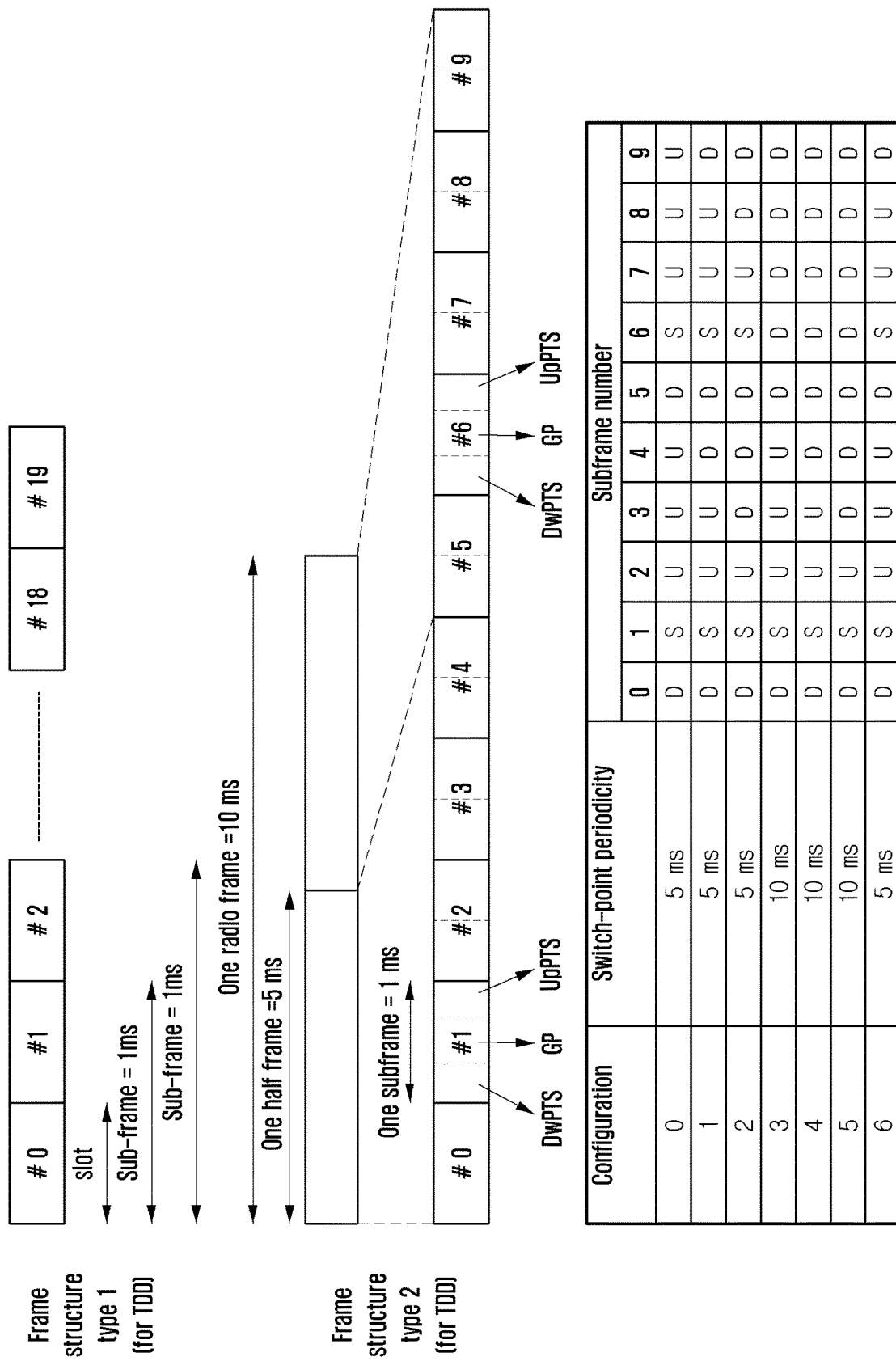
FIG. 2D is a diagram illustrating radio frame structures for LTE according to an embodiment of the present disclosure.

FIG. 2D is a diagram illustrating radio frame structures for LTE according to an embodiment of the present disclosure. FIG. 2D depicts Frame Structure Type 1 for a FDD system and Frame Structure Type 2 for a TDD system.

Referring to FIG. 2D, Frame Structure Types 1 and 2 has the same length of 10 ms, and one radio frame consists of 10 subframes (#0, #1, #2, . . . , #9) of 1 ms duration each. In Frame Structure Type 1 for FDD, all subframes are designated for downlink or uplink because the downlink and uplink are separated in frequency. In Frame Structure Type 2 for TDD, subframes #0, #2, #3, #4, #5, #7, #8, and #9 may be designated as downlink subframe (marked by D in the table depicted at the bottom of FIG. 2D) or uplink subframe (marked by U in the table depicted at the bottom of FIG. 2D) according to the TDD DL-UL configuration listed in the table depicted at the bottom of FIG. 2D. For example, TDD DL-UL configuration 0 includes downlink subframes of subframes #0 and #5 and uplink subframes of subframes #2, #3, #4, #7, #8, and #9; and TDD DL-UL configuration 1 includes downlink subframes of subframes #0, #4, #5, and #9 and uplink subframes of subframes #2, #3, #7, and #8.

In FIG. 2D, subframes #1 and #6 are special subframes (marked by S in the table depicted at the bottom of FIG. 2D) appearing at the transition from downlink to uplink transmission. A special subframe comprises three regions represented by DwPTS, GP, and UpPTS; the DwPTS is allowed for downlink data transmission, and the UpPTS is not allowed for uplink data transmission but SRS transmission. The GP helps avoid interference between the downlink and uplink transmission.

Figure 2E:
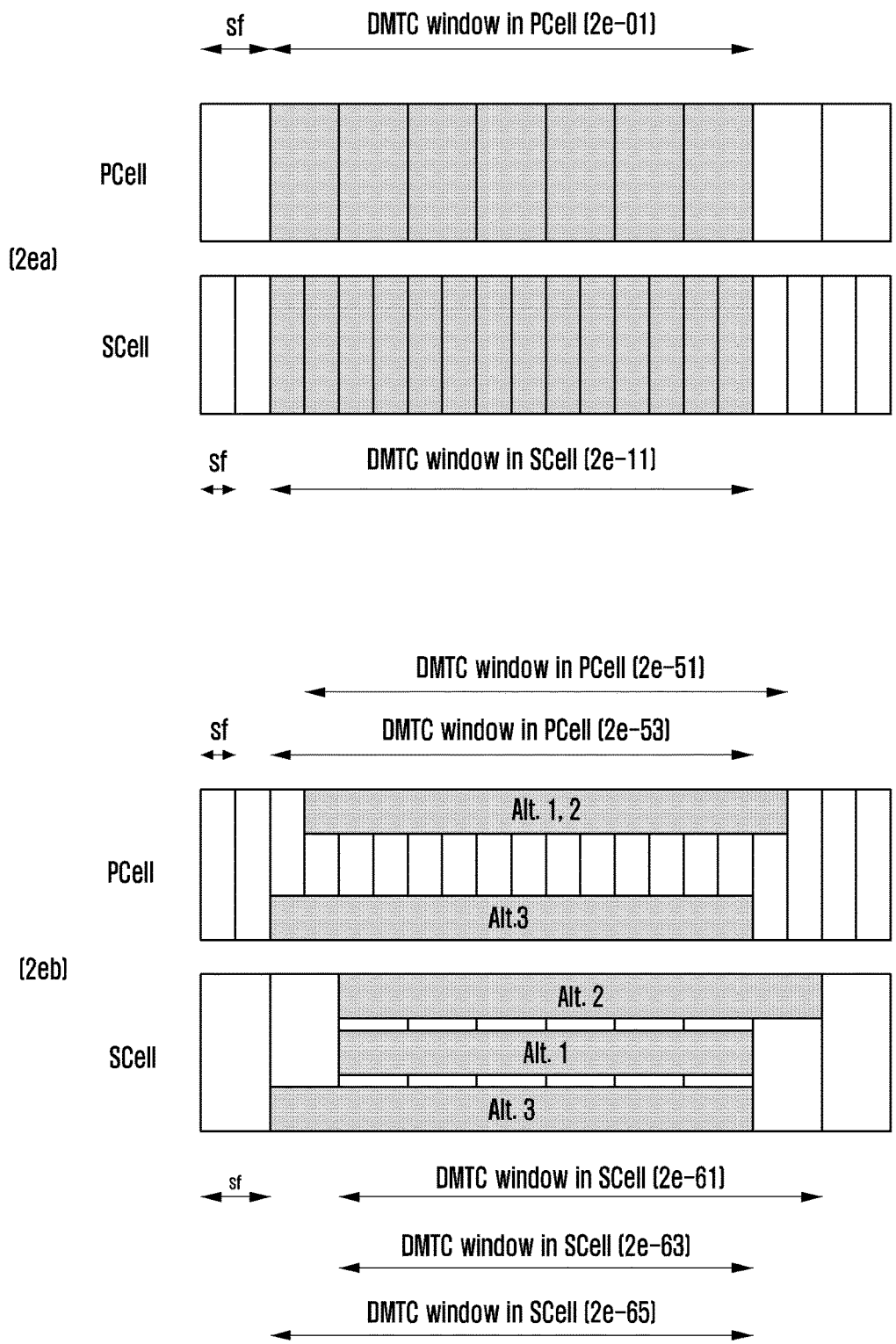
FIG. 2E is a diagram illustrating frame formats for explaining serving cell and neighboring cell measurement timings according to an embodiment of the present disclosure.

FIG. 2E is a diagram illustrating frame formats for explaining serving cell and neighboring cell measurement timings according to an embodiment of the present disclosure.

FIG. 2E is depicted under the assumption of measurement for aggregation or handover between frequencies of the PCell and SCell (including non-serving cell but referred to as SCell for convenience of explanation in the following description) operating with different subframe lengths. FIG. 2E consists of two parts: upper part 2ea where the subframe length of the PCell is longer than the subframe length of the SCell and lower part 2eb where the subframe length of the PCell is shorter than the subframe length of the SCell. FIG. 2E is also depicted under the assumption of a scenario where the UE is already connected to an eNB (i.e., in the RRC_CONNECTED state capable of transmitting/receiving data) and configured by the eNB to perform measurement on a frequency based on the subframe length and measurement window indicated in discovery signals measurement timing configuration (DMTC) information transmitted by the eNB for measurement in the SCell with the different subframe length.

First, a description is made of the case where the subframe length of the PCell is longer than the subframe length of the SCell as shown in part 2ea of FIG. 2E. If the eNB transmits to the UE the DMTC information including 'DMTC window in PCell' configured as denoted by reference number 2e-01 through the PCell, the UE performs measurement in the corresponding SCell operating with the subframe length shorter than that of the PCell during a 'DMCT window in SCell' 2e-11 corresponding to the DMTC window in PCell. That is, the UE starts measurement at the first SCell subframe of which the start point is equal to or later than the start point of the DMTC window of PCell and ends the measurement at the first SCell subframe of which the end point is equal to or earlier than the end point of the DMTC window in PCell. This is referred to as embodiment 2-1. That is, the DMTC configuration indicative of the DMTC window in PCell 2e-01 is received, the UE performs DMTC during the DMTC window in SCell 2e-11 in embodiment 2-1.

Next, a description is made of the case where the subframe length of the PCell is shorter than the subframe length of the SCell as shown in part 2eb of FIG. 2E.

In this embodiment, the DMTC configuration is categorized into two cases: one is that the boundaries of the DMTC window in PCell mismatch the boundaries of SCell subframes (i.e., boundaries of the DMTC window in PCell is in middle of the boundaries of SCell subframes) as denoted by reference number 2e-51 and the other is that the boundaries of the DMTC window in PCell match the boundaries of SCell subframes as denoted by reference number 2e-53. In the case that the boundaries of the DMTC window in PCell mismatch the boundaries of SCell subframes, the UE starts measurement at the first SCell subframe of which the start point (also start point of a DMTC window in SCell) is equal to or later than the start point of the DMTC window of PCell and continues the measurement until a DMTC window in SCell equal in length with the DMTC window in PCell ends; this is referred to as embodiment 2-2. That is, if the information on the DMTC window in PCell as denoted by reference number 2e-51 is received, the UE performs measurement during the DMTC window in SCell which is configured as denoted by reference number 2e-61 in embodiment 2-2.

It may also be possible that the UE starts measurement at the first SCell subframe of which start point is equal to or later than the start point of the DMTC window in PCell and ends the measurement at the first SCell subframe of which end point is equal to or earlier than the end point of the DMTC window in PCell as in embodiment 2-1. That is, if the information on the 'DMTC window in PCell' configured as denoted by 2e-51, the UE performs measurement during the DMTC window in SCell which is configured as denoted by reference number 2e-63 in embodiment 2-1.

In the case that the boundaries of the DMTC window in PCell match the boundaries of SCell subframes, the UE may perform measurement in SCell using the setting values for the DMTC window in PCell; this is referred to as embodiment 2-3. That is, if the information on the 'DMTC window in PCell' configured as denoted by 2e-53 is received, the UE may perform measurement in the DMTC window in SCell which is configured with the same setting values as denoted by reference number 2e-65.

Figure 2F:
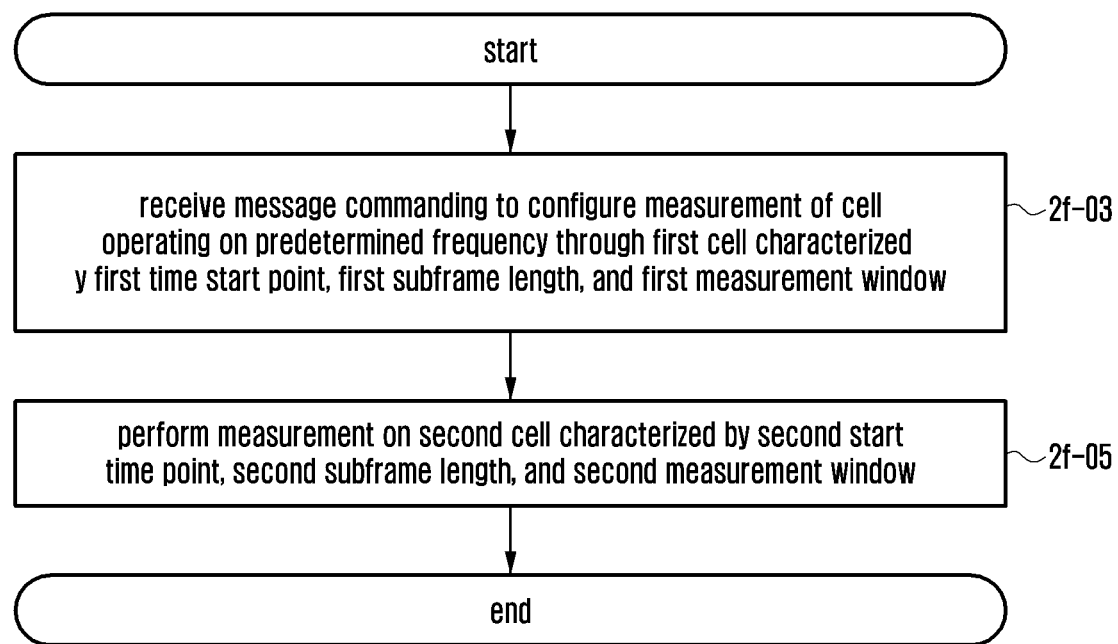
FIG. 2F is a flowchart illustrating an operation of a UE according to an embodiment of the present disclosure.

FIG. 2F is a flowchart illustrating an operation of a UE according to an embodiment of the present disclosure.

Referring to FIG. 2F, it is assumed that the UE is already connected to an eNB and thus in a state capable of transmitting/receiving data.

FIG. 2F is depicted under the assumption of measurement for aggregation or handover between frequencies of the PCell (first cell in the following description) and an SCell (second cell in the following description) (including a non-serving cell but referred to as SCell for convenience of explanation) operating with different subframe lengths. FIG. 2F is also depicted under the assumption of a scenario where the UE is already connected to an eNB (i.e., in the RRC_CONNECTED state capable of transmitting/receiving data) and configured by the eNB to perform measurement on a frequency based on the subframe length and measurement window indicated in DMTC information transmitted by the eNB for measurement in the SCell with the different subframe length.

The UE receives a measurement configuration command message for a cell operating on a predetermined frequency through a first cell of the eNB to which the UE has connected at operation 2f-03, the measurement configuration is to command a measurement for the cell with a first start time point, a first subframe length, and a first measurement window. The first start time point, the first subframe length, and the first measurement window are determined based on the subframe boundaries of the first cell. Accordingly, the UE performs measurement on the second cell characterized by a second start point, a second frame length, and a second measurement window at operation 2f-05.

In the embodiment 2f-1 of the present disclosure, the second start point starts from a subframe of the SCell which equals to the first start point or appears first after the first start point and ends at a subframe of the SCell which appears first before a last subframe from the first start point with the first subframe length or equals to the last subframe, wherein the first period and the second period are same.

In the embodiment 2f-2 of the present disclosure, the second start point starts from a subframe of the SCell which equals to the first start point or appears first after the first start point, the first subframe length and the second subframe length are same, and the first period and the second period are same.

Figure 2G:
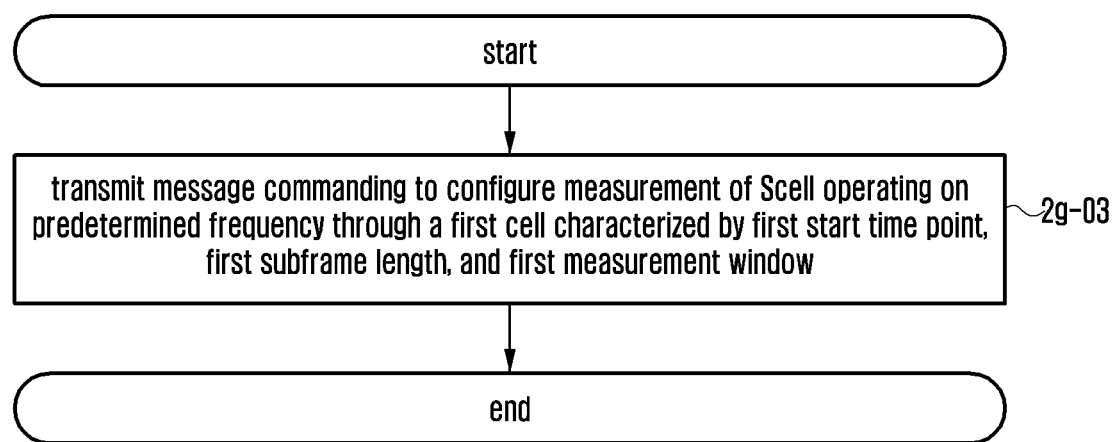
FIG. 2G is a flowchart illustrating an operation of an eNB according to an embodiment of the present disclosure.

FIG. 2G is a flowchart illustrating an operation of an eNB according to an embodiment of the present disclosure.

Referring to FIG. 2G, it is assumed that the UE is already connected to an eNB and thus in a state capable of transmitting/receiving data.

FIG. 2G is depicted under the assumption of measurement for aggregation or handover between frequencies of the PCell (first cell in the following description) and an SCell (second cell in the following description) (including a non-serving cell but referred to as SCell for convenience of explanation) operating with different subframe lengths. FIG. 2G is also depicted under the assumption of a scenario where the UE is already connected to an eNB (i.e., in the RRC_CONNECTED state capable of transmitting/receiving data) and configured by the eNB to perform measurement on a frequency based on the subframe length and measurement window indicated in DMTC information transmitted by the eNB for measurement in the SCell with the different subframe length.

At operation 2g-03, the eNB transmits to the UE a message for configuring measurement for a second cell operating on a predetermined frequency through a first cell characterized by a first start time point, a first subframe length, and a first measurement window. The first start time point, the first subframe length, and the first measurement window are determined based on the subframe boundaries of the first cell. It may be possible to perform measurement on another cell with a different subframe length using the same setting values (start time point, subframe length, and measurement window) by adjusting the first start time point, the first subframe length, and the first measurement window to match the second cell subframe boundaries.

Figure 2H:
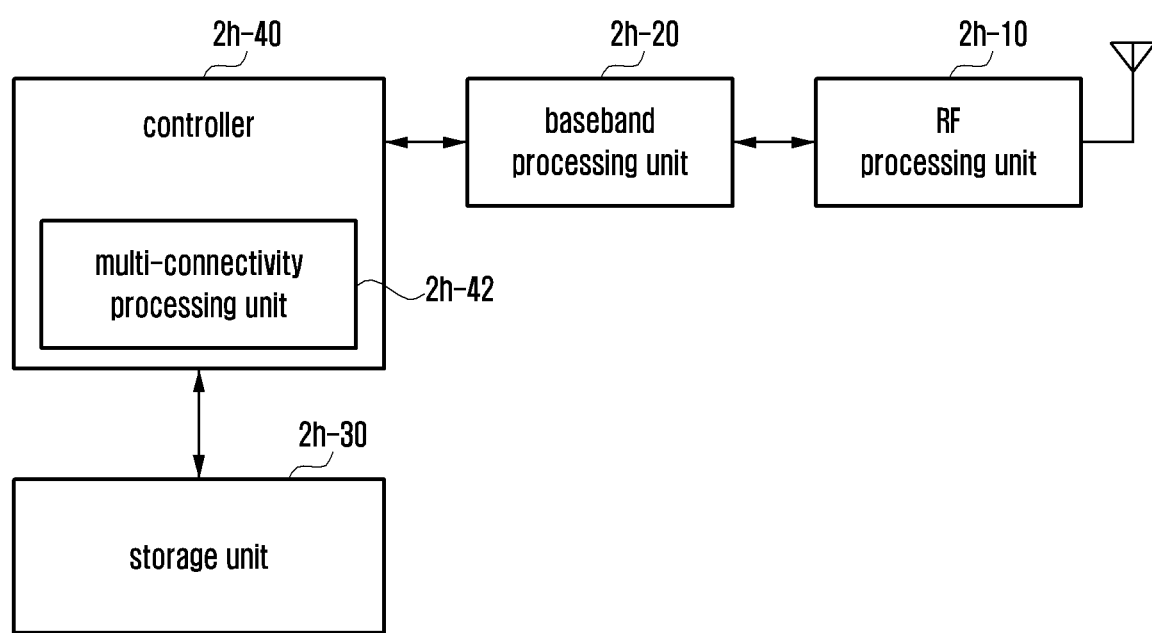
FIG. 2H is a block diagram illustrating a configuration of a UE in a wireless communication according to an embodiment of the present disclosure.

FIG. 2H is a block diagram illustrating a configuration of a UE in a wireless communication according to an embodiment of the present disclosure.

Referring to FIG. 2H, the UE includes a RF processing unit 2h-10, a baseband processing unit 2h-20, a storage unit 2h-30, and a controller 2h-40.

The RF processing unit 2h-10 takes charge of signal band conversion and amplification for transmitting signals over a radio channel. That is, the RF processing unit 2h-10 up-converts a baseband signal output from the baseband processing unit 2h-20 to an RF band signal for transmission through antennas and down-converts an RF band signal received through the antenna to a baseband signal. For example, the RF processing unit 2h-10 may include a transmission filter, a reception filter, an amplifier, a mixer, an oscillator, a DAC, and an ADC. Although one antenna is depicted in FIG. 2H, the terminal may include a plurality of antennas. The RF processing unit 2h-10 may include a plurality of RF chains. The RF processing unit 2h-10 may perform beamforming. For beamforming, the RF processing unit 2h-10 may adjust the phases and sizes of the signal transmitted/received through the antennas or antenna elements.

The baseband processing unit 2h-20 takes charge of conversion between baseband signals and bit strings according to a physical layer protocol of the system. For example, the baseband processing unit 2h-20 performs encoding and modulation on the transmit bit strings to generate complex symbols in data transmission mode. The baseband processing unit 2h-20 also performs demodulation and decoding on the baseband signal from the RF processing unit 2h-10 to recover the received bit strings in data reception mode. For the case of an OFDM system, the baseband processing unit 2h-20 performs encoding and modulation on the transmit bit string to generate complex symbols, maps the complex symbols to subcarriers, performs IFFT on the subcarriers, and inserts a CP to generate OFDM symbols in the data transmit mode. The baseband processing unit 2h-20 splits the baseband signal from the RF processing unit 2h-10 into OFDM symbols, recovers the signals mapped to the subcarriers through FFT, and performs demodulation and decoding to recover the bit strings in the data reception mode.

The baseband processing unit 2h-20 and the RF processing unit 2h-10 take charge of transmitting and receiving signals as described above. Accordingly, the baseband processing unit 2h-20 and the RF processing unit 2h-10 may be referred to as a transmission unit, a reception unit, a transceiver, or a communication unit. At least one of the baseband processing unit 2h-20 and the RF processing unit 2h-10 may include a plurality of communication modules for supporting different radio access technologies. At least one of the baseband processing unit 2h-20 and the RF processing unit 2h-10 may include a plurality of communication modules for processing different frequency bands signals. Examples of the radio access technologies include WLAN (e.g., IEEE 802.11) and cellular network (e.g., LTE). Examples of the different frequency bands may include SHF band (e.g., 2.5 GHz and 5 GHz) and mmWave bands (e.g., 60 GHz).

The storage unit 2h-30 stores basic programs for operation of the terminal, application programs, and data such as configuration information. In particular, the storage unit 2h-30 may store the information related to the secondary access node with which the terminal performs radio communication using the secondary radio access technology.

The storage unit 2h-30 provides the stored data in response to a request from the controller 2h-40.

The controller 2h-40 controls overall operations of the terminal. For example, the controller 2h-40 controls the baseband processing unit 2h-20 and the RF processing unit 2h-10 to transmit/receive signals. The controller 2h-40 also writes and reads data to and from the storage unit 2h-30. In order to accomplish this, the controller 2h-40 may include at least one processor. For example, the controller 2h-40 may include a CP for controlling communication and an AP for providing higher layer processing, e.g., application layer protocol processing. According to an embodiment of the present disclosure, the controller 2h-40 includes a multi-connectivity processing unit 2h-42. For example, the controller 2h-40 may control the UE to perform the UE operations and procedures described with reference to FIG. 2E.

According to an embodiment of the present disclosure, the controller 2h-40 may control the UE to receive the DMTC information for measurement from the eNB and adjust the measurement window for another cell with a different subframe length as described above.

Figure 2I:
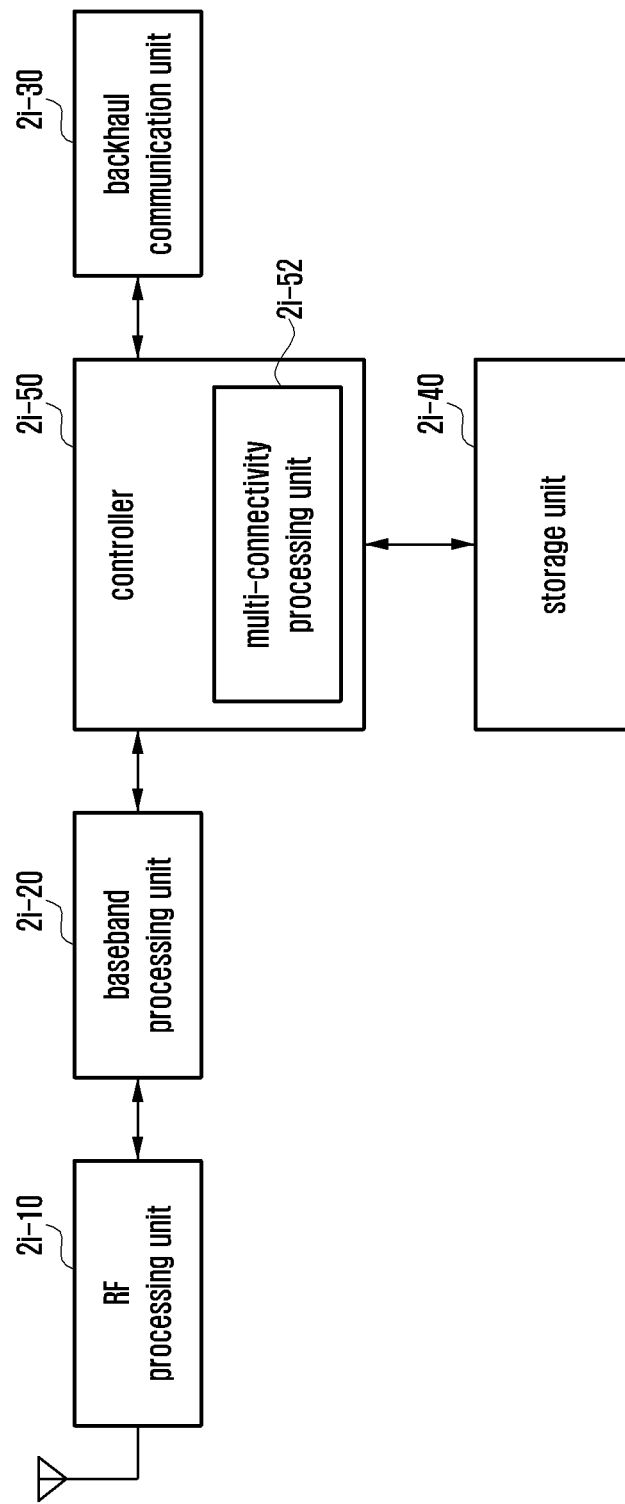
FIG. 2I is a block diagram illustrating a configuration of an eNB in a wireless communication system according to an embodiment of the present disclosure.

FIG. 2I is a block diagram illustrating a configuration of an eNB in a wireless communication system according to an embodiment of the present disclosure.

Referring to FIG. 2I, the eNB includes an RF processing unit 2i-10, a baseband processing unit 2i-20, a backhaul communication unit 2i-30, a storage unit 2i-40, and a controller 2i-50.

The RF processing unit 2i-10 takes charge of signal band conversion and amplification for transmitting signals over a radio channel. That is, the RF processing unit 2i-10 up-converts a baseband signal output from the baseband processing unit 2i-20 to an RF band signal for transmission through antennas and down-converts an RF band signal received through the antennas to a baseband signal. For example, the RF processing unit 2i-10 may include a transmission filter, a reception filter, an amplifier, a mixer, an oscillator, a DAC, and an ADC. Although one antenna is depicted in FIG. 2I, the eNB may include a plurality of antennas. The RF processing unit 2i-10 may include a plurality of RF chains. The RF processing unit 2i-10 may perform beamforming. For beamforming, the RF processing unit 2i-10 may adjust the phases and sizes of the signal transmitted/received through the antennas or antenna elements.

The baseband processing unit 2i-20 takes charge of converting between baseband signals and bit strings according to a physical layer protocol of the system. For example, the baseband processing unit 2i-20 performs encoding and modulation on the transmit bit strings to generate complex symbols in data transmission mode. The baseband processing unit 2i-20 also performs demodulation and decoding on the baseband signal from the RF processing unit 2i-10 to recover the received bit strings in data reception mode. For the case of an OFDM system, the baseband processing unit 2i-20 performs encoding and modulation on the transmit bit string to generate complex symbols, maps the complex symbols to subcarriers, performs IFFT on the subcarriers, and inserts a CP to generate OFDM symbols in the data transmit mode. The baseband processing unit 2i-20 splits the baseband signal from the RF processing unit 2i-10 into OFDM symbols, recovers the signals mapped to the subcarriers through FFT, and performs demodulation and decoding to recover the bit strings in the data reception mode. The baseband processing unit 2i-20 and the RF processing unit 2i-10 take charge of transmitting and receiving signals as described above. Accordingly, the baseband processing unit 2i-20 and the RF processing unit 2i-10 may be referred to as a transmission unit, a reception unit, a transceiver, or a communication unit.

The backhaul communication unit 2i-30 provides an interface for communication with other network nodes. That is, the backhaul communication unit 2i-30 converts the bit string to be transmitted to the access node and CN to a physical signal and the physical signal received from another node to a bit string.

The storage unit 2i-40 stores basic programs for operation of the eNB, application programs, and data such as configuration information. In particular, the storage unit 2i-40 may store the information on the bearers allocated to the connected terminal and measurement result reported by the terminal. The storage unit 2i-40 may also store the information as criteria for determining whether to enable or disable multi-connectivity for the terminal. The storage unit 2i-40 provides the stored data in response to a request from the controller 2i-50.

The controller 2i-50 may control overall operations of the eNB. For example, the controller 2i-50 controls the baseband processing unit 2i-20, the RF processing unit 2i-10, and the backhaul communication unit 2i-30 for transmitting/receiving signals. The controller 2i-50 also writes and reads data to and from the storage unit 2i-40. In order to accomplish this, the controller 2i-50 may include at least one processor. According to an embodiment of the present disclosure, the controller 2i-50 includes a multi-connectivity processing unit 2i-52.

According to an embodiment of the present disclosure, the controller 2i-50 transmits to the UE the DMTC setting values configured according to the subframe lengths of the cells operating the frequencies as measurement targets.

Embodiment 3

Figure 3A:
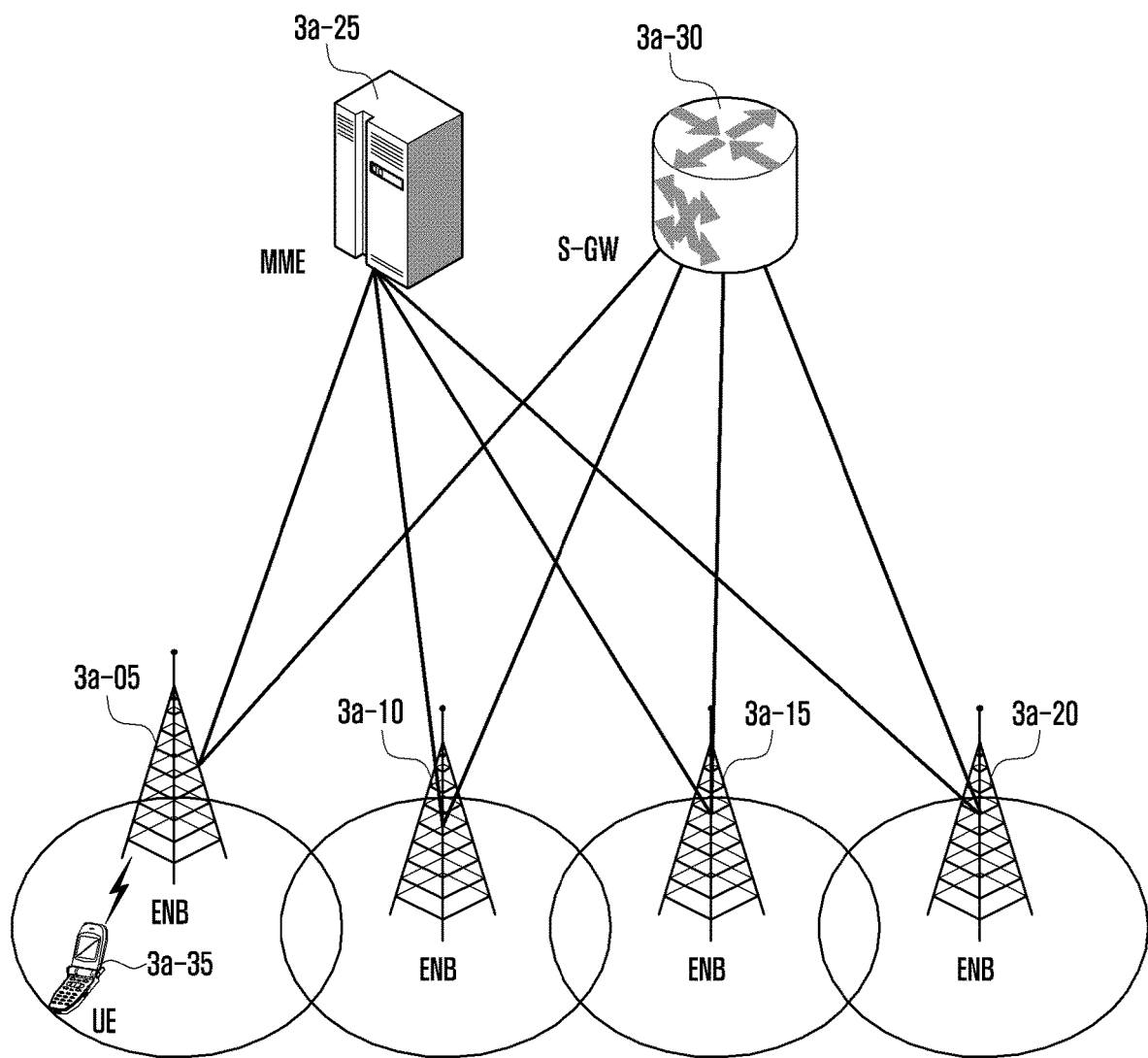
FIG. 3A is a diagram illustrating LTE system architecture according to an embodiment of the present disclosure.

FIG. 3A is a diagram illustrating LTE system architecture according to an embodiment of the present disclosure.

Referring to FIG. 3A, the radio communication system includes evolved Node Bs (eNBs) 3a-05, 3a-10, 3a-15, and 3a-20; a MME 3a-25; and an S-GW 3a-30. The UE 3a-35 connects to an external network via the eNBs 3a-05, 3a-10, 3a-15, and 3a-20 and the S-GW 3a-30.

The eNBs 3a-05, 3a-10, 3a-15, and 3a-20 are access nodes of a cellular network for serving the UEs attempting connection to the network. That is, each of the eNBs 3a-05, 3a-10, 3a-15, and 3a-20 collects status information of UEs (such as buffer status, power headroom, channel status) for serving the user traffics and schedules the UEs to support connection between the UEs and a CN. The MME 3a-25 is an entity taking charge of UE mobility management and control function and serves the eNBs 3a-05, 3a-10, 3a-15, and 3a-20; the S-GW 3a-30 is an entity taking charge of data bearer function. The MME 3a-25 and the S-GW 3a-30 may also perform UE authentication and bearer management on the UEs connected to the network and handle the packets arrived from and to be transmitted to the eNBs 3a-05, 3a-10, 3a-15, and 3a-20.

Figure 3B:
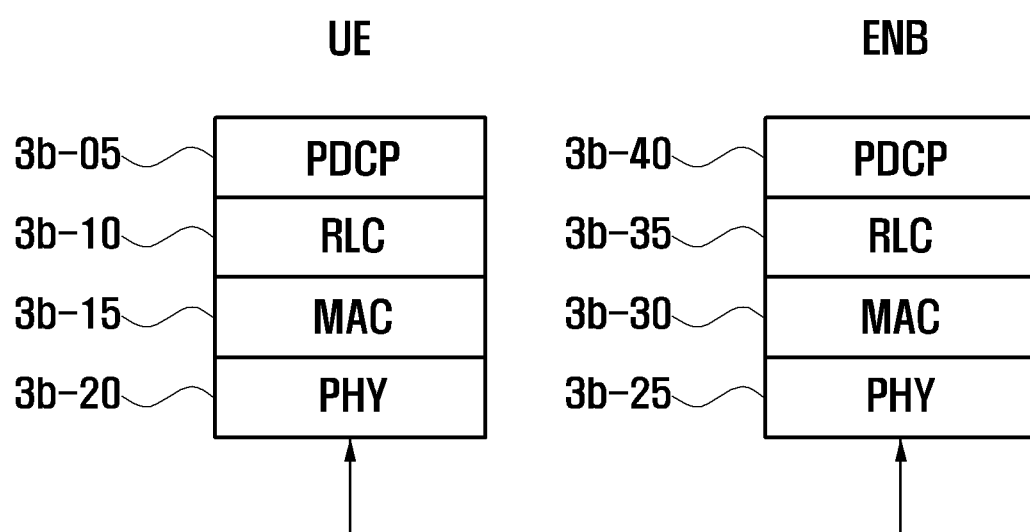
FIG. 3B is a diagram illustrating a protocol stack of an interface between a UE and an eNB in LTE according to an embodiment of the present disclosure.

FIG. 3B is a diagram illustrating a protocol stack of an interface between a UE and an eNB in LTE according to an embodiment the present disclosure.

Referring to FIG. 3B, the protocol stack of the interface between the UE and the eNB in the LTE system includes a plurality of protocol layers stacked from the bottom to the top: PHY layer denoted by reference numbers 3b-20 and 3b-25, MAC layer denoted by reference numbers 3b-15 and 3b-30, radio link control (RLC) layer denoted by reference numbers 3b-10 and 3b-35, and PDCP layer denoted by reference numbers 3b-05 and 3b-40. The PDCP layer denoted by reference numbers 3b-05 and 3b-40 takes charge of compressing/decompressing an IP header, and the RLC layer denoted by reference numbers 3b-10 and 3b-35 takes charge of reformatting PDCP PDUs in order to fit them into the size indicated by the mac layer. The MAC layer denoted by reference number 3b-15 and 3b-30 allows for connection of multiple RLC entities established for one UE and takes charge of multiplexing RLC PDUs from the RLC layer into a MAC PDU and demultiplexing a MAC PDU into RLC PDUs. The PHY layer denoted by reference numbers 3b-20 and 3b-25 takes charge of channel-coding and modulation on higher layer data to generate and transmit OFDM symbols over a radio channel, and demodulating and channel-decoding on OFDM symbols received over the radio channel to deliver the decoded data to the higher layers. The PHY layer denoted by reference numbers 3b-20 and 3b-25 uses HARQ for additional error correction by transmitting 1-bit information indicating positive or negative acknowledgement about data packet, the acknowledgement being transmitted from the receiver to the transmitter. The 1-bit information is referred to as HARQ ACK/NACK. The downlink HARQ ACK/NACK corresponding to an uplink transmission may be transmitted in Physical Hybrid-ARQ Indicator Channel (PHICH), and the uplink HARQ ACK/NACK corresponding to a downlink transmission may be transmitted in PUCCH or PUSCH.

Although not shown in the drawing, there is a RRC layer above the PDCP layer, and peer RRC entities exchange connection and measurement configuration control messages for controlling radio resources.

Meanwhile, the PHY layer may be configured to use one or more frequencies/carriers simultaneously, and this technique is referred to as CA. The CA makes it possible to increase the data rate for communication between a UE and an eNB (E-UTRAN NodeB) dramatically by aggregating one or more secondary component carriers with a primary component carrier in comparison with the legacy signal carrier system. In LTE, an eNB operate a primary cell (PCell) corresponding to the primary component carrier and, if necessary, at least one secondary cell (SCell) corresponding to the secondary component carrier.

In an LTE system, a UE reports its power headroom to an eNB (power headroom report (PHR)) when a predetermined condition is fulfilled. The power headroom means the difference between the UE's configured maximum transmit power and UE-estimated transmit power. The UE-estimated transmit power is calculated based on the power in use for real transmission when real uplink transmission occurs (in this case, the calculated value is called real value), however, if there is no real uplink transmission, the value is calculated according to a predetermined formula given in the standard (in this case, the calculated value is called virtual value). The eNB may determine the maximum allowed power value of the UE based on the PHR. In a CA situation, the power headroom information is reported per component carrier.

Figure 3C:
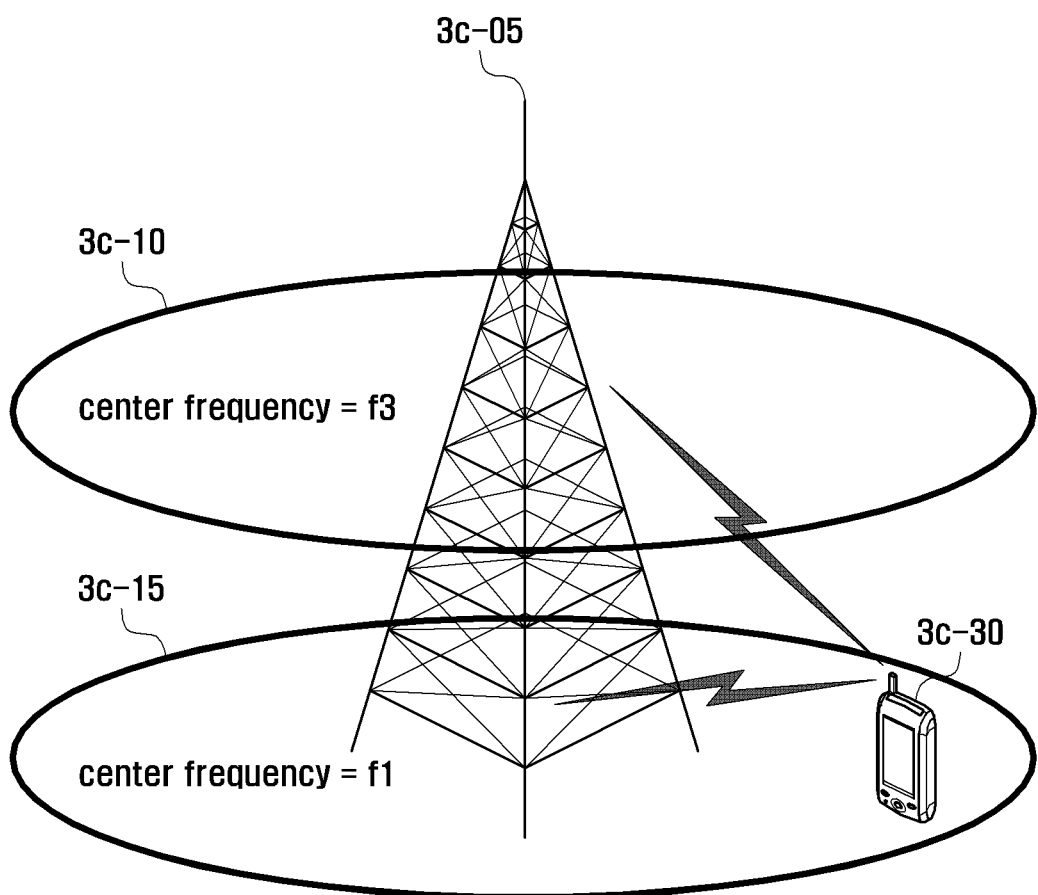
FIG. 3C is a diagram for explaining CA for a UE according to an embodiment of the present disclosure.

FIG. 3C is a diagram for explaining CA for a UE according an embodiment of the present disclosure.

Referring to FIG. 3C, an eNB 3c-05 may transmit signals over multiple carriers across several frequency bands. For example, if the eNB 3c-05 operates on two downlink (DL or forward) frequencies with respective center frequencies f1 and f3, a legacy UE receives data on one of the two carriers. However, a CA-enabled UE is capable of receiving data at an increased data rate using both the two carriers simultaneously. The eNB 3c-05 allocates more carriers to the CA-enabled UE 3c-30, depending on the situation, so as to increase data rate for the UE 3c-30.

Assuming that a cell is configured with one downlink carrier and one uplink carrier in the conventional concept, the CA can be understood as if the UE communicates data via multiple cells. This means that the CA makes it possible to increase the peak data rate in proportion to the number of aggregated carriers.

In the following description, if a UE receives data through a certain downlink carrier or transmits data through a certain uplink carrier, this means the UE transmits/receives data through a control channel and a data channel of the cell corresponding to the center frequency and frequency band characterizing the carrier. Although the description is directed to an LTE system for convenience of explanation, the present disclosure is applicable to other wireless communication systems supporting CA.

Since uplink transmissions (i.e. transmission from UEs to an eNB) are likely to cause interference to each other regardless whether CA is applied or not, uplink transmit power should be controlled at an appropriate level. Accordingly, a UE calculates uplink transmit power with a predetermined function and performs uplink transmission at the calculated uplink transmission power level. For example, the UE calculates an uplink transmit power by input values related to the scheduling information such as allocated transmission resource amount and modulation coding scheme (MCS) level and values indicative of the channel conditions such as path-loss to the predetermined function and performs uplink transmission by applying the calculated uplink transmit power. The uplink transmission power available for the UE is limited by the maximum uplink transmit power and, if the calculated uplink transmit power is greater than the maximum transmit power of the UE, the UE performs uplink transmission by applying its maximum transmit power. In this case, the lack in real uplink transmit power (in comparison with the uplink transmit power) causes uplink transmission quality degradation. Accordingly, it is preferred for the eNB to perform scheduling such that the transmit power is not excessive to the maximum transmit power. However, since the eNB cannot check a few parameters such as pathloss, the UE transmits to a power headroom report (PHR), if necessary, to report its power headroom (PH) to the eNB.

The power headroom is affected by: 1) allocated transmission resource amount, 2) MCS for uplink transmission, 3) pathloss on related downlink carrier, and 4) accumulated value of transmit power control commands. Among these elements, the pathloss (PL) and accumulated value of transmit power control commands vary depending on uplink carrier and thus if multiple uplink carriers are aggregated one UE, it is preferred to determine whether to transmit PHR per uplink carrier. For efficient PHR, however, it may be possible to report PHs of multiple uplink carriers through one uplink carrier. According to the operation strategy, it may be necessary to report the PHs for the carriers on which there is no real PUSCH transmission. In this case, it may be more efficient to report the PHs for the multiple uplink carriers through one uplink carrier. For this purpose, the legacy PHR should be extended. That is, multiple PHs should be arranged according to a predetermined ordering rule in a PHR.

A PHR is triggered when pathloss on a connected downlink carrier is equal to or greater than a predetermined threshold value, a prohibit PHR timer expires, or a predetermined time period elapses after the PHR generation. Although the PHR is triggered, the UE does not transmit the PHR immediately but waits until the arrival of an available uplink transmission timing. This is because the PHR is not delay-sensitive.

Figure 3D:
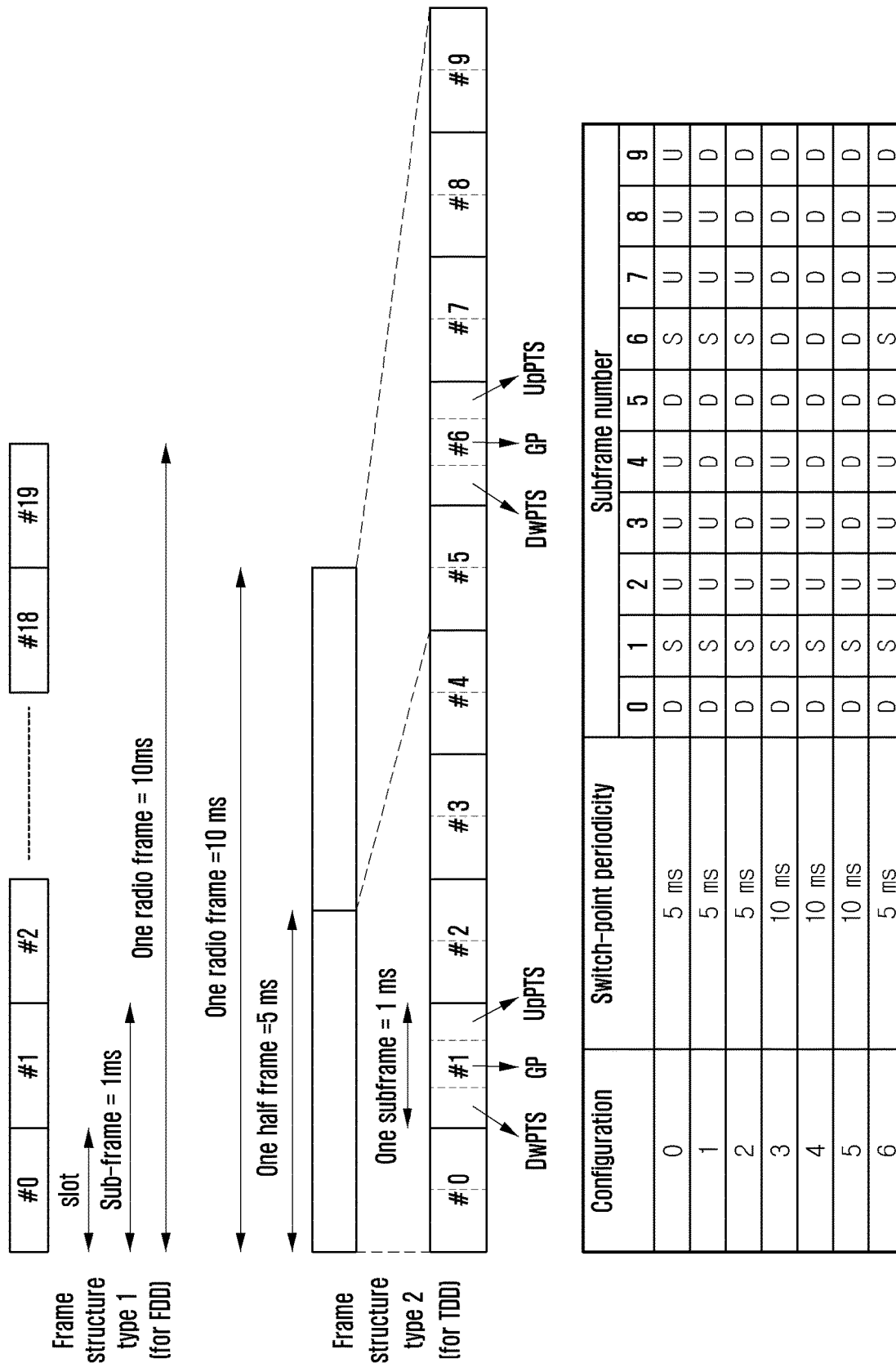
FIG. 3D is a diagram illustrating radio frame structures for LTE according to an embodiment of the present disclosure.

FIG. 3D is a diagram illustrating radio frame structures for LTE according to an embodiment of the present disclosure. FIG. 3D depicts Frame Structure Type 1 for a FDD system and Frame Structure Type 2 for a TDD system.

Referring to FIG. 3D, Frame Structure Types 1 and 2 has the same length of 10 ms, and one radio frame consists of 10 subframes (#0, #1, #2, . . . , #9) of 1 ms duration each. In Frame Structure Type 1 for FDD, all subframes are designated for downlink or uplink because the downlink and uplink are separated in frequency. In Frame Structure Type 2 for TDD, subframes #0, #2, #3, #4, #5, #7, #8, and #9 may be designated as downlink subframe (marked by D in the table depicted at the bottom of FIG. 3D) or uplink subframe (marked by U in the table depicted at the bottom of FIG. 3D) according to the TDD DL-UL configuration listed in the table depicted at the bottom of FIG. 3D. For example, TDD DL-UL configuration 0 includes downlink subframes of subframes #0 and #5 and uplink subframes of subframes #2, #3, #4, #7, #8, and #9; and TDD DL-UL configuration 1 includes downlink subframes of subframes #0, #4, #5, and #9 and uplink subframes of subframes #2, #3, #7, and #8.

In FIG. 3D, subframes #1 and #6 are special subframes (marked by S in the table depicted at the bottom of FIG. 3D) appearing at the transition from downlink to uplink transmission. A special subframe comprises three regions represented by DwPTS, GP, and UpPTS; the DwPTS is allowed for downlink data transmission, and the UpPTS is not allowed for uplink data transmission but SRS transmission. The GP helps avoid interference between the downlink and uplink transmission.

Figure 3E:
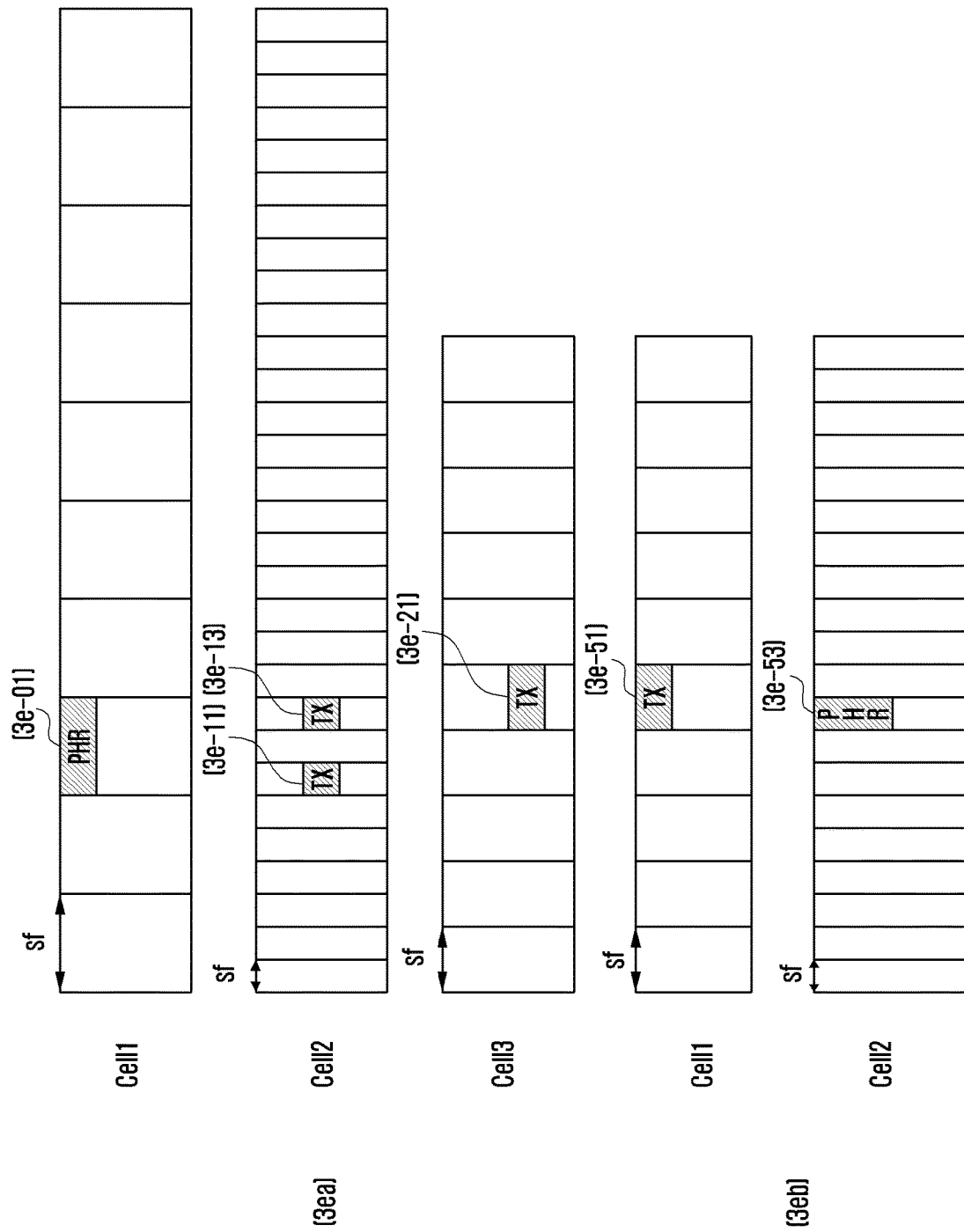
FIG. 3E is a diagram illustrating frame formats for explaining power headroom report (PHR) transmission timing according to an embodiment of the present disclosure.

FIG. 3E is a diagram illustrating frame formats for explaining PHR transmission timing according to an embodiment of the present disclosure.

Referring to FIG. 3E, is depicted under that assumption of aggregation of frequencies of the PCell and SCell operating with different subframe lengths. FIG. 3E consists of two parts: upper part 3ea where the subframe length of a cell designated for PHR transmission is longer than the subframe length of the other cell and a lower part 3eb where the subframe length of the cell designated for PHR transmission is shorter than the subframe length of the other cell. FIG. 3E is also depicted under the assumption of a scenario where the UE is already connected to an eNB (i.e., in the RRC_CO-NNECTED state capable of transmitting/receiving data) and has activated SCells after being configured by the eNB to operate with subframe lengths different from that of the PCell.

First, a description is made of the case where the subframe length of a cell through which the PHR is transmitted is longer than the subframe lengths of other cells as shown in part 3ea of FIG. 3E. Although it has been described above that the PH is reported with a real value or a virtual value depending whether there is real uplink transmission, cell 2 has real transmission periods 3e-11 and 3e-13 and non-transmission period therebetween during the PHR transmission period 3e-01 of cell 1 as shown in part 3ea of FIG. 3E. According to an embodiment of the present disclosure, the UE may generate the PHR based on a predetermined subframe of the cell selected according to a predetermined rule among the cells configured therefor (i.e., cell 2 as the SCell with the shortest subframe length among cell 1(3e-01), cell 2(3e-11, 3e-13), and cell 3(3e-21) in part 3ea of FIG. 3E). The predetermined subframe may be the first subframe 3e-11 or the last subframe 3e-13 among the subframes of cell 2 that correspond in length to the PHR subframe 3e-01 of cell 1. According to an embodiment of the present disclosure, it may also be possible to consider reporting PHs with a virtual format always in the case of aggregating frequencies with different subframe lengths as shown in the drawing.

Next, a description is made of the case where the subframe length of a cell through which the PHR is transmitted is shorter than the subframe length of another cell as shown in part 3eb of FIG. 3E. In this case, it is obvious whether there is a real uplink transmission as denoted by reference number 3e-51 or not in a cell during a PHR transmission period 3e-53 in another cell so as to use a real or virtual value depending on whether there is a real transmission. According to an embodiment of the present disclosure, it may be possible that the UE transmits the PHR through a cell with the shortest subframe length among the cells currently configured cells to the UE (i.e., cell 2 in part 3ea and cell 2 in part 3eb).

Figure 3F:
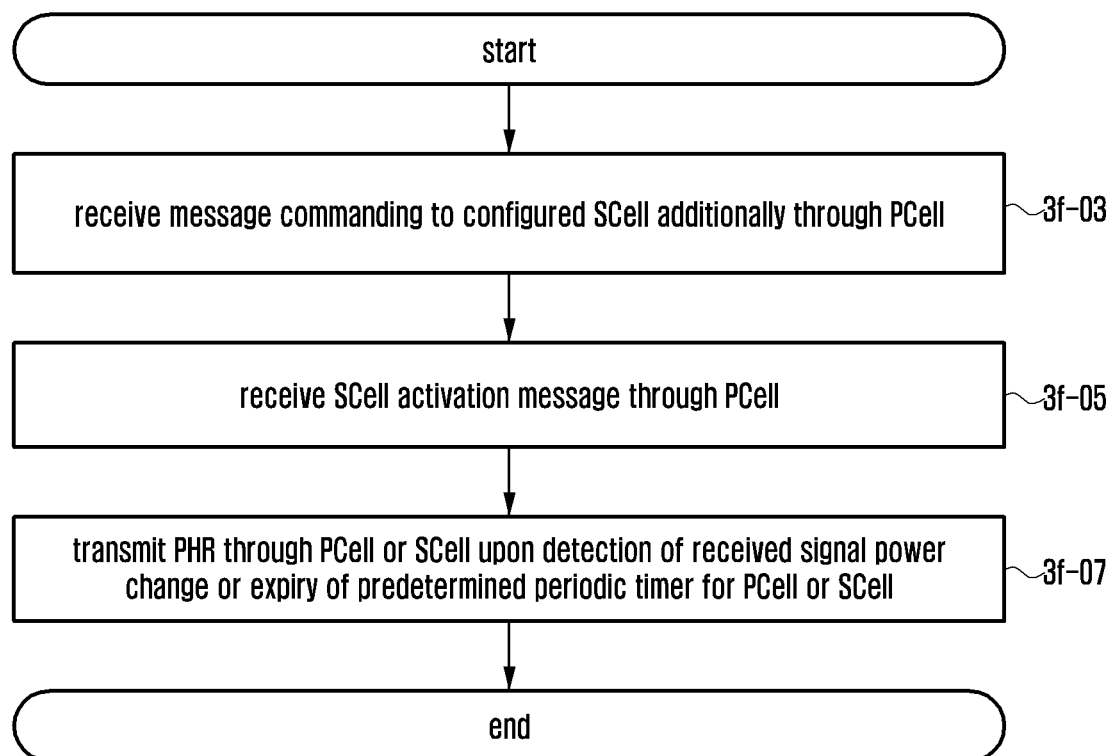
FIG. 3F is a flowchart illustrating an operation of a UE according to an embodiment of the present disclosure.

FIG. 3F is a flowchart illustrating an operation of a UE according to an embodiment of the present disclosure.

Referring to FIG. 3F, it is assumed that the UE is already connected to an eNB and thus in a state capable of transmitting/receiving data.

FIG. 3F is depicted under the assumption of a CA between frequencies of the PCell and SCell operating with different subframe lengths. FIG. 3F is also depicted under the assumption that the UE is already connected to an eNB (i.e., in the RRC_CONNECTED state capable of transmitting/receiving data) and configured by the eNB to add an SCell with a different subframe length.

The UE receives a message instructing to configure a SCell additionally from an eNB through the PCell at operation 3f-03. As described above, it is assumed that the PCell and SCell have different subframe lengths, and the additional SCell configuration message is conveyed by an RRC layer message. The SCell configuration message may include at least the information on the center frequency of the SCell and related information. Afterward, the UE receives an SCell activation message through the PCell (or another activated SCell) at operation 3f-05. Then, then the UE transmits a PHR to the eNB, at operation 3f-07, through the PCell or SCell when the pathloss on the downlink carrier of the PCell or SCell is equal to or greater than a predetermined threshold value, a prohibit PHR timer expires, or a predetermined time period elapses after generating the PHR.

According to an embodiment of the present disclosure, the UE calculates and reports per-cell PHs based on a predetermined subframe of a cell operating with the shortest subframe length among the cells configured to the UE. That is, the UE reports a PH with a real value for a cell in which there is real transmission and a virtual value for a cell in which there is no real transmission during a predetermined subframe. The predetermined subframe may be the first or last one among the subframes of the cell that correspond in length to the PHR subframe of another cell.

According to an embodiment of the present disclosure, it may also be possible to consider reporting PHs with a virtual format always in the case of aggregating frequencies with different subframe lengths as shown in the drawing.

According to an embodiment of the present disclosure, it may also be possible to consider that the UE transmits a PHR through a cell operating with the shortest subframe lengths among the cells currently configured to the cell.

Figure 3G:
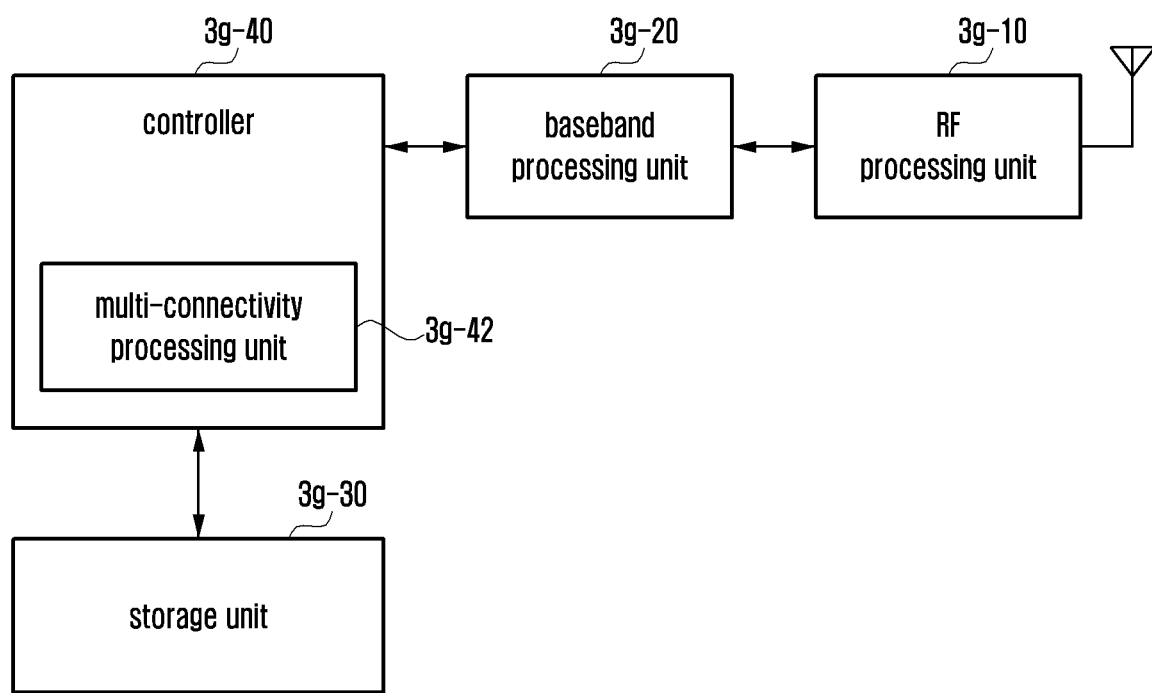
FIG. 3G is a block diagram illustrating a configuration of a UE in a wireless communication according to an embodiment of the present disclosure.

FIG. 3G is a block diagram illustrating a configuration of a UE in a wireless communication according to an embodiment of the present disclosure.

Referring to FIG. 3G, the UE includes a RF processing unit 3g-10, a baseband processing unit 3g-20, a storage unit 3g-30, and a controller 3g-40.

The RF processing unit 3g-10 takes charge of signal band conversion and amplification for transmitting signals over a radio channel. That is, the RF processing unit 3g-10 up-converts a baseband signal output from the baseband processing unit 3g-20 to an RF band signal for transmission through antennas and down-converts an RF band signal received through the antenna to a baseband signal. For example, the RF processing unit 3g-10 may include a transmission filter, a reception filter, an amplifier, a mixer, an oscillator, a DAC, and an ADC. Although one antenna is depicted in FIG. 3G, the terminal may include a plurality of antennas. The RF processing unit 3g-10 may include a plurality of RF chains. The RF processing unit 3g-10 may perform beamforming. For beamforming, the RF processing unit 3g-10 may adjust the phases and sizes of the signal transmitted/received through the antennas or antenna elements.

The baseband processing unit 3g-20 takes charge of conversion between baseband signals and bit strings according to a physical layer protocol of the system. For example, the baseband processing unit 3g-20 performs encoding and modulation on the transmit bit strings to generate complex symbols in data transmission mode. The baseband processing unit 3g-20 also performs demodulation and decoding on the baseband signal from the RF processing unit 3g-10 to recover the received bit strings in data reception mode. For the case of an OFDM system, the baseband processing unit 3g-20 performs encoding and modulation on the transmit bit string to generate complex symbols, maps the complex symbols to subcarriers, performs IFFT on the subcarriers, and inserts a CP to generate OFDM symbols in the data transmit mode. The baseband processing unit 3g-20 splits the baseband signal from the RF processing unit 3g-10 into OFDM symbols, recovers the signals mapped to the subcarriers through FFT, and performs demodulation and decoding to recover the bit strings in the data reception mode.

The baseband processing unit 3g-20 and the RF processing unit 3g-10 take charge of transmitting and receiving signals as described above. Accordingly, the baseband processing unit 3g-20 and the RF processing unit 3g-10 may be referred to as a transmission unit, a reception unit, a transceiver, or a communication unit. At least one of the baseband processing unit 3g-20 and the RF processing unit 3g-10 may include a plurality of communication modules for supporting different radio access technologies. At least one of the baseband processing unit 3g-20 and the RF processing unit 3g-10 may include a plurality of communication modules for processing different frequency bands signals. Examples of the radio access technologies include WLAN (e.g., IEEE 802.11) and cellular network (e.g., LTE). Examples of the different frequency bands may include SHF band (e.g., 2.5 GHz and 5 GHz) and mmWave bands (e.g., 60 GHz).

The storage unit 3g-30 stores basic programs for operation of the terminal, application programs, and data such as configuration information. In particular, the storage unit 3g-30 may store the information related to the secondary access node with which the terminal performs radio communication using the secondary radio access technology. The storage unit 3g-30 provides the stored data in response to a request from the controller 3g-40.

The controller 3g-40 controls overall operations of the terminal. For example, the controller 3g-40 controls the baseband processing unit 3g-20 and the RF processing unit 3g-10 to transmit/receive signals. The controller 3g-40 also writes and reads data to and from the storage unit 3g-30. In order to accomplish this, the controller 3g-40 may include at least one processor. For example, the controller 3g-40 may include a CP for controlling communication and an AP for providing higher layer processing, e.g., application layer protocol processing. According to an embodiment of the present disclosure, the controller 3g-40 includes a multi-connectivity processing unit 3g-42. For example, the controller 3g-40 may control the UE to perform the UE operations and procedures described with reference to FIG. 3E.

According to an embodiment of the present disclosure, the controller 3g-40 may control the UE to receive a command for aggregating and activating cells with different subframe lengths from an eNB, transmit a PHR through a predetermined cell according to an embodiment of the present disclosure, and calculate PHs based on a predetermined subframe of a cell selected according to a predetermined rule or use a virtual value always.

Embodiment 4

Figure 4A:
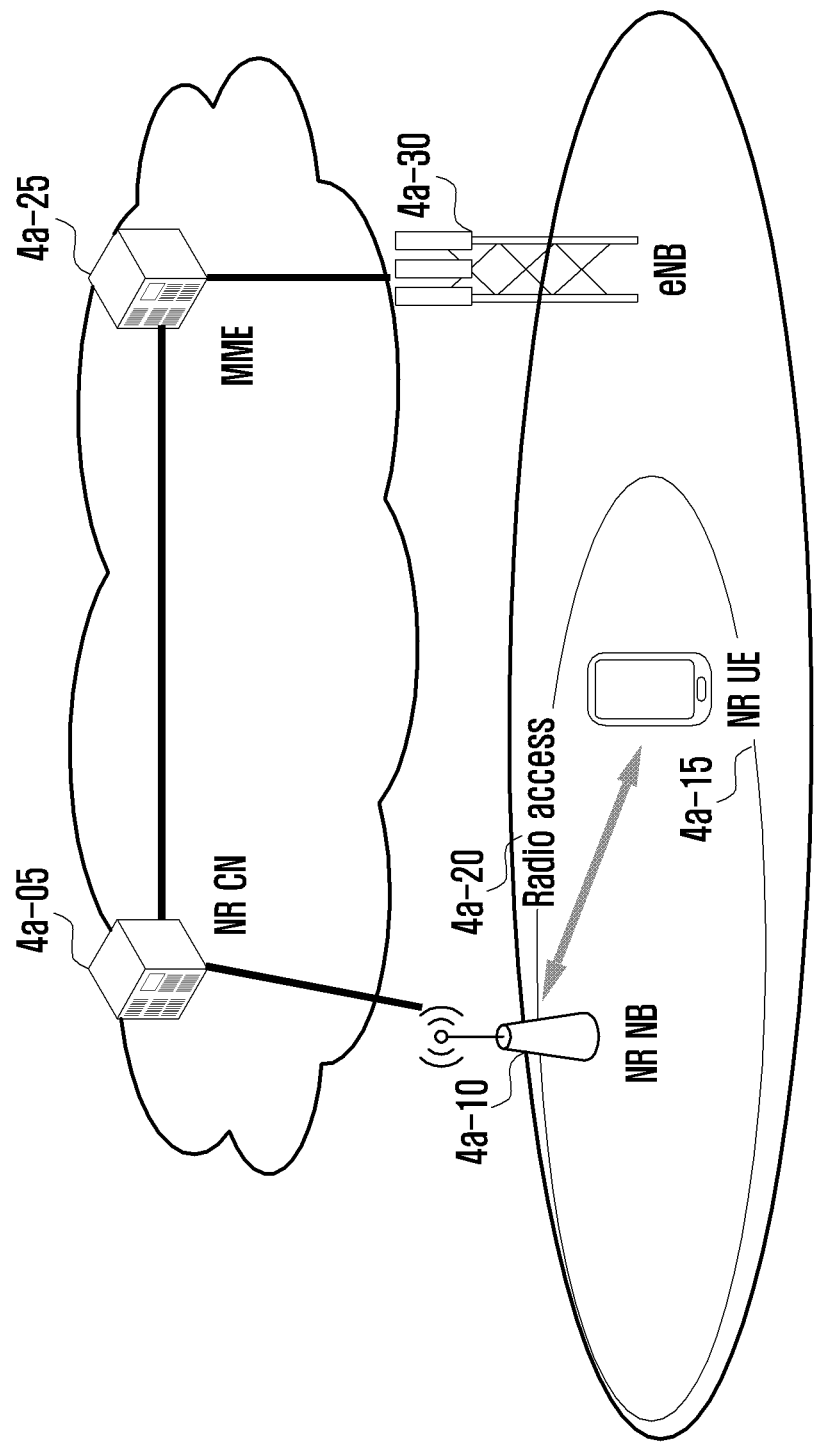
FIG. 4A is a diagram illustrating next generation mobile communication system architecture according to an embodiment of the present disclosure.

FIG. 4A is a diagram illustrating next generation mobile communication system architecture according to an embodiment of the present disclosure.

Referring to FIG. 4A, the next generation mobile communication system includes a radio access network with a next generation base station (New Radio Node B (NR NB)) 4a-10 and a new radio core network (NR CN) 4a-05. A new radio user equipment (NR UE) 4a-15 connects to an external network via the NR NB 4a-10 and the NR CN 4a-05.

In FIG. 4A, the NR NB 4a-10 corresponds to an evolved Node B (eNB) of the legacy LTE. The NR NB 4a-10 to which the NR UE 4a-15 connects through a radio channel 4a-20 is capable of providing superior services in comparison with the legacy eNB. In the next generation mobile communication system where all user traffic is served through shared channels, it is necessary to schedule the NR UEs based on scheduling information such as buffer status, power headroom status, and channel status collected by the NR UEs, and the NR NB 4a-10 takes charge of this function. Typically, one NR NB operates multiple cells. In order to achieve a data rate higher than the peak data rate of legacy LTE systems, the next generation mobile communication system may adopt a beamforming technique along with orthogonal frequency division multiple access (OFDMA) as a radio access technology. The next generation mobile communication system may also adopt an adaptive modulation and coding (AMC) to determine the modulation scheme and channel coding rate in adaptation to the channel condition of the NR UE. The NR CN 4a-05 takes charge of mobility support, bearer setup, and QoS configuration. The NR CN 4a-05 may take charge of a NR UE mobility management function, and a plurality of NR NBs may connect to the NR CN 4a-05. The next generation mobile communication system may also interoperate with a legacy LTE system and, in this case, the NR CN 4a-05 connects to an MME 4a-25 through a network interface. The MME 4a-25 communicates with at least one eNB 4a-30 as a legacy base station.

Figure 4B:
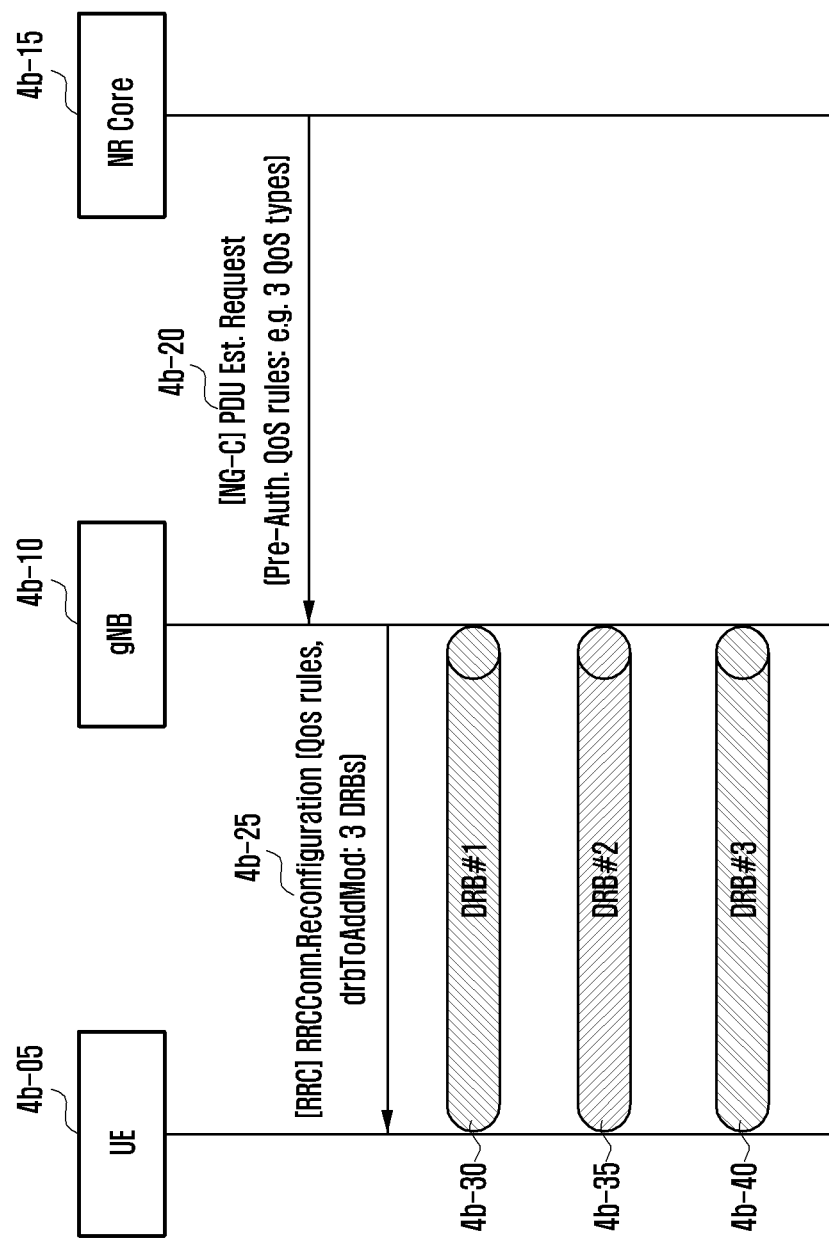
FIG. 4B is a signal flow diagram illustrating a flow-based data radio bearer (DRB) configuration scenario in a next generation mobile communication system according to an embodiment of the present disclosure.

FIG. 4B is a signal flow diagram illustrating a flow-based data radio bearer (DRB) configuration scenario in a next generation mobile communication system according to an embodiment of the present disclosure.

Referring to FIG. 4B, the flow-based DRB setup is for setting up multiple DRBs corresponding to multiple QoSs. The flow-based DRB setup is advantageous in terms of reducing unnecessary signaling overhead. An NR Core 4b-15 transmits per-QoS type configuration information (QoS profiles) to a gNB 4b-10 at operation 4b-20. The gNB 4b-10 configures a plurality of DRBs corresponding in number to the QoS types simultaneously as denoted by reference numbers 4b-30, 4b-35, and 4b-40. The gNB 4b-15 transmits DRB configuration and NAS information to a UE 4b-05 for DRB setup by means of an RRC Connection Reconfiguration message at operation 4b-25. Since the multiple DRBs are configured simultaneously, there may be no real data transmission on any of the DRBs. In the legacy LTE, the DRB setup is triggered only when there is data to transmit/receive.

Figure 4C:
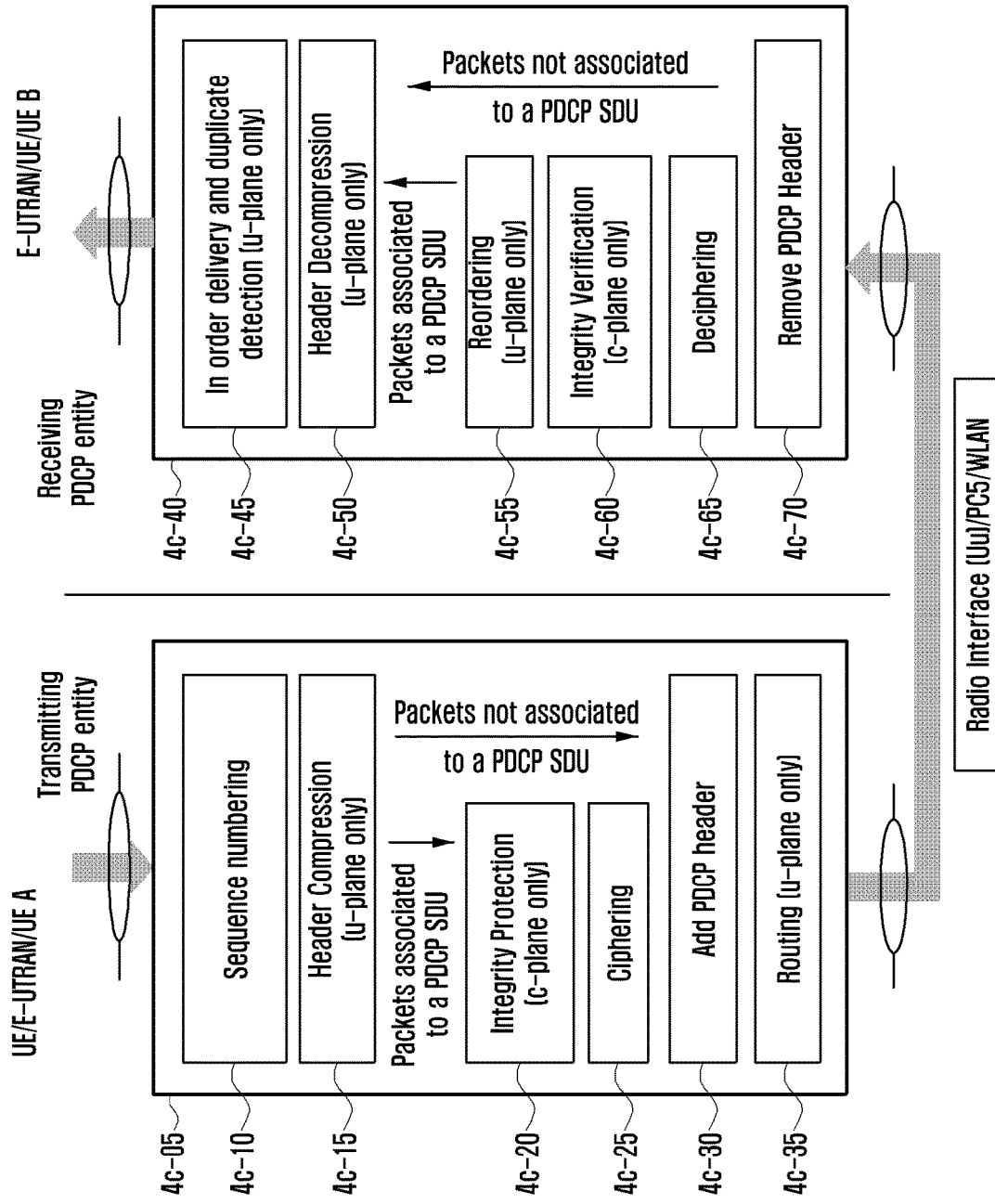
FIG. 4C is a diagram illustrating a configuration of a packet data convergence protocol (PDCP) layer of a legacy LTE system according to an embodiment of the present disclosure.

FIG. 4C is a diagram illustrating a configuration of a PDCP layer of a legacy LTE system according to an embodiment of the present disclosure.

Referring to 4C, the PDCP layer denoted by reference numbers 4c-05 and 4c-40 is responsible for PDCP SDU numbering 4c-10, IP header compression/decompression 4c-15/4c-50, packet security-related function 4c-20, 4c-25, 4c-60, and 4c-65, packet header configuration and remove 4c-30/4c-70, and duplicate PDCP PDU discard and in-order packet delivery 4c-45. The main functions of the PDCP can be summarized as follows:

Header compression and decompression: ROHC only;
Transfer of user data;
In-sequence delivery of upper layer PDUs at PDCP reconfiguration procedure for RLC AM;
For split bearers in DC (only support for RLC AM): PDCP PDU routing for transmission and PDCP PDU reordering for reception (4c-35, 4c-55);
Duplicate detection of lower layer SDUs at PDCP reconfiguration procedure for RLC AM;
Retransmission of PDCP SDUs at handover and, for split bearers in DC, of PDCP PDUs at PDCP data-recovery procedure, for RLC AM;
Ciphering and deciphering;
Timer-based SDU discard in uplink FIG. 4D is a signal flow diagram illustrating a procedure for PDCP re-establishment and PDCP status report in the legacy LTE system according to an embodiment of the present disclosure.

Referring to FIG. 4D, a source cell 4d-10 transmits a handover (HO) command to a UE 4d-05 at operation 4d-20. Upon receipt of the HO command from the source cell 4d-10, the UE 4d-05 performs PDCP re-establishment at operation 4d-25. During the PDCP re-establishment, the UE 4d-05 resets header compression configuration information,
applies a ciphering algorithm and security key provided by a higher layer, and
generates a PDCP status report to a target cell.

The source cell 4d-10 may reconfigure the header compression/decompression operation to be applied at the target cell 4d-15 and generate PDCP configuration information with the statusReportRequired information element (IE) instructing to configure and transmit the PDCP status report.

Figure 8:
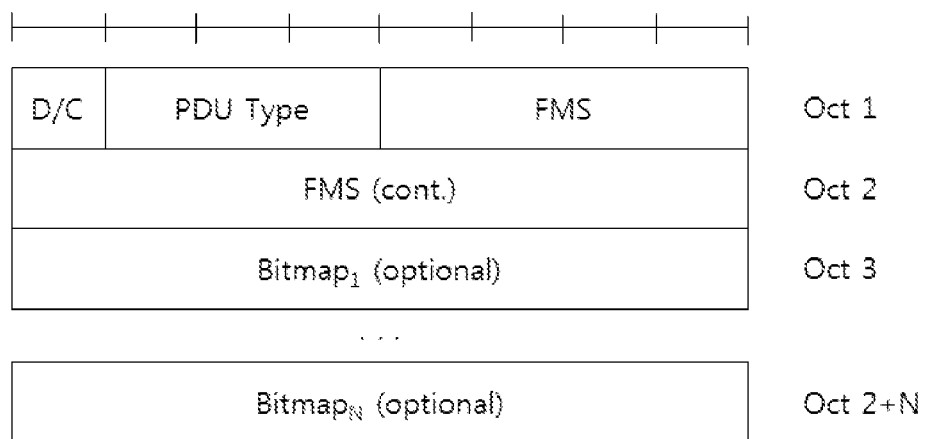
FIG. 8 is a block diagram illustrating a structure of a packet data convergence control (PDCP) status report according to an embodiment of the present disclosure.

The PDCP status report may be configured as shown in FIG. 8.

In FIG. 8, D/C: indicates whether the PDCP PDU is a control PDU or a data PDU.
PDU type: indicates whether the PDCP PDU conveys a PDCP status report, an interspersed ROHC feedback packet, or a LWA status report.
FMS: indicates a PDCP SN of the first missing PDCP SDP.
Bitmap: is a collection of bits set to 0 indicative of missing PDCP SDU and 1 indicative of successfully received PDCP SDU in an ascending order of PDCP SN after the PDCP SDU indicated by first missing PDCP sequence number (FMS).

Since the PDCP status report is used to report missing PDCP SDUs, it has meaningful at least only when there is any transmitted/received PDCP SDU. The UE attempts random access to the target cell 4d-15 at operation 4d-30 and then transmits the PDCP status report configured as above to the target cell 4d-15 at operation 4d-35.

FIG. 4E is a signal flow diagram illustrating a procedure for PDCP re-establishment and PDCP status report according to an embodiment of the present disclosure.

Referring to FIG. 4E, in the flow-based DRB configuration, although a DRB has been configured, there may be no data to transmit/receive. Accordingly, it may be inefficient to configure and transmit a PDCP status report right after the PDCP re-establishment according to a legacy method. The flow-based DRB setup method is characterized by configuring and transmitting a PDCP status report when there has been logical channel data transmission/reception before the PDCP re-establishment. A source cell 4e-10 transmits a flow-based DRB establishment message to establish a flow-based DRB to a UE 4e-05 at operation 4e-20. Then, the source cell 4e-10 transmits PDCP configuration information to the UE 4e-05 at operation 4e-25. The PDCP configuration information includes a statusReportRequired IE. If the statusReportRequired IE is configured, this indicates that the UE 4e-05 has to configure a PDCP status report during PDCP re-establishment. The UE 4e-05 transmits/receives data through the configured DRBs at operation 4e-30. The source cell 4e-10 transmits an HO command to the UE 4e-05 at operation 4e-35. If the HO command is received from the source cell 4e-10, the UE 4e-05 performs PDCP re-establishment at operation 4e-40. If there has been any logical channel data transmission/reception before the PDCP re-establishment, the UE 4e-05 generates a PDCP status report. The UE 4e-05 performs random access to a target cell 4e-15 at operation 4e-45. The UE 4e-05 transmits the PDCP status report to the target cell 4e-15 at operation 4e-50. If the source cell 4e-10 has instructed to perform header compression/decompression operation using an RRC message, the target cell 4e-15 performs PDCP re-establishment; if there has been any logical channel data transmission/reception, the target cell 4e-15 resets the header compression/decompression context. Otherwise, if it is configured to perform the header compression/decompression operation, if PDCP re-establishment has been performed, and if there has been no logical channel data transmission/reception before the PDCP re-establishment, the header compression/decompression context is not reset.

Figure 4F:
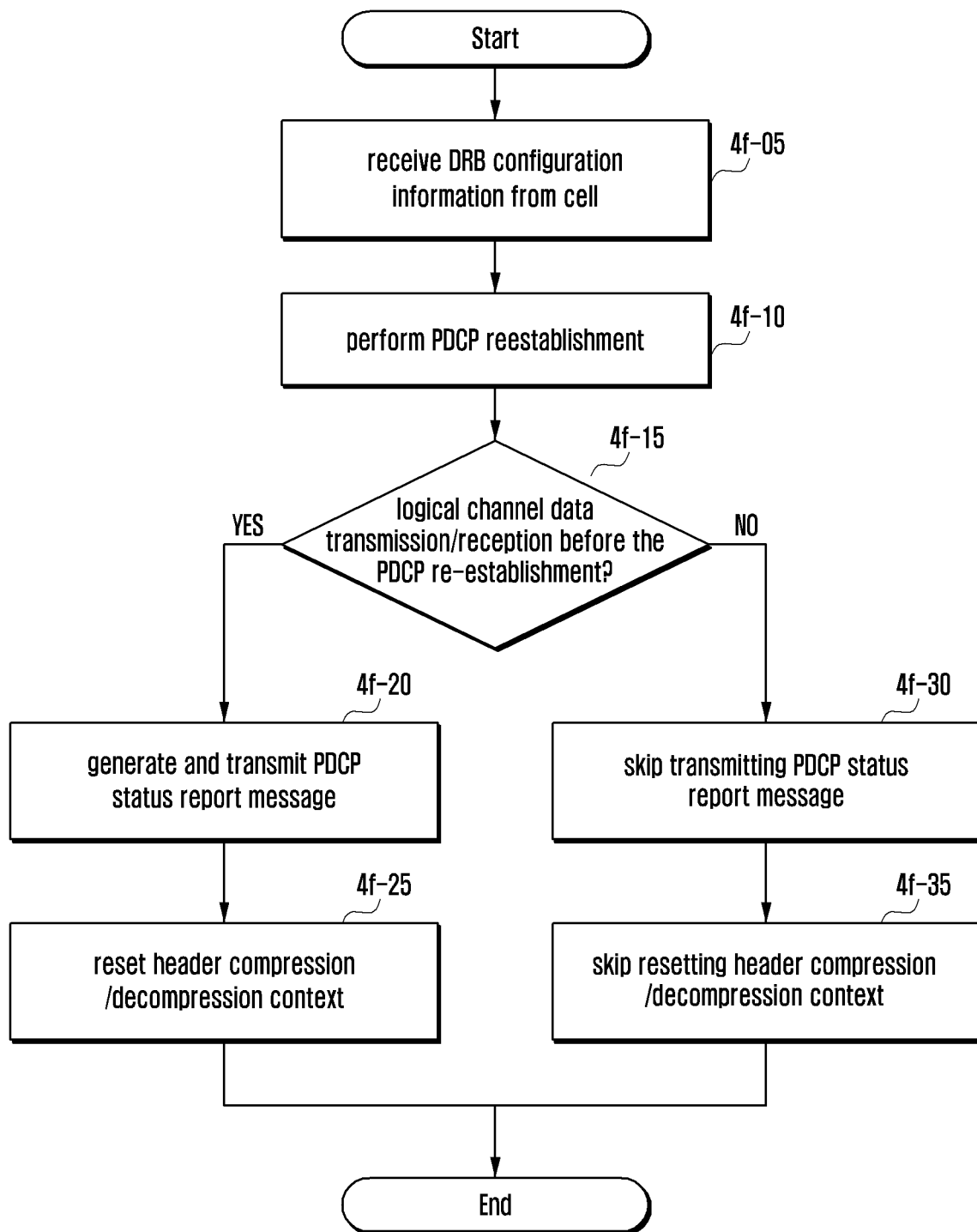
FIG. 4F is a flowchart illustrating an operation of a UE for PDCP status report according to an embodiment of the present disclosure.

FIG. 4F is a flowchart illustrating an operation of a UE for PDCP status report according to an embodiment of the present disclosure.

Referring to FIG. 4F, the UE receives DRB configuration information from a cell at operation 4f-05. The DRB configuration information includes first and second information. The first information is used to instruct to perform PDCP re-establishment and PDCP status report, and the second information is used to instruct to perform header compression/decompression. The UE performs PDCP re-establishment at operation 4f-10 upon receipt of a HO command. Then, the UE determines at operation 4f-15 whether there has been any logical channel data transmission/reception before the PDCP re-establishment. If it is determined that there has been any logical channel data transmission/reception before the PDCP re-establishment, the UE generates and transmits a PDCP status report message at operation 4*f*-20. Next, the UE resets the header compression/decompression context at operation 4*f*-25. If it is determined that there has been no logical channel data transmission/reception before the PDCP re-establishment, the UE skips generating and transmitting the PDCP status report message at operation 4*f*-30. The UE also skip resetting the header compression/decompression context at operation 4*f*-35.

Figure 4G:
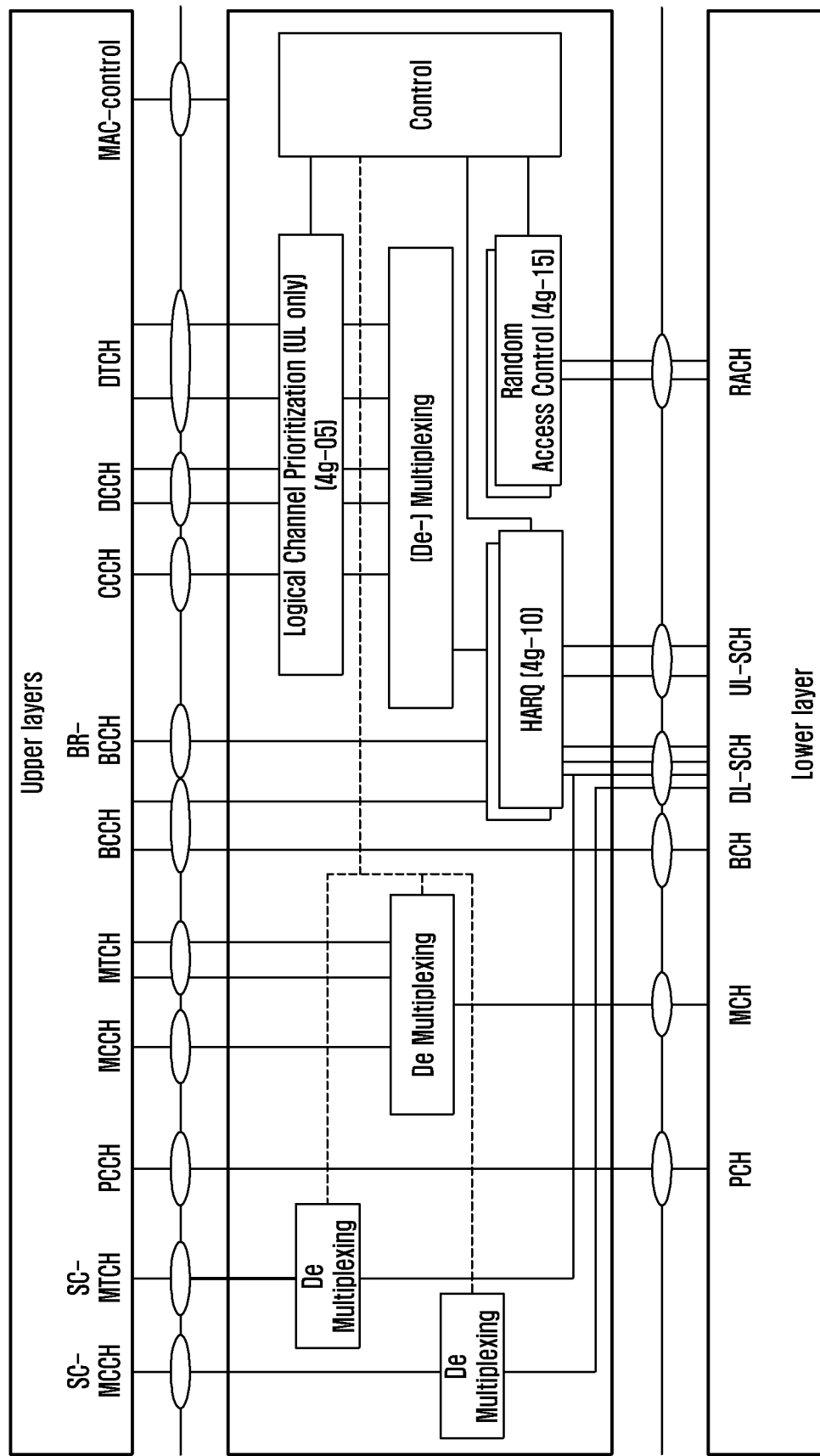
FIG. 4G is a diagram illustrating a configuration of a MAC layer in legacy LTE according to an embodiment of the present disclosure.

FIG. 4G is a diagram illustrating a configuration of a MAC layer in legacy LTE according to an embodiment of the present disclosure.

Referring to FIG. 4G, in the MAC layer of a UE, a MAC entity may be connected to multiple RLC entities to multiplex RLC PDUs into MAC PDUs and demultiplex MAC PDUs into RLC PDUs. The MAC layer is responsible for logical channel prioritization 4*g*-05, HARQ 4*g*-10, and random access 4*g*-15. The main functions of the MAC protocol can be summarized as follows.

Mapping between logical channels and transport channels;
Multiplexing/demultiplexing of MAC SDUs belonging to one or different logical channels into/from transport blocks (TB) delivered to/from the physical layer on transport channels;
Scheduling information reporting;
Error correction through HARQ;
Priority handling between logical channels of one UE;
Priority handling between UEs by means of dynamic scheduling;
MBMS service identification;
Transport format selection;
Padding.

Figure 4H:
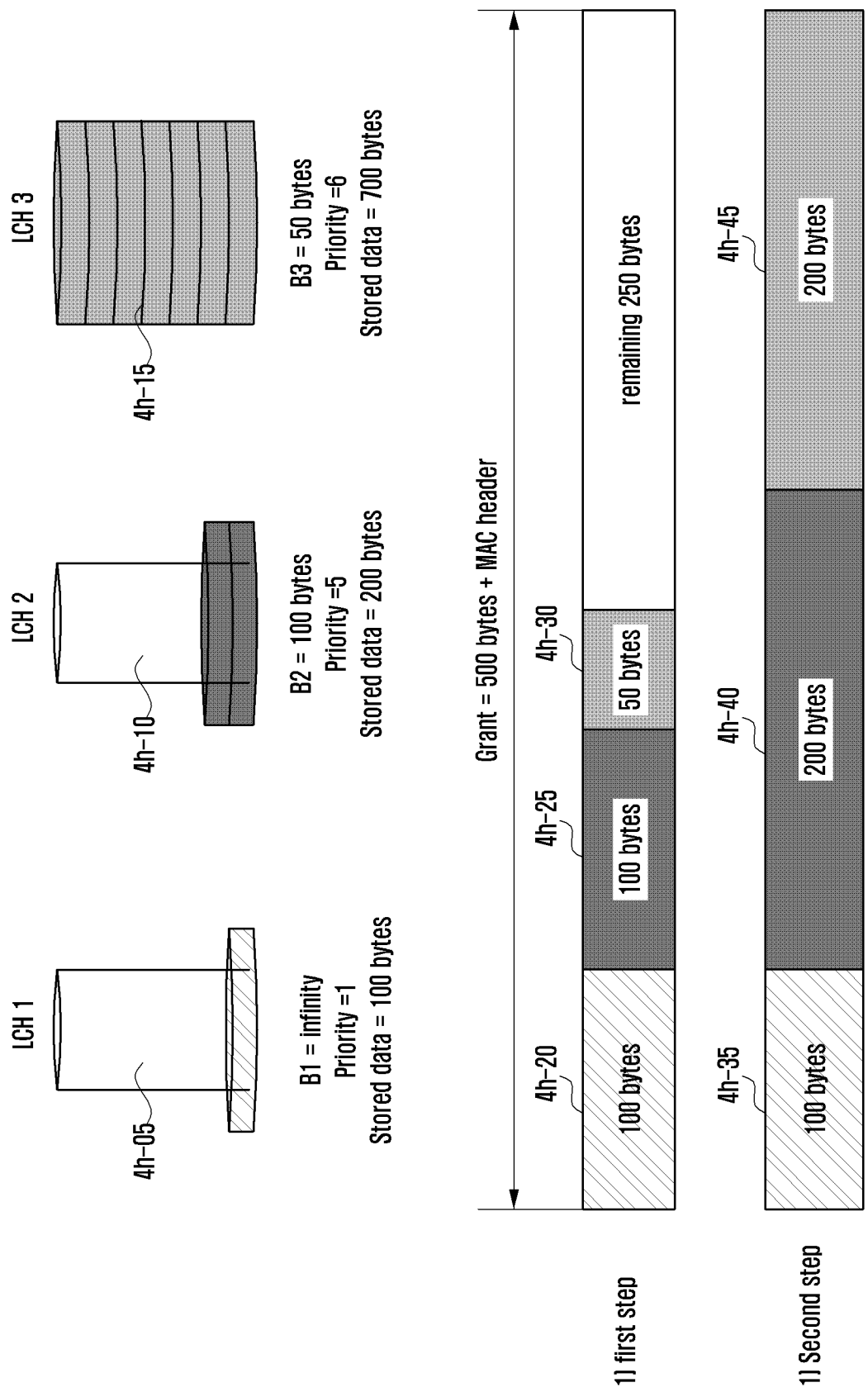
FIG. 4H is a diagram illustrating a MAC PDU configuration method in a legacy LTE system according to an embodiment of the present disclosure.

FIG. 4H is a diagram illustrating a MAC DPU configuration method in a legacy LTE system according to an embodiment of the present disclosure. In order to configure MAC PDUs, a logical channel prioritization technique is used. The logical channels are assigned a priority in such a way of preventing logical channel data with a low priority from being delayed excessively.

Referring to FIG. 4H, three logical channels (i.e., logical channel 1 4*h*-05, logical channel 2 4*h*-10, and logical channel 3 4*h*-15) are configured based on three configuration values per logical channel that are received from an eNB.

The first configuration value indicates the priority of the corresponding logical channel. The highest priority is 0.

The second configuration value indicates prioritized bit rate (PBR).

The third configuration value indicates bucket size duration (BSD).

Each logical channel is assigned a first variable with an initial value of 0. The first variable increases by the product of the second configuration value and a transmission time interval (TTI) every TTI. However, the first variable cannot exceed the product of the second and third configuration values. A first operation is performed every TTI. The first operation is to fill the data of each logical channel as much as the first variable per logical channel in a MAC PDU in a descending order of the priority indicated by the first configuration value. Since the first variable of the first logical channel is infinity, all data of 100 bytes stored in the buffer are filled in the MAC PDU as denote by reference number 4*h*-20. Since the first variable of the second logical channel is 100 bytes, the data of 100 bytes among the 200 bytes stored in the buffer is filled in the MAC PDU as denoted by reference number 4*h*-25. Since the first variable of the third logical channel is 50 bytes, the data of 50 bytes among the 700 bytes stored in the buffer is filled in the MAC PDU as denoted by reference number 4*h*-30. If there is any remaining space in the MAC PDU, the first operation is repeated. Since the MAC PDU has the remaining space of 250 bytes yet, the remaining 100-byte data of the second logical channel is filled in the MAC PDU as denote by reference number 4*h*-35 such that all 200-byte data of the second logical channel is filled in the MAC PDU as denoted by reference number 4*h*-40. Although the first variable of the third logical channel is 50 bytes, 150-byte data of the remaining data of the third channel is filled in the remaining space of the MAC PDU because there is no more data in the buffer of the first and second logical channels with priorities higher than that of the third channel, thereby all 200-byte data of the third logical channel is filled in the MAC PDU as denoted by reference number 4*h*-45.

In the flow-based DRB setup method, there may be no real logical channel data transmission/reception even though a DRB has been configured. The present disclosure is characterized by increasing the first variable by the product of the second configuration value and TTI every TTI since the generation or reception of logical channel data or an earliest one of the generation and reception of logical channel data.

Figure 4I:
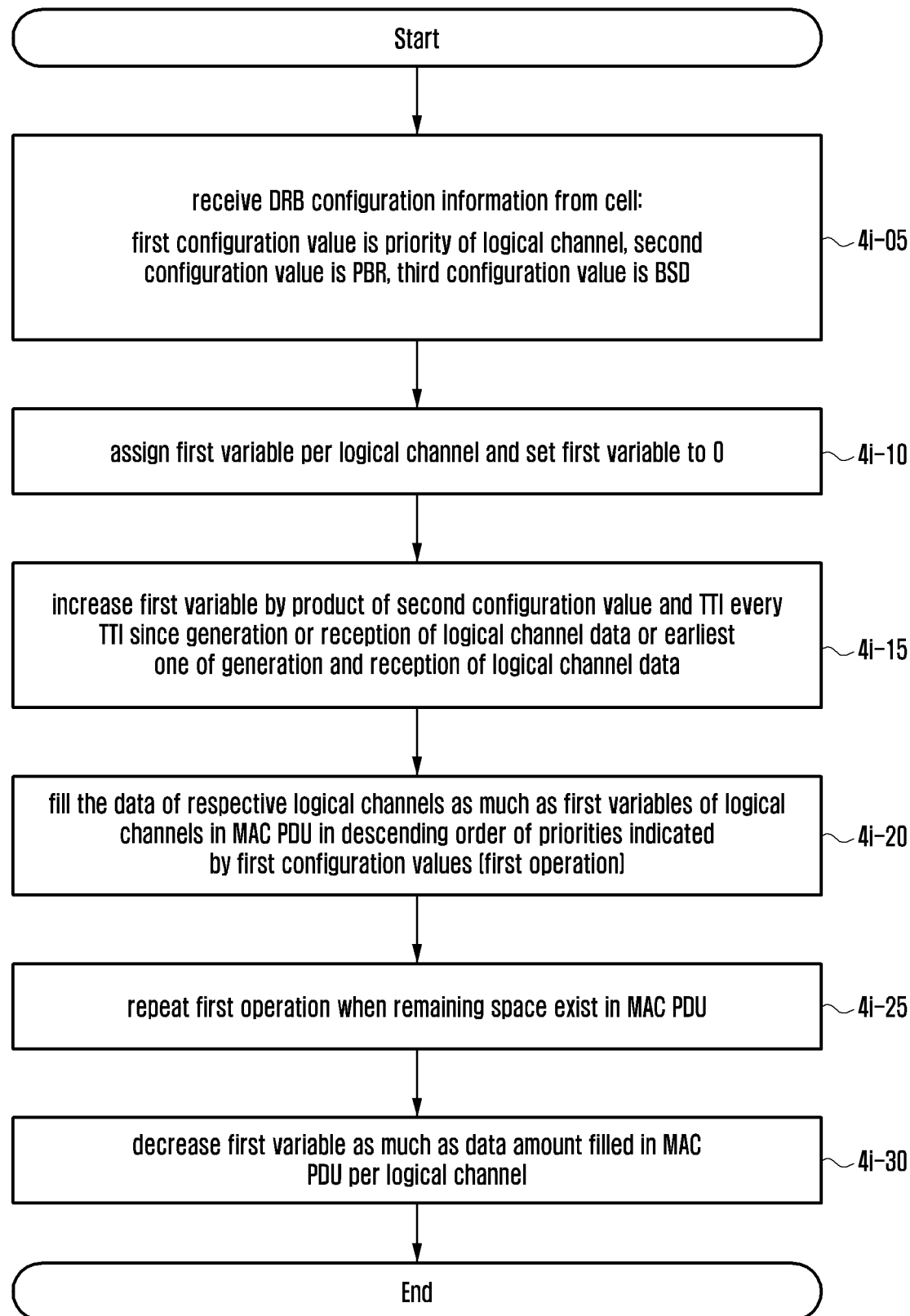
FIG. 4I is a flowchart illustrating an operation of a UE for configuring a MAC PDU according to an embodiment of the present disclosure.

FIG. 4I is a flowchart illustrating an operation of a UE for configuring a MAC PDU according to an embodiment of the present disclosure.

Referring to FIG. 4I, the UE receives DRB configuration information from a cell at operation 4*i*-05. The DRB configuration information includes a first configuration value, a second configuration value, and a third configuration value. The first configuration value indicates the priority of a logical channel (The highest priority is 0), the second configuration value indicates PBR, and the third configuration value indicates BSD. The first to third configuration values are configured by logical channel. The UE assigns the first variable per logical channel and set the first variable to an initial value of 0 at operation 4*i*-10. The UE increases the first variable by the product of the second configuration value and TTI every TTI at operation 4*i*-15 since the generation or reception of logical channel data or an earliest one of the generation and reception of logical channel data. The UE performs a first operation every TTI at operation 4*i*-20. The first operation is to fill the data of the respective logical channels as much as the first variables of the logical channels in a MAC PDU in a descending order of the priorities indicated by the first configuration values. If there is remaining space in the MAC PDU, the UE repeats the first operation at operation 4*i*-25. Then, the UE decreases the first variable as much as the data amount filled in the MAC PDU per logical channel at operation 4*i*-30.

Figure 4J:
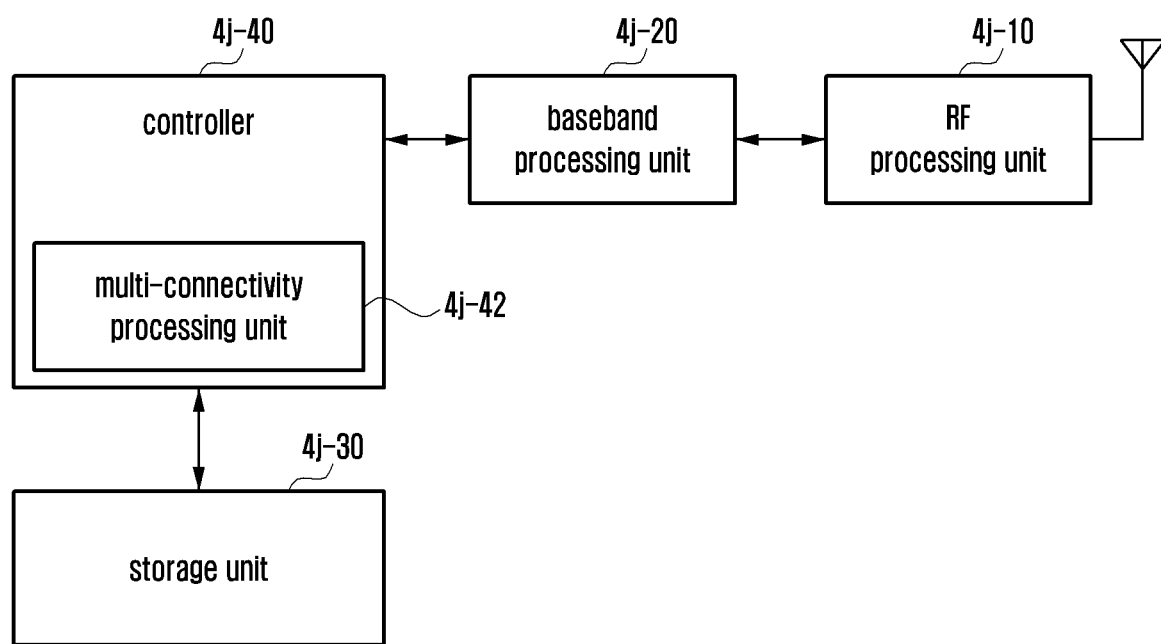
FIG. 4J is a block diagram illustrating a configuration of a UE in a wireless communication according to an embodiment of the present disclosure.

FIG. 4J is a block diagram illustrating a configuration of a UE in a wireless communication according to an embodiment of the present disclosure.

Referring to FIG. 4J, the UE includes a RF processing unit 4*j*-10, a baseband processing unit 4*j*-20, a storage unit 4*j*-30, and a controller 4*j*-40.

The RF processing unit 4*j*-10 takes charge of signal band conversion and amplification for transmitting signals over a radio channel. That is, the RF processing unit 4*j*-10 up-converts a baseband signal output from the baseband processing unit 4*j*-20 to an RF band signal for transmission through antennas and down-converts an RF band signal received through the antenna to a baseband signal. For example, the RF processing unit 4*j*-10 may include a transmission filter, a reception filter, an amplifier, a mixer, an oscillator, a DAC, and an ADC. Although one antenna is depicted in FIG. 4J, the terminal may include a plurality of antennas. The RF processing unit 4j-10 may include a plurality of RF chains. The RF processing unit 4j-10 may perform beamforming. For beamforming, the RF processing unit 4j-10 may adjust the phases and sizes of the signal transmitted/received through the antennas or antenna elements. The RF processing unit 4j-10 may perform a MIMO operation to receive a signal on multiple layers.

The baseband processing unit 4j-20 takes charge of conversion between baseband signals and bit strings according to a physical layer protocol of the system. For example, the baseband processing unit 4j-20 performs encoding and modulation on the transmit bit strings to generate complex symbols in data transmission mode. The baseband processing unit 4j-20 also performs demodulation and decoding on the baseband signal from the RF processing unit 4j-10 to recover the received bit strings in data reception mode. For the case of an OFDM system, the baseband processing unit 4j-20 performs encoding and modulation on the transmit bit string to generate complex symbols, maps the complex symbols to subcarriers, performs IFFT on the subcarriers, and inserts a CP to generate OFDM symbols in the data transmit mode. The baseband processing unit 4j-20 splits the baseband signal from the RF processing unit 4j-10 into OFDM symbols, recovers the signals mapped to the subcarriers through FFT, and performs demodulation and decoding to recover the bit strings in the data reception mode.

The baseband processing unit 4j-20 and the RF processing unit 4j-10 take charge of transmitting and receiving signals as described above. Accordingly, the baseband processing unit 4j-20 and the RF processing unit 4j-10 may be referred to as a transmission unit, a reception unit, a transceiver, or a communication unit. At least one of the baseband processing unit 4j-20 and the RF processing unit 4j-10 may include a plurality of communication modules for supporting different radio access technologies. At least one of the baseband processing unit 4j-20 and the RF processing unit 4j-10 may include a plurality of communication modules for processing different frequency bands signals. Examples of the radio access technologies include WLAN (e.g., IEEE 802.11) and cellular network (e.g., LTE). Examples of the different frequency bands may include SHF band (e.g., 2.5 GHz and 5 GHz) and mmWave bands (e.g., 60 GHz).

The storage unit 4j-30 stores basic programs for operation of the terminal, application programs, and data such as configuration information. In particular, the storage unit 4j-30 may store the information related to the secondary access node with which the terminal performs radio communication using the secondary radio access technology. The storage unit 4j-30 provides the stored data in response to a request from the controller 4j-40.

The controller 4j-40 controls overall operations of the terminal. For example, the controller 4j-40 controls the baseband processing unit 4j-20 and the RF processing unit 4j-10 to transmit/receive signals. The controller 4j-40 also writes and reads data to and from the storage unit 4j-30. In order to accomplish this, the controller 4j-40 may include at least one processor. For example, the controller 4j-40 may include a CP for controlling communication and an AP for providing higher layer processing, e.g., application layer protocol processing. According to an embodiment of the present disclosure, the controller 4j-40 includes a multi-connectivity processing unit 4j-42.

Figure 4K:
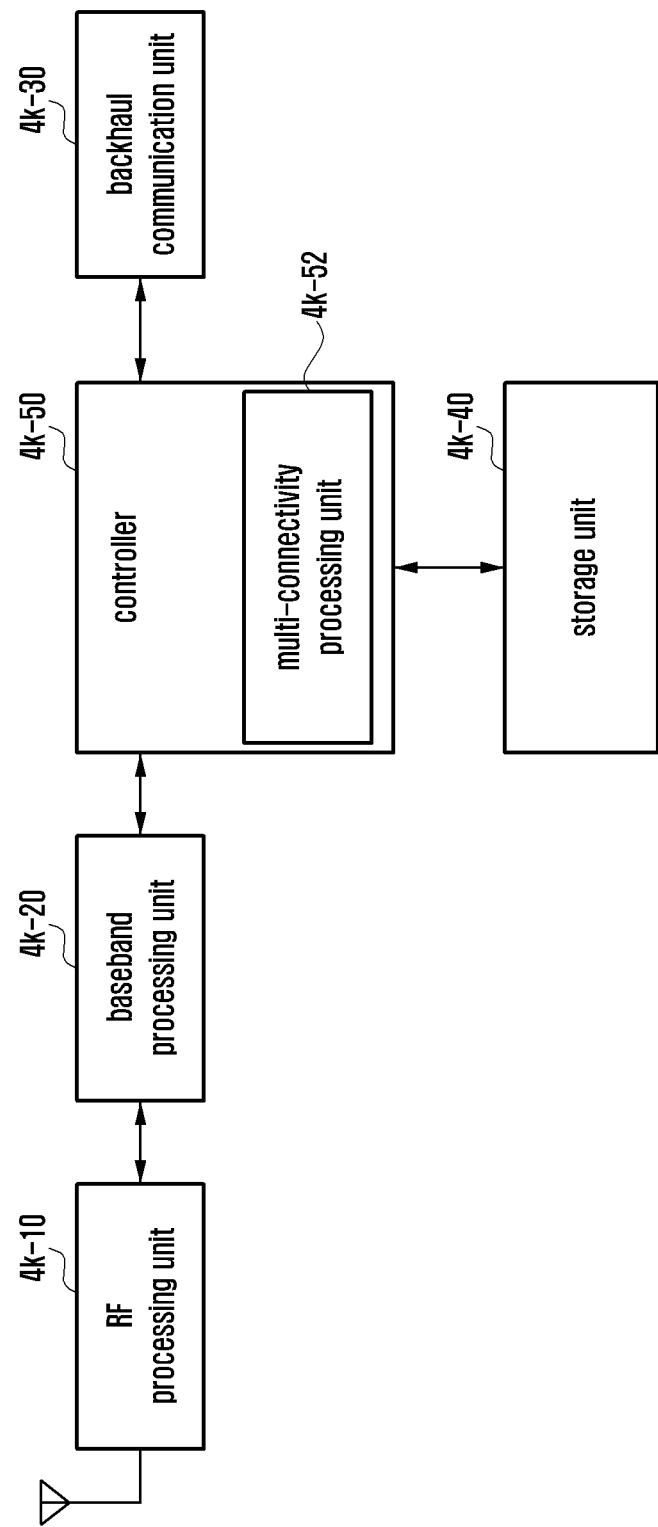
FIG. 4K is a block diagram illustrating a configuration of a base station in a wireless communication system according to an embodiment of the present disclosure.

FIG. 4K is a block diagram illustrating a configuration of an NR NB in a wireless communication system according to an embodiment of the present disclosure.

Referring to FIG. 4K, the NR NB includes an RF processing unit 4k-10, a baseband processing unit 4k-20, a backhaul communication unit 4k-30, a storage unit 4k-40, and a controller 4k-50.

The RF processing unit 4k-10 takes charge of signal band conversion and amplification for transmitting signals over a radio channel. That is, the RF processing unit 4k-10 up-converts a baseband signal output from the baseband processing unit 4k-20 to an RF band signal for transmission through antennas and down-converts an RF band signal received through the antennas to a baseband signal. For example, the RF processing unit 4k-10 may include a transmission filter, a reception filter, an amplifier, a mixer, an oscillator, a DAC, and an ADC. Although one antenna is depicted in FIG. 4K, the NR NB may include a plurality of antennas. The RF processing unit 4k-10 may include a plurality of RF chains. The RF processing unit 4k-10 may perform beamforming. For beamforming, the RF processing unit 4k-10 may adjust the phases and sizes of the signal transmitted/received through the antennas or antenna elements. The RF processing unit 4k-10 may perform a downlink MIMO operation to transmit a signal on multiple layers.

The baseband processing unit 4k-20 takes charge of converting between baseband signals and bit strings according to a physical layer protocol of the system. For example, the baseband processing unit 4k-20 performs encoding and modulation on the transmit bit strings to generate complex symbols in data transmission mode. The baseband processing unit 4k-20 also performs demodulation and decoding on the baseband signal from the RF processing unit 4k-10 to recover the received bit strings in data reception mode. For the case of an OFDM system, the baseband processing unit 4k-20 performs encoding and modulation on the transmit bit string to generate complex symbols, maps the complex symbols to subcarriers, performs IFFT on the subcarriers, and inserts a CP to generate OFDM symbols in the data transmit mode. The baseband processing unit 4k-20 splits the baseband signal from the RF processing unit 4k-10 into OFDM symbols, recovers the signals mapped to the subcarriers through FFT, and performs demodulation and decoding to recover the bit strings in the data reception mode. The baseband processing unit 4k-20 and the RF processing unit 4k-10 take charge of transmitting and receiving signals as described above. Accordingly, the baseband processing unit 4k-20 and the RF processing unit 4k-10 may be referred to as a transmission unit, a reception unit, a transceiver, or a communication unit.

The backhaul communication unit 4k-30 provides an interface for communication with other network nodes. That is, the backhaul communication unit 4k-30 converts the bit string to be transmitted to the access node and CN to a physical signal and the physical signal received from another node to a bit string.

The storage unit 4k-40 stores basic programs for operation of the NR NB, application programs, and data such as configuration information. In particular, the storage unit 4k-40 may store the information on the bearers allocated to the connected terminal and measurement result reported by the terminal. The storage unit 4k-40 may also store the information as criteria for determining whether to enable or disable multi-connectivity for the terminal. The storage unit 4k-40 provides the stored data in response to a request from the controller 4k-50.

The controller 4k-50 may control overall operations of the NR NB. For example, the controller 4k-50 controls the baseband processing unit 4k-20, the RF processing unit 4k-10, and the backhaul communication unit 4k-30 for transmitting/receiving signals. The controller 4k-50 also writes and reads data to and from the storage unit 4k-40. In order to accomplish this, the controller 4k-50 may include at least one processor. According to an embodiment of the present disclosure, the controller 4k-50 includes a multi-connectivity processing unit 4k-52.

The UE operation may include receiving DRB configuration information from a cell, the DRB configuration information including first and second information and first to third configuration values.

The first information is used to instruct to perform PDCP re-establishment and PDCP status report, and the second information is used to instruct to perform header compression/decompression.

The first configuration value indicates the priority of a logical channel (The highest priority is 0), the second configuration value indicates PBR, and the third configuration value indicates BSD. The first to third configuration values are configured by logical channel.

If the first information is configured, if the PDCP re-establishment is performed, and if there has been any logical channel data transmission/reception before the PDCP re-establishment, the UE may generate and transmit a PDCP status report message; If the first information is configured, if the PDCP re-establishment is performed, and if there has been no logical channel data transmission/reception before the PDCP re-establishment, the UE may not transmit the PDCP status report message.

The PDCP status report message may include the information on the PDCP SN of the first missing PDCP SDU and a bitmap indicate missing PDCP SUDs since the PDCP SN; if the second information is configured, the PDCP re-establishment is performed, and there has been any logical channel data transmission/reception, the header compression/decompression context may be reset.

If the second information is configured, if the PDCP re-establishment is performed, and if there has been no logical channel data transmission/reception before the PDCP re-establishment, the header compression/decompression context may not be reset, and the first variable is assigned per logical channel and set to an initial value of 0.

The first variable increases by the product of the second configuration value and the TTI every TTI since the generation or reception of logical channel data or an earliest one of the generation and reception of logical channel data and cannot exceed the product of the second and third configuration values.

The UE may perform the first operation to fill data of respective logical channels as much as the respective first variables of the logical channels in a descending order of the priorities indicated by the first configuration values.

If there is remaining space in the MAC PDU, the UE may repeat the first operation and decrease the first variable as much as the data amount filled in the MAC PDU per logical channel.

Embodiment 5

Figure 5A:
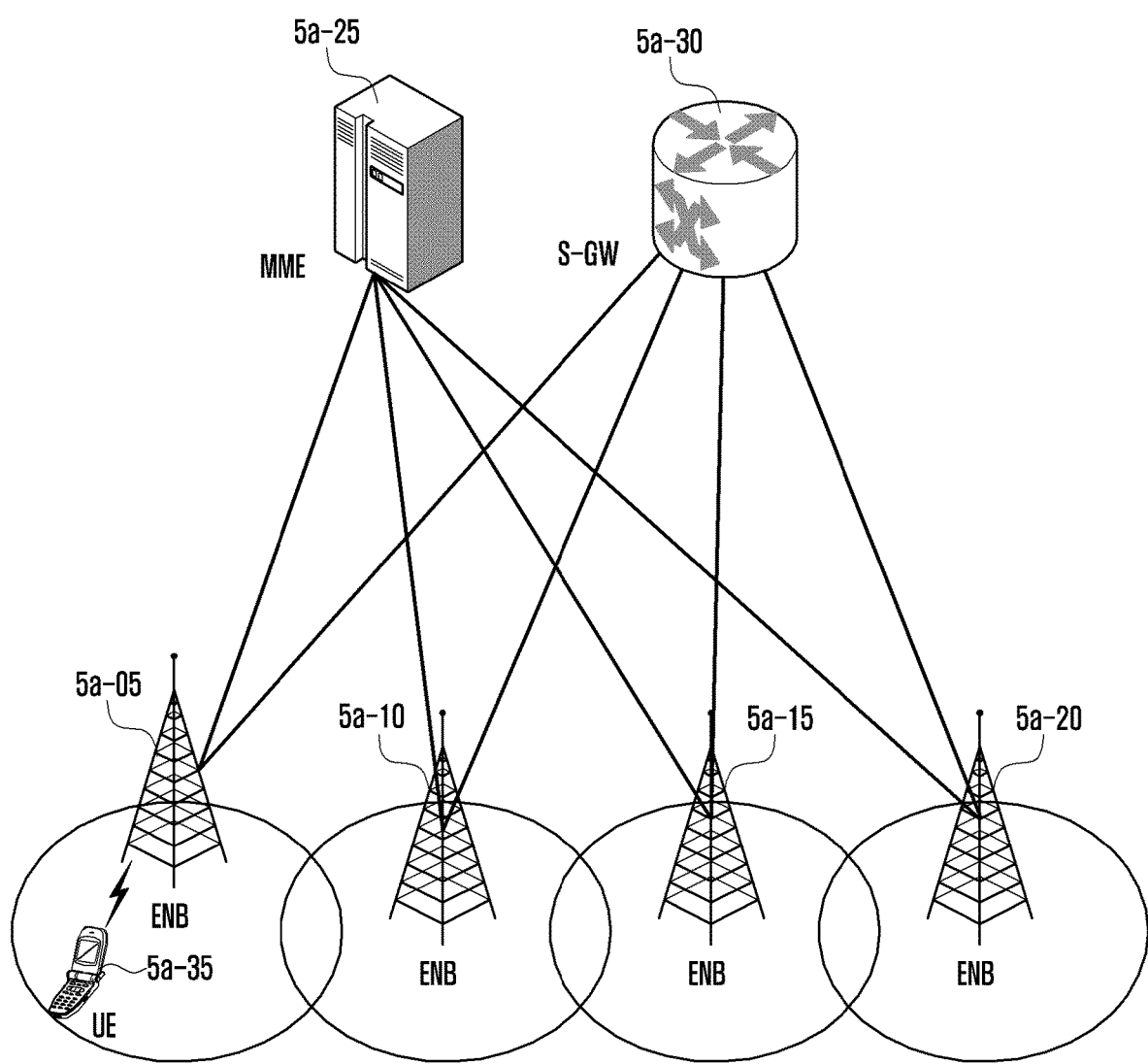
FIG. 5A is a diagram illustrating LTE system architecture according to an embodiment of the present disclosure.

FIG. 5A is a diagram illustrating LTE system architecture according to embodiment of the present disclosure.

Referring to FIG. 5A, the radio communication system includes evolved Node Bs (eNBs) 5a-05, 5a-10, 5a-15, and 5a-20; a MME 5a-25; and an S-GW 5a-30. The UE 5a-35 connects to an external network via the eNBs 5a-05, 5a-10, 5a-15, and 5a-20 and the S-GW 5a-30.

The eNBs 5a-05, 5a-10, 5a-15, and 5a-20 are equivalent to the legacy node Bs of the universal mobile telecommunications system (UMTS). The UE 5a-35 connects to one of the eNBs via a radio channel, and the eNB has more control functions than the legacy node B. In the LTE system where all user traffic including real time services such as Voice over IP (VoIP) is served through shared channels, it is necessary to schedule UEs based on scheduling information such as buffer status, power headroom status, and channel status collected from the UEs, an eNB serving the UEs takes charge of this function. It is typical that one eNB hosts a plurality of cells. For example, the LTE system adopts OFDM as a radio access technology to secure a data rate of up to 100 Mbps in a bandwidth of 20 MHz. The LTE system also adopts Adaptive Modulation and Coding (AMC) to determine the modulation scheme and channel coding rate in adaptation to the channel condition of the UE. The S-GW 5a-30 as an entity handling bearers establishes and releases data bearers under the control of the MME 5a-25. The MME 5a-25 takes charge of various control functions and maintains connections with a plurality of eNBs.

Figure 5B:
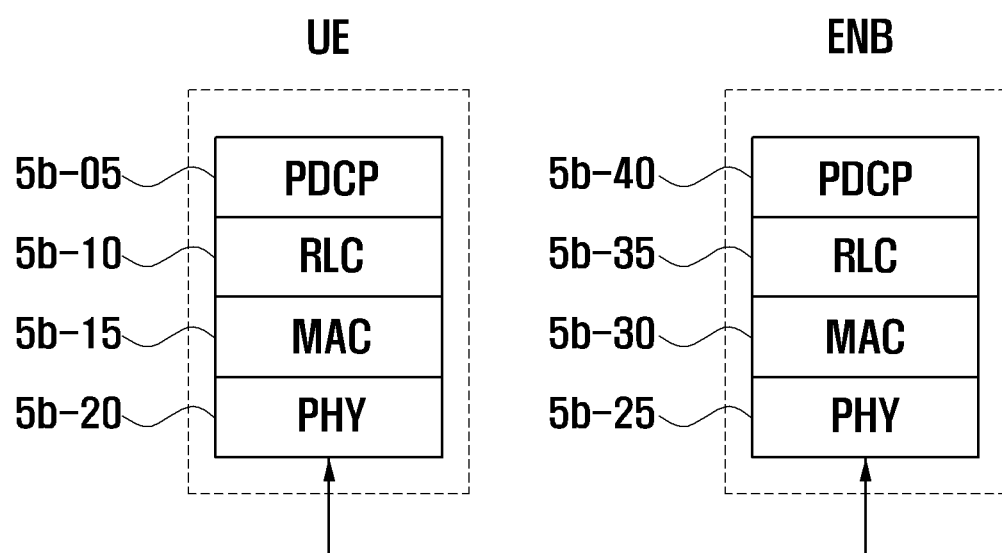
FIG. 5B is a diagram illustrating a protocol stack of an interface between a UE and an evolved Node B (eNB) in LTE according to an embodiment of the present disclosure.

FIG. 5B is a diagram illustrating a protocol stack of an interface between a UE and an eNB in LTE according to an embodiment of the present disclosure.

Referring to FIG. 5B, the protocol stack of the interface between the UE and the eNB in the LTE system includes a plurality of protocol layers stacked from the bottom to the top: PHY layer denoted by reference numbers 5b-20 and 5b-25, MAC layer denoted by reference numbers 5b-15 and 5b-30, radio link control (RLC) layer denoted by reference numbers 5b-10 and 5b-35, and PDCP layer denoted by reference numbers 5b-05 and 5b-40. The PDCP layer denoted by reference numbers 5b-05 and 5b-40 takes charge of compressing/decompressing an IP header. The main functions of the PDCP can be summarized as follows:

Header compression and decompression: ROHC only
  Transfer of user data
  In-sequence delivery of upper layer PDUs at PDCP re-establishment procedure for RLC AM
  Reordering (For split bearers in DC (only support for RLC AM): PDCP PDU routing for transmission and PDCP PDU reordering for reception
  Duplicate detection of lower layer SDUs at PDCP re-establishment procedure for RLC AM
  Retransmission of PDCP SDUs at handover and, for split bearers in DC, of PDCP PDUs at PDCP data-recovery procedure, for RLC AM
  Ciphering and deciphering
  Timer-based SDU discard in uplink The RLC layer designated by reference number 5b-10 and 5b-35 takes charge of reformatting PDCP PDUs in order to fit them into the size for ARQ operation. The main functions of the RLC protocol can be summarized as follows:

Transfer of upper layer PDUs
  Error Correction through ARQ (only for AM data transfer)
  Concatenation, segmentation and reassembly of RLC SDUs (only for UM and AM data transfer)
  Re-segmentation of RLC data PDUs (only for AM data transfer)
  Reordering of RLC data PDUs (only for UM and AM data transfer)
  Duplicate detection (only for UM and AM data transfer)
  Protocol error detection (only for AM data transfer)
  RLC SDU discard (only for UM and AM data transfer)
  RLC re-establishment The MAC layer denoted by reference number 5b-15 and 5b-30 allows for connection of multiple RLC entities established for one UE and takes charge of multiplexing RLC PDUs from the RLC layer into a MAC PDU and demultiplexing a MAC PDU into RLC PDUs. The main functions of the MAC protocol can be summarized as follows:

Mapping between logical channels and transport channels
Multiplexing/demultiplexing of MAC SDUs belonging to one or different logical channels into/from transport blocks (TB) delivered to/from the physical layer on transport channels
Scheduling information reporting
Error correction through HARQ
Priority handling between logical channels of one UE
Priority handling between UEs by means of dynamic scheduling
MBMS service identification
Transport format selection
Padding The PHY layer denoted by reference numbers 5b-20 and 5b-25 takes charge of channel-coding and modulation on higher layer data to generate and transmit OFDM symbols over a radio channel, and demodulating and channel-decoding on OFDM symbols received over the radio channel to deliver the decoded data to the higher layers.

Figure 5C:
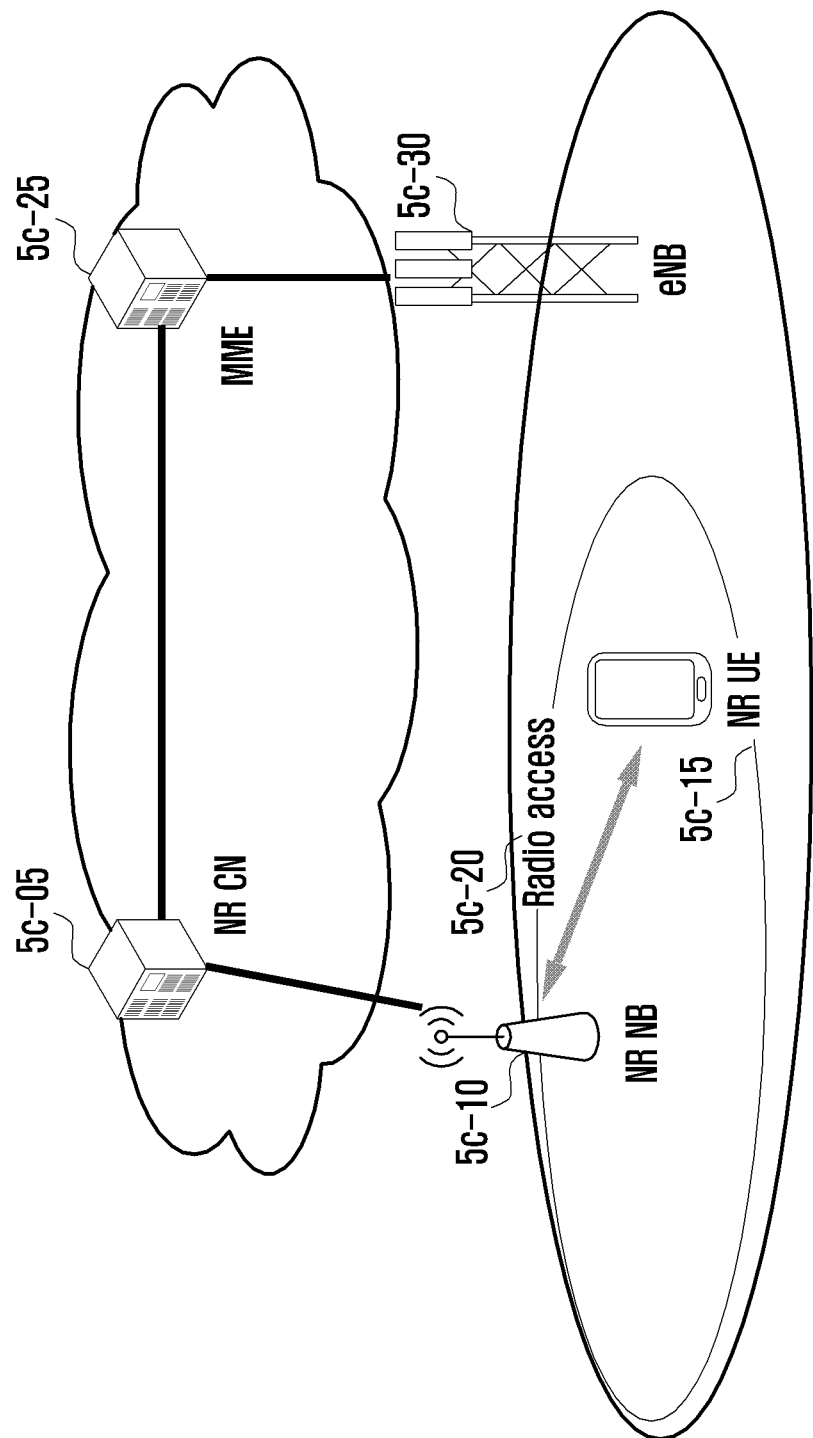
FIG. 5C is a diagram illustrating next generation mobile communication system architecture according to an embodiment of the present disclosure.

FIG. 5C is a diagram illustrating next generation mobile communication system architecture according to an embodiment of the present disclosure.

Referring to FIG. 5C, the next generation mobile communication system includes a radio access network with a next generation base station (New Radio Node B (NR gNB) or NR NB) 5c-10 and a new radio core network (NR CN) 5c-05. A new radio user equipment (NR UE) 5c-15 connects to an external network via the NR NB 5c-10 and the NR CN 5c-05.

In FIG. 5C, the NR NB 5c-10 corresponds to an evolved Node B (eNB) of the legacy LTE. The NR NB 5c-10 to which the NR UE 5c-15 connects through a radio channel 5c-20 is capable of providing superior services in comparison with the legacy eNB. In the next generation mobile communication system where all user traffic is served through shared channels, it is necessary to schedule the NR UEs based on scheduling information such as buffer status, power headroom status, and channel status collected by the NR UEs, and the NR NB 5c-10 takes charge of this function. Typically, one NR NB operate multiple cells. In order to achieve a data rate higher than the peak data rate of legacy LTE systems, the next generation mobile communication system may adopt a beamforming technique along with orthogonal frequency division multiple access (OFDMA) as a radio access technology. The next generation mobile communication system may also adopt an adaptive modulation and coding (AMC) to determine the modulation scheme and channel coding rate in adaptation to the channel condition of the NR UE. The NR CN 5c-05 takes charge of mobility support, bearer setup, and QoS configuration. The NR CN 5c-05 may take charge of a NR UE mobility management function, and a plurality of NR NBs may connect to the NR CN 5c-05. The next generation mobile communication system may also interoperate with a legacy LTE system and, in this case, the NR CN 5c-05 connects to an MME 5c-25 through a network interface. The MME 5c-25 communicates with at least one eNB 5c-30 as a legacy base station.

Figure 5D:
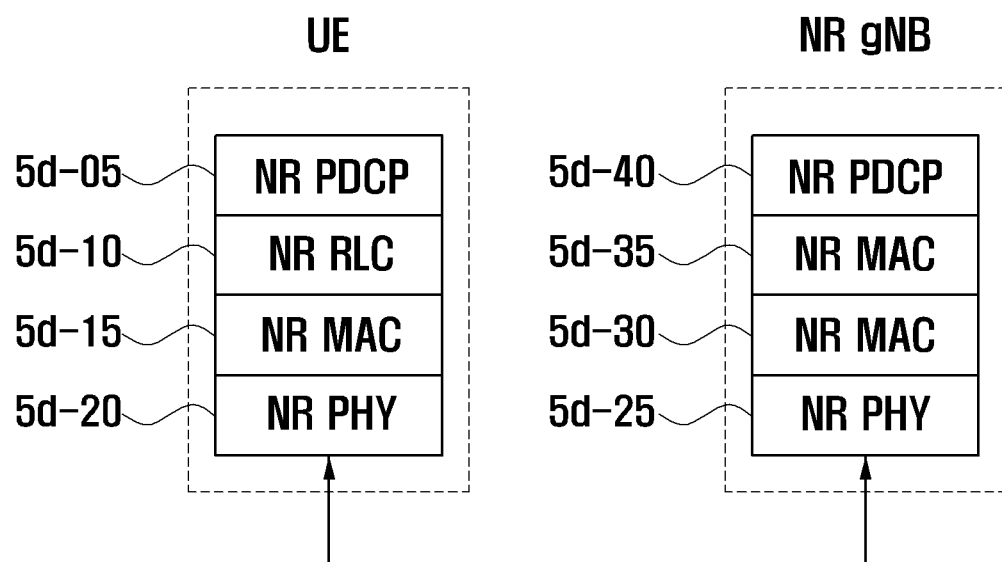
FIG. 5D is a diagram illustrating a protocol stack of an interface between a NR UE and an NR gNB in a next generation mobile communication system according to an embodiment of the present disclosure.

FIG. 5D is a diagram illustrating a protocol stack of an interface between a NR UE and an NR gNB in a next generation mobile communication system according to an embodiment of the present disclosure.

Referring to FIG. 5D, the protocol stack of the interface between a NR UE and an NR gNB in a next generation mobile communication system includes a plurality of protocol layers stacked from the bottom to the top: NR PHY layer denoted by reference numbers 5d-20 and 5d-25, NR MAC layer denoted by reference numbers 5d-15 and 5d-30, NR radio link control (RLC) layer denoted by reference numbers 5d-10 and 5d-35, and NR PDCP layer denoted by reference numbers 5d-05 and 5d-40. The main functions of the NR PDCP layer denoted by reference numbers 5d-05 and 5d-40 may include some of the following functions:

Header compression and decompression: ROHC only
Transfer of user data
In-sequence delivery of upper layer PDUs
PDCP PDU reordering for reception
Duplicate detection of lower layer SDUs
Retransmission of PDCP SDUs
Ciphering and deciphering
Timer-based SDU discard in uplink The PDCP PDU reordering function of an NR PDCP entity is to reorder the PDCP PDUs delivered from a lower layer based on the PDCP sequence number (PDCP SN) and may include delivering the reordered data to an upper layer, recording the missing PDCP PDUs among the reordered PDCP PDUs, transmitting a status report indicating the missing PDCP PDUs to the sender, and requesting for retransmission of the missing PDCP PDUs.

The main functions of the NR RLC layer denoted by reference numbers 5d-10 and 5d-35 may include some of the following functions.

Transfer of upper layer PDUs
In-sequence delivery of upper layer PDUs
Out-of-sequence delivery of upper layer PDUs
Error Correction through ARQ
Concatenation, segmentation and reassembly of RLC SDUs
Re-segmentation of RLC data PDUs
Reordering of RLC data PDUs
Duplicate detection
Protocol error detection
RLC SDU discard
RLC re-establishment The in-sequence delivery function of an NR RLC entity is to deliver the RLC SDUs received from the lower layer to the upper layer and may include reassembling, when multiple segmented RLC SDUs constituting an original RLC SDU, the RLC SDUs and delivering the reassembled RLC SDU to the upper layer, reordering the received RLC PDUs based on the RLC SN or PDCP SN, recording the missing RLC PDUs among the reordered RLC PDUs, transmitting a status report indicating the missing RLC PDUs to the sender, requesting for retransmission of the missing RLC PDUs, and delivering, when there is an missing RLC PDU, the RLC PDUs before the missing RLC PDU in sequence, delivering, if a predetermined timer expires even when there is any missing RLC SDU, all RLC SDUs received before the start of the timer to the upper layer in sequence, or delivering, if a predetermined timer expires even when there is any missing RLC SDU, all RLC SDUs received until then to the upper layer in sequence.

The out-of-sequence delivery function of an NR RLC entity is to deliver the RLC SDUs received from the lower layer to the upper layer out of order and may include reassembling, when multiple segmented RLC SDUs constituting an original RLC SDU, the segmented RLC SDUs and delivering the reassembled RLC SDUs to the upper layer, arranging the received RLC PDUs based on the RLC SN or PDCP SN, recording the SN of the missing RLC PDUs.

In the NR MAC layer denoted by reference number 5d-15 and 5d-30, a MAC entity may be connected to multiple NR RLC entities, and the main functions of the NR MAC entity may include some of the following functions:

Mapping between logical channels and transport channels
Multiplexing/demultiplexing of MAC SDUs
Scheduling information reporting
Error correction through HARQ
Priority handling between logical channels of one UE
Priority handling between UEs by means of dynamic scheduling
MBMS service identification
Transport format selection
Padding The NR PHY layer denoted by reference number 5d-20 and 5d-25 takes charge of channel-coding and modulation on higher layer data to generate and transmit OFDM symbols over a radio channel, and demodulating and channel-decoding on OFDM symbols received over the radio channel to deliver the decoded data to the higher layers.

Figure 5E:
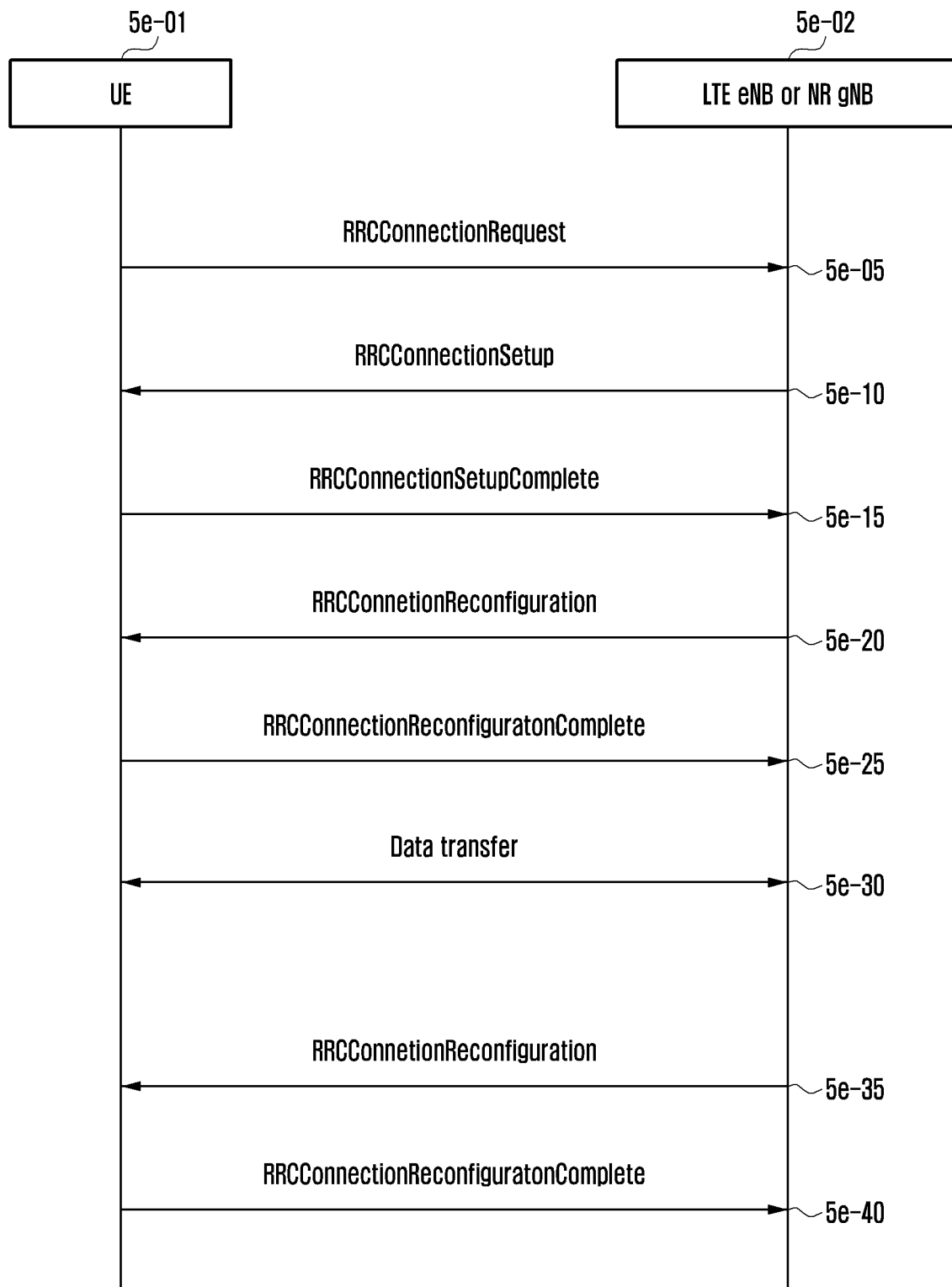
FIG. 5E is a diagram illustrating a procedure for establishing a connection between a UE and a gNB for data communication and configuring information used for scheduling request of the UE according to an embodiment of the present disclosure.

FIG. 5E is a signal flow diagram illustrating signal flows between a UE and an eNB or NR gNB for establishing respective protocol layer entities in the UE in a next generation mobile communication system according to an embodiment of the present disclosure.

Referring to FIG. 5E, a diagram illustrating a procedure for establishing a connection between a UE and a gNB for data communication and configuring information used for scheduling request of the UE according to an embodiment of the present disclosure.

If there is data to transmit, the UE 5e-01 in the idle mode (idle mode UE) performs an RRC connection establishment procedure with an LTE eNB/NR gNB 5e-02. The UE 5e-01 achieves uplink transmission synchronization with the eNB/gNB 5e-02 through a random access procedure and then transmits an RRCConnectionRequest message to the eNB/gNB 5e-02 at operation 5e-05. This message includes an identifier of the UE 5e-01 and cause of the connection request. The eNB/gNB 5e-02 transmits an RRCConnectionSetup message to the UE 5e-01 at operation 5e-10. This message may include RRC connection configuration information, UE's scheduling request-related information, and protocol layers configuration information. The UE's scheduling request-related information may include scheduling request (SR) information, i.e., number of SRs, number of transmission resource bits per SR, per-SR priority information, per-SR transmission resources (including frequency, time, and period), and SR configuration information for use in CA mode and dual connectivity (DC) mode or multi-connectivity mode. The network may configure multiple SRs to a UE. If the network configures multiple SRs to the UE, the UE may be configured to generate a plurality of buffer status reports (BSRs) equal in number to the SRs. The RRC connection is also referred to as signaling radio bearer (SRB) and used to exchange RRC messages as control messages between the UE and the eNB/gNB. After establishing an RRC Connection, the UE 5e-01 transmits an RRCConnectionSetupComplete message to the eNB/gNB 5e-02 at operation 5e-15. The eNB/gNB 5e-02 transmits an RRCConnectionReconfiguration message to the UE 5e-01 for establishing a data radio bearer (DRB) at operation 5e-20. This message may include the information for use in scheduling request of the UE. The information for use in scheduling request of the UE may include scheduling request (SR) information, i.e., number of SRs, number of transmission resource bits per SR, per-SR priority information, per-SR transmission resources (including frequency, time, and period), and SR configuration information for use in carrier aggregation (CA) mode and dual connectivity (DC) mode or multi-connectivity mode. The network may configure multiple SRs to a UE. If the network configures multiple SRs to the UE, the UE may be configured to generate a plurality of buffer status reports (BSRs) equal in number to the SRs. This message also includes configuration information of DRB for user data, and the UE 5e-01 configures a DRB and per-layer functions based on this configuration information and transmits an RRCConnectionReconfigurationComplete message to the eNB/gNB 5e-02 at operation 5e-25. When all of the above operations have been completed, the UE 5e-01 and the eNB/gNB 5e-02 communicate data at operation 5e-30. During the data communication, if necessary, the eNB/gNB 5e-02 may transmit the RRCConnectionReconfiguration message to the UE 5e-01 at operation 5e-35 to reconfigure the UE's SR configuration information. The information for use in scheduling request of the UE may include scheduling request (SR) information, i.e., number of SRs, number of transmission resource bits per SR, per-SR priority information, per-SR transmission resources (including frequency, time, and period), and SR configuration information for use in CA mode and dual connectivity (DC) mode or multi-connectivity mode. The network may configure multiple SRs to a UE. If the network configures multiple SRs to the UE, the UE may be configured to generate a plurality of buffer status reports (BSRs) equal in number to the SRs.

If the SR configuration has been completed according to the RRCConnectionReconfiguration message, the UE 5e-01 transmits the RRCConnectionReconfigurationComplete message to the eNB/gNB 5e-02 at operation 5e-40.

Figure 5F:
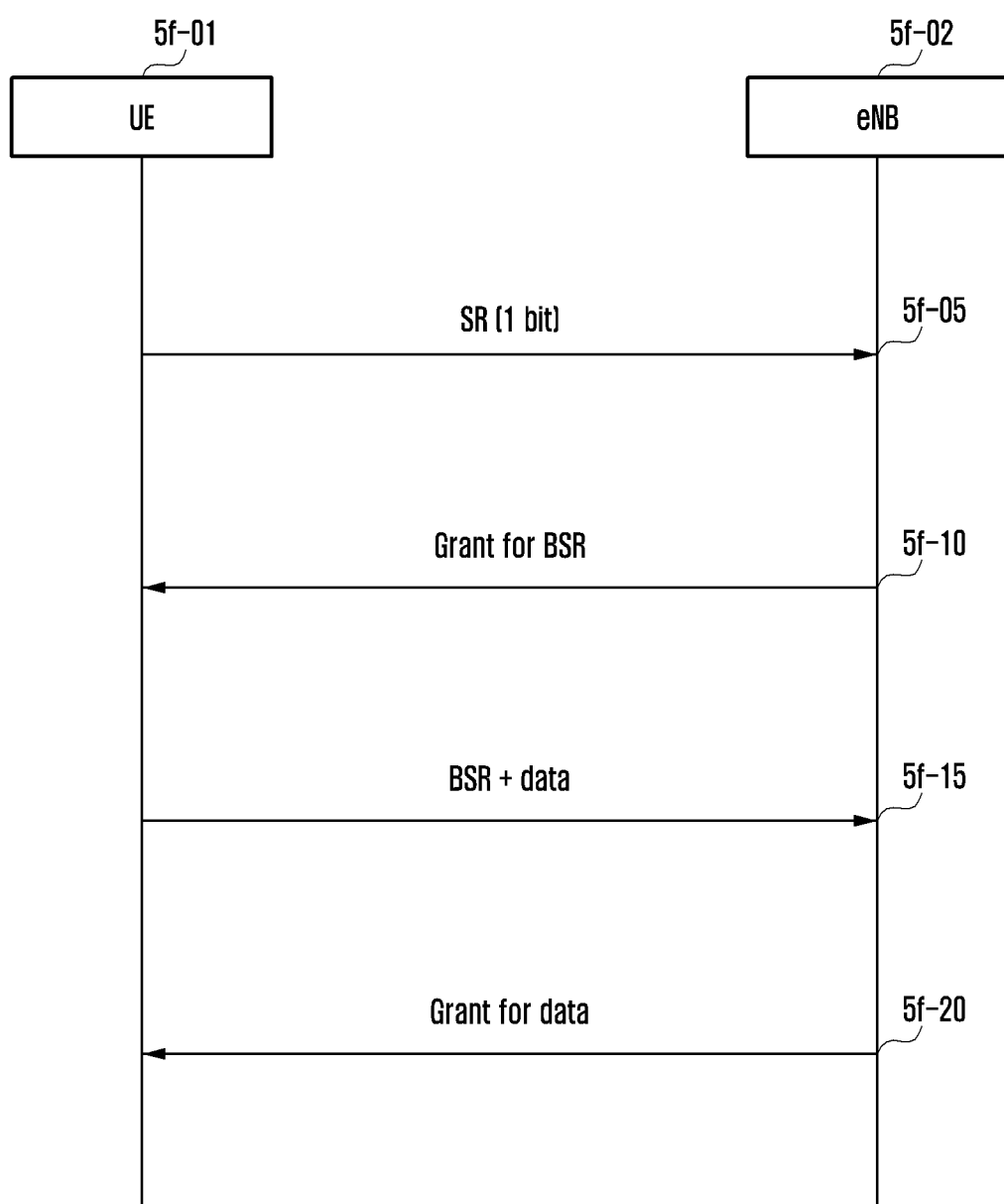
FIG. 5F is a signal flow diagram illustrating signal flows between a UE and an eNB/gNB in a procedure for the UE to make a scheduling request to the eNB/gNB for uplink resources to transmit uplink data according to an embodiment of the present disclosure.

FIG. 5F is a signal flow diagram illustrating signal flows between a UE and an eNB/gNB in a procedure for the UE to make a scheduling request to the eNB/gNB for uplink resources to transmit uplink data according to an embodiment of the present disclosure.

Referring to FIG. 5F, if a predetermined condition is fulfilled, the UE 5f-01 transmits an SR to the eNB/gNB 5f-02 at operation 5f-05. The predetermined condition may be that a predetermined uplink data is generated. If there is no resource allocated for SR, the UE 5f-01 may perform a random access procedure. It may also be possible to perform the random access procedure when no resource for SR is allocated in spite of a predetermined number of SR transmissions. If the SR is received from the UE 5f-01 at operation 5f-05, the eNB/gNB 5f-02 may perform scheduling to allocate resources to the UE 5f-01 in the light of the currently available resources. The eNB/gNB 5f-05 transmits the UE 5f-01 a grant for BSR to allocate uplink resources to the UE 5f-01 at operation 5f-10. If the UE 5f-01 is allocated the resources, it generates and transmits a BSR to the eNB/gNB 5f-02 using the allocated resources at operation 5f-15. If the uplink transmission resources are large enough to transmit the BSR and additional data, the UE 5f-01 may transmit data with the highest priority along with the BSR at operation 5f-15. The eNB/gNB 5f-02 checks the BSR and performs scheduling in the light of the currently available resources to allocate uplink transmission resources to the UE 5f-01 at operation 5f-20.

In the present disclosure, the network may configure the multiple SRs to the UE and multiple BSRs equal in number to the SRs at operations 5e-10, 5e-20, or 5e-35. An embodiment of the present disclosure is directed to a scenario of configuring 2 SRs for convenience of explanation. The 2 SRs include a first SR characterized by a short transmission interval and a high priority and a second SR characterized by a long transmission interval and a low priority. The first SR is triggered by a first BSR, and the second SR is triggered by a second BSR.

In embodiment 5-1 of the present disclosure, a UE receives an RRC Control message instructing to configure SR from an eNB/gNB (see operation 5e-10, 5e-20, or 5e-35 of FIG. 5E) and configures 2 SRs. The first SR is configured with the transmission resources allocated at a short interval, and the second SR is configured with the transmission resources allocated at a long interval. The UE configures the first BSR for triggering the first SR and the second BSR for triggering the second SR. In embodiment 5-1 of the present disclosure, the SRs are triggered as follows to transmit the SRs efficiently at operation 5f-05 of FIG. 5F.

If a first condition is fulfilled, the UE triggers the first BSR, and the first BSR triggers the first SR.

If a second condition is fulfilled, the UE triggers the second BSR, and the second BSR triggers the second SR.

The first condition is that newly generated data has a priority higher than that of the data stored in a buffer or a retransmission BSR timer expires.

The second condition is that the newly generated data has a priority equal to or less than the data stored in the buffer and the first SR is not in pending state.

The first or second SR is in pending until the BSR is transmitted after the first or second SR is triggered.

Figure 5G:
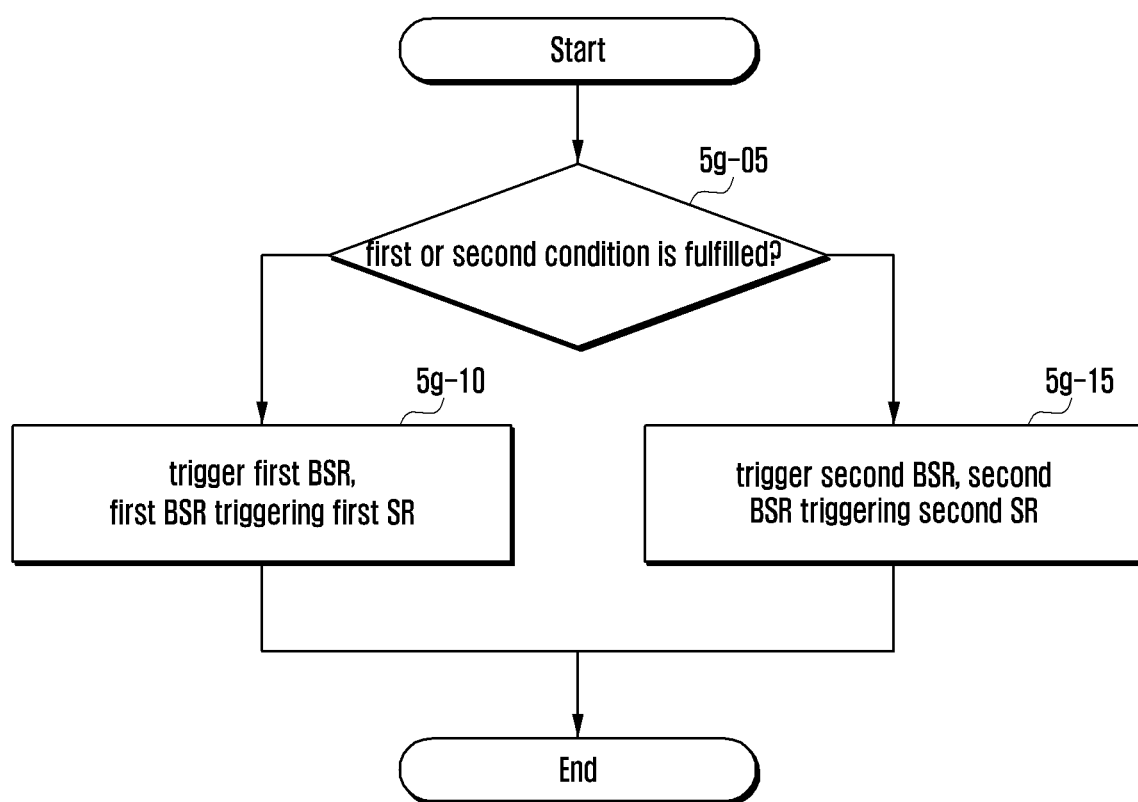
FIG. 5G is a flowchart illustrating an operation of a UE according to embodiment 5-1 of the present disclosure.

FIG. 5G is a flowchart illustrating an operation of a UE according to embodiment 5-1 of the present disclosure.

In FIG. 5G, if it is determined at operation 5g-05 that the first condition is fulfilled, the UE triggers the first BSR at operation 5g-10, the first BSR triggering the first SR. If it is determined at operation 5g-05 that the second condition is fulfilled, the UE triggers the second BSR at operation 5g-15, the second BSR triggering the second SR.

In embodiment 5-2 of the present disclosure, the UE receives an RRC control message instructing to configure SR from an eNB/gNB (operation 5e-10, 5e-20, or 5e-35 FIG. of 5E) and configures two SRs. The two SRs includes a first SR being configured for use of transmission resources with a short interval and a second SR being configured for use of transmission resources with a long interval. The UE configures a first BSR to trigger the first SR and a second BSR to trigger the second SR. In embodiment 5-2 of the present disclosure, the SRs are triggered as follows to transmit the SRs efficiently at operation 5f-05 of FIG. 5F.

If a first condition is fulfilled, the UE triggers the first BSR, and the first BSR triggers the first SR.

If a second condition is fulfilled, the UE triggers the second BSR, and the second BSR triggers the second SR.

If a third condition is fulfilled, only the first BSR and the first SR are maintained.

If a fourth condition is fulfilled, the second BSR and the second SR are cancelled, and the first BSR and the first SR are triggered.

The first condition is that newly generated data has a priority higher than that of the data stored in a buffer or a retransmission BSR timer expires.

The second condition is that the newly generated data has a priority equal to or less than the data stored in the buffer and the first SR is not in pending state.

The third condition is that the second condition is fulfilled while the first SR is in pending state.

The fourth condition is that the first condition is fulfilled while the second SR is in pending state.

The first or second SR is in pending state before BSR transmission since it has been triggered.

Figure 5H:
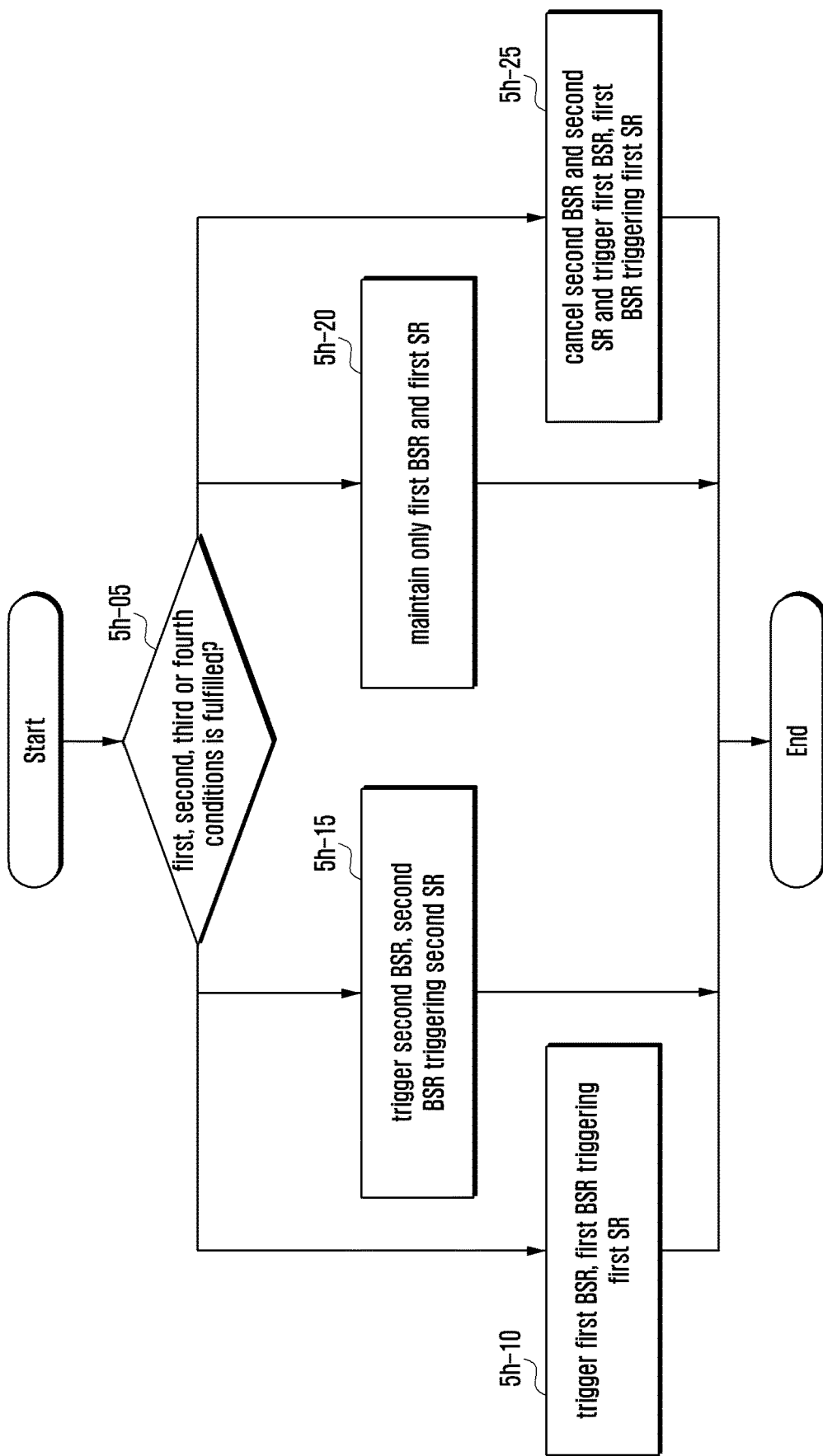
FIG. 5H is a flowchart illustrating an operation of a UE according to embodiment 5-2 of the present disclosure.

FIG. 5H is a flowchart illustrating an operation of a UE according to embodiment 5-2 of the present disclosure.

Referring to FIG. 5H, if it is determined at operation 5h-05 that the first condition is fulfilled, the UE triggers the first BSR at operation 5h-10, the first BSR triggering the first SR. If it is determined at operation 5h-05 that the second condition is fulfilled, the UE triggers the second BSR at operation 5h-15, the second BSR triggering the second SR. If it is determined at operation 5h-05 that the third condition, the UE maintains only the first BSR and the first SR at operation 5h-20. If it is determined at operation 5h-05 that the fourth condition is fulfilled, the UE cancels the second BSR and the second SR and triggers the first BSR at operation 5h-25, the first BSR triggering the first SR.

In embodiment 5-3 of the present disclosure, the UE receives an RRC control message instructing to configure SR from an eNB/gNB (operation 5e-10, 5e-20, or 5e-35 of FIG. 5E) and configures two SRs. The two SRs includes a first SR being configured for use of transmission resources with a short interval and a second SR being configured for use of transmission resources with a long interval. The UE configures a first BSR to trigger the first SR and a second BSR to trigger the second SR. In embodiment 5-3 of the present disclosure, the SRs are triggered as follows to transmit the SRs efficiently at operation 5f-05 of FIG. 5F as follows.

If a first condition is fulfilled, the UE triggers a first BSR, the first BSR triggers a first SR; if the first SR is triggered, the UE sets a first counter to 0 and increases the first counter by 1 whenever the first SR is transmitted.

If a second condition is fulfilled, the UE triggers a second BSR, and the second BSR triggers a second SR; if the second SR is triggered, the UE sets a second counter to 0 and increases the second counter by 1 whenever the second SR is transmitted.

If a third condition is fulfilled, the UE maintains the first SR in the triggered state and increases the first counter by 1 whenever the first SR is triggered.

If a fourth condition is fulfilled, the UE cancels the second BSR and the second SR, triggers the first BSR and the first SR, resets the first and second counters to 0, and increases the first counter by 1 whenever the first SR is transmitted.

If the first or second counter reaches a predetermined value, the UE stops transmitting the first or second SR and initiates a random access procedure.

The first condition is that newly generated data has a priority higher than that of the data stored in a buffer or a retransmission BSR timer expires.

The second condition is that the newly generated data has a priority equal to or less than that of the data stored in the buffer and the first SR is not in pending state.

The third condition is that the second condition is fulfilled while the first SR is in pending state.

The fourth condition is that the first condition is fulfilled while the second SR is in pending state.

The first or second SR is in pending state before BSR transmission since it has been triggered.

FIG. 5I is a flowchart illustrating an operation of a UE according to embodiment 5-3 of the present disclosure.

In FIG. 5I, if it is determined at operation 5i-05 that the first condition is fulfilled, the UE triggers the first BSR at operation 5i-10, the first BSR triggering the first SR; if the first SR is triggered, the UE sets the first counter to 0 and increases the first counter by 1 whenever the first SR is transmitted. If it is determined at operation 5i-05 that the second condition is fulfilled, the UE triggers the second BSR at operation 5i-15, the second BSR triggering the second SR;

if the second SR is triggered, the UE sets the second counter to 0 and increases the second counter by 1 whenever the second SR is transmitted. If it is determined at operation 5i-05 that the third condition is fulfilled, the UE maintains the first SR in the triggered state and increases the first counter by 1 whenever the first SR is transmitted at operation 5i-20. If it is determined at operation 5i-05 that the fourth condition is fulfilled, the UE cancels the second BSR and the second SR, triggers the first BSR which triggers the first SR, resets the first and second counters to 0, and increases the first counter by 1 whenever the first SR is transmitted at operation 5i-25.

In embodiment 5-4 of the present disclosure, the UE receives an RRC control message instructing to configure SR from an eNB/gNB (operation 5e-10, 5e-20, or 5e-35 of FIG. 5E) and configures two SRs. The two SRs includes a first SR being configured for use of transmission resources with a short interval and a second SR being configured for use of transmission resources with a long interval. The UE configures a first BSR to trigger the first SR and a second BSR to trigger the second SR. In embodiment 5-4 of the present disclosure, the SRs are triggered as follows to transmit the SRs efficiently at operation 5f-05 of FIG. 5F as follows.

If a first condition is fulfilled, the UE triggers a first BSR, and the first BSR triggers a first SR.

If a second condition is fulfilled, the UE triggers the second BSR, and the second BSR triggers the second SR.

If a third condition is fulfilled, the UE triggers or maintains the SR with the transmission resources available earlier in time between the first and second SRs.

If a fourth condition is fulfilled, the UE triggers or maintains the SR with the transmission resources available earlier in time between the first and second SRs.

The first condition is that newly generated data has a priority higher than that of the data stored in a buffer or a retransmission BSR timer expires.

The second condition is that the newly generated data has a priority equal to or less than that of the data stored in the buffer and the first SR is not in pending state.

The third condition is that the second condition is fulfilled while the first SR is in pending state.

The fourth condition is that the first condition is fulfilled while the second SR is in pending state.

The first or second SR is in pending state before BSR transmission since it has been triggered.

FIG. 5J is a flowchart illustrating an operation of a UE according to embodiment 5-4 of the present disclosure.

Referring to FIG. 5J, if it is determined at operation 5j-05 that the first condition is fulfilled, the UE triggers the first BSR at operation 5j-10, the first BSR triggering the first SR. If it is determined at operation 5j-05 that the second condition is fulfilled, the UE triggers the second BSR at operation 5j-15, the second BSR triggering the second SR. If it is determined at operation 5j-05 that the third condition is fulfilled, the UE triggers or maintains the SR with the transmission resources available earlier in time between the first and second SRs at operation 5j-20. If it is determined at operation 5j-05 that the fourth condition is fulfilled, the UE triggers or maintains the SR with the transmission resources available earlier in time between the first and second SRs at operation 5j-25.

In embodiment 5-5 of the present disclosure, the UE receives an RRC control message instructing to configure SR from an eNB/gNB (operation 5e-10, 5e-20, or 5e-35 of FIG. 5E) and configures two SRs. The two SRs includes a first SR being configured for use of transmission resources with a short interval and a second SR being configured for use of transmission resources with a long interval. The UE configures a first BSR to trigger the first SR and a second BSR to trigger the second SR. In embodiment 5-5 of the present disclosure, the SRs are triggered as follows to transmit the SRs efficiently at operation 5f-05 of FIG. 5F as follows.

If a first condition is fulfilled, the UE triggers a first BSR, the first BSR triggers a first SR; if the first SR is triggered, the UE sets a first counter to 0 and increases the first counter by 1 whenever the first SR is transmitted.

If a second condition is fulfilled, the UE triggers a second BSR, and the second BSR triggers a second SR; if the second SR is triggered, the UE sets a second counter to 0 and increases the second counter by 1 whenever the second SR is transmitted.

If a third condition is fulfilled, the UE triggers or maintains the SR with the transmission resources available earlier in time between the first and second SRs, resets the corresponding counter to 0, and increases the counter by 1 whenever the triggered or maintained SR is transmitted.

If a fourth condition is fulfilled, the UE triggers or maintains the SR with the transmission resources available earlier in time between the first and second SR, resets the corresponding counter to 0, and increases the counter by 1 whenever the triggered or maintained SR is transmitted.

If the first or second counter reaches a predetermined value, the UE stops transmitting the first or second SR and initiates a random access procedure.

The first condition is that newly generated data has a priority higher than that of the data stored in a buffer or a retransmission BSR timer expires.

The second condition is that the newly generated data has a priority equal to or less than that of the data stored in the buffer and the first SR is not in pending state.

The third condition is that the second condition is fulfilled while the first SR is in pending state.

The fourth condition is that the first condition is fulfilled while the second SR is in pending state.

The first or second SR is in pending state before BSR transmission since it has been triggered.

FIG. 5K is a flowchart illustrating an operation of a UE according to embodiment 5-5 of the present disclosure.

Referring to FIG. 5K, if it is determined at operation 5k-05 that the first condition is fulfilled, the UE triggers the first BSR at operation 5k-10, the first BSR triggering the first SR; if the first SR is triggered, the UE sets the first counter to 0 and increases the first counter by 1 whenever the first SR is transmitted. If it is determined at operation 5k-05 that the second condition is fulfilled, the UE triggers the second BSR at operation 5k-15, the second BSR triggering the second SR; if the second SR is triggered, the UE sets the second counter to 0 and increases the second counter by 1 whenever the second SR is transmitted. If it is determined at operation 5k-05 that the third condition is fulfilled, the UE triggers or maintains the SR with the transmission resources available earlier in time between the first and second SRs at operation 5k-20, resets the corresponding counter to 0, and increases the counter by 1 whenever the triggered or maintained SR is transmitted. If it is determined at operation 5k-05 that the fourth condition is fulfilled, the UE triggers or maintains the SR with the transmission resources available earlier in time between the first and second SRs at operation 5k-25, resets the corresponding counter to 0, and increases the counter by 1 whenever the triggered or maintained SR is transmitted.

Figure 5L:
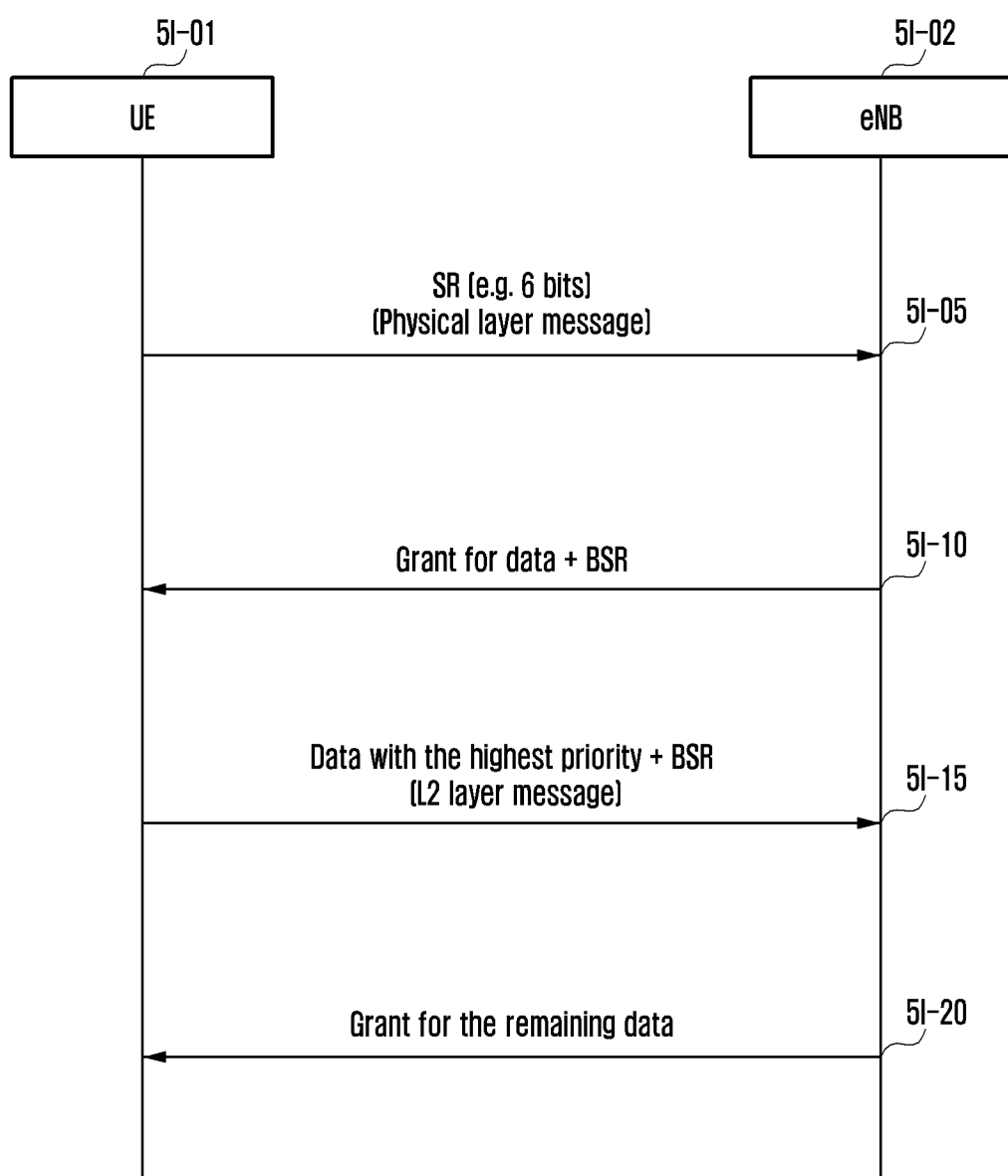
FIG. 5L is a signal flow diagram illustrating signal flows between a UE and an eNB/gNB in a procedure for the UE to make a scheduling request to the network for uplink resources to transmit uplink data according to embodiment 5-6 of the present disclosure.

FIG. 5L is a signal flow diagram illustrating signal flows between a UE and an eNB/gNB in a procedure for the UE to make a scheduling request to the network for uplink resources to transmit uplink data according to embodiment 5-6 of the present disclosure.

Referring to FIG. 5L, if a predetermined condition is fulfilled, the UE 5l-01 transmits an SR to the eNB/gNB 5l-02 at operation 5l-05. The predetermined condition may be that a predetermined uplink data is generated. If there is no resource allocated for SR, the UE 5l-01 may perform a random access procedure. It may also be possible to perform the random access procedure when no resource for SR is allocated in spite of a predetermined number of SR transmissions. The eNB/gNB 5l-02 may configure a number of bits of SR transmission resources of the UE 5l-01 by means of an RRC control message (e.g., message transmitted at operation 5e-10, 5e-20, or 5e-35 of FIG. 5E). For example, the eNB/gNB 5l-02 may allocates 6 bits as the SR transmission resource bits of the UE 5l-01 using the RRC control message. Then, the UE 5l-01 may transmit the SR including the buffer status information for the data with the highest priority using the transmission resource bits. If the SR is received from the UE 5l-01 at operation 5l-05, the eNB/gNB 5l-02 checks the buffer status of UE 5l-01 in association with the data with the highest priority and performs scheduling in the light of the currently available resources based on this information to allocate resources to the UE 5l-01. The eNB/gNB 5l-02 allocates resources for uplink data with the highest priority and BSR to the UE 5l-01 at operation 5l-10. If the uplink resources are allocated, the UE 5l-01 generates and transmits a BSR to the eNB/gNB 5l-02 at operation 5l-15. If the uplink transmission resources are large enough to transmit the BSR and additional data, the UE 5l-01 may transmit data with the highest priority along with the BSR at operation 5l-15. The eNB/gNB 5l-02 checks the BSR and performs scheduling in the light of the currently available resources to allocate uplink transmission resources to the UE 5l-01 at operation 5l-20.

Figure 5M:
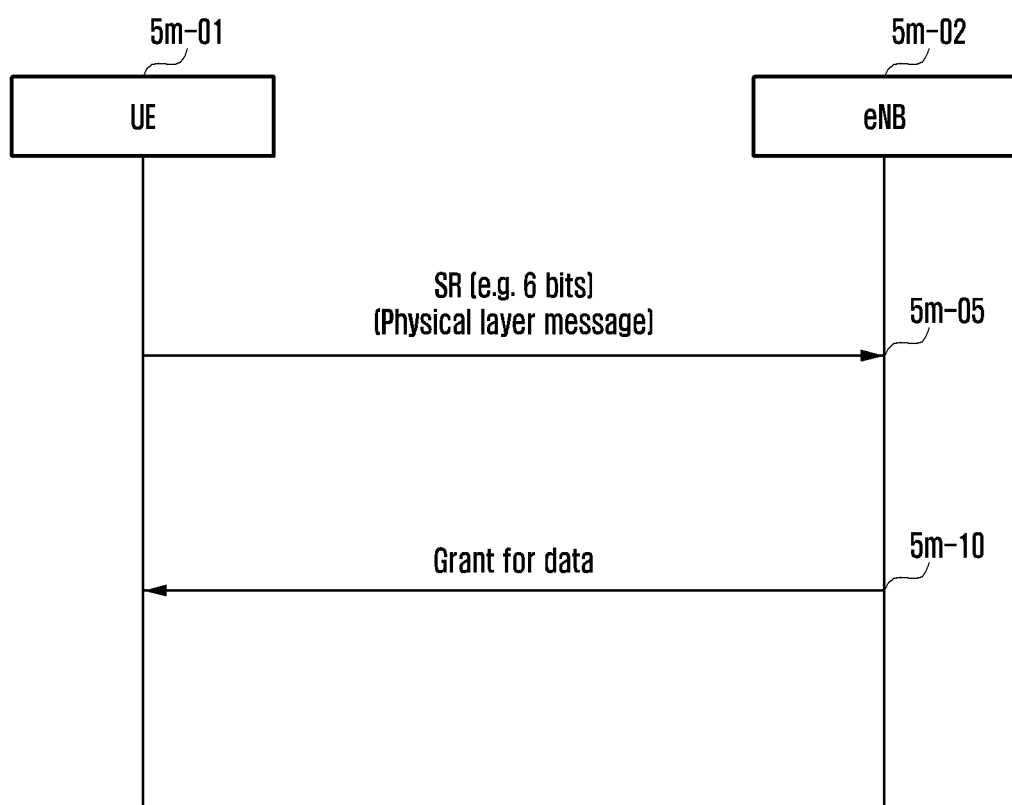
FIG. 5M is a signal flow diagram illustrating signal flows between an UE and an eNB/gNB in a procedure for the UE to make a scheduling request to the network for uplink resources to transmit uplink data according to embodiment 5-7 of the present disclosure.

FIG. 5M is a signal flow diagram illustrating signal flows between an UE and an eNB/gNB in a procedure for the UE to make a scheduling request to the network for uplink resources to transmit uplink data according to embodiment 5-7 of the present disclosure.

Referring to FIG. 5M, if a predetermined condition is fulfilled, the UE 5m-01 transmits an SR to the eNB/gNB 5m-02 at operation 5m-05. The predetermined condition may be that a predetermined uplink data is generated. If there is no resource allocated for SR, the UE 5m-01 may perform a random access procedure. It may also be possible to perform the random access procedure when no resource for SR is allocated in spite of a predetermined number of SR transmissions. The eNB/gNB 5m-02 may configure a number of bits of SR transmission resources of the UE 5m-01 by means of an RRC control message (e.g., message transmitted at operation 5e-10, 5e-20, or 5e-35 of FIG. 5E). For example, the eNB/gNB 5m-02 may allocates 6 bits as the SR transmission resource bits of the UE 5m-01 using the RRC control message. If the network allocates multi-bit transmission resources, this means that an SR can be used as BSR. This may also be interpreted that the buffer status information is transmitted using the resources periodically allocated for BSR without SR. The UE 5m-01 may transmit an SR along with the buffer status information about data with the highest priority, all data stored in the buffer, or data on a predetermined logical channel using the transmission resources bits. It may be prearranged that which of data with the highest priority, all data stored in the buffer, and data on a predetermined logical channel are checked for transmitting the buffer status information. If the SR is received from the UE 5m-01 at operation 5m-05, the eNB/gNB 5m-02 checks the buffer status of UE 5m-01 in association with the data with the highest priority, all data stored in the buffer, or data on a predetermined logical channel and performs scheduling in the light of the currently available resources based on this information to allocate resources to the UE 5m-01. The eNB/gNB 5m-02 allocates resources for uplink data with the highest priority or for all data stored in the buffer and BSR to the UE 5m-01 at operation 5m-10. If the uplink resources are allocated, the UE 5m-01 may transmit uplink data using the allocated resources. The procedure of embodiment 5-7 is capable of reducing battery consumption of UE and service delay and suitable for mMTC, NB-IoT, and URLLC services.

Figure 5N:
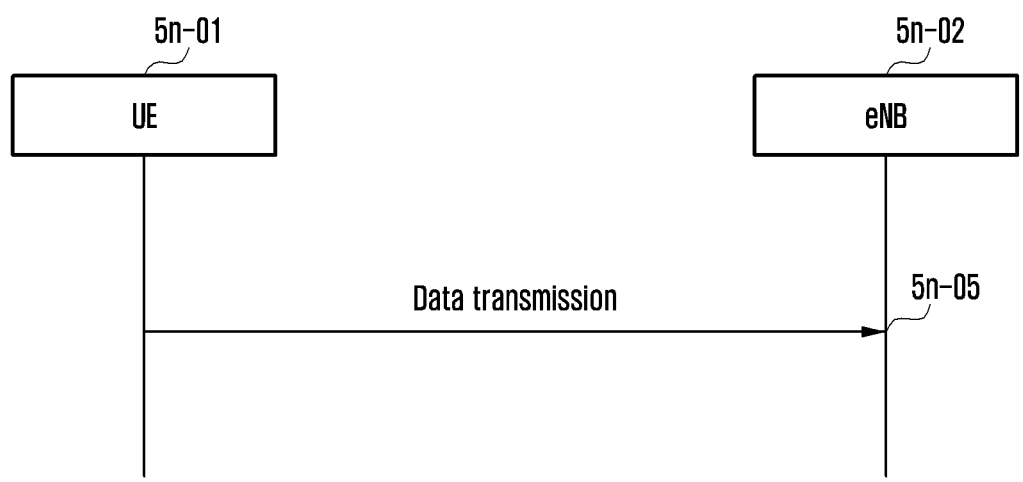
FIG. 5N is a signal flow diagram illustrating signal flows between an UE and an eNB/gNB in a procedure for the UE to transmit uplink data using prearranged resources according to embodiment 5-8 of the present disclosure.
Figure 50:
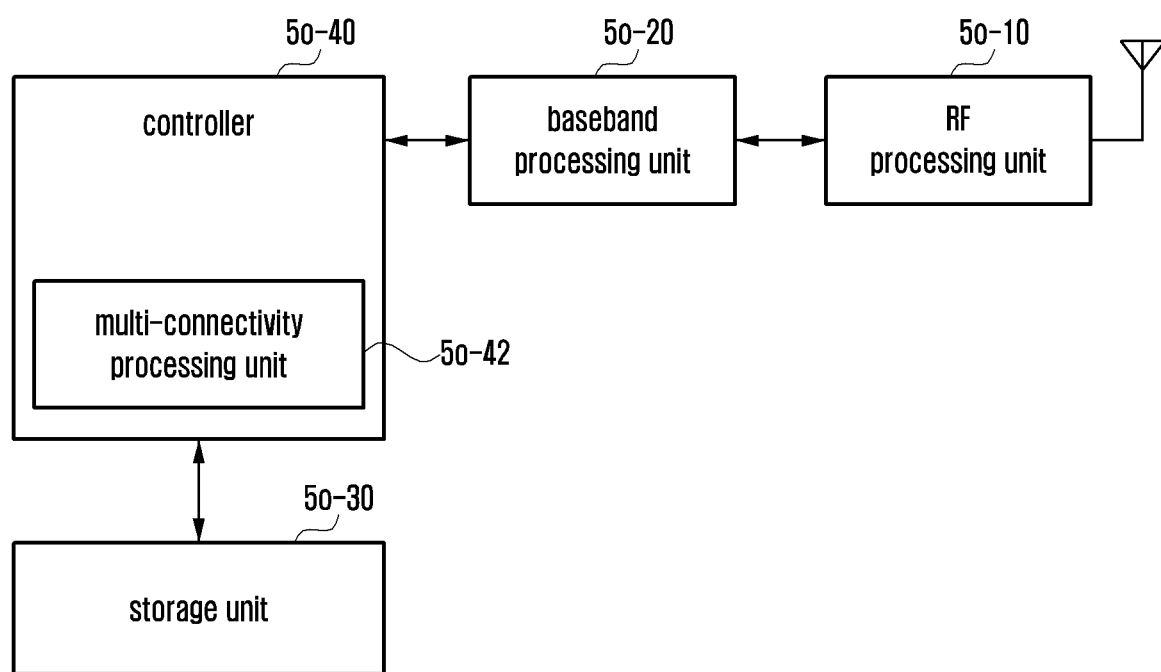

FIG. 5N is a signal flow diagram illustrating signal flows between an UE and an eNB/gNB in a procedure for the UE to transmit uplink data using prearranged resources according to embodiment 5-8 of the present disclosure.

Referring to FIG. 5N, uplink data fulfilling a predetermined condition is generated, the UE 5n-01 transmits the data using the prearranged uplink transmission resources at operation 5n-05. The eNB/gNB 5n-02 may configure the prearranged uplink transmission resources to the UE 5n-01 01 by means of an RRC control message (e.g., message transmitted at operation 5e-10, 5e-20, or 5e-35 of FIG. 5E). The uplink transmission resources may be allocated at a predetermined interval. If the UE 5n-01 fails in transmitting data a predetermined number of times on the prearranged resources, it may perform a random access procedure. The procedure of embodiment 5-8 is capable of reducing battery consumption of UE and service delay and suitable for mMTC, NB-IoT, and URLLC services. The procedure of embodiment 5-8 may is applicable for sensors or devices transmitting data with a predetermined size.

Embodiments 5-1, 5-2, 5-3, 5-4, 5-5, 5-6, 5-7, and 5-8 of the present disclosure are applicable to the cases of using multiple SRs in the environment of using a CA technique, a dual-connectivity and/or a multi-connectivity technique. The 2 SR transmissions scenarios may easily be extended to 3 or more SR transmissions scenarios. That is, it may be possible to use a rule of maintaining or triggering the SR with the highest priority or the shortest interval for the case where multiple SRs are overlapped or initializing a counter to 0 whenever multiple SRs are overlapped and increasing the counter by 1 whenever the SR is transmitted.

FIG. 5O is a block diagram illustrating a configuration of a UE in a wireless communication according to an embodiment of the present disclosure.

Referring to FIG. 5O, the UE includes a RF processing unit 5o-10, a baseband processing unit 5o-20, a storage unit 5o-30, and a controller 5o-40.

The RF processing unit 5o-10 takes charge of signal band conversion and amplification for transmitting signals over a radio channel. That is, the RF processing unit 5o-10 up-converts a baseband signal output from the baseband processing unit 5o-20 to an RF band signal for transmission through antennas and down-converts an RF band signal received through the antenna to a baseband signal. For example, the RF processing unit 5o-10 may include a transmission filter, a reception filter, an amplifier, a mixer, an oscillator, a DAC, and an ADC. Although one antenna is depicted in FIG. 5O, the terminal may include a plurality of antennas. The RF processing unit 5o-10 may include a plurality of RF chains. The RF processing unit 5o-10 may perform beamforming. For beamforming, the RF processing unit 5o-10 may adjust the phases and sizes of the signal transmitted/received through the antennas or antenna elements. The RF processing unit 5o-10 may perform a MIMO operation to receive a signal on multiple layers. The RF processing unit 5o-10 may configure a plurality antennas or antenna elements to perform reception beam sweeping and adjust a reception direction and width for match with the transmission beam.

The baseband processing unit 5o-20 takes charge of conversion between baseband signals and bit strings according to a physical layer protocol of the system. For example, the baseband processing unit 5o-20 performs encoding and modulation on the transmit bit strings to generate complex symbols in data transmission mode. The baseband processing unit 5o-20 also performs demodulation and decoding on the baseband signal from the RF processing unit 5o-10 to recover the received bit strings in data reception mode. For the case of an OFDM system, the baseband processing unit 5o-20 performs encoding and modulation on the transmit bit string to generate complex symbols, maps the complex symbols to subcarriers, performs IFFT on the subcarriers, and inserts a CP to generate OFDM symbols in the data transmit mode. The baseband processing unit 5o-20 splits the baseband signal from the RF processing unit 5o-10 into OFDM symbols, recovers the signals mapped to the subcarriers through FFT, and performs demodulation and decoding to recover the bit strings in the data reception mode.

The baseband processing unit 5o-20 and the RF processing unit 5o-10 take charge of transmitting and receiving signals as described above. Accordingly, the baseband processing unit 5o-20 and the RF processing unit 5o-10 may be referred to as a transmission unit, a reception unit, a transceiver, or a communication unit. At least one of the baseband processing unit 5o-20 and the RF processing unit 5o-10 may include a plurality of communication modules for supporting different radio access technologies. At least one of the baseband processing unit 5o-20 and the RF processing unit 5o-10 may include a plurality of communication modules for processing different frequency bands signals. Examples of the radio access technologies include LTE and NR networks. Examples of the different frequency bands may include SHF band (e.g., 2.5 GHz and 5 GHz) and mmWave bands (e.g., 60 GHz).

The storage unit 5o-30 stores basic programs for operation of the terminal, application programs, and data such as configuration information. The storage unit 5o-30 provides the stored data in response to a request from the controller 5o-40.

The controller 5o-40 controls overall operations of the terminal. For example, the controller 5o-40 controls the baseband processing unit 5o-20 and the RF processing unit 5o-10 to transmit/receive signals. The controller 5o-40 also writes and reads data to and from the storage unit 5o-30. In order to accomplish this, the controller 5o-40 may include at least one processor. For example, the controller 5o-40 may include a CP for controlling communication and an AP for providing higher layer processing, e.g., application layer protocol processing. According to an embodiment of the present disclosure, the controller 5o-40 includes a multi-connectivity processing unit 5o-42.

Figure 5P:
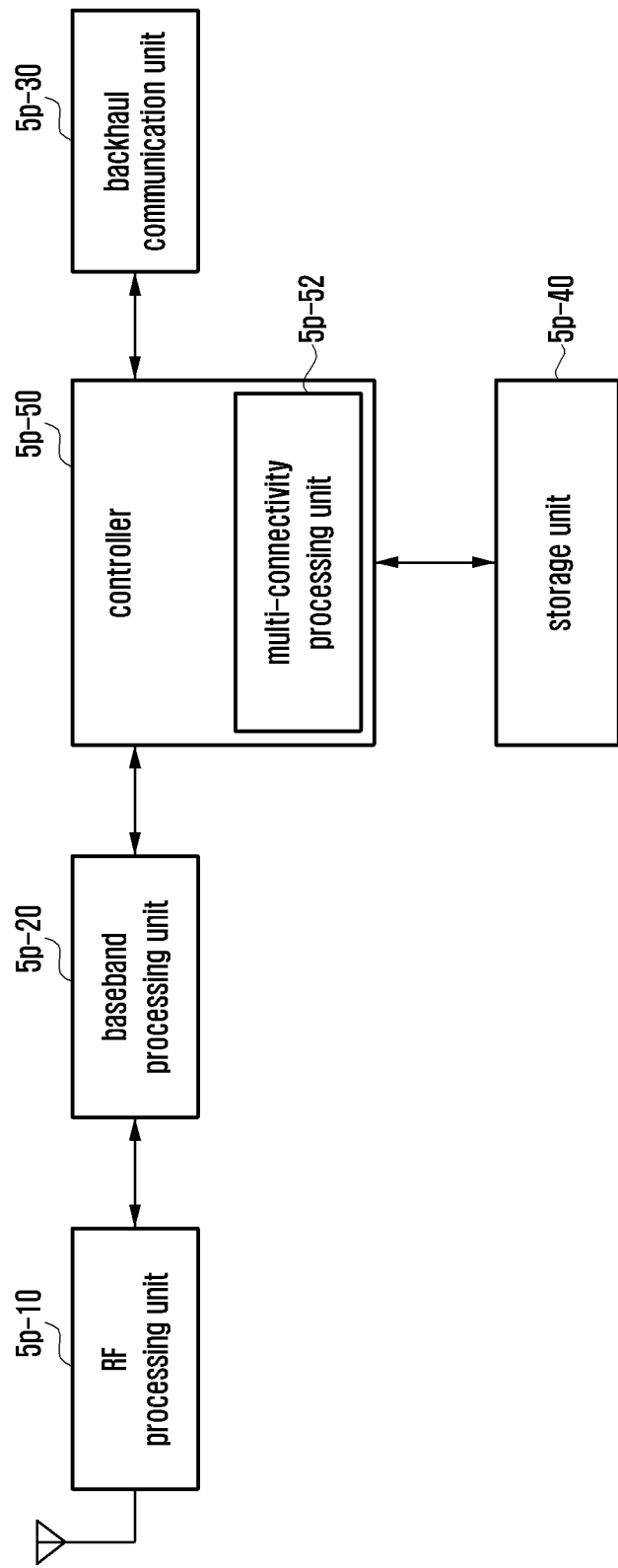
FIG. 5P is a block diagram illustrating a Tx/Rx Point (TRP) in a wireless communication system according to an embodiment of the present disclosure.

FIG. 5P is a block diagram illustrating a Tx/Rx Point (TRP) in a wireless communication system according to an embodiment of the present disclosure.

Referring to FIG. 5P, the TRP includes an RF processing unit 5p-10, a baseband processing unit 5p-20, a backhaul communication unit 5p-30, a storage unit 5p-40, and a controller 5p-50.

The RF processing unit 5p-10 takes charge of signal band conversion and amplification for transmitting signals over a radio channel. That is, the RF processing unit 5p-10 up-converts a baseband signal output from the baseband processing unit 5p-20 to an RF band signal for transmission through antennas and down-converts an RF band signal received through the antennas to a baseband signal. For example, the RF processing unit 5p-10 may include a transmission filter, a reception filter, an amplifier, a mixer, an oscillator, a DAC, and an ADC. Although one antenna is depicted in FIG. 5P, the TRP may include a plurality of antennas. The RF processing unit 5p-10 may include a plurality of RF chains. The RF processing unit 5p-10 may perform beamforming. For beamforming, the RF processing unit 5p-10 may adjust the phases and sizes of the signal transmitted/received through the antennas or antenna elements. The RF processing unit 5p-10 may perform a downlink MIMO operation to transmit a signal on multiple layers.

The baseband processing unit 5p-20 takes charge of converting between baseband signals and bit strings according to a physical layer protocol of the system. For example, the baseband processing unit 5p-20 performs encoding and modulation on the transmit bit strings to generate complex symbols in data transmission mode. The baseband processing unit 5p-20 also performs demodulation and decoding on the baseband signal from the RF processing unit to recover the received bit strings in data reception mode. For the case of an OFDM system, the baseband processing unit 5p-20 performs encoding and modulation on the transmit bit string to generate complex symbols, maps the complex symbols to subcarriers, performs IFFT on the subcarriers, and inserts a CP to generate OFDM symbols in the data transmit mode. The baseband processing unit 5p-20 splits the baseband signal from the RF processing unit 5p-10 into OFDM symbols, recovers the signals mapped to the subcarriers through FFT, and performs demodulation and decoding to recover the bit strings in the data reception mode. The baseband processing unit 5p-20 and the RF processing unit 5p-10 take charge of transmitting and receiving signals as described above. Accordingly, the baseband processing unit 5p-20 and the RF processing unit 5p-10 may be referred to as a transmission unit, a reception unit, a transceiver, or a communication unit.

The communication unit 5p-30 is provided with an interface for communication with other nodes in the network.

The storage unit 5p-40 stores basic programs for operation of the TRP, application programs, and data such as configuration information. In particular, the storage unit 5p-40 may store the information on the bearers allocated to the connected terminal and measurement result reported by the terminal. The storage unit 5p-40 may also store the information as criteria for determining whether to enable or disable multi-connectivity for the terminal. The storage unit 5p-40 provides the stored data in response to a request from the controller 5p-50.

The controller 5p-50 may control overall operations of the TRP. For example, the controller 5p-50 controls the baseband processing unit 5p-20, the RF processing unit 5p-10, and the backhaul communication unit 5p-30 for transmitting/receiving signals. The controller 5p-50 also writes and reads data to and from the storage unit 5p-40. In order to accomplish this, the controller 5p-50 may include at least one processor. According to an embodiment of the present disclosure, the controller 5p-50 includes a multi-connectivity processing unit 5p-52.

Embodiment 6

Figure 6A:
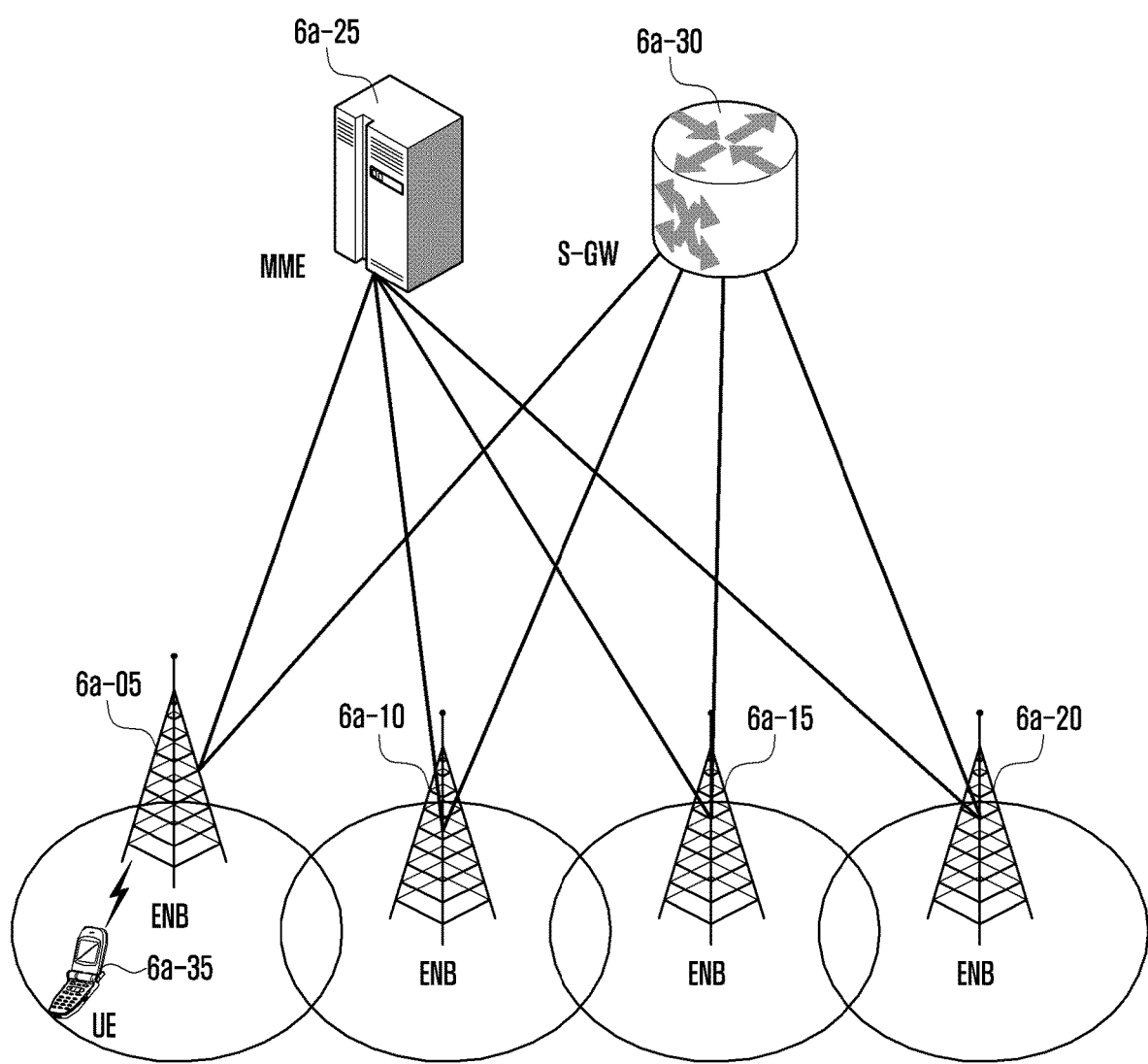
FIG. 6A is a diagram illustrating LTE system architecture according to an embodiment of the present disclosure.

FIG. 6A is a diagram illustrating LTE system architecture for according to an embodiment of the present disclosure.

Referring to FIG. 6A, the radio communication system includes evolved Node Bs (eNBs) 6a-05, 6a-10, 6a-15, and 6a-20; a MME 6a-25; and an S-GW 6a-30. The UE 6a-35 connects to an external network via the eNBs 6a-05, 6a-10, 6a-15, and 6a-20 and the S-GW 6a-30.

The eNBs 6a-05, 6a-10, 6a-15, and 6a-20 are equivalent to the legacy node Bs of the universal mobile telecommunications system (UMTS). The UE 6a-35 connects to one of the eNBs via a radio channel, and the eNB has more control functions than the legacy node B. In the LTE system where all user traffic including real time services such as Voice over IP (VoIP) is served through shared channels, it is necessary to schedule UEs based on scheduling information such as buffer status, power headroom status, and channel status collected from the UEs, an eNB serving the UEs takes charge of this function. It is typical that one eNB hosts a plurality of cells. For example, the LTE system adopts OFDM as a radio access technology to secure a data rate of up to 100 Mbps in a bandwidth of 20 MHz. The LTE system also adopts Adaptive Modulation and Coding (AMC) to determine the modulation scheme and channel coding rate in adaptation to the channel condition of the UE. The S-GW 6a-30 as an entity handling bearers establishes and releases data bearers under the control of the MME 6a-25. The MME 6a-25 takes charge of various control functions and maintains connections with a plurality of eNBs.

Figure 6B:
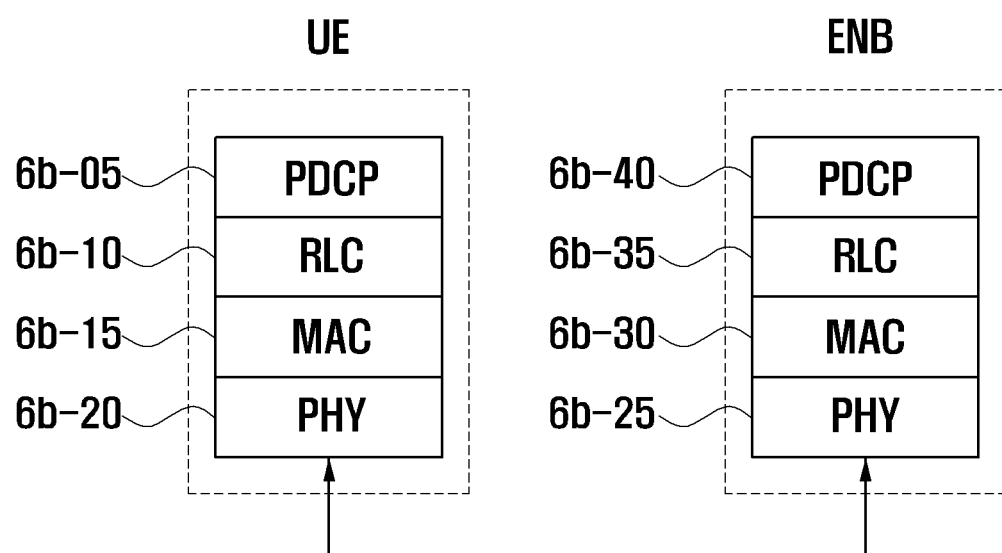
FIG. 6B is a diagram illustrating a protocol stack of an interface between a UE and an eNB in LTE according to an embodiment of the present disclosure.

FIG. 6B is a diagram illustrating a protocol stack of an interface between a UE and an eNB in LTE according to an embodiment of the present disclosure.

Referring to FIG. 6B, the protocol stack of the interface between the UE and the eNB in the LTE system includes a plurality of protocol layers stacked from the bottom to the top: physical layer denoted by reference numbers 6b-20 and 6b-25, MAC layer denoted by reference numbers 6b-15 and 6b-30, radio link control (RLC) layer denoted by reference numbers 6b-10 and 6b-35, and PDCP layer denoted by reference numbers 6b-05 and 6b-40. The PDCP layer denoted by reference numbers 6b-05 and 6b-40 takes charge of compressing/decompressing an IP header. The main functions of the PDCP can be summarized as follows:

Header compression and decompression: ROHC only
Transfer of user data
In-sequence delivery (In-sequence delivery of upper layer PDUs at PDCP re-establishment procedure for RLC AM)
Reordering (For split bearers in DC (only support for RLC AM): PDCP PDU routing for transmission and PDCP PDU reordering for reception)
Duplicate detection (Duplicate detection of lower layer SDUs at PDCP re-establishment procedure for RLC AM)
Retransmission (Retransmission of PDCP SDUs at handover and, for split bearers in DC, of PDCP PDUs at PDCP data-recovery procedure, for RLC AM)
Ciphering and deciphering
Timer-based SDU discard in uplink The RLC layer designated by reference number 6b-10 and 6b-35 takes charge of reformatting PDCP PDUs in order to fit them into the size for ARQ operation. The main functions of the RLC protocol can be summarized as follows:

Transfer of upper layer PDUs
Error Correction through ARQ (only for AM data transfer)
Concatenation, segmentation and reassembly of RLC SDUs (only for UM and AM data transfer)
Re-segmentation of RLC data PDUs (only for AM data transfer)
Reordering of RLC data PDUs (only for UM and AM data transfer)
Duplicate detection (only for UM and AM data transfer)
Protocol error detection (only for AM data transfer)
RLC SDU discard (only for UM and AM data transfer)
RLC re-establishment The MAC layer denoted by reference number 6b-15 and 6b-30 allows for connection of multiple RLC entities established for one UE and takes charge of multiplexing RLC PDUs from the RLC layer into a MAC PDU and demultiplexing a MAC PDU into RLC PDUs. The main functions of the MAC protocol can be summarized as follows:

Mapping between logical channels and transport channels
Multiplexing/demultiplexing of MAC SDUs belonging to one or different logical channels into/from transport blocks (TB) delivered to/from the physical layer on transport channels
Scheduling information reporting
Error correction through HARQ
Priority handling between logical channels of one UE
Priority handling between UEs by means of dynamic scheduling
MBMS service identification
Transport format selection
Padding The PHY layer denoted by reference numbers 6b-20 and 6b-25 takes charge of channel-coding and modulation on higher layer data to generate and transmit OFDM symbols over a radio channel, and demodulating and channel-decoding on OFDM symbols received over the radio channel to deliver the decoded data to the higher layers.

Figure 6C:
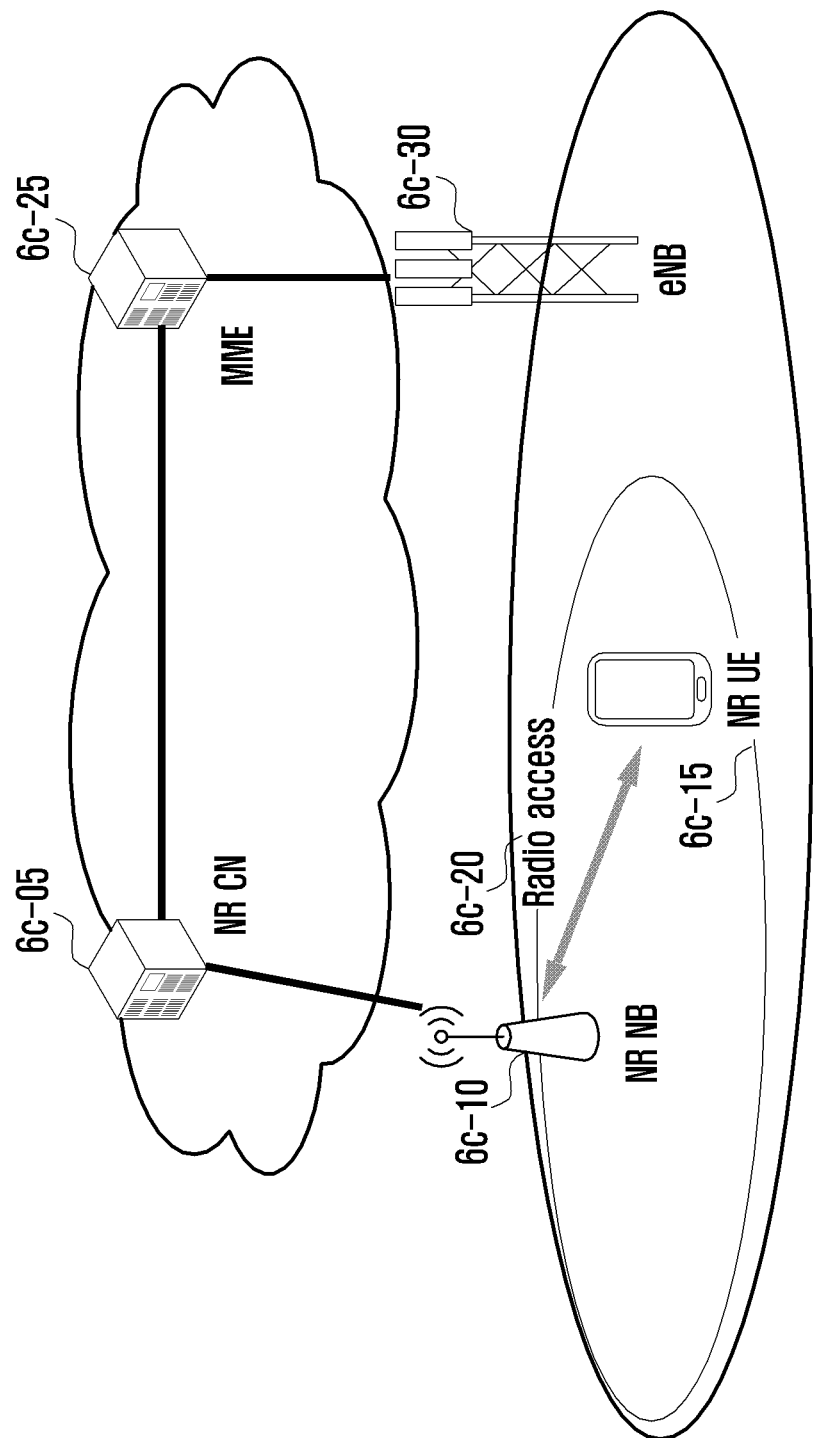
FIG. 6C is a diagram illustrating next generation mobile communication system architecture according to an embodiment of the present disclosure.

FIG. 6C is a diagram illustrating next generation mobile communication system architecture according to an embodiment of the present disclosure.

Referring to FIG. 6C, the next generation mobile communication system includes a radio access network with a next generation base station (New Radio Node B (NR gNB) or NR NB) 6c-10 and a new radio core network (NR CN) 6c-05. A new radio user equipment (NR UE) 6c-15 connects to an external network via the NR NB 6c-10 and the NR CN 6c-05.

In FIG. 6C, the NR NB 6c-10 corresponds to an evolved Node B (eNB) of the legacy LTE. The NR NB 6c-10 to which the NR UE 6c-15 connects through a radio channel 6c-20 is capable of providing superior services in comparison with the legacy eNB. In the next generation mobile communication system where all user traffic is served through shared channels, it is necessary to schedule the NR UEs based on scheduling information such as buffer status, power headroom status, and channel status collected by the NR UEs, and the NR NB 6c-10 takes charge of this function. Typically, one NR NB operate multiple cells. In order to achieve a data rate higher than the peak data rate of legacy LTE systems, the next generation mobile communication system may adopt a beamforming technique along with orthogonal frequency division multiple access (OFDMA) as a radio access technology. The next generation mobile communication system may also adopt an adaptive modulation and coding (AMC) to determine the modulation scheme and channel coding rate in adaptation to the channel condition of the NR UE. The NR CN 6c-05 takes charge of mobility support, bearer setup, and QoS configuration. The NR CN 6c-05 may take charge of a NR UE mobility management function, and a plurality of NR NBs may connect to the NR CN 6c-05. The next generation mobile communication system may also interoperate with a legacy LTE system and, in this case, the NR CN 6c-05 connects to an MME 6c-25 through a network interface. The MME 6c-25 communicates with at least one eNB 6c-30 as a legacy base station.

Figure 6D:
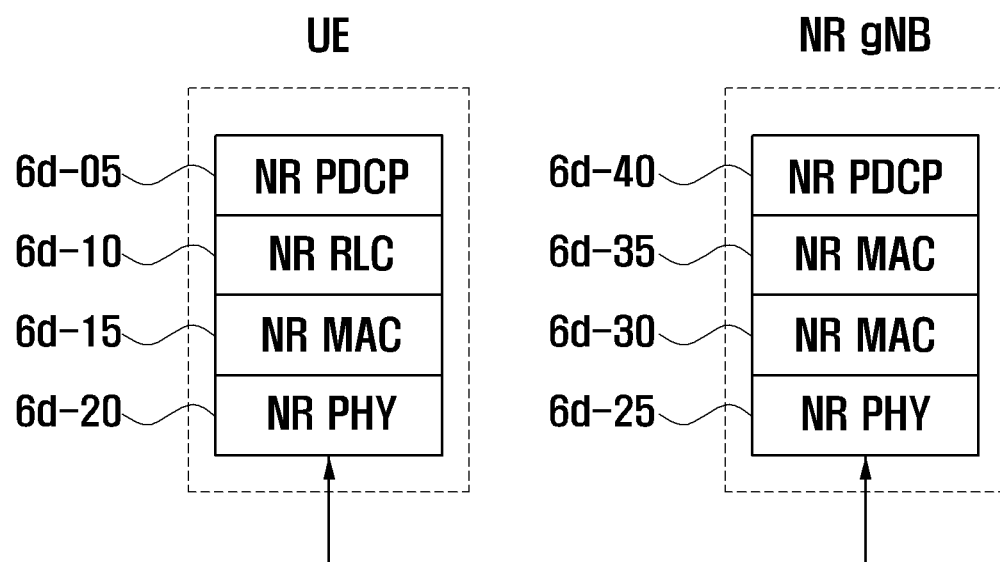
FIG. 6D is a diagram illustrating a protocol stack of an interface between a NR UE and an NR gNB in a next generation mobile communication system according to an embodiment of the present disclosure.

FIG. 6D is a diagram illustrating a protocol stack of an interface between a NR UE and an NR gNB in a next generation mobile communication system according to an embodiment of the present disclosure.

Referring to FIG. 6D, the protocol stack of the interface between a NR UE and an NR gNB in a next generation mobile communication system includes a plurality of protocol layers stacked from the bottom to the top: NR PHY layer denoted by reference numbers 6d-20 and 6d-25, NR MAC) layer denoted by reference numbers 6d-15 and 6d-30, NR radio link control (RLC) layer denoted by reference numbers 6d-10 and 6d-35, and NR DCP layer denoted by reference numbers 6d-05 and 6d-40. The main functions of the NR PDCP layer denoted by reference numbers 6d-05 and 6d-40 may include some of the following functions:

Header compression and decompression: ROHC only
Transfer of user data
In-sequence delivery of upper layer PDUs
PDCP PDU reordering for reception
Duplicate detection of lower layer SDUs
Retransmission of PDCP SDUs
Ciphering and deciphering
Timer-based SDU discard in uplink The PDCP PDU reordering function of an NR PDCP entity is to reorder the PDCP PDUs delivered from a lower layer based on the PDCP sequence number (PDCP SN) and may include delivering the reordered data to an upper layer, recording the missing PDCP PDUs among the reordered PDCP PDUs, transmitting a status report indicating the missing PDCP PDUs to the sender, and requesting for retransmission of the missing PDCP PDUs.

The main functions of the NR RLC layer denoted by reference numbers 6d-10 and 6d-35 may include some of the following functions.

Transfer of upper layer PDUs
In-sequence delivery of upper layer PDUs
Out-of-sequence delivery of upper layer PDUs
Error Correction through ARQ
Concatenation, segmentation and reassembly of RLC SDUs
Re-segmentation of RLC data PDUs
Reordering of RLC data PDUs
Duplicate detection
Protocol error detection
RLC SDU discard
RLC re-establishment The in-sequence delivery function of an NR RLC entity is to deliver the RLC SDUs received from the lower layer to the upper layer and may include reassembling, when multiple segmented RLC SDUs constituting an original RLC SDU, the RLC SDUs and delivering the reassembled RLC SDU to the upper layer, reordering the received RLC PDUs based on the RLC SN or PDCP SN, recording the missing RLC PDUs among the reordered RLC PDUs, transmitting a status report indicating the missing RLC PDUs to the sender, requesting for retransmission of the missing RLC PDUs, and delivering, when there is an missing RLC PDU, the RLC PDUs before the missing RLC PDU in sequence, delivering, if a predetermined timer expires even when there is any missing RLC SDU, all RLC SDUs received before the start of the timer to the upper layer in sequence, or delivering, if a predetermined timer expires even when there is any missing RLC SDU, all RLC SDUs received until then to the upper layer in sequence.

The out-of-sequence delivery function of an NR RLC entity is to deliver the RLC SDUs received from the lower layer to the upper layer out of order and may include reassembling, when multiple segmented RLC SDUs constituting an original RLC SDU, the segmented RLC SDUs and delivering the reassembled RLC SDUs to the upper layer, arranging the received RLC PDUs based on the RLC SN or PDCP SN, recording the SN of the missing RLC PDUs.

In the NR MAC layer denoted by reference number 6d-15 and 6d-30, a MAC entity may be connected to multiple NR RLC entities, and the main functions of the NR MAC entity may include some of the following functions:

Mapping between logical channels and transport channels
Multiplexing/demultiplexing of MAC SDUs
Scheduling information reporting
Error correction through HARQ
Priority handling between logical channels of one UE
Priority handling between UEs by means of dynamic scheduling
MBMS service identification
Transport format selection
Padding The NR PHY layer denoted by reference number 6d-20 and 6d-25 takes charge of channel-coding and modulation on higher layer data to generate and transmit OFDM symbols over a radio channel, and demodulating and channel-decoding on OFDM symbols received over the radio channel to deliver the decoded data to the higher layers.

Figure 6E:
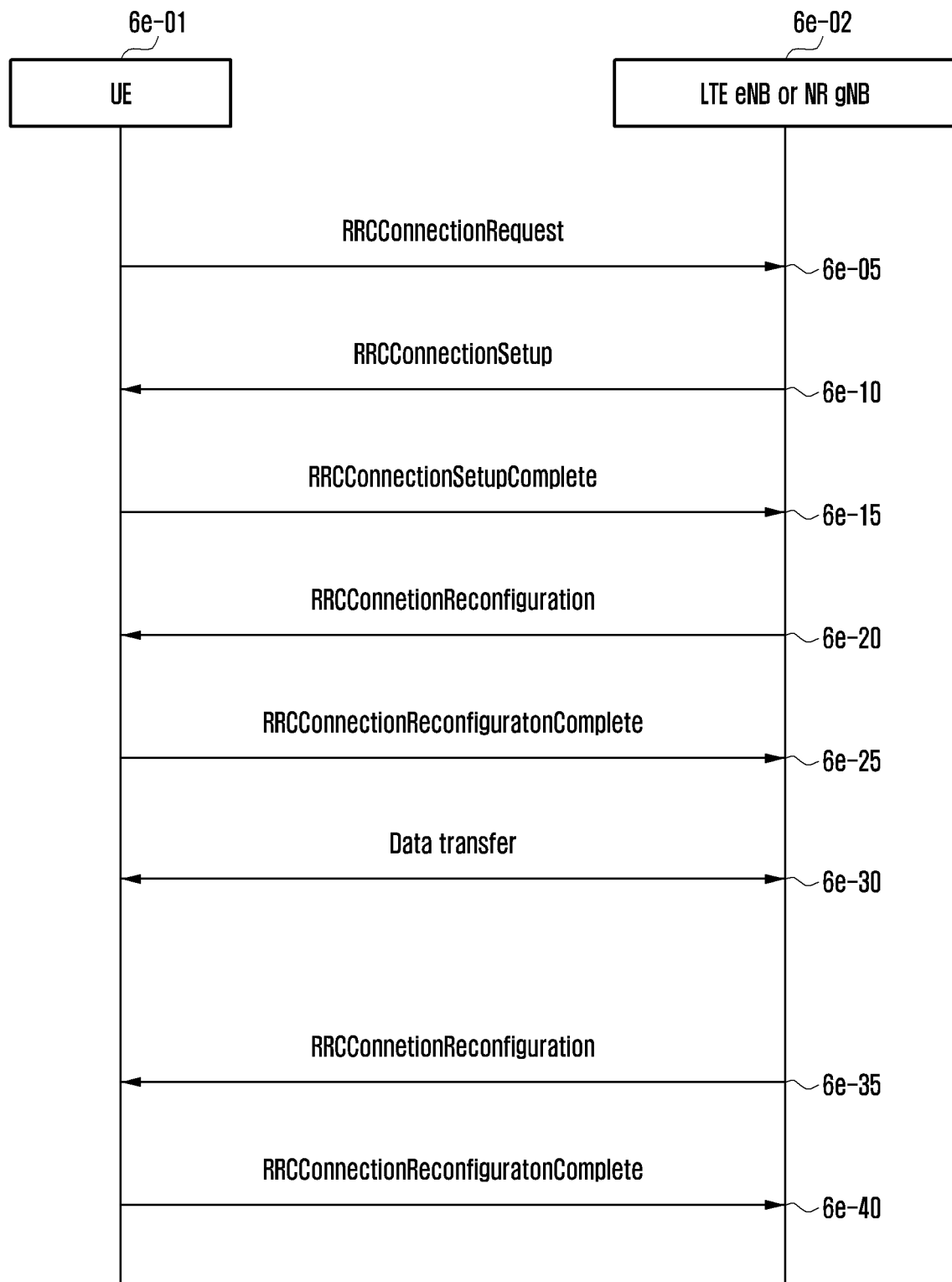
FIG. 6E is a diagram illustrating a procedure for establishing a connection between a UE and a gNB for data communication and configuring information used for scheduling request of the UE according to an embodiment of the present disclosure.

FIG. 6E is a signal flow diagram illustrating signal flows between a UE and an eNB or NR gNB for establishing respective protocol layer entities in the UE in a next generation mobile communication system according to an embodiment of the present disclosure.

Referring to FIG. 6E, a diagram illustrating a procedure for establishing a connection between a UE and a gNB for data communication and configuring information used for scheduling request of the UE according to an embodiment of the present disclosure.

If there is data to transmit, the UE 6e-01 in the idle mode (idle mode UE) performs an RRC connection establishment procedure with an LTE eNB/NR gNB 6e-02. The UE 6e-01 achieves uplink transmission synchronization with the eNB/gNB 6e-02 through a random access procedure and then transmits an RRCConnectionRequest message to the eNB/gNB 6e-02 at operation 6e-05. This message includes an identifier of the UE 6e-01 and cause of the connection request. The eNB/gNB 6e-02 transmits an RRCConnection-Setup message to the UE 6e-01 at operation 6e-10. This message may include RRC connection configuration information, UE's scheduling request-related information, and protocol layers configuration information. The UE's scheduling request-related information may include scheduling request (SR) information, i.e., number of SRs, number of transmission resource bits per SR, per-SR priority information, per-SR transmission resources (including frequency, time, and period), SR configuration information for use in CA mode and dual connectivity (DC) mode or multi-connectivity mode, modulation scheme to be applied for SR, and mapping between SR and numerology (or subscriber spacing or OFDM frequency spacing) or TTI. The network may configure multiple SRs to a UE. If the network configures multiple SRs to the UE, the UE may be configured to generate a plurality of buffer status reports (BSRs) equal in number to the SRs. The RRC connection is also referred to as signaling radio bearer (SRB) and used to exchange RRC messages as control messages between the UE and the eNB/gNB. After establishing an RRC Connection, the UE 6e-01 transmits an RRCConnectionSetupComplete message to the eNB/gNB 6e-02 at operation 6e-15. The eNB/gNB 6e-02 transmits an RRCConnectionReconfiguration message to the UE 6e-01 for establishing a data radio bearer (DRB) at operation 6e-20. This message may include the information for use in scheduling request of the UE. The information for use in scheduling request of the UE may include scheduling request (SR) information, i.e., number of SRs, number of transmission resource bits per SR, per-SR priority information, per-SR transmission resources (including frequency, time, and period), SR configuration information for use in CA mode and dual connectivity (DC) mode or multi-connectivity mode, modulation scheme to be applied for SR, and mapping between SR and numerology (or subscriber spacing or OFDM frequency spacing) or TTI. The network may configure multiple SRs to a UE. If the network configures multiple SRs to the UE, the UE may be configured to generate a plurality of buffer status reports (BSRs) equal in number to the SRs. This message also includes configuration information of DRB for user data, and the UE 6e-01 configures a DRB and per-layer functions based on this configuration information and transmits an RRCConnectionReconfigurationComplete message to the eNB/gNB 6e-02 at operation 6e-25. When all of the above operations have been completed, the UE 6e-01 and the eNB/gNB 6e-02 communicate data at operation 6e-30. During the data communication, if necessary, the eNB/gNB 6e-02 may transmit the RRCConnectionReconfiguration message to the UE 6e-01 at operation 6e-35 to reconfigure the UE's SR configuration information. The information for use in scheduling request of the UE may include scheduling request (SR) information, i.e., number of SRs, number of transmission resource bits per SR, per-SR priority information, per-SR transmission resources (including frequency, time, and period), SR configuration information for use in CA mode and dual connectivity (DC) mode or multi-connectivity mode, modulation scheme to be applied for SR, and mapping between SR and numerology (or subscriber spacing or OFDM frequency spacing) or TTI. The network may configure multiple SRs to a UE. If the network configures multiple SRs to the UE, the UE may be configured to generate a plurality of buffer status reports (BSRs) equal in number to the SRs.

If the SR configuration has been completed according to the RRCConnectionReconfiguration message, the UE 6e-01 transmits the RRCConnectionReconfigurationComplete message to the eNB/gNB 6e-02 at operation 6e-40.

Figure 6F:
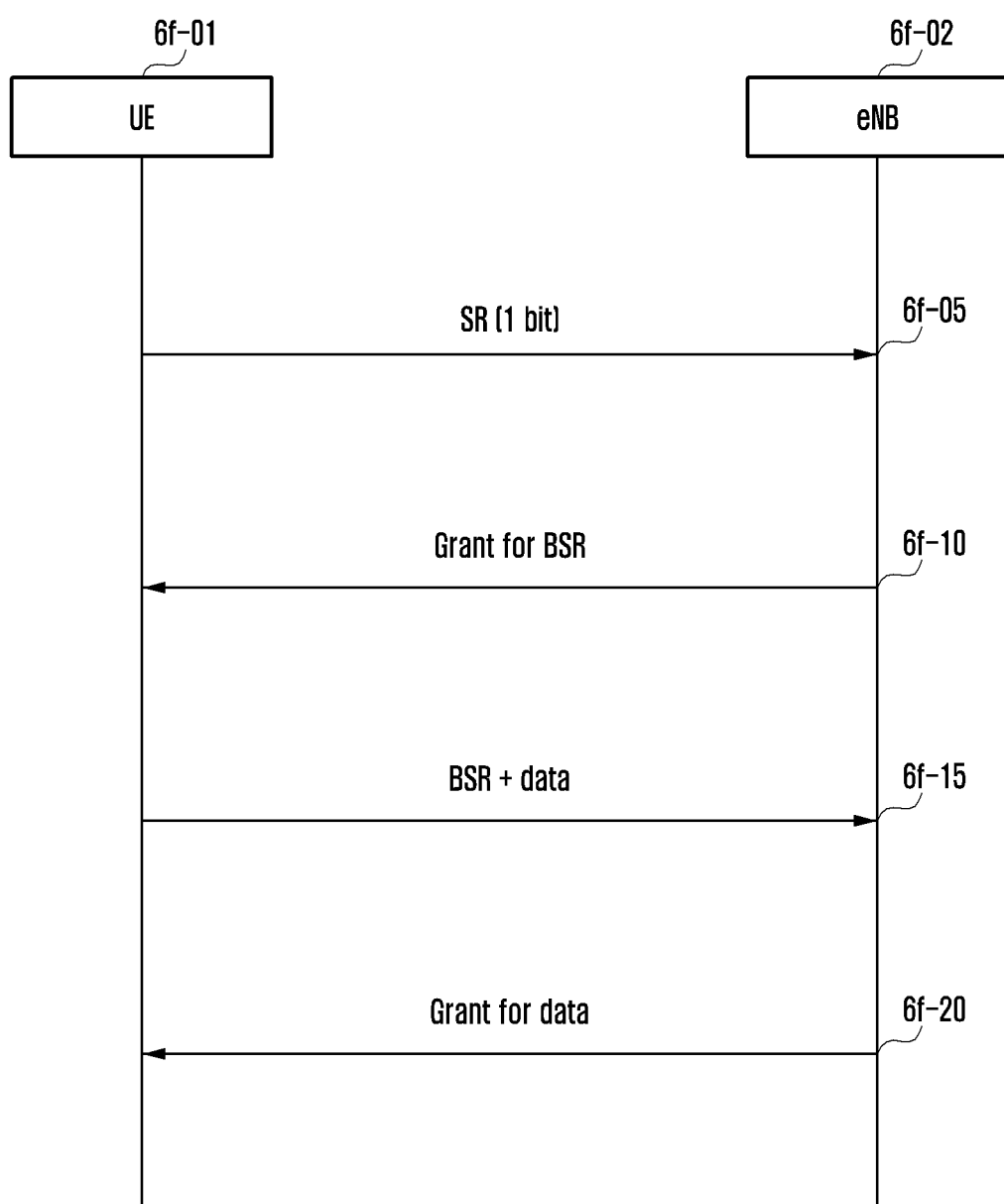
FIG. 6F is a signal flow diagram illustrating signal flows between a UE and an eNB/gNB in a procedure for the UE to make a scheduling request to the eNB/gNB for uplink resources to transmit uplink data according to embodiment 6-1 of the present disclosure.

FIG. 6F is a signal flow diagram illustrating signal flows between a UE and an eNB/gNB in a procedure for the UE to make a scheduling request to the eNB/gNB for uplink resources to transmit uplink data according to embodiment 6-1 of the present disclosure.

Referring to FIG. 6F, if a predetermined condition is fulfilled, the UE 6f-01 transmits an SR to the eNB/gNB 6f-02 at operation 6f-05. The predetermined condition may be that a predetermined uplink data is generated. If there is no resource allocated for SR, the UE 6f-01 may perform a random access procedure. It may also be possible to perform the random access procedure when no resource for SR is allocated in spite of a predetermined number of SR transmissions. If the SR is received from the UE 6f-01 at operation 6f-05, the eNB/gNB 6f-02 may perform scheduling to allocate resources to the UE 6f-01 in the light of the currently available resources. The eNB/gNB 6f-05 transmits the UE 6f-01 a grant for BSR to allocate uplink resources to the UE 6f-01 at operation 6f-10. If the UE 6f-01 is allocated the resources, it generates and transmits a BSR to the eNB/gNB 6f-02 using the allocated resources at operation 6f-15. If the uplink transmission resources are large enough to transmit the BSR and additional data, the UE 6f-01 may transmit data along with the BSR at operation 6f-15. The eNB/gNB 6f-02 checks the BSR and performs scheduling in the light of the currently available resources to allocate uplink transmission resources to the UE 6f-01 at operation 6f-20.

Figure 6G:
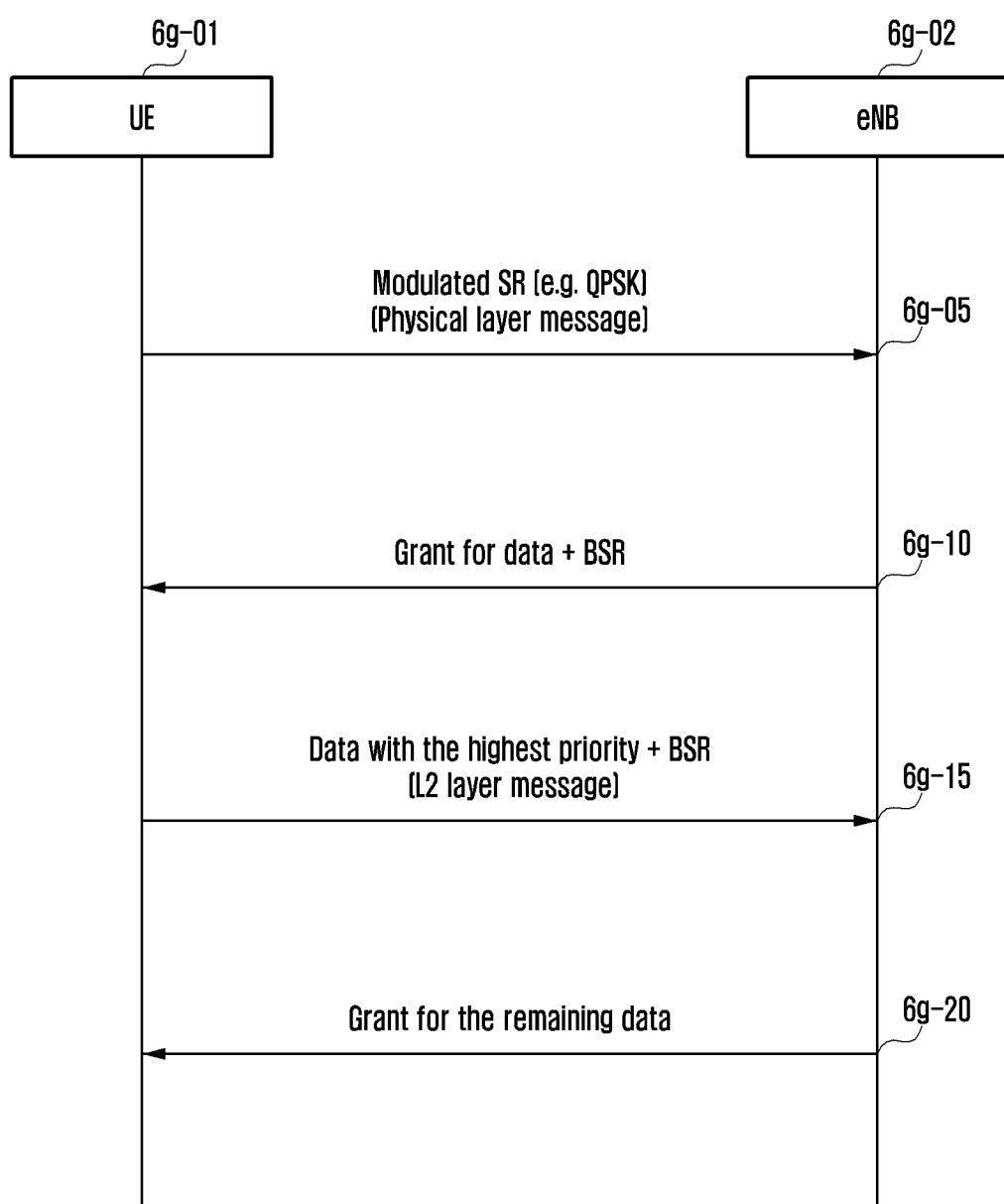
FIG. 6G is a signal flow diagram illustrating signal flows between an UE and an eNB/gNB in a procedure for the UE to make a scheduling request to the network for uplink resources to transmit uplink data according to embodiment 6-2 of the present disclosure.

FIG. 6G is a signal flow diagram illustrating signal flows between a UE and an eNB/gNB in a procedure for the UE to make a scheduling request to the network for uplink resources to transmit uplink data according to embodiment 6-2 of the present disclosure.

Referring to FIG. 6G, in embodiment 6-1 the UE performs modulation on the SR to be transmitted. Examples of the modulation may include binary phase shift keying (BPSK), quadrature phase shift keying (QPSK), 16 quadrature amplitude modulation (16QAM), 64QAM, and 256QAM. Using one of the above modulation schemes, the UE may generate a symbol conveying a single bit or multi-bit information. A BPSK symbol represents 1 bit, a QPSK symbol represents 2 bits, a 16QAM symbol represents 4 bits, a 64QAM symbol represents 6 bits, and a 256QAM symbol represents 8 bits.

In FIG. 6G, if a predetermined condition is fulfilled, the UE 6g-01 transmits an SR to the eNB/gNB 6g-02 at operation 6g-05. The predetermined condition may be that a predetermined uplink data is generated. If there is no resource allocated for SR, the UE 6g-01 may perform a random access procedure. It may also be possible to perform the random access procedure when no resource for SR is allocated in spite of a predetermined number of SR transmissions. The eNB 6g-02 may transmit the information indicating a modulation scheme for use by the UE 6g-01 in transmitting an SR by means of an RRC control message (e.g., message transmitted at operation 6e-10, 6e-20, or 6e-35 of FIG. 6E). It may also be possible, for a certain cause, to use an L1 message (physical layer message downlink control information (DCI)) or an L2 message (MAC control element (MAC CE)) to indicate the modulation scheme for use in transmitting an SR. The certain cause may be change of channel condition or channel pathloss. Then, the UE 6g-01 may transmits the information on the priority of the data, buffer status associated with the data with the highest priority, all data in the buffer, or a specific logical channel along with the SR using the extra bits secured through modulation. If the SR is received from the UE 6g-01 at operation 6g-05, the eNB/gNB 6g-02 checks the buffer status of UE 6g-01 in association with the data with the highest priority, all data in the buffer, or a specific logical channel, and performs scheduling in the light of the currently available resources based on this information to allocate resources to the UE 6g-01. It may be prearranged that which of data with the highest priority, all data stored in the buffer, and data on a predetermined logical channel are checked for transmitting the buffer status information. The eNB/gNB 6g-02 allocates resources for uplink data with the highest priority and BSR to the UE 6g-01 at operation 6g-10. If the uplink resources are allocated, the UE 6g-01 generates and transmits a BSR to the eNB/gNB 6g-02 at operation 6g-15. If the uplink transmission resources are large enough to transmit the BSR and additional data, the UE 6g-01 may transmit data with the highest priority along with the BSR at operation 6g-15. The eNB/gNB 6g-02 checks the BSR and performs scheduling in the light of the currently available resources to allocate uplink transmission resources to the UE 6g-01 at operation 6g-20.

Figure 6H:
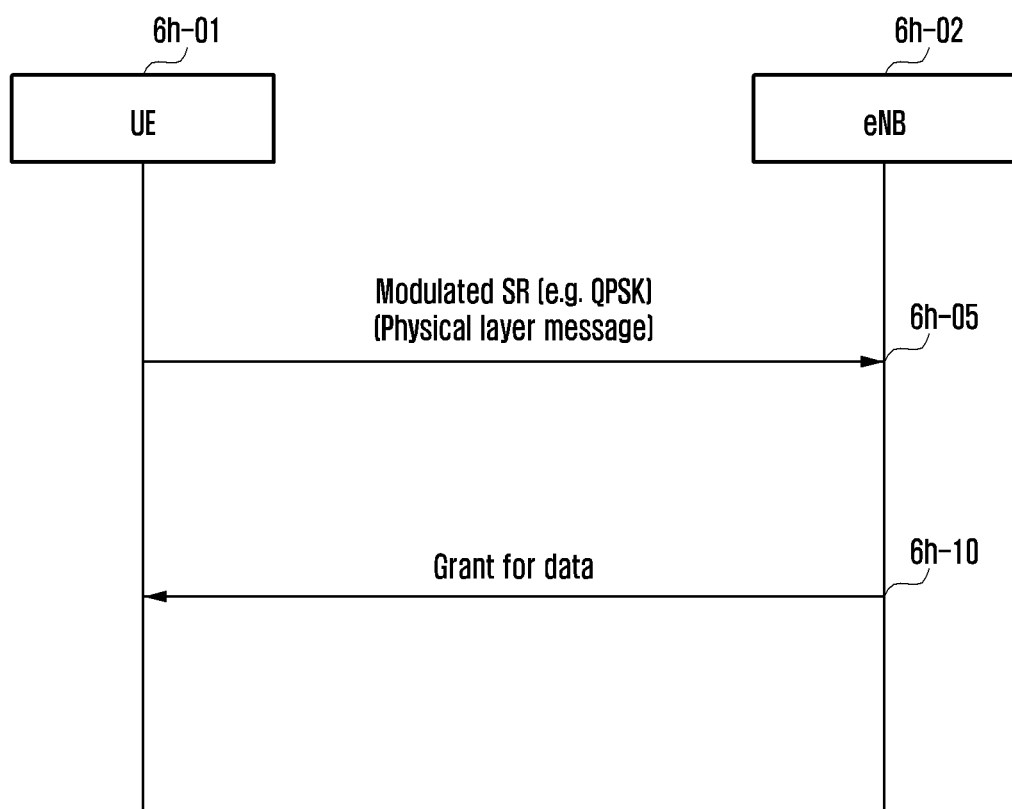
FIG. 6H is a signal flow diagram illustrating signal flows between an UE and an eNB/gNB in a procedure for the UE to make a scheduling request to the network for uplink resources to transmit uplink data according to embodiment 6-3 of the present disclosure.

FIG. 6H is a signal flow diagram illustrating signal flows between an UE and an eNB/gNB in a procedure for the UE to make a scheduling request to the network for uplink resources to transmit uplink data according to embodiment 6-3 of the present disclosure.

In embodiment 6-3 of the present disclosure, the UE performs modulation on the SR to be transmitted. Examples of the modulation may include BPSK, QPSK, 16QAM, 64QAM, and 256QAM. Using one of the above modulation schemes, the UE may generate a symbol conveying a single bit or multi-bit information. A BPSK symbol represents 1 bit, a QPSK symbol represents 2 bits, a 16QAM symbol represents 4 bits, a 64QAM symbol represents 6 bits, and a 256QAM symbol represents 8 bits.

Referring to FIG. 6H, if a predetermined condition is fulfilled, the UE 6h-01 transmits an SR to the eNB/gNB 6h-02 at operation 6h-05. The predetermined condition may be that a predetermined uplink data is generated. If there is no resource allocated for SR, the UE 6h-01 may perform a random access procedure. It may also be possible to perform the random access procedure when no resource for SR is allocated in spite of a predetermined number of SR transmissions. The eNB 6h-02 may transmit the information indicating a modulation scheme for use by the UE 6h-01 in transmitting an SR by means of an RRC control message (e.g., message transmitted at operation 6e-10, 6e-20, or 6e-35 of FIG. 6E). It may also be possible, for a certain cause, to use an L1 message (physical layer message downlink control information (DCI)) or an L2 message (MAC control element (MAC CE)) to indicate the modulation scheme for use in transmitting an SR. The certain cause may be change of channel condition or channel pathloss. If the network configures a modulation scheme to transmit multibit information with an SR, this means that the SR can be used as BSR. This may also be interpreted that the buffer status information is transmitted using the resources periodically allocated for BSR without SR. The UE 6h-01 may transmit an SR along with the buffer status information about data with the highest priority, all data stored in the buffer, or data on a predetermined logical channel using the modulation scheme. It may be prearranged that which of data with the highest priority, all data stored in the buffer, and data on a predetermined logical channel are checked for transmitting the buffer status information. If the SR is received from the UE 6h-01 at operation 6h-05, the eNB/gNB 6h-02 checks the buffer status of UE 6h-01 in association with the data with the highest priority, all data stored in the buffer, or data on a predetermined logical channel and performs scheduling in the light of the currently available resources based on this information to allocate resources to the UE 6h-01. The eNB/gNB 6h-02 allocates resources for uplink data with the highest priority or for all data stored in the buffer and BSR to the UE 6h-01 at operation 6h-10. If the uplink resources are allocated, the UE 6h-01 may transmit uplink data using the allocated resources. The procedure of embodiment 6-3 is capable of reducing battery consumption of UE and service delay and suitable for mMTC, NB-IoT, and URLLC services In embodiments 6-2 and 6-3 of the present disclosure, a first SR transmission rule may be used; the first rule is as follows:

In the present disclosure, a UE may perform modulation on an SR to transmit extra information. The extra information may be a priority of the data or buffer status. The eNB/gNB may transmit SR configuration information to a UE by means of an RRC control message, L1 signaling (DCI), or L2 signaling (MAC CE). The SR configuration information may include information indicating a modulation scheme for modulating SR.

The first SR transmission rule of the UE is as follows:

If an RRC control message is received from an eNB and if a first condition is fulfilled, the UE performs SR according to a first method.

If an RRC control message is received from an eNB and if a second condition is fulfilled, the UE performs SR according to a second method.

If an RRC control message is received from an eNB and if a third condition is fulfilled, the UE performs SR according to a third method.

The first condition is that an RRC control message includes information indicating a modulation scheme and SR transmission resources are not overlapped in time with HARQ ACK/NACK transmission resources.

The second condition is that an RRC control message includes no information indicating a modulation scheme and SR transmission resources are not overlapped in time with HARQ ACK/NACK transmission resources.

The third condition is that SR transmission resources are overlapped in time with the HARQ ACK/NACK transmission resources.

The first method is to use a modulation scheme indicated in the RRC control message to transmit the SR along with extra information, which is priority of data or buffer status.

The second method is to transmit the SR without being modulated.

The third method is to transmit HARQ ACK/NACK without being modulated on the SR transmission resources.

In embodiments 6-2 and 6-3 of the present disclosure, a second SR transmission rule may be used; the second rule is as follows:

In the present disclosure, a UE may perform modulation on an SR to transmit extra information. The extra information may be a priority of the data or buffer status. The eNB/gNB may transmit SR configuration information to a UE by means of an RRC control message, L1 signaling (DCI), or L2 signaling (MAC CE). The SR configuration information may include information indicating a modulation scheme for modulating SR.

The second SR transmission rule of the UE is as follows:

If an RRC control message is received from an eNB and if a first condition is fulfilled, the UE performs SR according to a first method.

If an RRC control message is received from an eNB and if a second condition is fulfilled, the UE performs SR according to a second method.

If an RRC control message is received from an eNB and if a third condition is fulfilled, the UE perform SR according to a third method.

The first condition is that an RRC control message includes information indicating a modulation scheme and SR transmission resources are not overlapped in time with HARQ ACK/NACK transmission resources.

The second condition is that an RRC control message includes no information indicating a modulation scheme and SR transmission resources are not overlapped in time with HARQ ACK/NACK transmission resources.

The third condition is that SR transmission resources are overlapped with the HARQ ACK/NACK transmission resources.

The first method is to use a modulation scheme indicated in the RRC control message to transmit the SR along with extra information, which is priority of data or buffer status.

The second method is to determine, at the UE, channel condition and select the best modulation scheme to modulate the SR for transmitting the SR with extra information, which is priority of data or buffer status.

Third method is to transmit HARQ ACK/NACK without being modulated on the SR transmission resources.

The UE may determine the channel condition based on radio link monitoring (RLM) or pathloss. In this case, the eNB does not know the modulation scheme used by the UE and thus may perform blind decoding.

In embodiments 6-2 and 6-3 of the present disclosure, a third SR transmission rule may be used; the third rule is as follows:

In the present disclosure, a UE may perform modulation on an SR to transmit extra information. The extra information may be a priority of the data or buffer status. The eNB/gNB may transmit SR configuration information to a UE by means of an RRC control message, L1 signaling (DCI), or L2 signaling (MAC CE). The SR configuration information may include information indicating a modulation scheme for modulating SR.

The third SR transmission rule of the UE is as follows:

If an RRC control message is received from an eNB and if a first condition is fulfilled, the UE performs SR according to a first method.

If an RRC control message is received from an eNB and if a second condition is fulfilled, the UE performs SR according to a second method.

If an RRC control message is received from an eNB and if a third condition is fulfilled, the UE perform SR according to a third method.

The first condition is that an RRC control message includes information indicating a modulation scheme and SR transmission resources are not overlapped in time with HARQ ACK/NACK transmission resources.

The second condition is that an RRC control message includes no information indicating a modulation scheme and SR transmission resources are not overlapped in time with HARQ ACK/NACK transmission resources.

The third condition is that SR transmission resources are overlapped with the HARQ ACK/NACK transmission resources.

The first method is to set the modulation scheme of the RRC control message to default, determine, at the UE, channel status to select the best modulation scheme to modulate the SR for transmitting the SR with extra information, which is priority of data or buffer status.

The second method is to determine, at the UE, channel condition to select the best modulation scheme and transmit the modulated SR.

The third method is to transmit HARQ ACK/NACK without being modulated on the SR transmission resources.

The UE may determine the channel condition based on radio link monitoring (RLM) or pathloss. In this case, the eNB does not know the modulation scheme used by the UE and thus may perform blind decoding.

In embodiments 6-2 and 6-3 of the present disclosure, a fourth SR transmission rule may be used; the fourth rule is as follows:

In the present disclosure, a UE may perform modulation on an SR to transmit extra information to the eNB. The extra information may be a priority of the data or buffer status. The eNB/gNB may transmit SR configuration information to a UE by means of an RRC control message, L1 signaling (DCI), or L2 signaling (MAC CE). The SR configuration information may include information indicating a modulation scheme for modulating SR.

The fourth SR transmission rule of the UE is as follows:

If an RRC control message is received from an eNB and if a first condition is fulfilled, the UE performs SR according to a first method.

If an RRC control message is received from an eNB and if a second condition is fulfilled, the UE performs SR according to a second method.

If an RRC control message is received from an eNB and if a third condition is fulfilled, the UE perform SR according to a third method.

The first condition is that an RRC Control message, L1 signaling (DCI), or L2 signaling (MAC CE) includes information indicating a modulation scheme and SR transmission resources are not overlapped in time with HARQ ACK/NACK transmission resources.

The second condition is that an RRC Control message, L1 signaling (DCI), or L2 signaling (MAC CE) includes no information indicating a modulation scheme and SR transmission resources are not overlapped in time with HARQ ACK/NACK transmission resources.

The third condition is that SR transmission resources are overlapped in time with the HARQ ACK/NACK transmission resources.

The first method is to use a modulation scheme indicated in the RRC Control message, L1 signaling (DCI), or L2 signaling (MAC CE) to transmit the SR along with extra information, which is priority of data or buffer status.

The second method is to transmit the SR without being modulated.

The third method is to transmit HARQ ACK/NACK without being modulated on the SR transmission resources.

In the case of using a MAC CE in the eNB, it may be possible to define a reserved logical channel ID (LCID) newly for use in indicating the modulation scheme for modulating SR.

In embodiments 6-2 and 6-3 of the present disclosure, a fifth SR transmission rule may be used; the fifth rule is as follows:

In the present disclosure, a UE may perform modulation on an SR to transmit extra information. The extra information may be a priority of the data or buffer status. The eNB/gNB may transmit SR configuration information to a UE by means of an RRC control message, L1 signaling (DCI), or L2 signaling (MAC CE). The SR configuration information may include information indicating a modulation scheme for modulating SR.

The fifth SR transmission rule of the UE is as follows:

If an RRC control message is received from an eNB and if a first condition is fulfilled, the UE performs SR according to a first method.

If an RRC control message is received from an eNB and if a second condition is fulfilled, the UE performs SR according to a second method.

If an RRC control message is received from an eNB and if a third condition is fulfilled, the UE perform SR according to a third method.

The first condition is that an RRC Control message, L1 signaling (DCI), or L2 signaling (MAC CE) includes information indicating a modulation scheme and SR transmission resources are not overlapped in time with HARQ ACK/NACK transmission resources.

The second condition is that an RRC Control message, L1 signaling (DCI), or L2 signaling (MAC CE) includes no information indicating a modulation scheme and SR transmission resources are not overlapped in time with HARQ ACK/NACK transmission resources.

The third condition is that SR transmission resources are overlapped with the HARQ ACK/NACK transmission resources.

The first method is to use a modulation scheme indicated in the RRC Control message, L1 signaling (DCI), or L2 signaling (MAC CE) to transmit the SR along with extra information, which is priority of data or buffer status.

The second method is to determine, at the UE, channel condition to select the best modulation scheme for modulating SR.

The third method is to transmit HARQ ACK/NACK without being modulated on the SR transmission resources.

The UE may determine the channel condition based on radio link monitoring (RLM) or pathloss. In this case, the eNB does not know the modulation scheme used by the UE and thus may perform blind decoding.

In the case of using a MAC CE in the eNB, it may be possible to define a reserved logical channel ID (LCID) newly for use in indicating the modulation scheme for modulating SR.

Figure 6I:
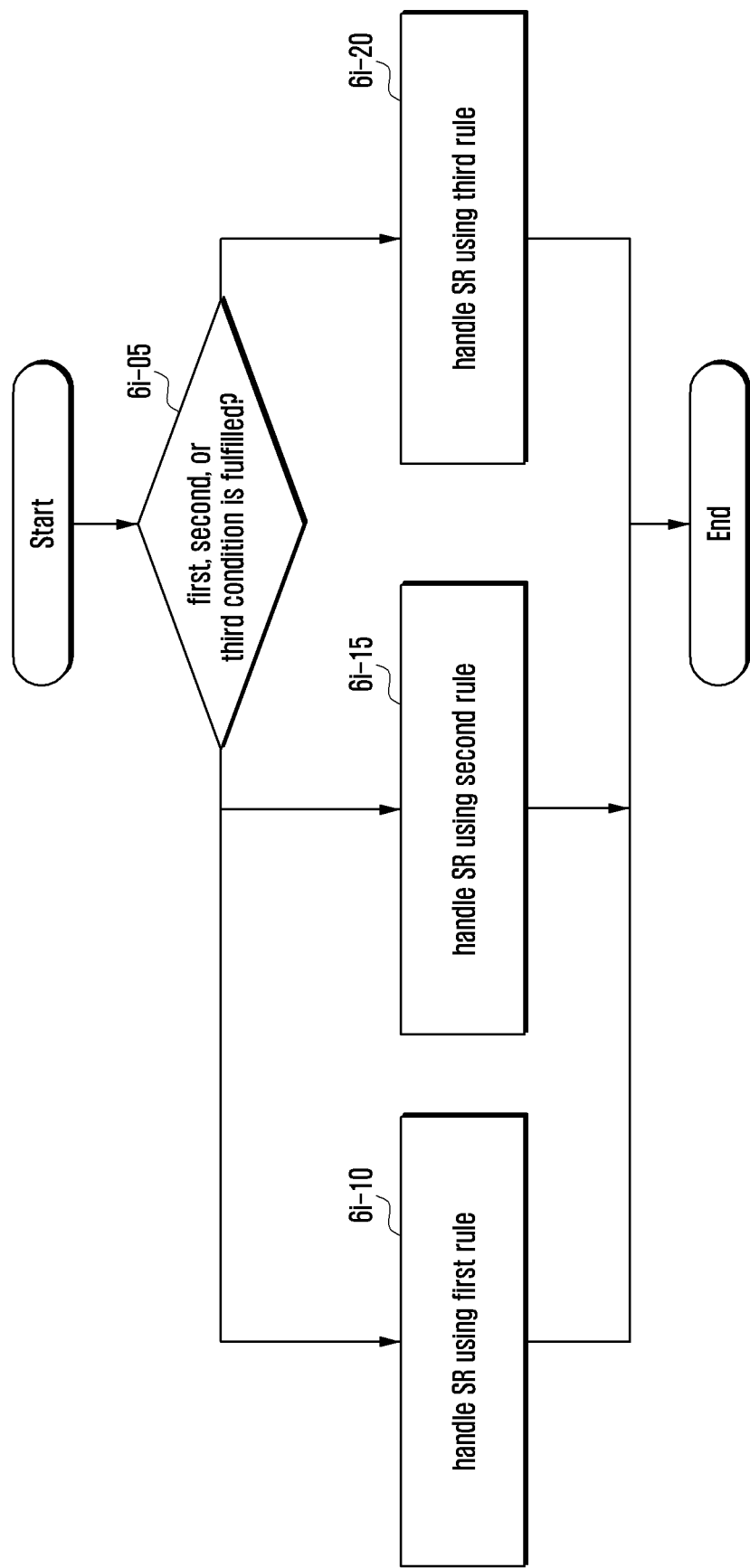
FIG. 6I is a flowchart illustrating an operation of a UE for handling SR using the first to fifth SR transmission rules selectively according to an embodiment of the present disclosure.

FIG. 6I is a flowchart illustrating an operation of a UE for handling SR using the first to fifth SR transmission rules selectively according to an embodiment of the present disclosure.

Referring to FIG. 6I, if it is determined at operation 6i-05 that the first condition is fulfilled, the UE handles SR using the first SR transmission rule at operation 6i-10. If it is determined at operation 6i-05 that the second condition is fulfilled, the UE handles SR using the second rule at operation 6i-15. If it is determined at operation 6i-05 that the third condition is fulfilled, the UE handles SR using the third rule at operation 6i-20.

Figure 6J:
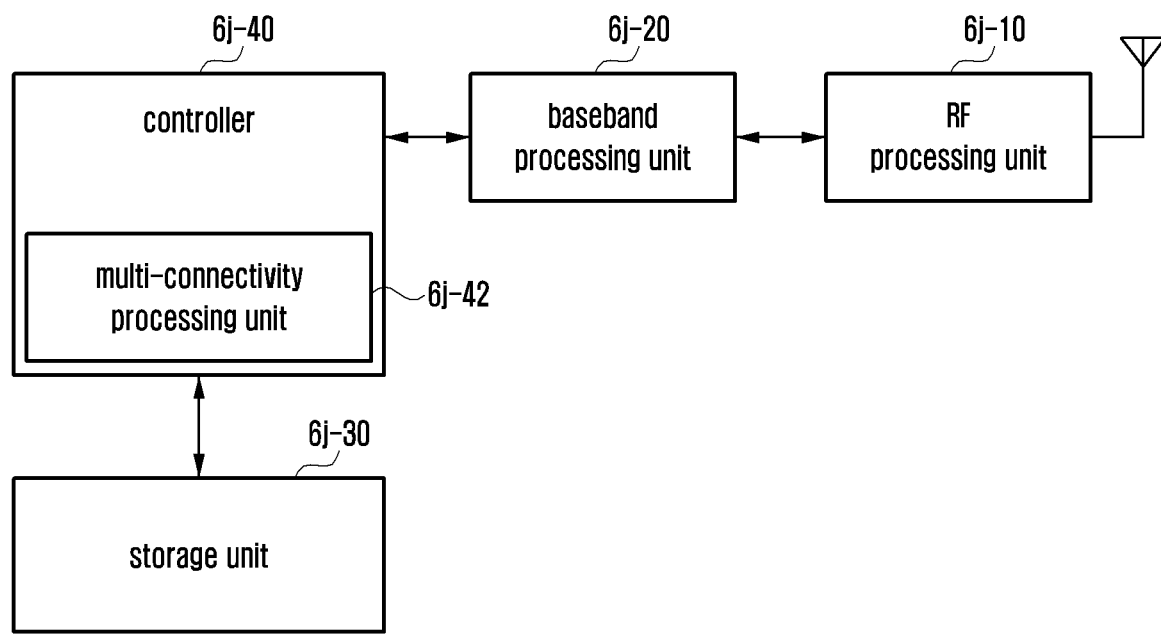
FIG. 6J is a block diagram illustrating a configuration of a UE in a wireless communication system according to an embodiment of the present disclosure.

FIG. 6J is a block diagram illustrating a configuration of a UE in a wireless communication system according to an embodiment of the present disclosure.

Referring to FIG. 6J, the UE includes a radio frequency (RF) processing unit 6j-10, a baseband processing unit 6j-20, a storage unit 6j-30, and a controller 6j-40.

The RF processing unit 6j-10 takes charge of signal band conversion and amplification for transmitting signals over a radio channel. That is, the RF processing unit 6j-10 up-converts a baseband signal output from the baseband processing unit 6j-20 to an RF band signal for transmission through antennas and down-converts an RF band signal received through the antenna to a baseband signal. For example, the RF processing unit 6j-10 may include a transmission filter, a reception filter, an amplifier, a mixer, an oscillator, a DAC, and an ADC. Although one antenna is depicted in FIG. 6J, the terminal may include a plurality of antennas. The RF processing unit 6j-10 may include a plurality of RF chains. The RF processing unit 6j-10 may perform beamforming. For beamforming, the RF processing unit 6j-10 may adjust the phases and sizes of the signal transmitted/received through the antennas or antenna elements. The RF processing unit 6j-10 may perform a MIMO operation to receive a signal on multiple layers. The RF processing unit 6j-10 may configure a plurality antennas or antenna elements to perform reception beam sweeping and adjust a reception direction and width for match with the transmission beam.

The baseband processing unit 6j-20 takes charge of conversion between baseband signals and bit strings according to a physical layer protocol of the system. For example, the baseband processing unit 6j-20 performs encoding and modulation on the transmit bit strings to generate complex symbols in data transmission mode. The baseband processing unit 6j-20 also performs demodulation and decoding on the baseband signal from the RF processing unit 6j-10 to recover the received bit strings in data reception mode. For the case of an OFDM system, the baseband processing unit 6j-20 performs encoding and modulation on the transmit bit string to generate complex symbols, maps the complex symbols to subcarriers, performs IFFT on the subcarriers, and inserts a CP to generate OFDM symbols in the data transmit mode. The baseband processing unit 6j-20 splits the baseband signal from the RF processing unit 6j-10 into OFDM symbols, recovers the signals mapped to the subcarriers through FFT, and performs demodulation and decoding to recover the bit strings in the data reception mode.

The baseband processing unit 6j-20 and the RF processing unit 6j-10 take charge of transmitting and receiving signals as described above. Accordingly, the baseband processing unit 6j-20 and the RF processing unit 6j-10 may be referred to as a transmission unit, a reception unit, a transceiver, or a communication unit. At least one of the baseband processing unit 6j-20 and the RF processing unit 6j-10 may include a plurality of communication modules for supporting different radio access technologies. At least one of the baseband processing unit 6j-20 and the RF processing unit 6j-10 may include a plurality of communication modules for processing different frequency bands signals. Examples of the radio access technologies include LTE and NR networks. Examples of the different frequency bands may include SHF band (e.g., 2.5 GHz and 5 GHz) and mmWave bands (e.g., 60 GHz).

The storage unit 6j-30 stores basic programs for operation of the terminal, application programs, and data such as configuration information. The storage unit 6j-30 provides the stored data in response to a request from the controller 6j-40.

The controller 6j-40 controls overall operations of the terminal. For example, the controller 6j-40 controls the baseband processing unit 6j-20 and the RF processing unit 6j-10 to transmit/receive signals. The controller 6j-40 also writes and reads data to and from the storage unit 6j-30. In order to accomplish this, the controller 6j-40 may include at least one processor. For example, the controller 6j-40 may include a CP for controlling communication and an AP for providing higher layer processing, e.g., application layer protocol processing. According to an embodiment of the present disclosure, the controller 6j-40 includes a multi-connectivity processing unit 6j-42

Figure 6K:
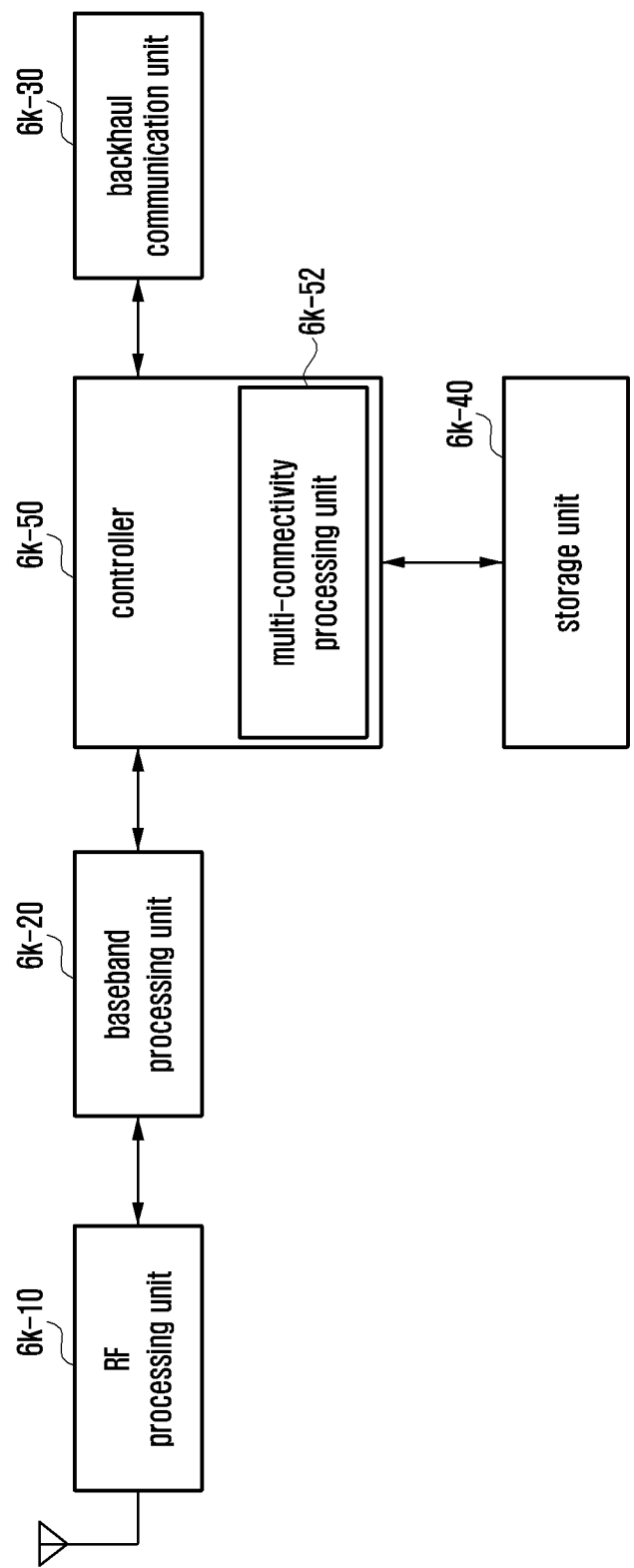
FIG. 6K is a block diagram illustrating a TRP in a wireless communication system according to an embodiment of the present disclosure.

FIG. 6K is a block diagram illustrating a TRP in a wireless communication system according to an embodiment of the present disclosure.

Referring to FIG. 6K, the TRP includes an RF processing unit 6k-10, a baseband processing unit 6k-20, a backhaul communication unit 6k-30, a storage unit 6k-40, and a controller 6k-50.

The RF processing unit 6k-10 takes charge of signal band conversion and amplification for transmitting signals over a radio channel. That is, the RF processing unit 6k-10 up-converts a baseband signal output from the baseband processing unit 6k-20 to an RF band signal for transmission through antennas and down-converts an RF band signal received through the antennas to a baseband signal. For example, the RF processing unit 6k-10 may include a transmission filter, a reception filter, an amplifier, a mixer, an oscillator, a DAC, and an ADC. Although one antenna is depicted in FIG. 6K, the TRP may include a plurality of antennas. The RF processing unit 6k-10 may include a plurality of RF chains. The RF processing unit 6k-10 may perform beamforming. For beamforming, the RF processing unit 6k-10 may adjust the phases and sizes of the signal transmitted/received through the antennas or antenna elements. The RF processing unit 6k-10 may perform a downlink MIMO operation to transmit a signal on multiple layers.

The baseband processing unit 6k-20 takes charge of converting between baseband signals and bit strings according to a physical layer protocol of the system. For example, the baseband processing unit 6k-20 performs encoding and modulation on the transmit bit strings to generate complex symbols in data transmission mode. The baseband processing unit 6k-20 also performs demodulation and decoding on the baseband signal from the RF processing unit 6k-10 to recover the received bit strings in data reception mode. For the case of an OFDM system, the baseband processing unit 6k-20 performs encoding and modulation on the transmit bit string to generate complex symbols, maps the complex symbols to subcarriers, performs IFFT on the subcarriers, and inserts a CP to generate OFDM symbols in the data transmit mode. The baseband processing unit 6k-20 splits the baseband signal from the RF processing unit 6k-10 into OFDM symbols, recovers the signals mapped to the subcarriers through FFT, and performs demodulation and decoding to recover the bit strings in the data reception mode. The baseband processing unit 6k-20 and the RF processing unit 6k-10 take charge of transmitting and receiving signals as described above. Accordingly, the baseband processing unit 6k-20 and the RF processing unit 6k-10 may be referred to as a transmission unit, a reception unit, a transceiver, or a communication unit.

The communication unit 6k-30 is provided with an interface for communication with other nodes in the network.

The storage unit 6k-40 stores basic programs for operation of the TRP, application programs, and data such as configuration information. In particular, the storage unit 6k-40 may store the information on the bearers allocated to the connected terminal and measurement result reported by the terminal. The storage unit 6k-40 may also store the information as criteria for determining whether to enable or disable multi-connectivity for the terminal. The storage unit 6k-40 provides the stored data in response to a request from the controller 6k-50.

The controller 6k-50 may control overall operations of the TRP. For example, the controller 6k-50 controls the baseband processing unit 6k-20, the RF processing unit 6k-10, and the backhaul communication unit 6k-30 for transmitting/receiving signals. The controller 6k-50 also writes and reads data to and from the storage unit 6k-40. In order to accomplish this, the controller 6k-50 may include at least one processor. According to an embodiment of the present disclosure, the controller 6k-50 includes a multi-connectivity processing unit 6k-52.

Embodiment 7

Figure 7A:
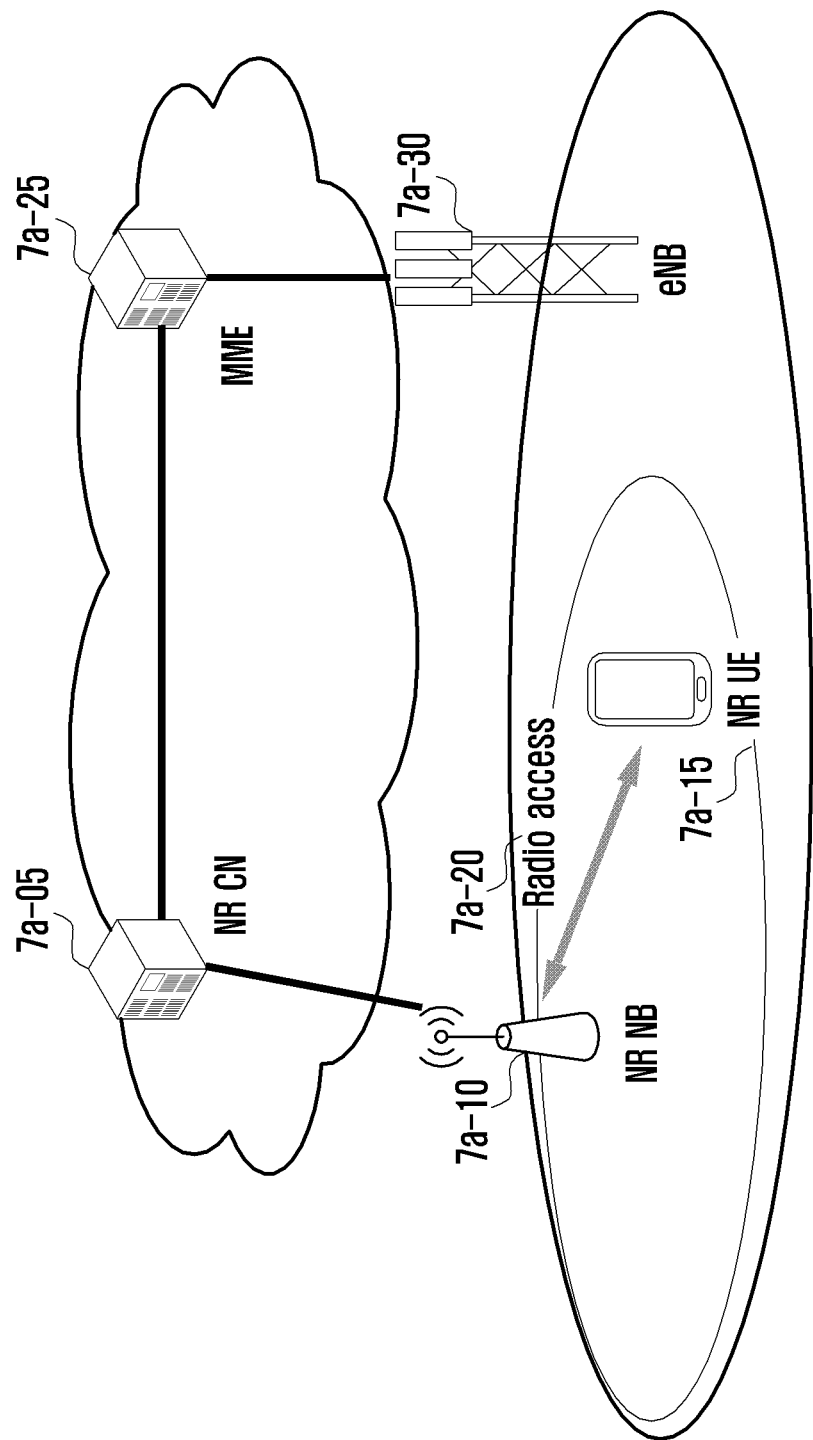
FIG. 7A is a diagram illustrating next generation mobile communication system architecture according to embodiment of the present disclosure.

FIG. 7A is a diagram illustrating next generation mobile communication system architecture according to an embodiment of the present disclosure.

Referring to FIG. 7A, the next generation mobile communication system includes a radio access network with a next generation base station (New Radio Node B (NR gNB) or NR NB) 7a-10 and a new radio core network (NR CN) 7a-05. A new radio user equipment (NR UE) 7a-15 connects to an external network via the NR NB 7a-10 and the NR CN 7a-05.

In FIG. 7A, the NR NB 7a-10 corresponds to an evolved Node B (eNB) of the legacy LTE. The NR NB 7a-10 to which the NR UE 7a-15 connects through a radio channel 7a-20 is capable of providing superior services in comparison with the legacy eNB. In the next generation mobile communication system where all user traffic is served through shared channels, it is necessary to schedule the NR UEs based on scheduling information such as buffer status, power headroom status, and channel status collected by the NR UEs, and the NR NB 7a-10 takes charge of this function. Typically, one NR NB operate multiple cells. In order to achieve a data rate higher than the peak data rate of legacy LTE systems, the next generation mobile communication system may adopt a beamforming technique along with orthogonal frequency division multiple access (OFDMA) as a radio access technology. The next generation mobile communication system may also adopt an adaptive modulation and coding (AMC) to determine the modulation scheme and channel coding rate in adaptation to the channel condition of the NR UE 7a-15. The NR CN 7a-05 takes charge of mobility support, bearer setup, and QoS configuration. The NR CN 7a-05 may take charge of a NR UE mobility management function, and a plurality of NR NBs may connect to the NR CN 7a-05. The next generation mobile communication system may also interoperate with a legacy LTE system and, in this case, the NR CN 7a-05 connects to an MME 7a-25 through a network interface. The MME 7a-25 communicates with at least one eNB 7a-30 as a legacy base station.

Figure 7B:
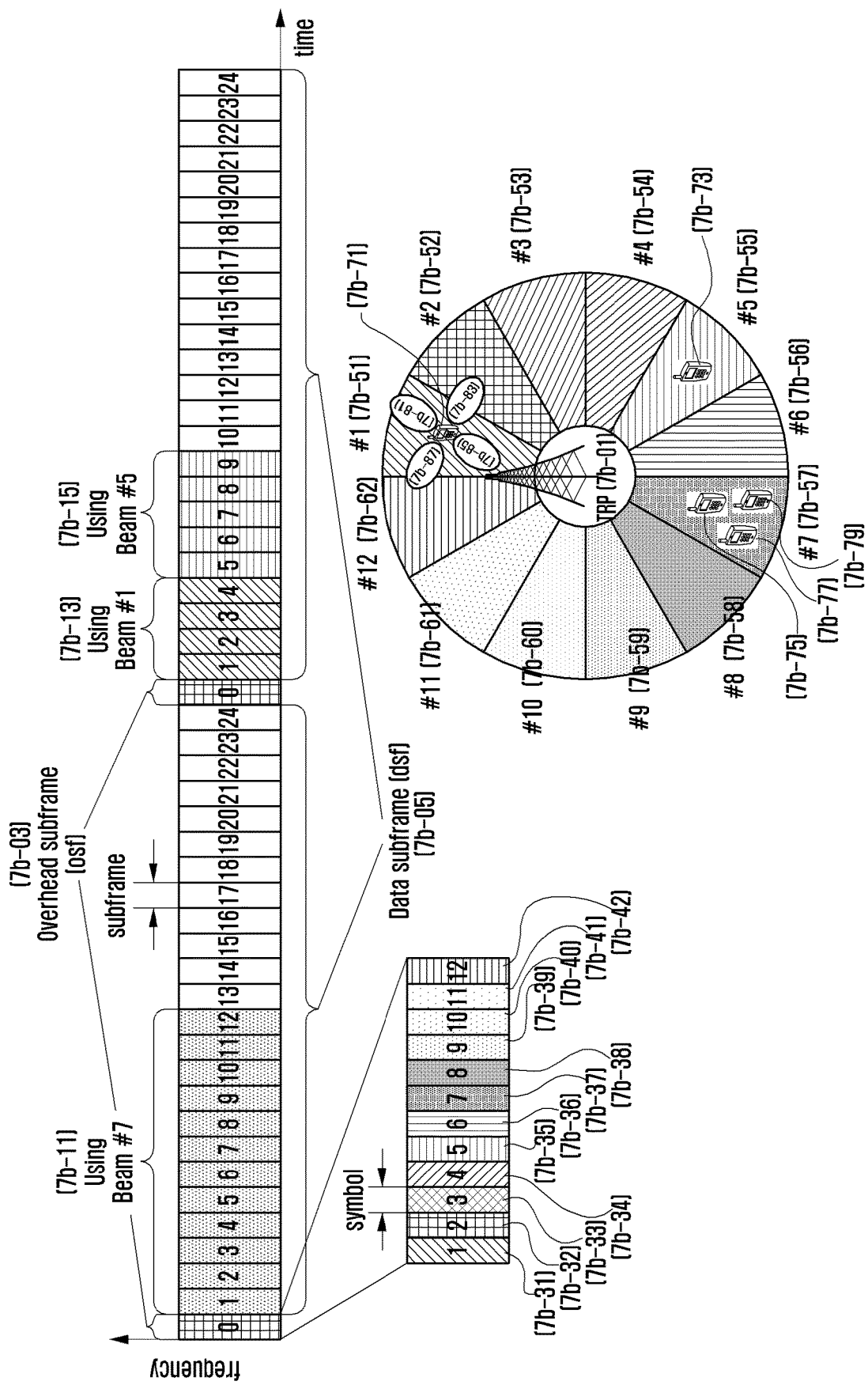
FIG. 7B is a diagram illustrating a frame format for use in an NR system according to embodiment of the present disclosure.

FIG. 7B is a diagram illustrating a frame format for use in an NR system according to an embodiment of the present disclosure.

Referring to FIG. 7B, an NR system aims to achieve a data rate higher than that of an LTE system and considers scenarios of operation on a high frequency to secure broad frequency bandwidth. Particularly, it may be possible to consider a scenario of high-data transmission a UE by forming a directional beam of a high frequency.

It may be possible to consider a scenario where a gNB or a TRP 7b-01 to form different beams to communicate with the UEs 7b-71, 7b-73, 7b-75, 7b-77, and 7b-79 located in a cell. In the embodiment of FIG. 7B, it is assumed that UE 1 7b-71 uses the beam #1 7b-51, UE 2 7b-73 uses the beam #5 7b-55, and UE 3 7b-75, UE 4 7b-77, and UE 5 7b-79 use the beam #7 7b-57 of the TRP 7b-01.

In order to detect a beam for use by a UE to communicate with the TRP, an overhead subframe (osf) 7b-03 conveying a common overhead signal is introduced in the time domain. The osf 7b-03 conveys a primary synchronization signal (PSS) for acquiring OFDM symbol timing, a secondary synchronization signal (SSS) for cell ID detection, an extended synchronization signal (ESS) for acquiring subframe timing, and a beam reference signal (BRS) for identifying a beam. It may also be possible to transmit system information, master information block (MIB) or physical broadcast channel (PHCH) including information (including downlink beam bandwidth and system frame number) for use by the UE in accessing the system. The TRB 7b-01 may also transmit a reference signal per symbol (or across several symbols) through different beams in the osf 7b-03. It may be possible to extract a beam index for identify each beam from the reference signal. In the embodiment FIG. 7B, it is assumed that the TRP 7b-01 transmits 12 beams, i.e., beam #1 7b-51 to beam #12 7b-62, and the beams are swept from one to another every symbol in the osf 7b-03. That is, a different beam is transmitted per symbol in the osf (e.g., beam #1 7b-51 is formed in the first symbol 7b-31) such that the UE may perform measurement in the osf 7b-03 to determine the beam having the strongest received signal strength among the beams transmitted within the osf 7b-03.

The embodiment of FIG. 7B assumes a scenario where the osf 7b-03 appears at an interval of 25 subframes and the 24 subframes between two osf 7b-03 are data subframes (dsf) 7b-05 conveying normal data.

The embodiment of FIG. 7B also assumes a scenario where, according to the scheduling of the base station, the UE 3 7b-75, the UE 4 7b-77, and the UE 5 7b-79 use the beam #7 in common for communication during a period 7b-11, the UE 1 7b-71 uses the beam #1 for communication during a period 7b-13, and the UE 2 7b-73 uses the beam #5 for communication during a period 7b-15.

Although FIG. 7B mainly depicts the transmission (Tx) beams #1 7b-51-to #12 7b-62 formed in first to twelfth symbols 7b-31 to 7b-42 by the TRP 7b-01, it may be possible to consider reception (Rx) beams formed by the UEs (e.g., Rx beams 7b-81, 7b-83, 7b-85, and 7b-87 of the UE 1 7b-71) for receiving the Tx beams. In the embodiment of FIG. 7B, the UE 1 forms 4 beams 7b-81, 7b-83, 7b-85, and 7b-87 and performs beam sweeping to determine the beam with the best reception performance. If it is impossible to use multiple beams simultaneously, it may be possible to find the best Tx beam of the TRB and the best Rx beam of the UE by receiving multiple Rx beam-specific osfs equal in number to the Rx beams.

Figure 7C:
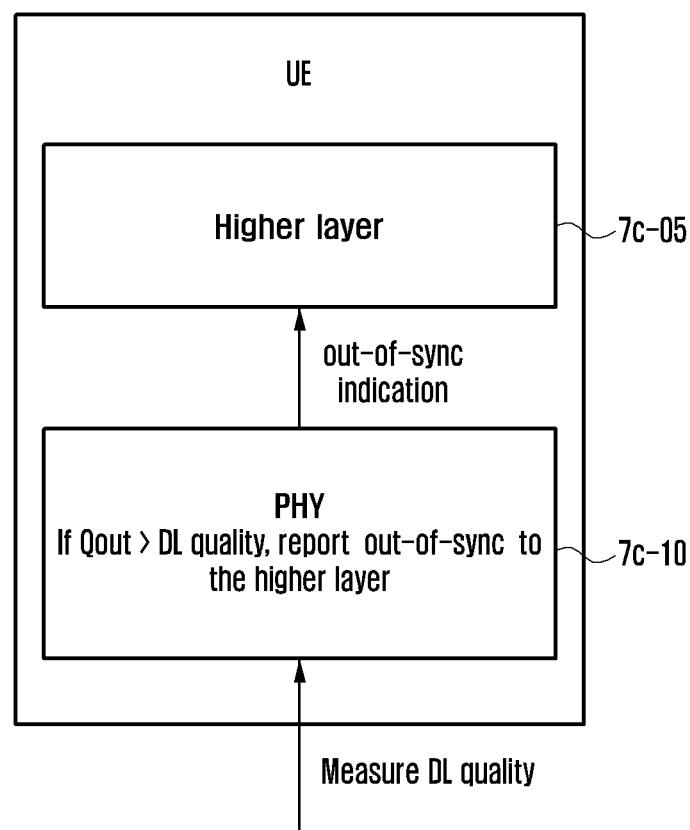
FIG. 7C is a diagram illustrating a radio link monitoring (RLM) operation of a UE in a legacy LTE system according to an embodiment of the present disclosure.

FIG. 7C is a diagram illustrating a radio link monitoring (RLM) operation of a UE in a legacy LTE system according to an embodiment of the present disclosure.

Referring to FIG. 7C, the PHY layer 7c-10 of the UE performs downlink signal strength measurement using a cell-specific reference signal (CRS). The signal strength is measured in reference signal received power (RSRP) or reference signal received quality (RSRQ). The measurement signal strength is compared with a predetermined threshold (Qout). The threshold indicates a signal strength value fulfilling a predetermined block error rate (BLER) of physical downlink control channel (PDCCH). If the measured downlink signal strength is less than the threshold, the PHY layer 7c-10 generates an 'out-of-sync' indicator to a higher layer 7c-05. The relationship between the threshold and the BLER is determined according to the UE capability and thus derived from the implementation of the UE.

Figure 7D:
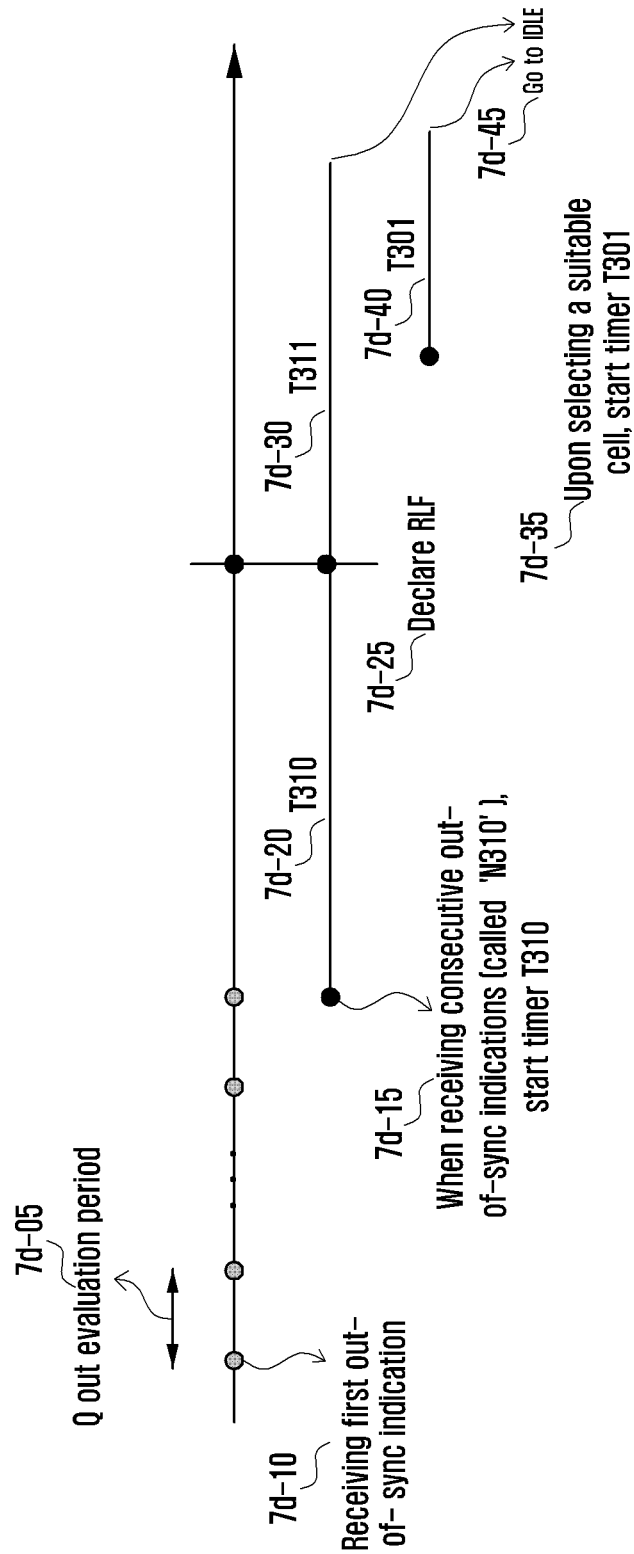
FIG. 7D is a diagram for explaining a radio link failure (RLF) operation of a UE in a legacy LTE system according to an embodiment of the present disclosure.

FIG. 7D is a diagram for explaining a radio link failure (RLF) operation of a UE in a legacy LTE system according to an embodiment of the present disclosure.

Referring to FIG. 7D, the PHY layer of the UE compares the measured CRS signal quality with Qout at a predetermined period 7d-05 beginning when a first 'out-out-sync' indication is received at a time point 7d-10. If a 'out-out-sync' indicator N310 is received from the PHY layer, the higher layer starts a T310 timer 7d-20 at a time point 7d-15. If an 'in-sync' indicator is received N311 times before expiry of the T310 timer from the PHY layer, the T310 time stops. Otherwise, if the T310 timer expires without receipt of N311 'in-sync' indicators, the UE declares RLF at the time point 7d-25. Then, the UE initializes the re-establishment procedure and starts a T311 timer 7d-30. The re-establishment initialization operation includes operations related discontinuous reception (DRX), semi-persistent scheduling (SPS), CQI, SRS, scheduling request (SR), and SCell release. If a suitable cell is found as denoted by reference number 7d-35, the UE stops the T311 7d-30 timer and starts a T301 timer 7d-40. The T301 timer 7d-40 stops when the UE receives the RRC Connection Reestablishment message from the gNB. If the T311 timer 7d-30 or the T301 timer 7d-40 expires, the UE enters the idle mode as denoted by reference number 7d-45. The values of N310, N311, T310, T311, and T301 are provided by the network.

Figure 7E:
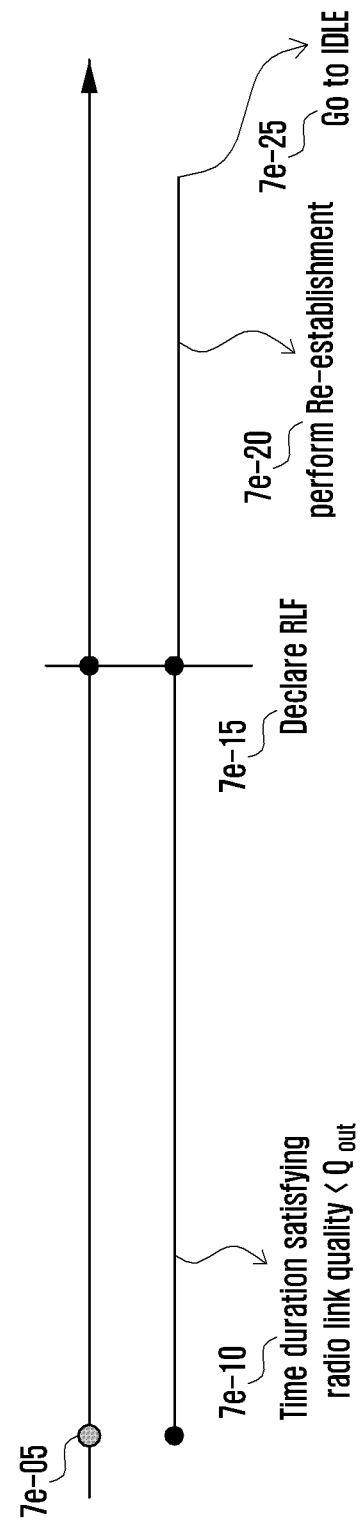
FIG. 7E is a diagram for explaining an RLF operation of a UE in a next generation mobile communication system according to an embodiment of the present disclosure.

FIG. 7E is a diagram for explaining an RLF operation of a UE in a next generation mobile communication system according to an embodiment of the present disclosure.

Referring to FIG. 7E, the RLF handling procedure is performed in a similar way to that of the legacy LTE. Conceptually, if the state where the downlink signal strength measured by the UE (7e-05) is less than a predetermined threshold Qout continues over a predetermined time period 7e-10, the UE declares RLF at a time point 7e-15. After declaring RLF, the UE perform a re-establishment procedure for connection recovery as denoted by reference number 7e-20. If the reestablishment procedure fails, the UE enters the idle mode as denoted by reference number 7e-25.

Figure 7F:
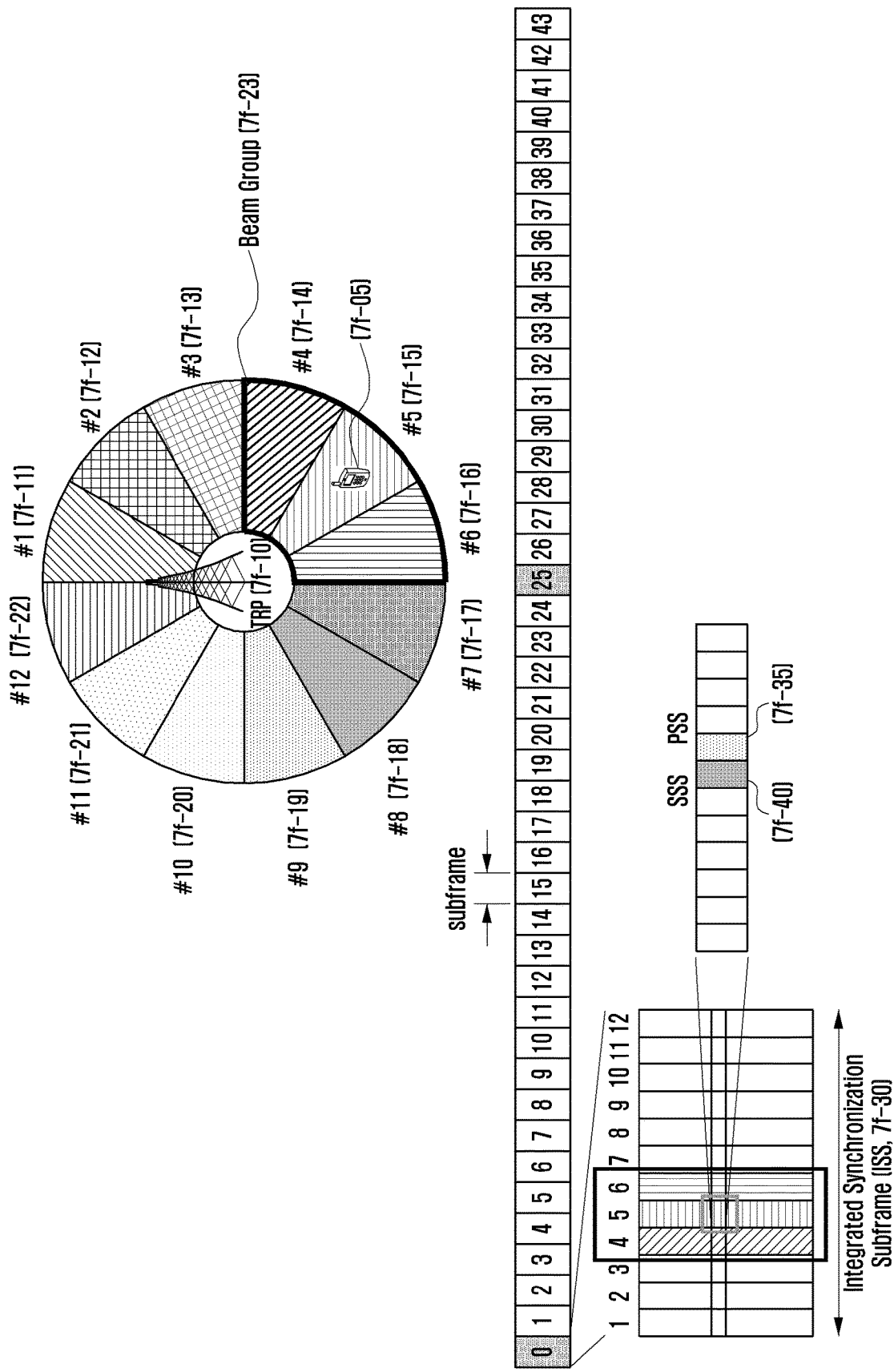
FIG. 7F is a diagram illustrating a frame format for transmitting a synchronization signal in a next generation mobile communication system according to an embodiment of the present disclosure.

FIG. 7F is a diagram illustrating a frame format for transmitting a synchronization signal in a next generation mobile communication system according to an embodiment of the present disclosure.

Referring to FIG. 7F, a TRP 7f-10 forms 12 beams 7f-11 to 7f-22 for directional downlink signal transmission. A UE 7f-05 receives a PSS 7f-35 for acquiring symbol timing, a SSS 7f-40 for cell ID detection, an ESS for acquiring subframe timing, and a BRS for identifying the beam to perform measurement for selecting a beam for use in communication with the TRP 7f-10. It may be possible to extract beam indices for identifying the beams from the beam reference signal. In the embodiment of FIG. 7F, it is assumed that beams are swept from one to another every symbol in the osf 7b-03. The UE 7f-05 receives multiple first downlink signals xSS in the first subframe 7f-30. The first subframe convey a plurality of synchronization signals and referred to as integrated synchronization subframe (ISS). That is, the ISS is defined as the subframe conveying synchronization signal among osfs. The first downlink signals include PSS/SSS basically and ESS on a high frequency and may be transmitted in the time durations designated for the respective Tx beams. That is, the first subframe 7f-30 consists of n consecutive time durations (symbols), and each symbol conveys the first downlink signal. In the case of a sub-6 GHz system, the first symbol conveys the first downlink signals and the remaining symbols convey other downlink signals. Particularly, the UE 7f-05 may receive only the first downlink signal of a serving cell/serving beam or the first downlink signals transmitted on a group 7f-23 of neighboring beams.

Figure 7G:
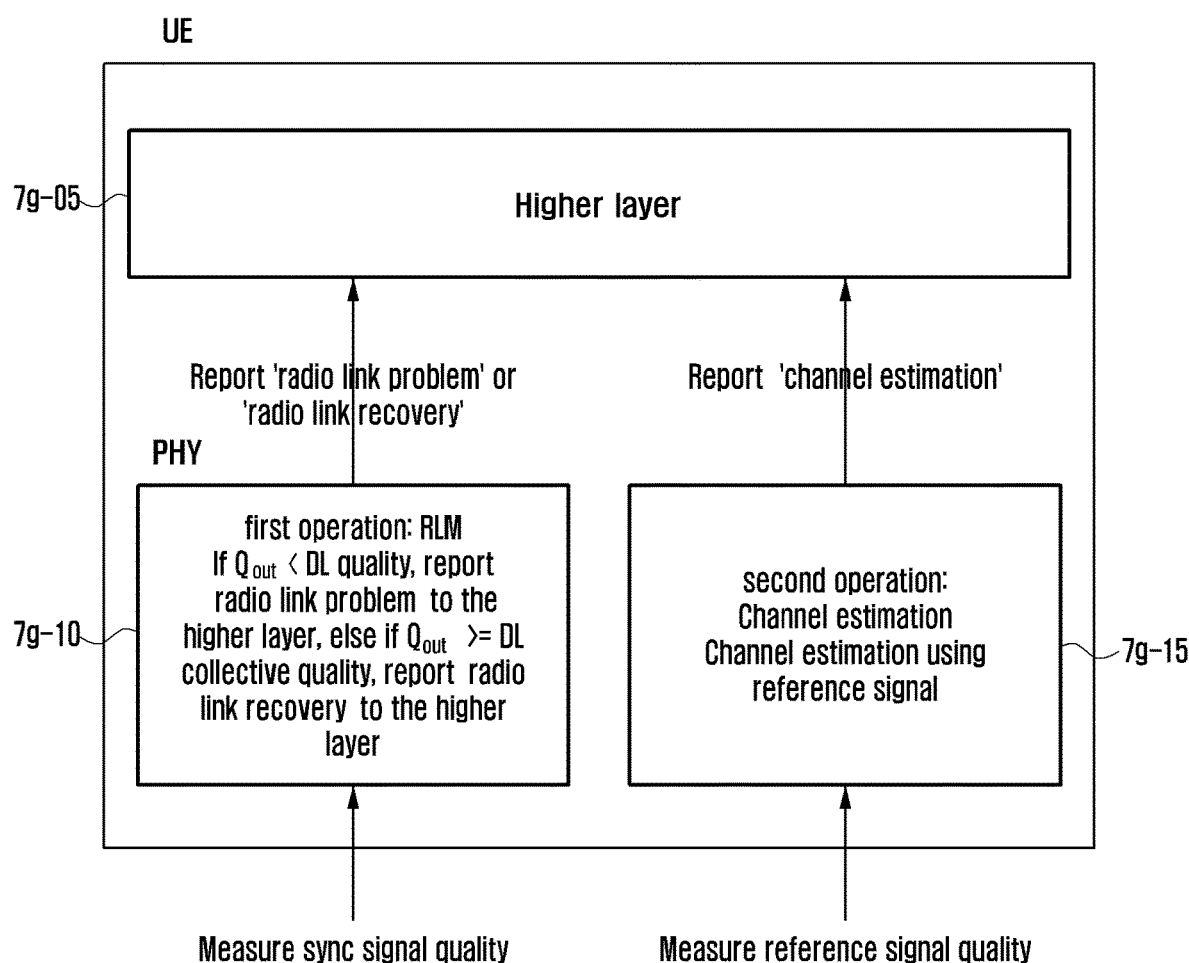
FIG. 7G is a diagram illustrating part of a UE for explaining an RLM operation according to an embodiment of the present disclosure.

FIG. 7G is a diagram illustrating part of a UE for explaining an RLM operation according to an embodiment of the present disclosure.

Referring to FIG. 7G, the UE receives a synchronization signal and a reference signal periodically, and the PHY layer of the UE performs a first operation (i.e., RLM) and a second operation (i.e., channel estimation) and delivers the first and second operations results to the higher layer. The first and second operations may be performed in series or in parallel.

In the first operation 7g-10, the PHY layer determines whether the measured strength of the first downlink signal (synchronization signal and xSS) or a representative first downlink signal in a predetermined beam group is greater than a predetermined threshold. Here, the first downlink signal strength may be represented by one of PSS and SSS measurement values or sum or average value of the PSS and SSS measurement values. The first downlink signal may include ESS for acquiring the subframe timing and, in this case, the first downlink signal strength may be calculated using the ESS along with the PSS and SSS. The UE performs the first operation to determine whether to maintain the connection through the current serving cell/serving beam based on the result of reception of the M ISS subframes. Here, M denotes a value indicated by a resource allocation message or preconfigured by the gNB. That is, the PHY layer reports the first downlink signal strength measurement result to the higher layer 7g-05 periodically. If a serving beam or a serving beam group fulfils a first condition (if the first downlink signal strength is greater than the threshold Qout), the UE maintains the connection through the current serving cell/serving beam. Otherwise, if a serving beam or a serving beam group fulfils a second condition (if the first downlink signal strength is equal to or less than the threshold Qout) the UE compares the representative value of the downlink signals in the beam group with the threshold value. If the updated first downlink signal strength fulfils the first condition, the UE performs a first procedure to report a radio link recovery indicator to the higher layer 7g-05. Otherwise, if the serving beam or serving beam group fulfils the second condition, the UE performs a second procedure, and the PHY layer reports a radio link problem indicator to the higher layer 7g-05. The radio link problem indicator corresponds to the out-of-sync indicator of LTE. If the radio link problem indicator is received, the higher layer 7g-05 starts a timer and, if the timer expires, declares RLF. After declaring RLF, the UE performs an RRC connection re-establishment procedure for connection recovery and reports to the network whether a RLF has occurred. If the first downlink signal strength becomes greater than the threshold Qout while the timer is running, the timer stops. The threshold may be determined depending on the implementation of the UE, fixed to a value, or configured by the network.

After performing the RLM/RLF procedure, the PHY layer of the UE performs the second operation 7g-15, i.e., data channel estimation, using the second downlink signal (reference signal). In the second operation, the UE measures the channel quality of the data channel based on the second downlink signal and reports the measurement result to the gNB.

Figure 7H:
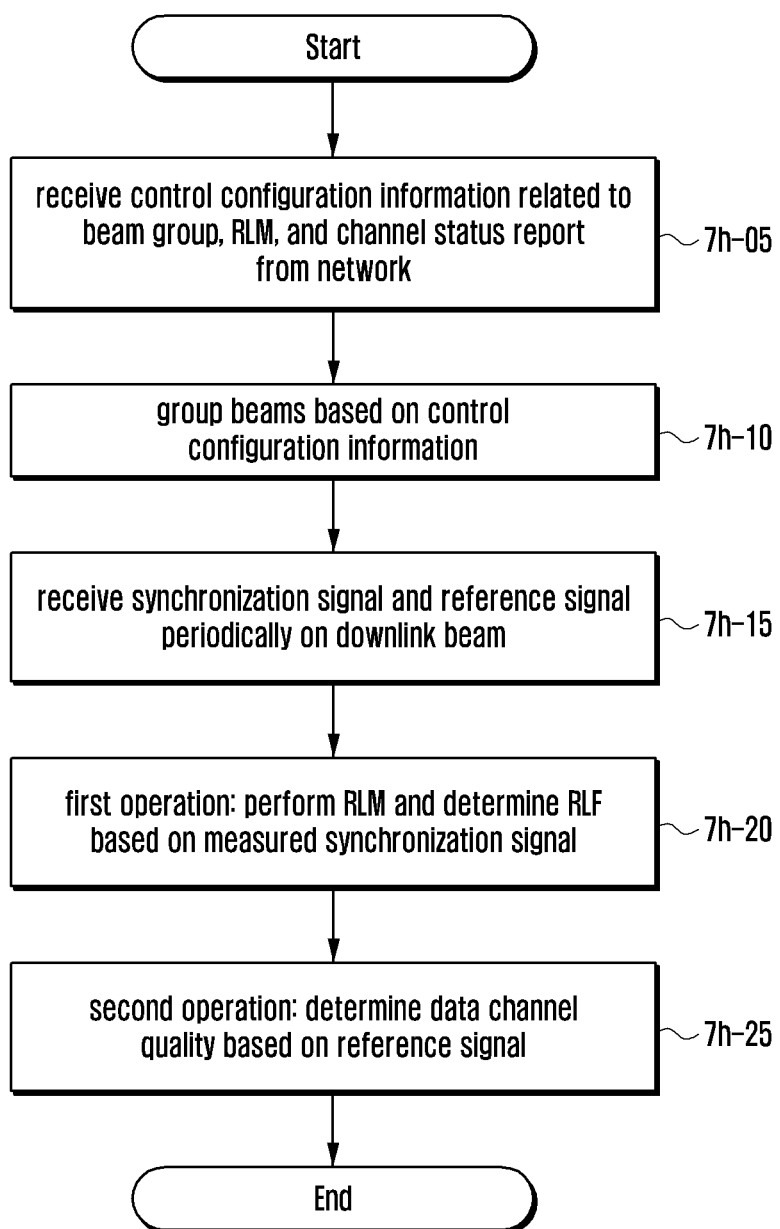
FIG. 7H is a flowchart illustrating an operation of a UE in a synchronization signal-based RLM/RLF and reference signal-based channel estimation procedure according to an embodiment of the present disclosure.

FIG. 7H is a flowchart illustrating an operation of a UE in a synchronization signal-based RLM/RLF and reference signal-based channel estimation procedure according to an embodiment of the present disclosure.

Referring to FIG. 7H, at operation 7h-05, the UE receives beam group and RLM control configuration information from the network. The control configuration information is transmitted by the network using an RRC message or system information. The control configuration information includes beam group information such as the number of beams of the beam group and beam index and a threshold and counters for use in determining RLM operation RLF state. There may be one or more thresholds, which are provided from the network or determined according to the implementation of the UE. For example, the threshold may be set to a value indicative of the signal strength fulfilling a BLER on PDCCH of the serving beam. The network may also transmit channel status information (CSI) report configuration information. The control configuration information may include a CSI report scheme (periodic or aperiodic report) and CSI report designation information (broadband, specific UE, and specific sub-band).

At operation 7h-10, the UE configures a group comprised of certain beams of a TRP having the serving beam based on the beam group configuration information. It may also be possible to configure a signal serving beam.

At operation 7h-15, the UE measures the signal strength on a downlink serving beam or beam group at a predetermined interval. At this operation, the UE receives a synchronization signal (first downlink signal) and a reference signal (second downlink signal). The signal strengths on the serving beam or beam group may be the sum or average of the signal strengths of the synchronization signals and reference signals received in M ISS subframes.

At operation 7h-20, the UE determines whether the first downlink signal (synchronization signal) strength is greater than a predetermined threshold and, if so, performs the first operation. The first operation includes that the UE performs RLM to detect whether the first downlink signal strength is less than the threshold and fulfils a predetermined condition and, if so, to declare RLF and performs a connection reestablishment procedure.

After completing the first operation, the UE performs the second operation based on the second downlink signal (reference signal) at operation 7h-25. The second operation includes that the UE performs data channel estimation; the data channel estimation is performed in such a way that the UE measures channel quality of a data channel based on the second downlink signal (reference signal) and report the measurement result to the gNB in a similar way to that of LTE.

Figure 7I:
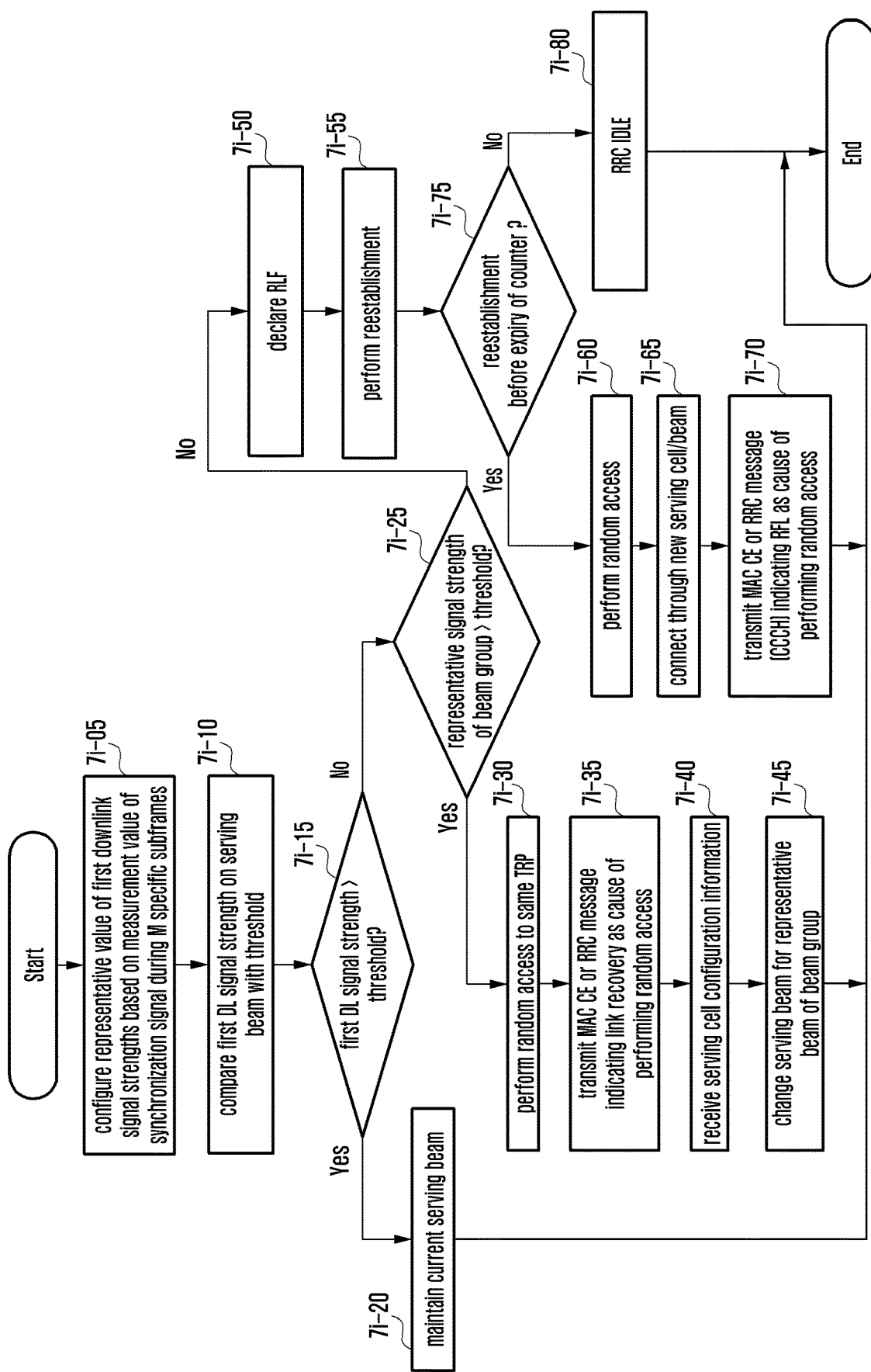
FIG. 7I is a flowchart illustrating an operation of a UE according to embodiment 7-1 of the present disclosure.

FIG. 7I is a flowchart illustrating an operation of a UE according to embodiment 7-1 of the present disclosure.

Referring to FIG. 7I, in embodiment 7-1, the UE determines whether to maintain the connection by performing RLM on a synchronization signal. The operation of determining whether to maintain the connection is performed in such a way that the UE detects the current serving cell/serving beam quality is equal to or less than a predetermined threshold, declares RLF, and initiate a recovery operation.

At operation 7i-05, the UE configures a representative value of first downlink signal strengths based on the measurement value of the synchronization signal during M ISS subframes. The representative value of the first downlink signal strength may be the sum or average of the first downlink signal strengths of the synchronization signal during the M ISS subframes. Here, M may be indicated by a resource allocation message or configured by a gNB.

At operation 7i-10, the UE compares the representative value of the first downlink signal strengths of the serving cell with a threshold. There may be one or more thresholds that are provided by the network or derived from the implementation of the UE. For example, the threshold value may be a signal strength value fulfilling a BLER on PDCCH of the serving beam.

If it is determined at operation 7i-15 that the first downlink signal strength of the current serving cell fulfils a first condition (i.e., DL_quality>Qout), the UE maintains the connection through the current serving cell/serving beam at operation 7i-20. If it is determined at operation 7i-15 that the first downlink signal strength of the serving beam fulfils a second condition (i.e., DL_quality≤Qout), the UE compares the representative first downlink signal strength with the threshold at operation 7i-25. Here, it may be possible to configure one threshold or may be different from the thresholds for use in comparison with the serving beam. If the beam group includes only beam, i.e., serving beam, this operation may be omitted.

If the representative first downlink signal strength fulfils the first condition (i.e., DL_quality_new>Qout), the UE performs a first procedure 7i-30 to 7i-45. The UE performs random access, at operation 7i-30, to the same TRP that forms the serving beam and transmits a MAC CE or RRC message indicating link recovery as the cause for performing the random access at operation 7i-35. The UE receives serving beam configuration information newly from the gNB at operation 7i-40 and changes the serving beam for the representative beam of the beam group at operation 7i-45.

A second procedure is performed when the representative first downlink signal strength of the beam group does not fulfil the first condition at operation 7i-25 (i.e., DL_quality_new≤Qout). The UE declares RLF at operation 7i-50 and initiates a reestablishment procedure at operation 7i-55 for RRC Connection recovery and starts a counter. If the first downlink signal strength becomes greater than the threshold value Qout while the counter is running, the UE stops the counter. The threshold may be determined depending on the implementation of the UE, fixed to a value, or configured by the network. That is, if it is instructed by the gNB to establish RRC Connection during the reestablishment procedure or a predetermined condition is fulfilled at operation 7i-75, the UE performs random access at operation 7i-60. Then, the UE connects to the gNB through a new serving cell/beam at operation 7i-65 and transmits a MAC CE or RRC message (CCCH) indicating RLF, at operation 7i-70, as the cause of performing the random access.

If the reestablishment counter expires at operation 7i-75, the UE enters the RRC IDLE state at operation 7i-80.

Figure 7J:
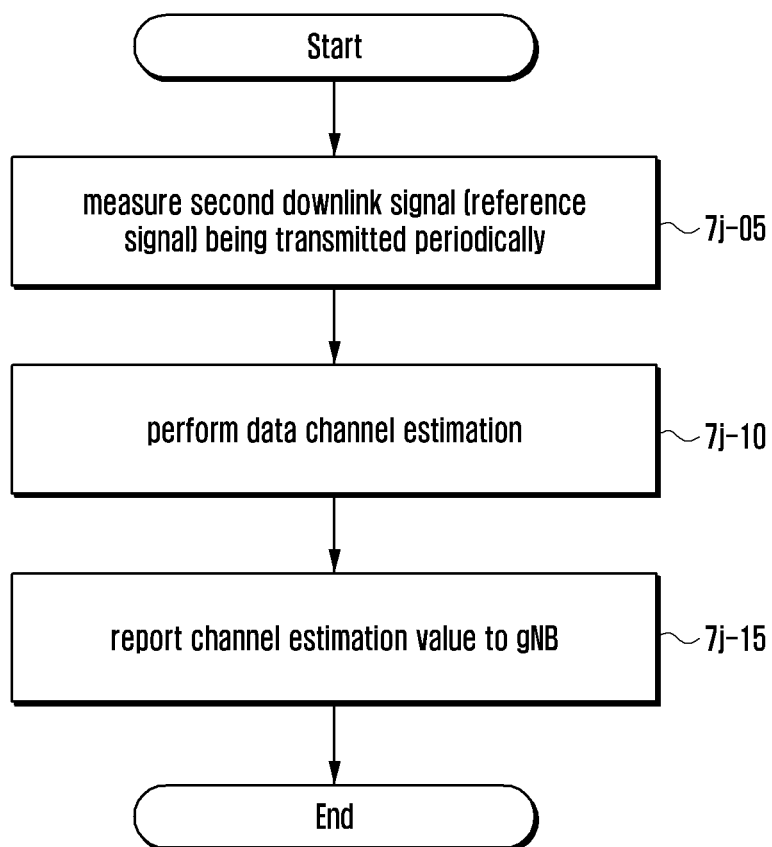
FIG. 7J is a flowchart illustrating an operation of a UE according to embodiment 7-2 of the present disclosure.

FIG. 7J is a flowchart illustrating an operation of a UE according to embodiment 7-2 of the present disclosure.

Referring to FIG. 7J, in embodiment 7-2, the UE performs data channel estimation in such a way of measuring channel quality of a data channel based on the second downlink signal (reference signal) and report the measurement result to the gNB in a similar way to that of LTE.

At operation 7j-05, the UE performs measurement on the second downlink signal (reference signal), which is transmitted periodically. The second downlink signal may be a reference signal such as a cell-specific reference signal (CRS), a demodulation reference signal (DM-RS), and a channel status information reference signal (CSI-RS) specified for LTE or the like newly defined. That is, the second downlink signal is designed so as to be used for estimating a data channel.

At operation 7j-10, the UE performs channel estimation for a downlink data channel PDSCH using a second downlink signal. The channel estimation may be performed based on the average of received signal strengths of multiple second downlink signals or the strongest one of the received signal strengths. How to perform channel estimation depends on the UE capability and thus is determined according to the implementation of the UE. The estimated channel state (CSI) may be expressed by means of one of channel quality information (CQI), RI, PMI, or any combination of them. Which one is used to express the channel state may be determined depending on the transmission mode. The channel estimation may be broadband channel estimation, UE-specific channel estimation, or sub-band-specific channel estimation, and the type of channel estimation may be determined depending on network configuration.

At operation 7j-15, the UE reports the channel estimation value to the gNB. At this operation, the aforementioned CSI reporting format (combination of CQI, RI, and PMI) is used. The CSI report may be performed periodically or aperiodically. The aperiodic CSI report may be used in response to an explicit request from the network. The network may request for CSI report using a 'channel-status request' indicator included in an uplink scheduling grant. The aperiodic CSI report may be transmitted on PUSCH resources that are dynamically allocated always. In the case of the periodic CSI report, the network configures such that the CSI report is transmitted on PUCCH resources at a predetermined interval. If the UE receives a valid uplink scheduling grant for PUSCH, it may transmit the CSI report on PUSCH periodically. The terms "PUSCH and PUCCH" are borrowed from LTE standards and may be replaced by other terms intended to have the same meanings in RN.

Figure 7K:
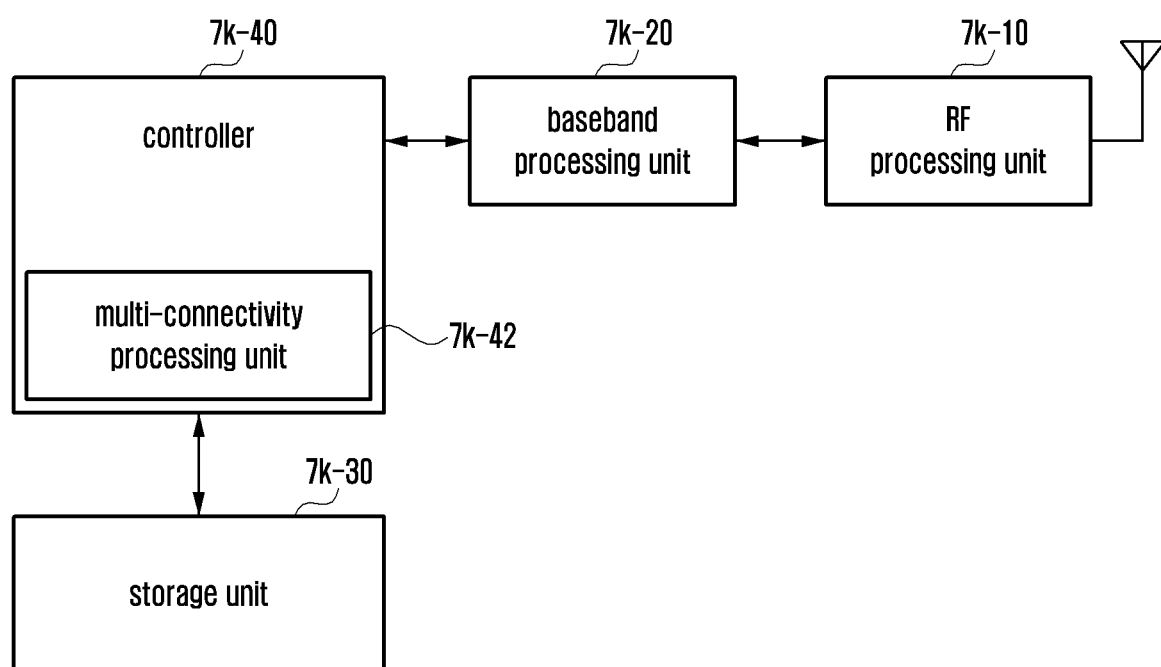
FIG. 7K is a block diagram illustrating a configuration of a UE in a wireless communication according to an embodiment of the present disclosure.

FIG. 7K is a block diagram illustrating a configuration of a UE in a wireless communication according to an embodiment of the present disclosure.

Referring to FIG. 7K, the UE includes a RF processing unit 7k-10, a baseband processing unit 7k-20, a storage unit 7k-30, and a controller 7k-40.

The RF processing unit 7k-10 takes charge of signal band conversion and amplification for transmitting signals over a radio channel. That is, the RF processing unit 7k-10 up-converts a baseband signal output from the baseband processing unit 7k-20 to an RF band signal for transmission through antennas and down-converts an RF band signal received through the antenna to a baseband signal. For example, the RF processing unit 7k-10 may include a transmission filter, a reception filter, an amplifier, a mixer, an oscillator, a DAC, and an ADC. Although one antenna is depicted in FIG. 7K, the terminal may include a plurality of antennas. The RF processing unit 7k-10 may include a plurality of RF chains. The RF processing unit 7k-10 may perform beamforming. For beamforming, the RF processing unit 7k-10 may adjust the phases and sizes of the signal transmitted/received through the antennas or antenna elements. The RF processing unit 7k-10 may perform a MIMO operation to receive a signal on multiple layers.

The baseband processing unit 7k-20 takes charge of conversion between baseband signals and bit strings according to a physical layer protocol of the system. For example, the baseband processing unit 7k-20 performs encoding and modulation on the transmit bit strings to generate complex symbols in data transmission mode. The baseband processing unit 7k-20 also performs demodulation and decoding on the baseband signal from the RF processing unit 7k-10 to recover the received bit strings in data reception mode. For the case of an OFDM system, the baseband processing unit 7k-20 performs encoding and modulation on the transmit bit string to generate complex symbols, maps the complex symbols to subcarriers, performs IFFT on the subcarriers, and inserts a CP to generate OFDM symbols in the data transmit mode. The baseband processing unit 7k-20 splits the baseband signal from the RF processing unit 7k-10 into OFDM symbols, recovers the signals mapped to the subcarriers through FFT, and performs demodulation and decoding to recover the bit strings in the data reception mode.

The baseband processing unit 7k-20 and the RF processing unit 7k-10 take charge of transmitting and receiving signals as described above. Accordingly, the baseband processing unit 7k-20 and the RF processing unit 7k-10 may be referred to as a transmission unit, a reception unit, a transceiver, or a communication unit. At least one of the baseband processing unit 7k-20 and the RF processing unit 7k-10 may include a plurality of communication modules for supporting different radio access technologies. At least one of the baseband processing unit 7k-20 and the RF processing unit 7k-10 may include a plurality of communication modules for processing different frequency bands signals. Examples of the radio access technologies include WLAN (e.g., IEEE 802.11) and cellular network (e.g., LTE). Examples of the different frequency bands may include SHF band (e.g., 2.5 GHz and 5 GHz) and mmWave bands (e.g., 60 GHz).

The storage unit 7k-30 stores basic programs for operation of the terminal, application programs, and data such as configuration information. In particular, the storage unit 7*k*-30 may store the information related to the secondary access node with which the terminal performs radio communication using the secondary radio access technology. The storage unit 7*k*-30 provides the stored data in response to a request from the controller 7*k*-40.

The controller 7*k*-40 controls overall operations of the terminal. For example, the controller 7*k*-40 controls the baseband processing unit 7*k*-20 and the RF processing unit 7*k*-10 to transmit/receive signals. The controller 7*k*-40 also writes and reads data to and from the storage unit 7*k*-30. In order to accomplish this, the controller 7*k*-40 may include at least one processor. For example, the controller 7*k*-40 may include a CP for controlling communication and an AP for providing higher layer processing, e.g., application layer protocol processing. According to an embodiment of the present disclosure, the controller 7*k*-40 includes a multi-connectivity processing unit 7*k*-42.

Figure 7L:
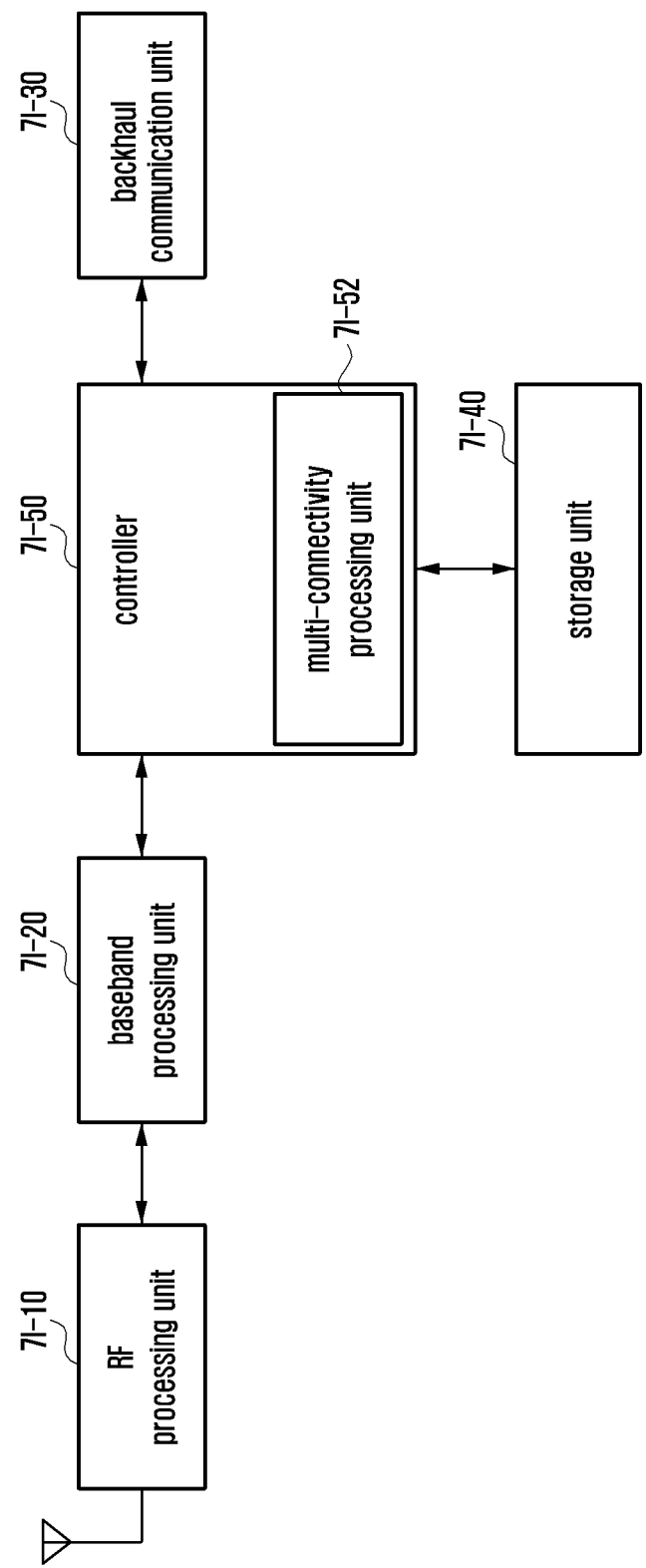
FIG. 7L is a block diagram illustrating a base station in a wireless communication system according to an embodiment of the present disclosure.

FIG. 7L is a block diagram illustrating an NR NB in a wireless communication system according to an embodiment of the present disclosure.

Referring to FIG. 7L, the NR NB includes an RF processing unit 7*l*-10, a baseband processing unit 7*l*-20, a backhaul communication unit 7*l*-30, a storage unit 7*l*-40, and a controller 7*l*-50.

The RF processing unit 7*l*-10 takes charge of signal band conversion and amplification for transmitting signals over a radio channel. That is, the RF processing unit 7*l*-10 up-converts a baseband signal output from the baseband processing unit 7*l*-20 to an RF band signal for transmission through antennas and down-converts an RF band signal received through the antennas to a baseband signal. For example, the RF processing unit 7*l*-10 may include a transmission filter, a reception filter, an amplifier, a mixer, an oscillator, a DAC, and an ADC. Although one antenna is depicted in FIG. 7L, the TRP may include a plurality of antennas. The RF processing unit 7*l*-10 may include a plurality of RF chains. The RF processing unit 7*l*-10 may perform beamforming. For beamforming, the RF processing unit 7*l*-10 may adjust the phases and sizes of the signal transmitted/received through the antennas or antenna elements. The RF processing unit 7*l*-10 may perform a downlink MIMO operation to transmit a signal on multiple layers.

The baseband processing unit 7*l*-20 takes charge of converting between baseband signals and bit strings according to a physical layer protocol of the system. For example, the baseband processing unit 7*l*-20 performs encoding and modulation on the transmit bit strings to generate complex symbols in data transmission mode. The baseband processing unit 7*l*-20 also performs demodulation and decoding on the baseband signal from the RF processing unit 7*l*-10 to recover the received bit strings in data reception mode. For the case of an OFDM system, the baseband processing unit 7*l*-20 performs encoding and modulation on the transmit bit string to generate complex symbols, maps the complex symbols to subcarriers, performs IFFT on the subcarriers, and inserts a CP to generate OFDM symbols in the data transmit mode. The baseband processing unit 7*l*-20 splits the baseband signal from the RF processing unit 7*l*-10 into OFDM symbols, recovers the signals mapped to the subcarriers through FFT, and performs demodulation and decoding to recover the bit strings in the data reception mode. The baseband processing unit 7*l*-20 and the RF processing unit 7*l*-10 take charge of transmitting and receiving signals as described above. Accordingly, the baseband processing unit 7*l*-20 and the RF processing unit 7*l*-10 may be referred to as a transmission unit, a reception unit, a transceiver, or a communication unit.

The backhaul communication unit 7*l*-30 provides an interface for communication with other network nodes. That is, the backhaul communication unit 7*l*-30 converts the bit string to be transmitted to the access node and CN to a physical signal and the physical signal received from another node to a bit string The storage unit 7*l*-40 stores basic programs for operation of the TRP, application programs, and data such as configuration information. In particular, the storage unit 7*l*-40 may store the information on the bearers allocated to the connected terminal and measurement result reported by the terminal. The storage unit 7*l*-40 may also store the information as criteria for determining whether to enable or disable multi-connectivity for the terminal. The storage unit 7*l*-40 provides the stored data in response to a request from the controller 7*l*-50.

The controller 7*l*-50 may control overall operations of the TRP. For example, the controller 7*l*-50 controls the baseband processing unit 7*l*-20, the RF processing unit 7*l*-10, and the backhaul communication unit 7*l*-30 for transmitting/receiving signals. The controller 7*l*-50 also writes and reads data to and from the storage unit 7*l*-40. In order to accomplish this, the controller 7*l*-50 may include at least one processor. According to an embodiment of the present disclosure, the controller 7*l*-50 includes a multi-connectivity processing unit 7*l*-52.

The synchronization signal-based RLM method according to an embodiment of the present disclosure may include receiving a control configuration information for an RLM operation from the network, and the configuration information may include at least one of beam group configuration information including the number of beams constituting a beam group and beam indices, thresholds and counter values for the RLM operation and RLF state determination, and CSR reporting method indicator.

According to an embodiment of the present disclosure, a synchronization signal-based RLM method of a UE may include receiving a synchronization signal and a reference signal periodically on a downlink beam, the synchronization signal having a length of a first duration (symbol) and including an identifier (cell identifier or TRP identifier) indicating a plurality of beams collectively. The synchronization signal may be transmitted during a second duration (ISS), the ISS is transmitted at a predetermined interval and conveys a plurality of synchronization signals.

According to an embodiment of the present disclosure, the synchronization signal-based RLM method may include performing a first operation based on a result of receiving M ISSs.

The first operation is to determine whether to maintain the connection through a current serving cell/serving beam based on measured synchronization signal; if a first condition is fulfilled, the UE maintain the connection through the current serving cell/serving beam as a first procedure. If a second condition is fulfilled, the UE may perform a RLF operation with the current serving cell/serving beam as a second procedure.

If the RLF operation is performed as the second procedure, the UE may perform a reestablishment procedure for connection recovery, and the first condition may be that a measured serving beam signal strength is greater than a threshold during a predetermined period.

The second condition is that the measured serving beam signal strength is equal to or less than the predetermined period; the second condition is fulfilled, a physical layer of the UE sends a radio link problem indicator to a higher layer of the UE, and the serving beam signal strength may be the sum or average of the signal strengths of synchronization signals in M ISSs. Here, M may be indicated by a resource allocation message or configured by a gNB.

According to an embodiment of the present disclosure, the synchronization signal-based RLM method of the UE may include performing a second operation based on a reference signal. The second operation is to performing data channel estimation in such a way that the UE measures data channel quality based on the reference signal to report channel status to the gNB, the channel state report being performed periodically or aperiodically.

As described above, the present disclosure is advantageous in terms of protecting against malfunctioning by performing an activation/deactivation operation during a time period determined in association with the synchronization operation between a terminal and a base station.

Also, the present disclosure is advantageous in that a terminal is capable of performing per-frequency (per-cell) signal measurement during a time period determined per terminal.

Also, the present disclosure is advantageous in terms of scheduling a terminal based on accurate power headroom information thereof because the base station is capable of acquiring the power headroom information from a power headroom report (PHR) performed by the terminal according to a predetermined rule.

Also, the present disclosure is advantageous in terms of reducing transmission latency and allocating transmission resources more promptly by employing an improved scheduling request method in a next generation mobile communication system.

Also, the present disclosure is advantageous in terms of making it possible to improve radio link monitoring operation efficiency, particularly in designing a synchronization signal and reference signal, and subframe use efficiency in a next generation mobile communication system.

The methods specified in claims and specification can be implemented by hardware, software, or a combination of them.

In the case of being implemented in software, it may be possible to store at least one program (software module) in a non-transitory computer-readable storage medium. The at least one program stored in the non-transitory computer-readable storage medium may be configured for execution by at least one processor embedded in an electronic device. The at least one program includes instructions executable by the at least one processor of the electronic device to perform the methods disclosed in the claims and specifications of the present disclosure.

Such a program (software module or software program) may be stored in a non-volatile memory such as random access memory (RAM) and flash memory, Read Only Memory (ROM), Electrically Erasable Programmable Read Only Memory (EEPROM), a magnetic disc storage device, a Compact Disc-ROM (CD-ROM), Digital Versatile Discs (DVDs) or other type of optical storage device, and a magnetic cassette. It may also be possible to store the program in a memory device implemented in combination of part or whole of the aforementioned media. The storage unit may include a plurality of memories.

The program may be stored in an attachable storage device accessible through a communication network implemented as a combination of Internet, intranet, Local Area Network (LAN), Wireless LAN (WLAN), and Storage Area Network (SAN). The storage device may be attached to the device performing the methods according to embodiments of the present disclosure by means of an external port. It may also be possible for a separate storage device installed on a communication network to attach to the device performing the methods according to embodiments of the present disclosure.

In the embodiments of the present disclosure, the components are described in singular or plural forms depending on the embodiment. However, the singular and plural forms are selected appropriately for the proposed situation just for explanatory convenience without any intention of limiting the present disclosure thereto; thus, the singular form includes the plural forms as well, unless the context clearly indicates otherwise.

While the present has been shown and described with reference to various thereof, it will be understood by those skilled in the art that various changes in form and details may be made therein without departing from the spirit and scope of the present disclosure as defined by the appended claims and their equivalents.

What is claimed is:

1. A method performed by a terminal in a communication system, the method comprising:
    receiving, from a base station, a control message including first configuration information for a first scheduling request (SR) and second configuration information for a second SR, wherein the first configuration information corresponds to a priority, a subcarrier spacing, and a transmission time interval (TTI) and the second configuration information corresponds to a priority, a subcarrier spacing, and a TTI;
    identifying that a buffer status report (BSR) is triggered;
    in case that the BSR triggers the first SR and a first counter corresponding to the first SR is lower than a first configured value, transmitting, to the base station, the first SR based on the first configuration information and increasing the first counter by 1, wherein the first configuration information indicates a time and frequency resource for the first SR and a periodicity for the first SR; and
    in case that the BSR triggers the second SR and a second counter corresponding to the second SR is lower than a second configured value, transmitting, to the base station, the second SR based on the second configuration information and increasing the second counter by 1, wherein the second configuration information indicates a time and frequency resource for the second SR and a periodicity for the second SR,
    wherein, in case that the first SR is triggered and no other SRs are pending corresponding to the first SR, the first counter is set to 0,
    wherein, in case that the second SR is triggered and no other SRs are pending corresponding to the second SR, the second counter is set to 0,
    wherein, in case that the first counter is equal to the first configured value, a random access procedure is performed on the base station, and
    wherein, in case that the second counter is equal to the second configured value, a random access procedure is performed on the base station.

2. The method of claim 1, wherein the periodicity for the first SR and the periodicity for the second SR are different from each other.

3. The method of claim 1,
    wherein a first logical channel is mapped to the first configuration information,
    wherein a second logical channel is mapped to the second configuration information, and wherein the identifying that the BSR is triggered comprises identifying a logical channel to which the BSR corresponds.

4. The method of claim 1, wherein the time and frequency resource for the first SR and the time and frequency resource for the second SR include physical layer resources on a physical uplink control channel (PUCCH).

5. A terminal in a communication system, the terminal comprising:
a transceiver; and
a controller configured to:
receive, from a base station via the transceiver, a control message including first configuration information for a first scheduling request (SR) and second configuration information for a second SR, wherein the first configuration information corresponds to a priority, a subcarrier spacing, and a transmission time interval (TTI) and the second configuration information corresponds to a priority, a subcarrier spacing, and a TTI,
identify that a buffer status report (BSR) is triggered,
in case that the BSR triggers the first SR and a first counter corresponding to the first SR is lower than a first configured value, transmit, to the base station via the transceiver, the first SR based on the first configuration information and increase the first counter by 1, wherein the first configuration information indicates a time and frequency resource for the first SR and a periodicity for the first SR, and
in case that the BSR triggers the second SR and a second counter corresponding to the second SR is lower than a second configured value, transmit, to the base station via the transceiver, the second SR based on the second configuration information and increase the second counter by 1, wherein the second configuration information indicates a time and frequency resource for the second SR and a periodicity for the second SR,
wherein, in case that the first SR is triggered and no other SRs are pending corresponding to the first SR, the first counter is set to 0,
wherein, in case that the second SR is triggered and no other SRs are pending corresponding to the second SR, the second counter is set to 0,
wherein, in case that the first counter is equal to the first configured value, a random access procedure is performed on the base station, and
wherein, in case that the second counter is equal to the second configured value, a random access procedure is performed on the base station.

6. The terminal of claim 5, wherein the periodicity for the first SR and the periodicity for the second SR are different from each other.

7. The terminal of claim 5,
wherein a first logical channel is mapped to the first configuration information,
wherein a second logical channel is mapped to the second configuration information, and
wherein the controller is configured to identify a logical channel to which the BSR corresponds.

8. The terminal of claim 5, wherein the time and frequency resource for the first SR and the time and frequency resource for the second SR include physical layer resources on a physical uplink control channel (PUCCH).

9. A method performed by a base station in a communication system, the method comprising:

transmitting, to a terminal, a control message including first configuration information for a first scheduling request (SR), and second configuration information for a second SR, wherein the first configuration information corresponds to a priority, a subcarrier spacing, and a transmission time interval (TTI) and the second configuration information corresponds to a priority, a subcarrier spacing, and a TTI;
in case that a buffer status report (BSR) triggers the first SR and a first counter corresponding to the first SR is lower than a first configured value, receiving, from the terminal, the first SR based on the first configuration information, the first counter being incremented by 1 based on the first SR, wherein the first configuration information indicates a time and frequency resource for the first SR and a periodicity for the first SR; and
in case that the triggered BSR triggers the second SR and a second counter corresponding to the second SR is lower than a second configured value, receiving, from the terminal, the second SR based on the second configuration information, the second counter being incremented by 1 based on the second SR, wherein the second configuration information indicates a time and frequency resource for the second SR and a periodicity for the second SR,
wherein, in case that the first SR is triggered and no other SRs are pending corresponding to the first SR, the first counter is set to 0,
wherein, in case that the second SR is triggered and no other SRs are pending corresponding to the second SR, the second counter is set to 0,
wherein, in case that the first counter is equal to the first configured value, a random access procedure is performed with the terminal, and
wherein, in case that the second counter is equal to the second configured value, a random access procedure is performed with the terminal.

10. The method of claim 9, wherein the periodicity for the first SR and the periodicity for the second SR are different from each other.

11. The method of claim 9,
wherein a first logical channel is mapped to the first configuration information,
wherein a second logical channel is mapped to the second configuration information, and
wherein the logical channel to which the BSR corresponds is identified.

12. The method of claim 9, wherein the time and frequency resource for the first SR and the time and frequency resource for the second SR include physical layer resources on a physical uplink control channel (PUCCH).

13. A base station in a communication system, the base station comprising:
a transceiver; and
a controller configured to:
transmit, to a terminal via the transceiver, a control message including first configuration information for a first scheduling request (SR) and; second configuration information for a second SR, wherein the first configuration information corresponds to a priority, a subcarrier spacing, and a transmission time interval (TTI) and the second configuration information corresponds to a priority, a subcarrier spacing, and a TTI,
in case that a buffer status report (BSR) triggers the first SR and a first counter corresponding to the first SR is lower than a first configured value, receive, from the terminal via the transceiver, the first SR based on the first configuration information, the first counter being incremented by 1 based on the first SR, wherein the first configuration information indicates a time and frequency resource for the first SR and a periodicity for the first SR, and in case that the BSR triggers the second SR and a second counter corresponding to the second SR is lower than a second configured value, receive, from the terminal via the transceiver, the second SR based on the second configuration information, the second counter being incremented by 1 based on the second SR, wherein the second configuration information indicates a time and frequency resource for the second SR and a periodicity for the second SR, wherein, in case that the first SR is triggered and no other SRs are pending corresponding to the first SR, the first counter is set to 0, wherein, in case that the second SR is triggered and no other SRs are pending corresponding to the second SR, the second counter is set to 0, wherein, in case that the first counter is equal to the first configured value, a random access procedure is performed with the terminal, and wherein, in case that the second counter is equal to the second configured value, a random access procedure is performed with the terminal.

14. The base station of claim 13, wherein the periodicity for the first SR and the periodicity for the second SR are different from each other.

15. The base station of claim 13,
wherein a first logical channel is mapped to the first configuration information,
wherein a second logical channel is mapped to the second configuration information, and
wherein the logical channel to which the BSR corresponds is identified.

16. The base station of claim 13, wherein the time and frequency resource for the first SR and the time and frequency resource for the second SR include physical layer resources on a physical uplink control channel (PUCCH).

* * * * *